US007192171B2

(12) United States Patent
Rodriguez Barros et al.

(10) Patent No.: US 7,192,171 B2
(45) Date of Patent: Mar. 20, 2007

(54) REAR-VIEW MIRROR WITH MULTIFUNCTIONAL SIGNAL

(76) Inventors: Alejandro Rodriguez Barros, Francesc Macia, 67 Atico 2a, Mollet del Valles 08100 (ES); Jose Manuel Rodriguez Fernandez, Francesc Macia, 67 Atico 2a, Mollet del Valles 08100 (ES)

( * ) Notice: Subject to any disclaimer, the term of this patent is extended or adjusted under 35 U.S.C. 154(b) by 0 days.

(21) Appl. No.: 11/157,075

(22) Filed: Jun. 20, 2005

(65) Prior Publication Data

US 2005/0276059 A1 Dec. 15, 2005

Related U.S. Application Data

(60) Division of application No. 10/340,360, filed on Jan. 9, 2003, now Pat. No. 6,926,432, which is a continuation of application No. PCT/ES01/00251, filed on Jun. 22, 2001.

(30) Foreign Application Priority Data

Jul. 12, 2000 (ES) ................................ 200001834

(51) Int. Cl.
*B60Q 1/26* (2006.01)

(52) U.S. Cl. ...................................... 362/494; 362/545

(58) Field of Classification Search ................ 362/494, 362/492, 135, 136, 800, 540, 544, 545, 543, 362/511, 509, 516, 240, 294; 340/475, 478, 340/468, 469, 474

See application file for complete search history.

(56) References Cited

U.S. PATENT DOCUMENTS 4,965,950 A 10/1990 Yamada ........................ 40/546
5,671,996 A 9/1997 Bos et al. ................... 362/488
5,879,074 A * 3/1999 Pastrick ...................... 362/494
6,139,171 A 10/2000 Waldmann .................. 362/494

(Continued)

FOREIGN PATENT DOCUMENTS

DE 19538771 4/1997

(Continued)

OTHER PUBLICATIONS

International Search Report dated Nov. 5, 2001 for PCT/ES01/00251 (2 pp.).

*Primary Examiner*—Alan Cariaso
*Assistant Examiner*—Bao Q. Truong
(74) *Attorney, Agent, or Firm*—Jones Day

(57) ABSTRACT

The invention relates to a rear-view mirror for vehicles, which consists of compatible, combinable and exchangeable modules such as: (A) and (B), or integrated (A+B), functional, signal, lighting and sensor modules, and structural (C), (D) and (E) modules; cover-housing, body-housing and support which may include functional modules. (A), (B) and (A+B) fulfill their function even if the rear-view mirror is folded. They use a multifocal light source of LED's inserted into a flexible and orientable circuit and/or a mixed rigid-flexible circuit-combining LED's+bulbs and other lighting elements, with variable optical and reflective means enabling more than one signal from one same transparent surface with direct light output, indirect-reflected light output and/or through intermediate optical light guides depending on the directions required in the front, the side, the back and the lateral ground for different commands, applications and safety signals.

35 Claims, 103 Drawing Sheets

U.S. PATENT DOCUMENTS

| | | | | |
|---|---|---|---|---|
| 6,176,602 | B1 | 1/2001 | Pastrick et al. | 362/494 |
| 6,195,261 | B1 | 2/2001 | Babutzka et al. | 361/752 |
| 6,244,716 | B1 | 6/2001 | Steenwyk et al. | 359/603 |
| 6,250,784 | B1 | 6/2001 | Kayama | 362/494 |
| 6,264,353 | B1 | 7/2001 | Caraher et al. | 362/494 |
| 6,276,821 | B1 | 8/2001 | Pastrick et al. | 362/494 |
| 6,315,437 | B1 | 11/2001 | Katz et al. | 362/494 |
| 6,502,970 | B1 | 1/2003 | Anderson et al. | 362/494 |
| 6,695,465 | B2 | 2/2004 | Apfelbeck | 362/494 |

FOREIGN PATENT DOCUMENTS

| | | |
|---|---|---|
| DE | 19646042 | 5/1998 |
| DE | 20001407 | 4/2000 |
| EP | 0719674 | 7/1996 |
| EP | 0886462 | 12/1998 |
| EP | 0967118 | 12/1999 |
| EP | 0972680 | 1/2000 |
| WO | 9412368 | 6/1994 |
| WO | 0030893 | 6/2000 |
| WO | 0142048 | 6/2001 |

* cited by examiner

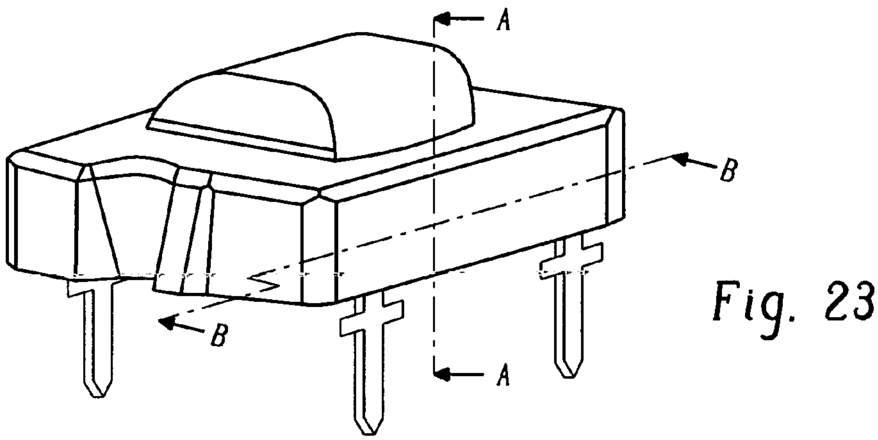
Fig. 23
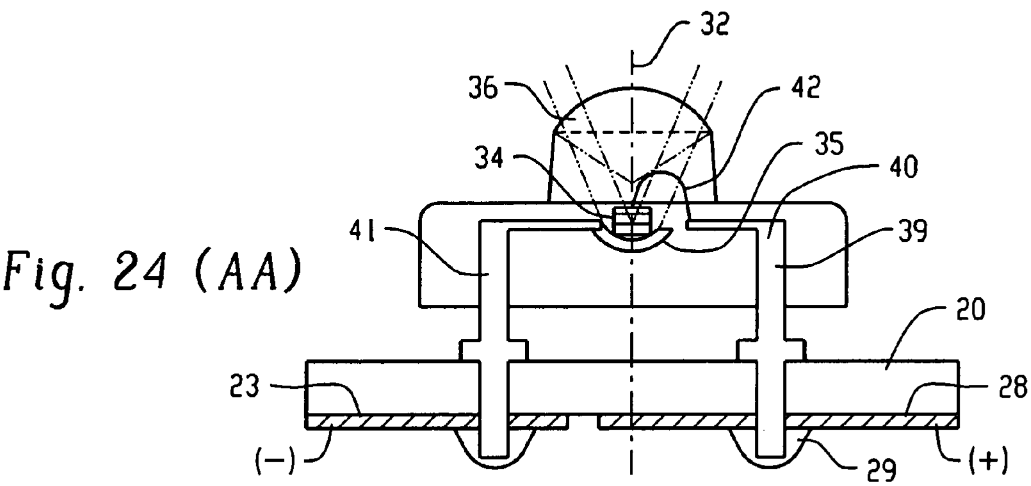
Fig. 24 (AA)
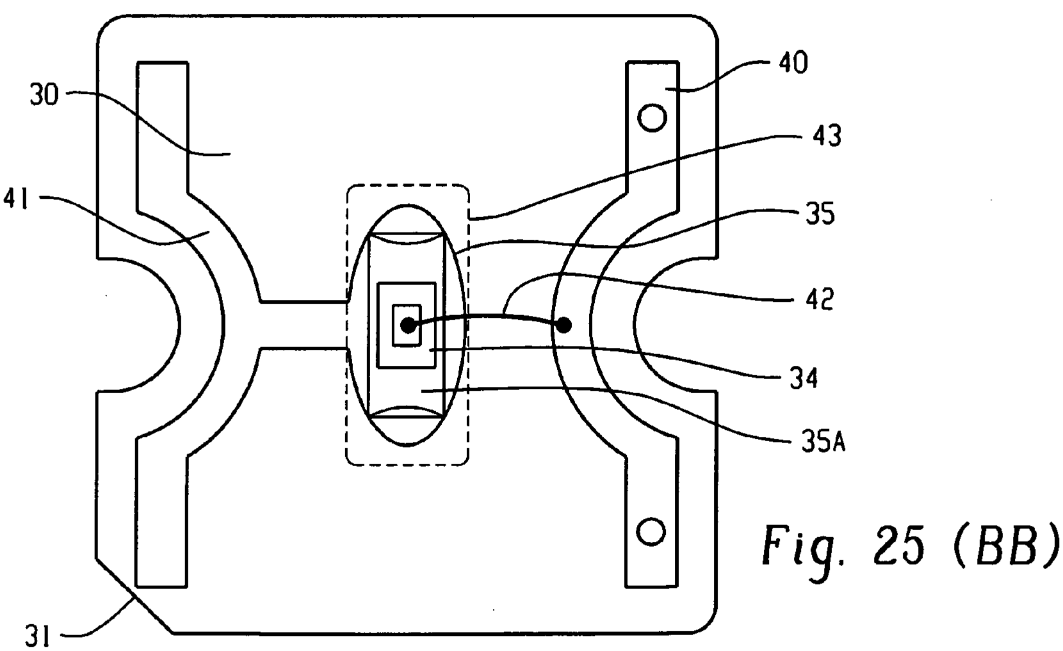
Fig. 25 (BB)

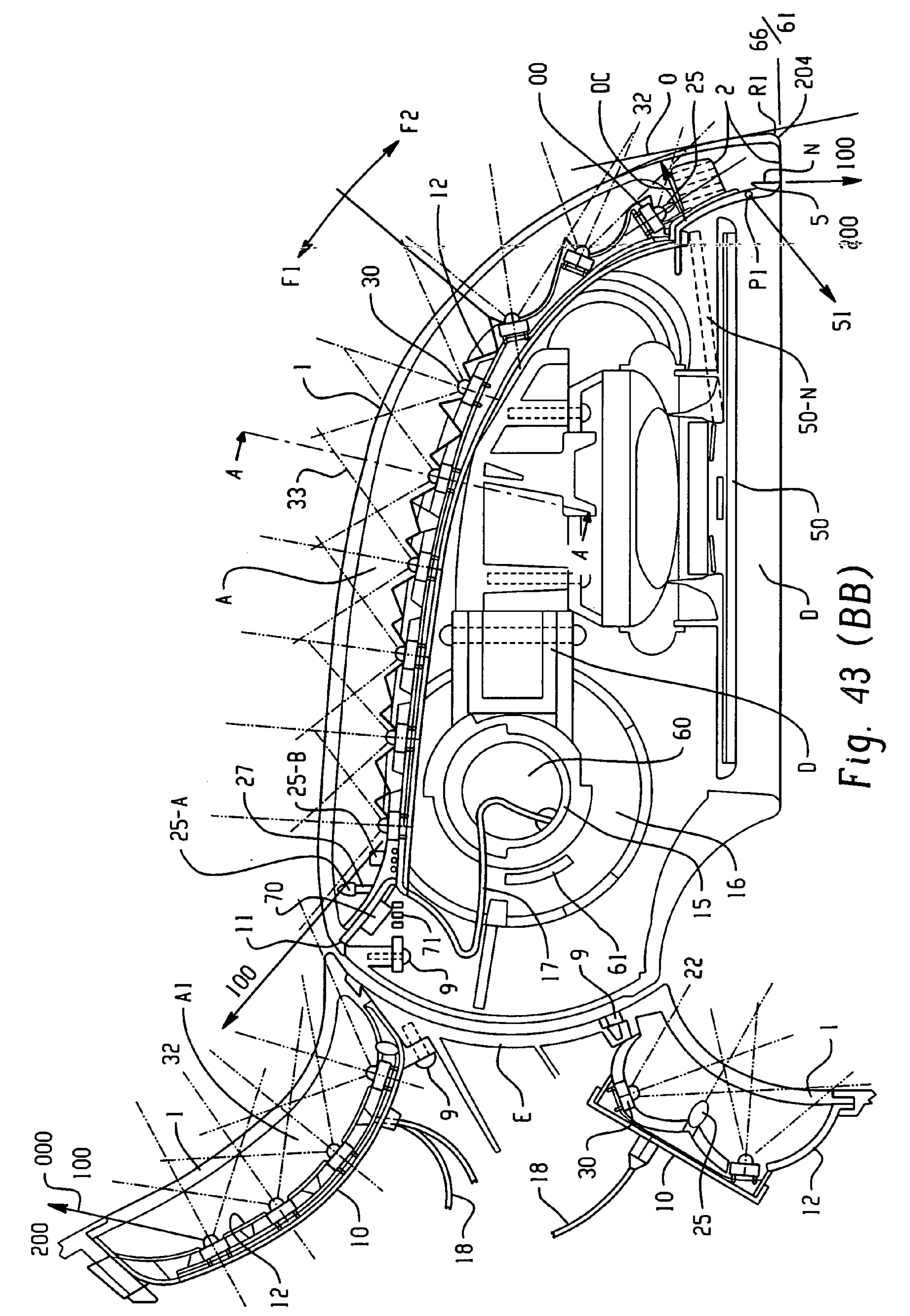
Fig. 43 (BB)

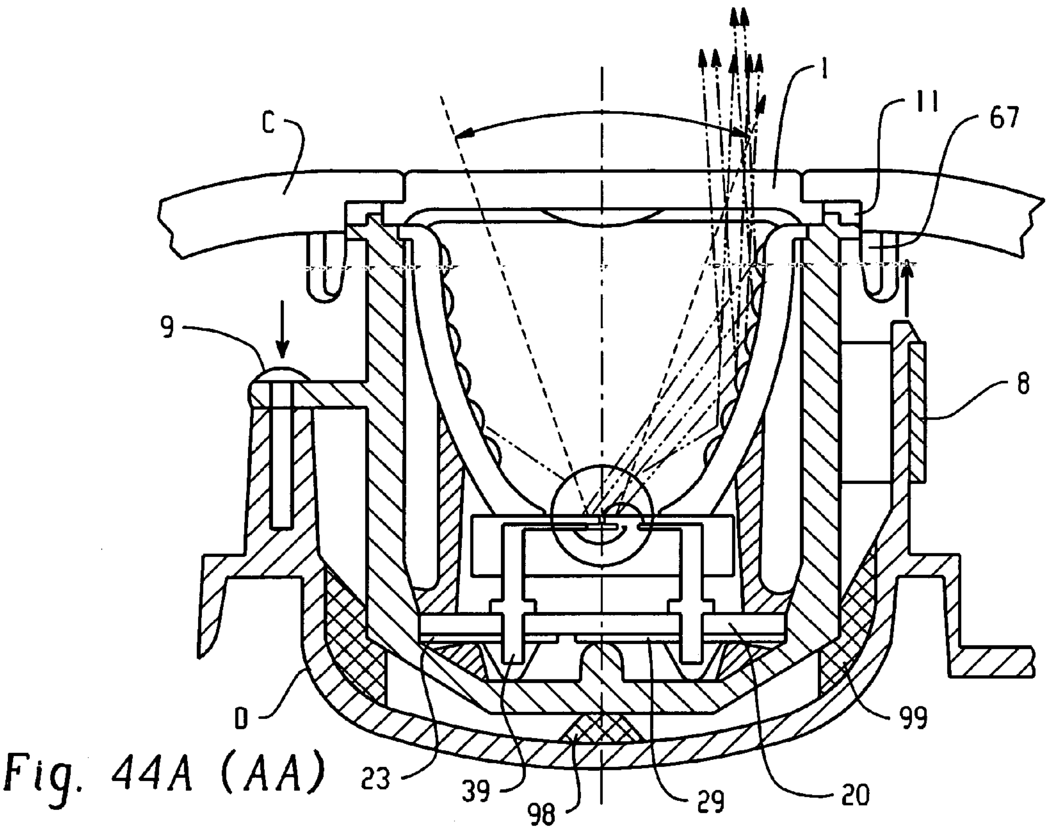
Fig. 44A (AA)
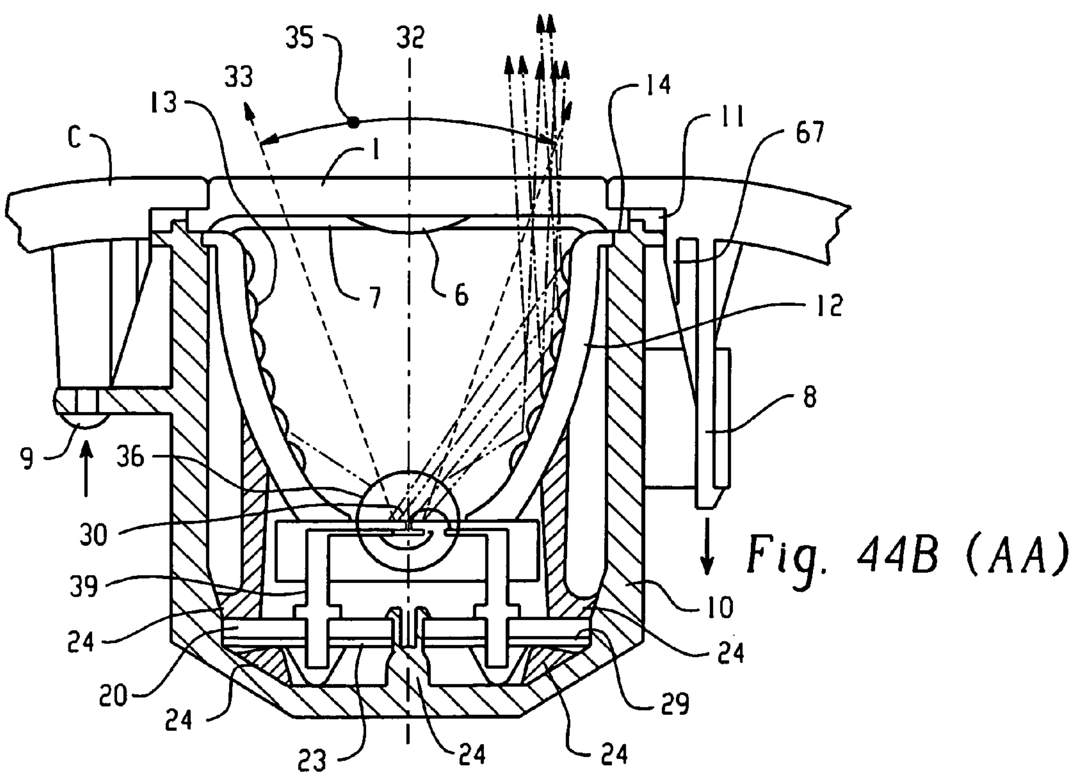
Fig. 44B (AA)

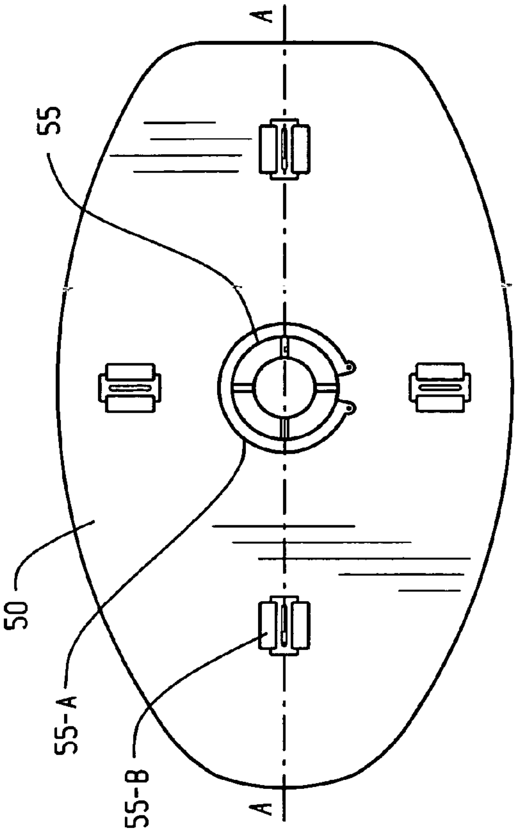
Fig. 45B1
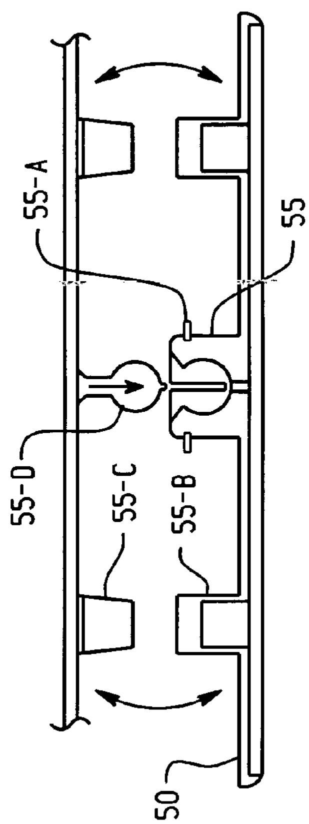
Fig. 45B2
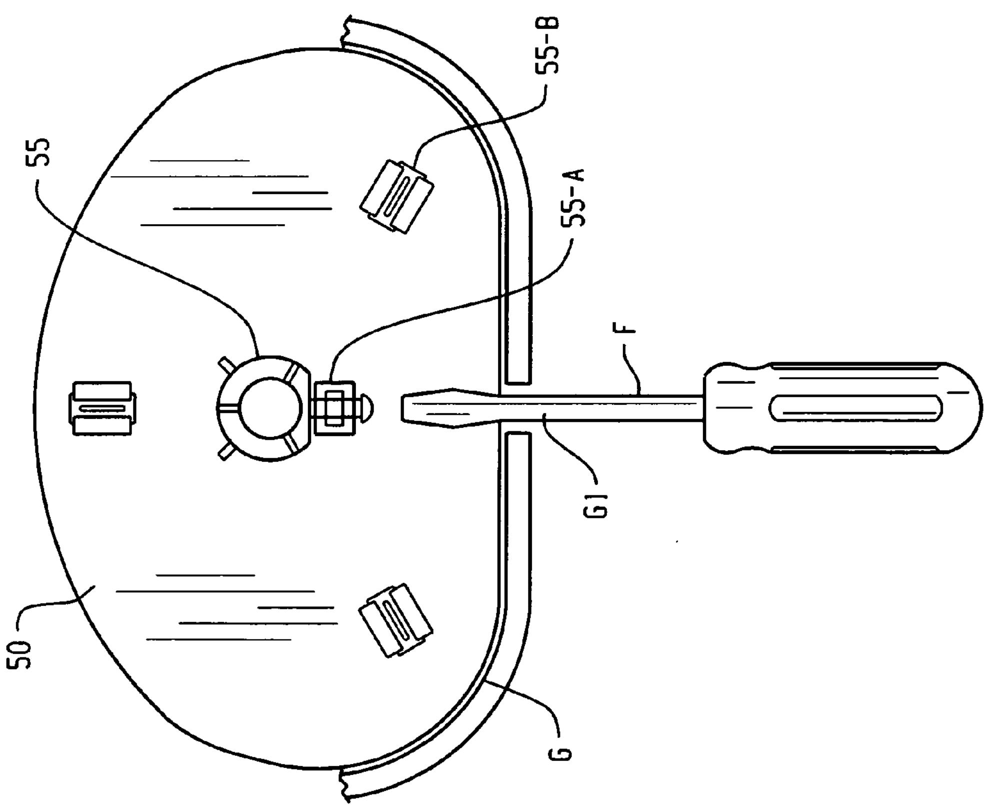
Fig. 45A

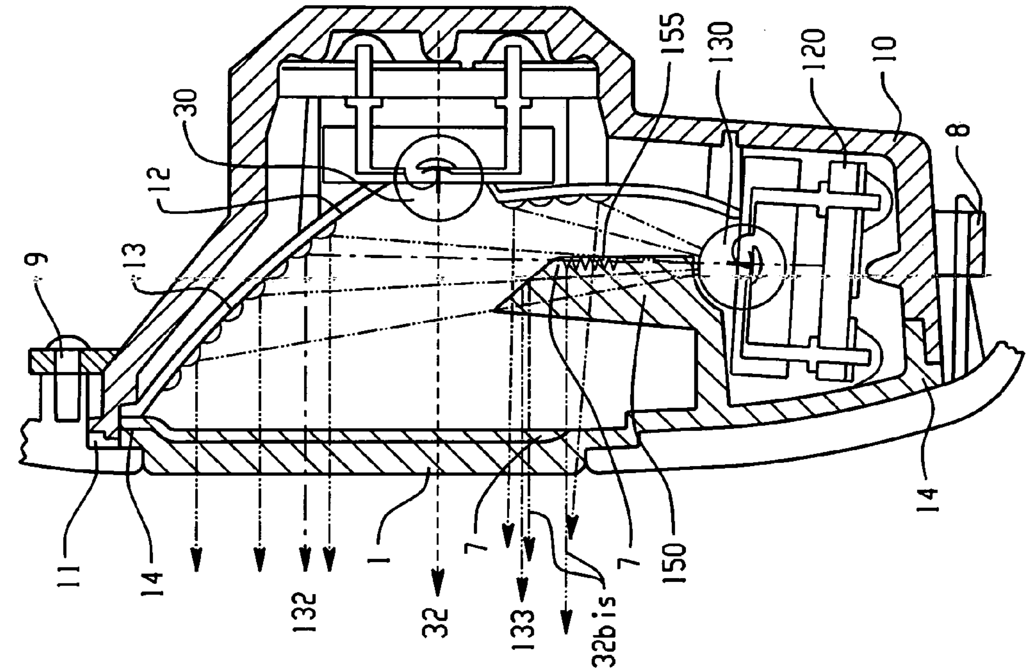
Fig. 48B (AA)
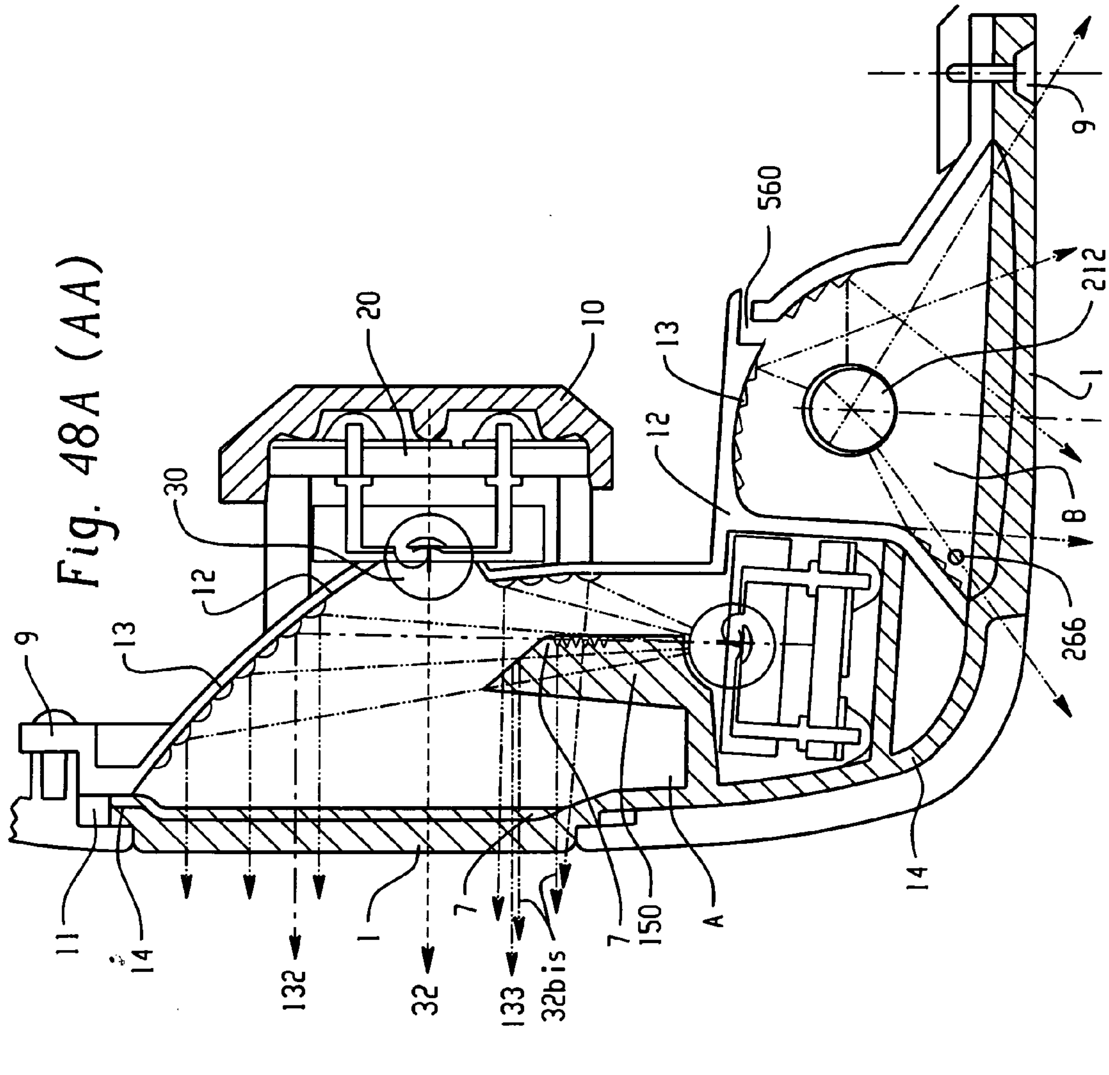
Fig. 48A (AA)

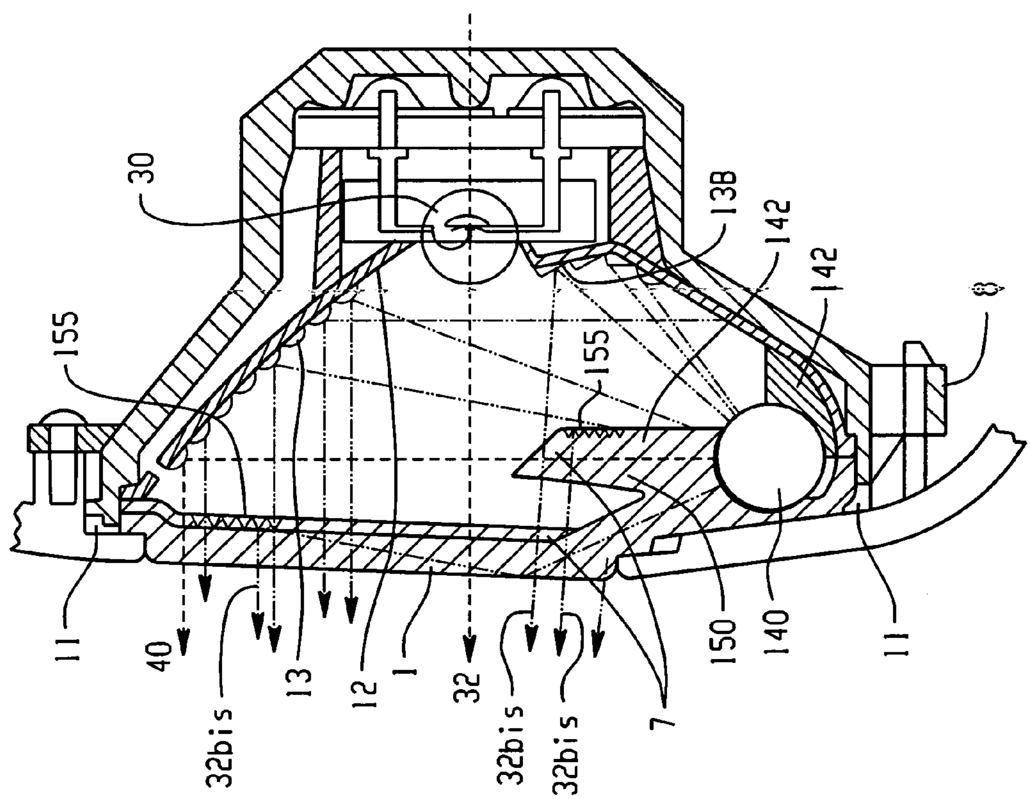
Fig. 50B (AA)
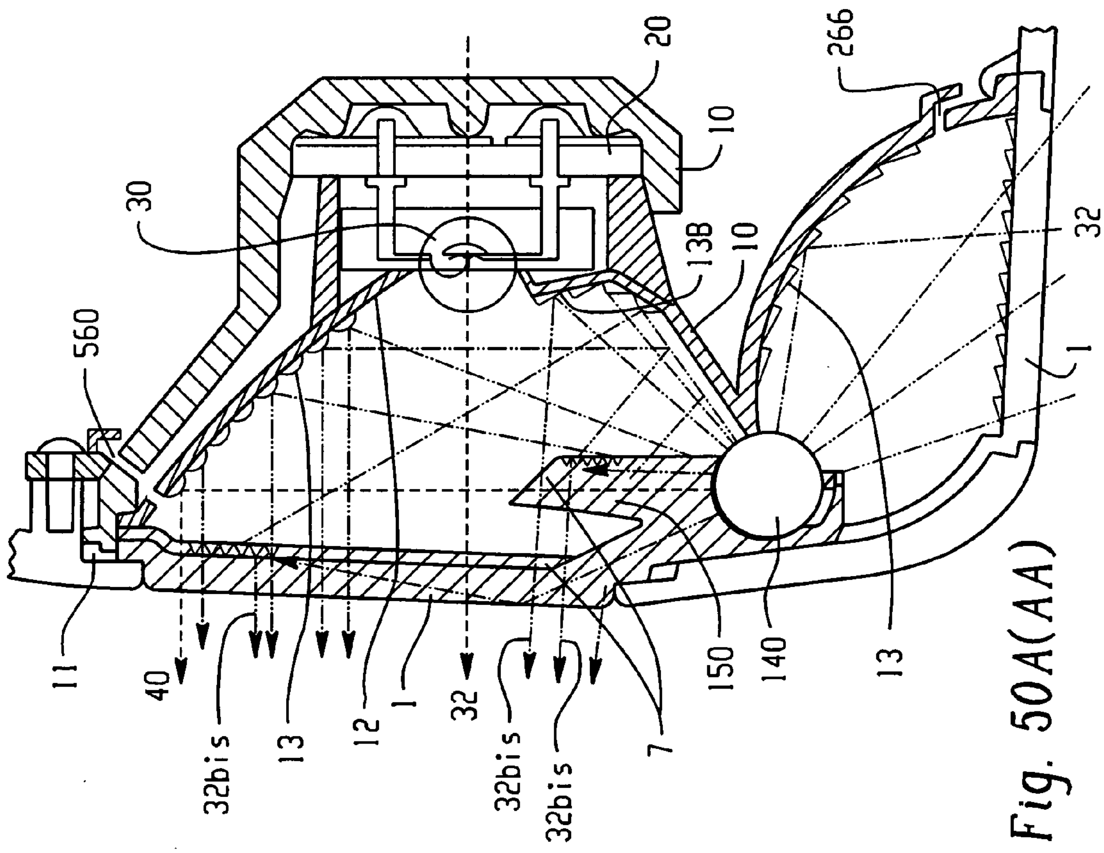
Fig. 50A(AA)

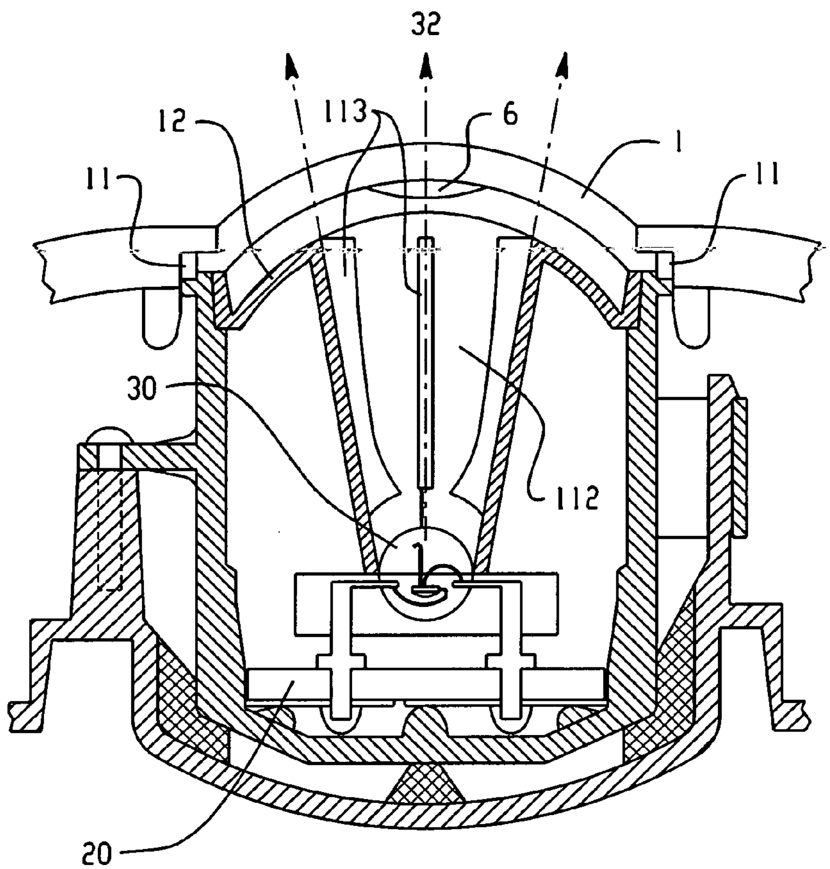
Fig. 54 (AA)
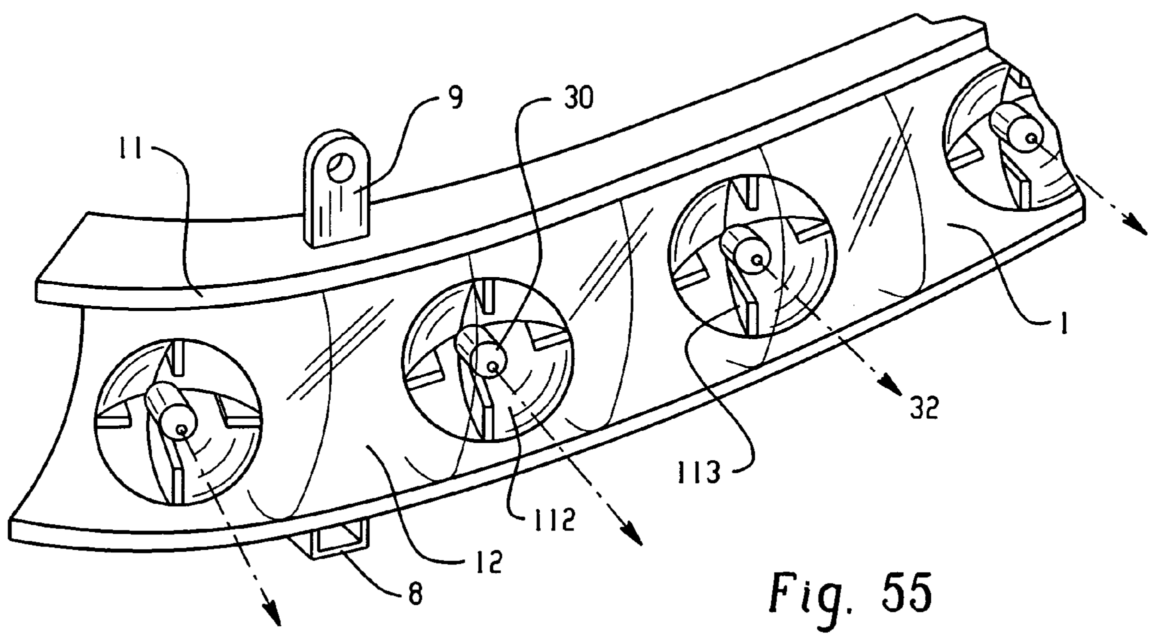
Fig. 55

Fig. 56 (AA)

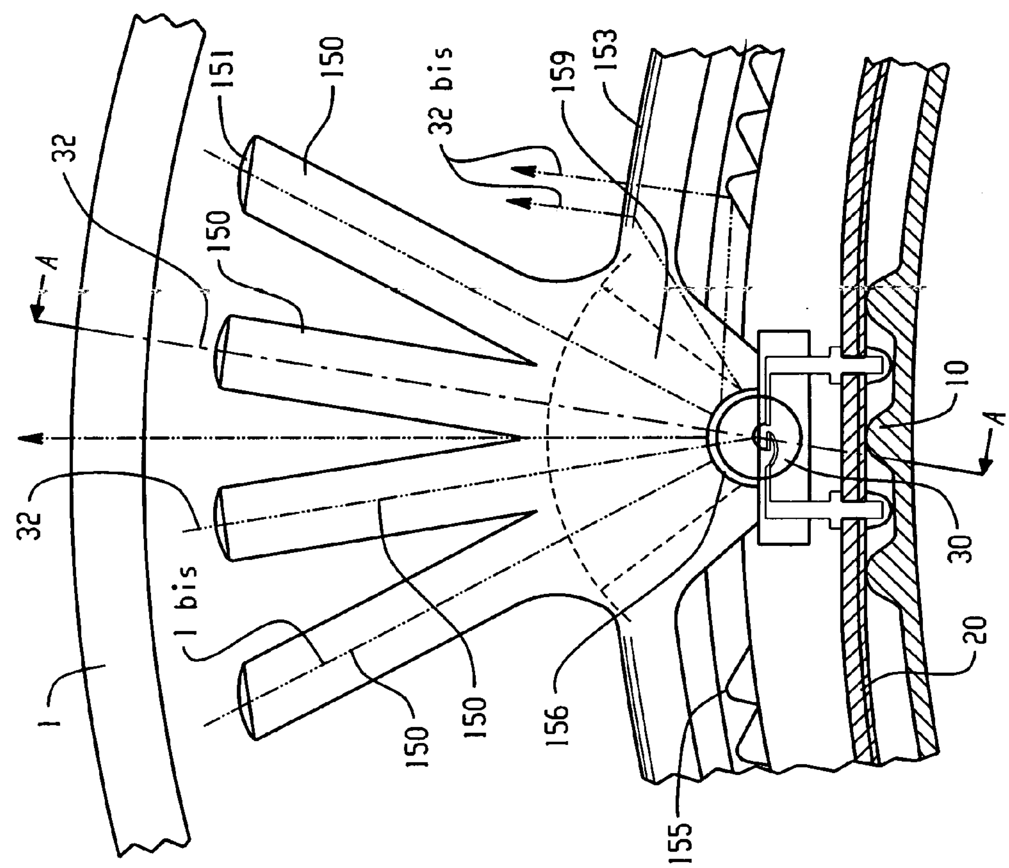
Fig. 62C (BB)
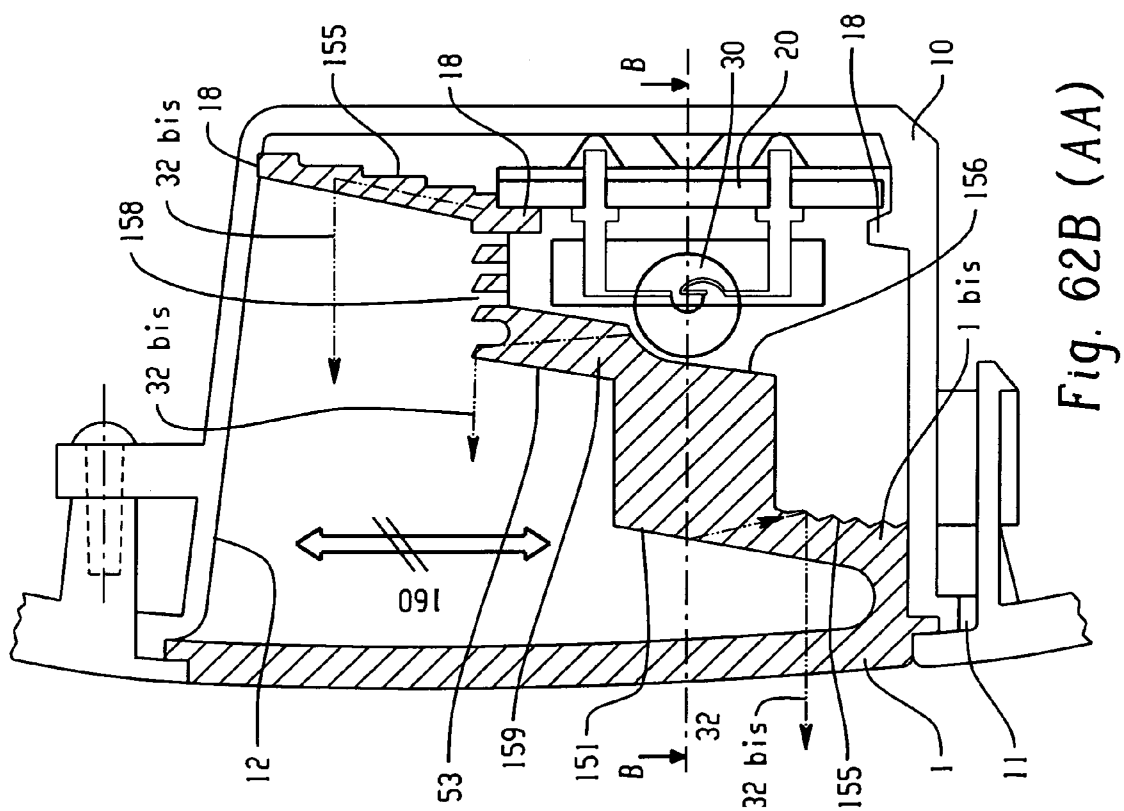
Fig. 62B (AA)

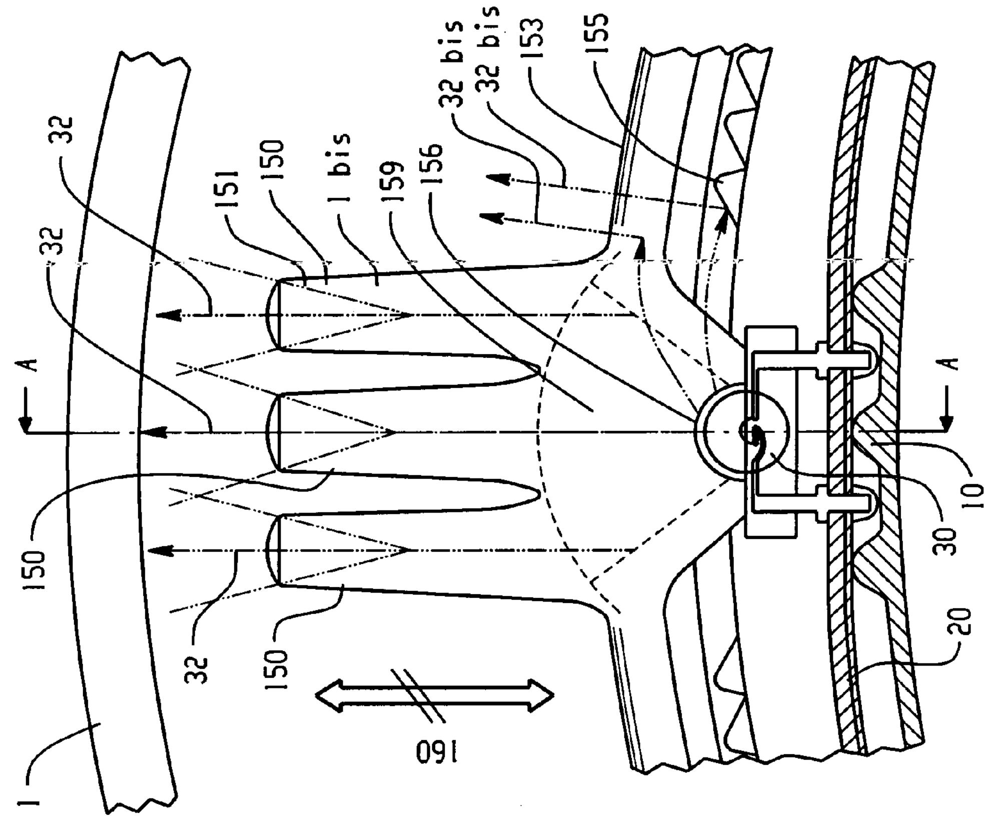
Fig. 63B (BB)
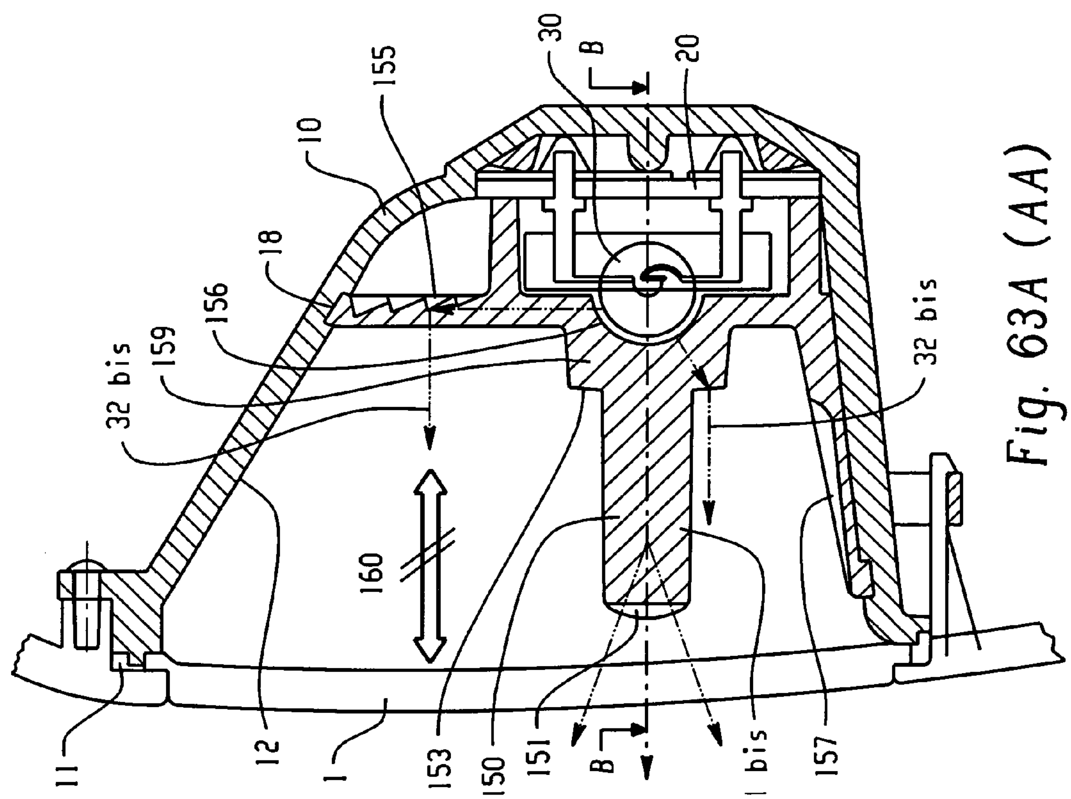
Fig. 63A (AA)

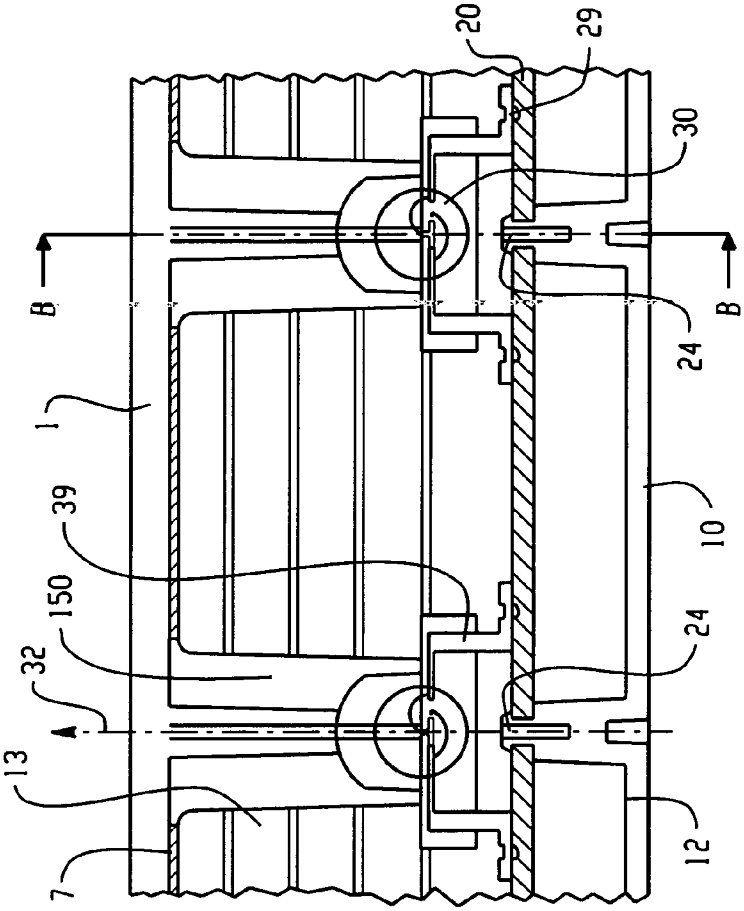
Fig. 64B (BB)
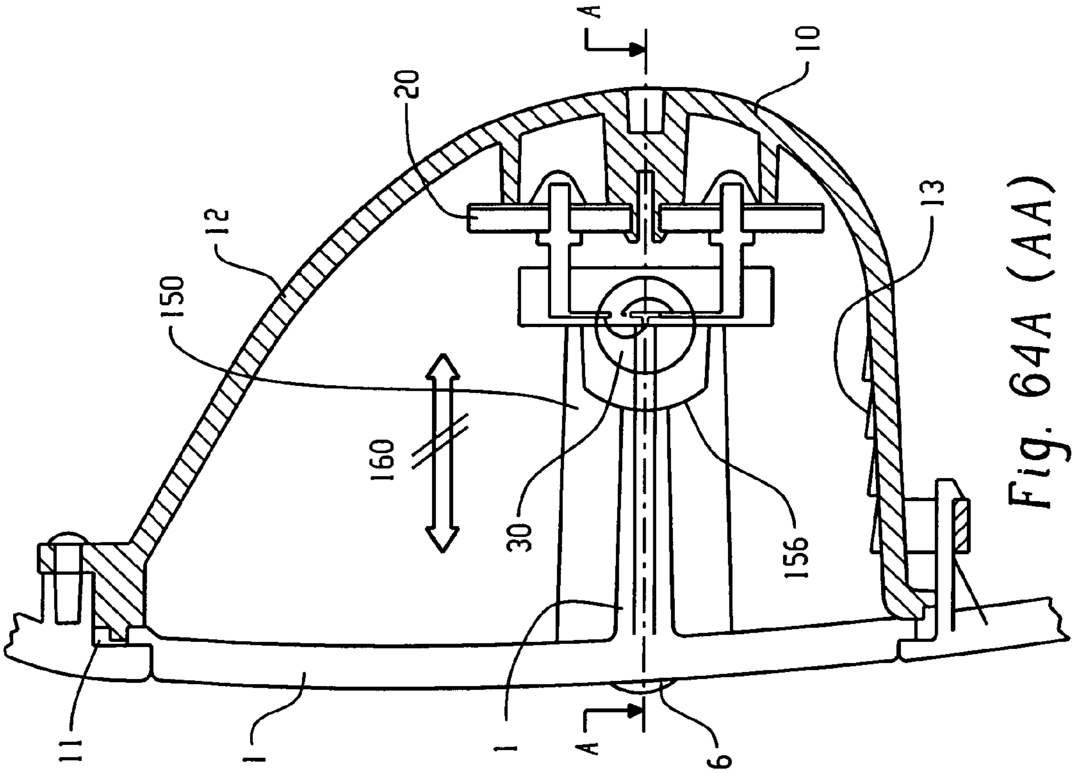
Fig. 64A (AA)

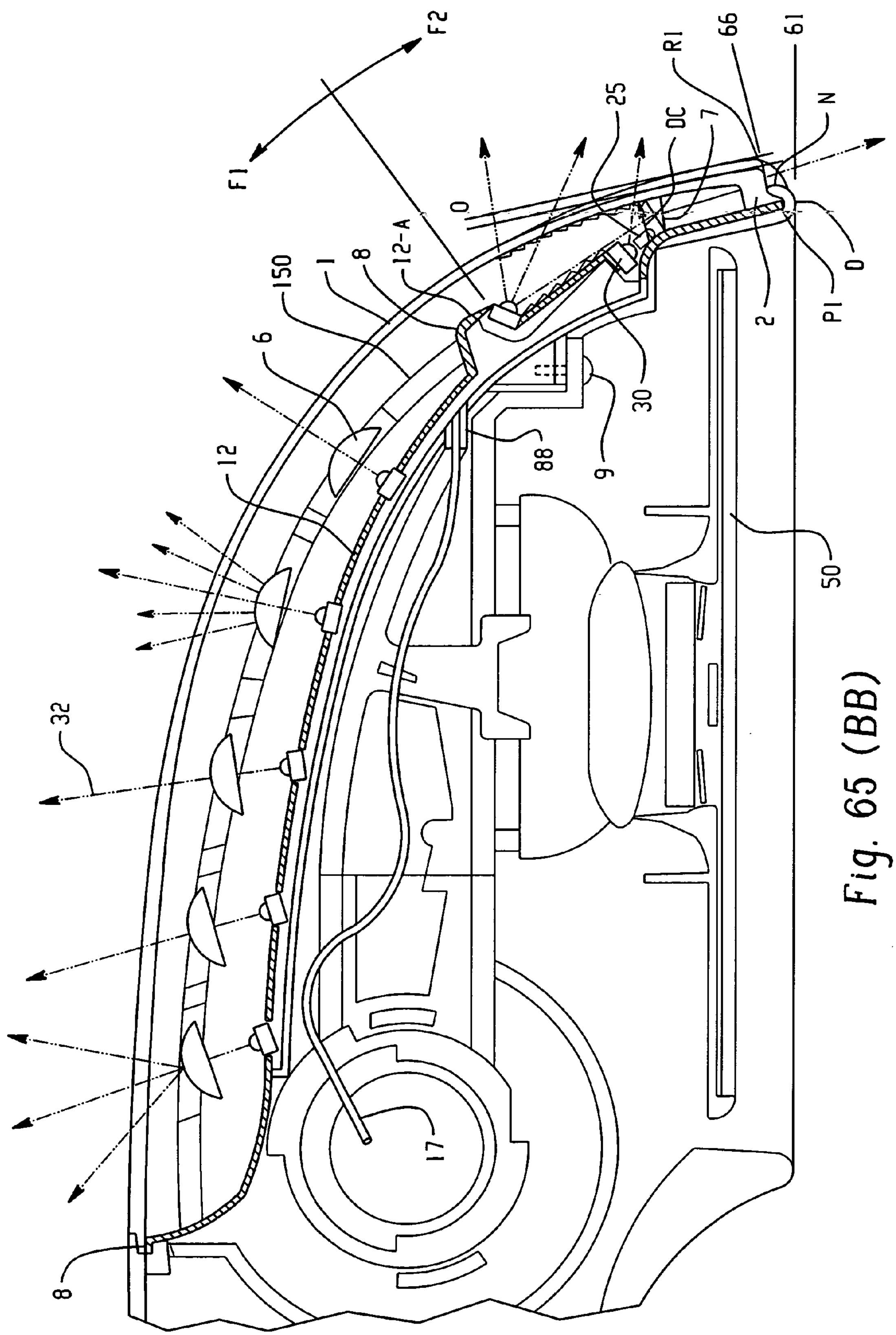
Fig. 65 (BB)

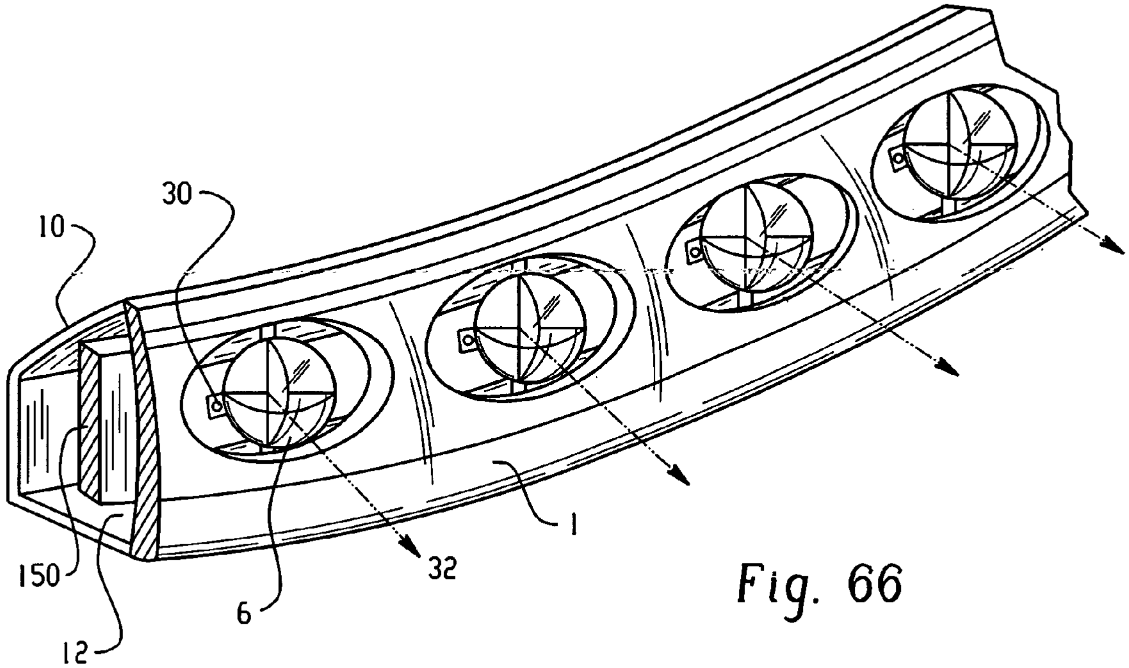
Fig. 66
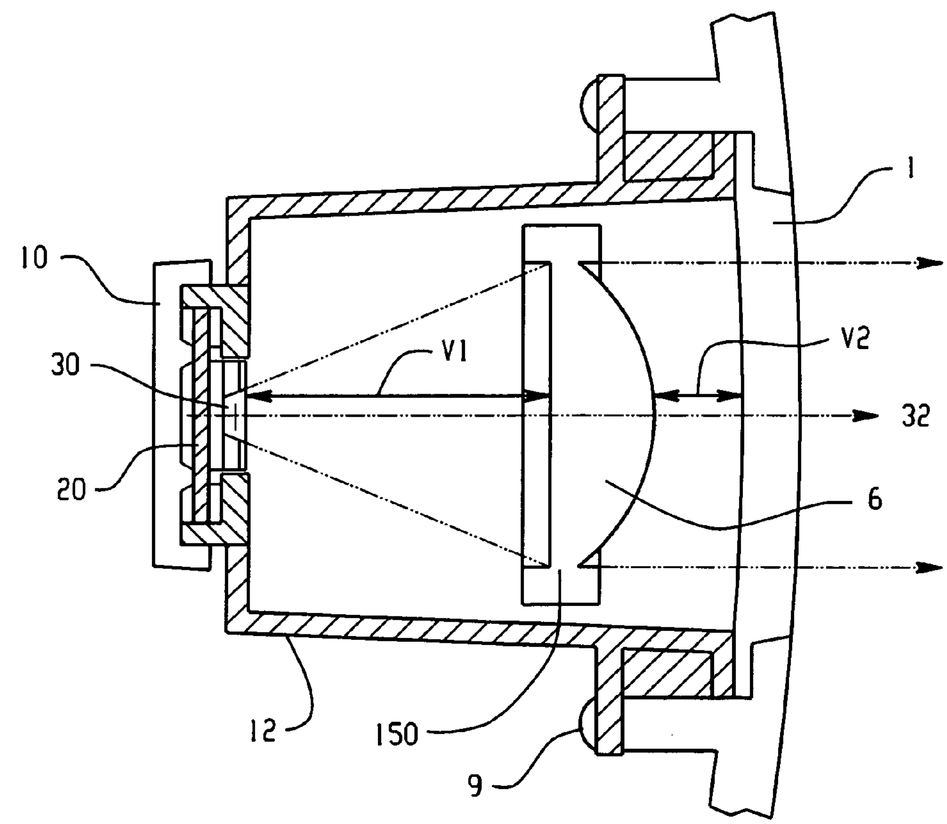
Fig. 67 (AA)

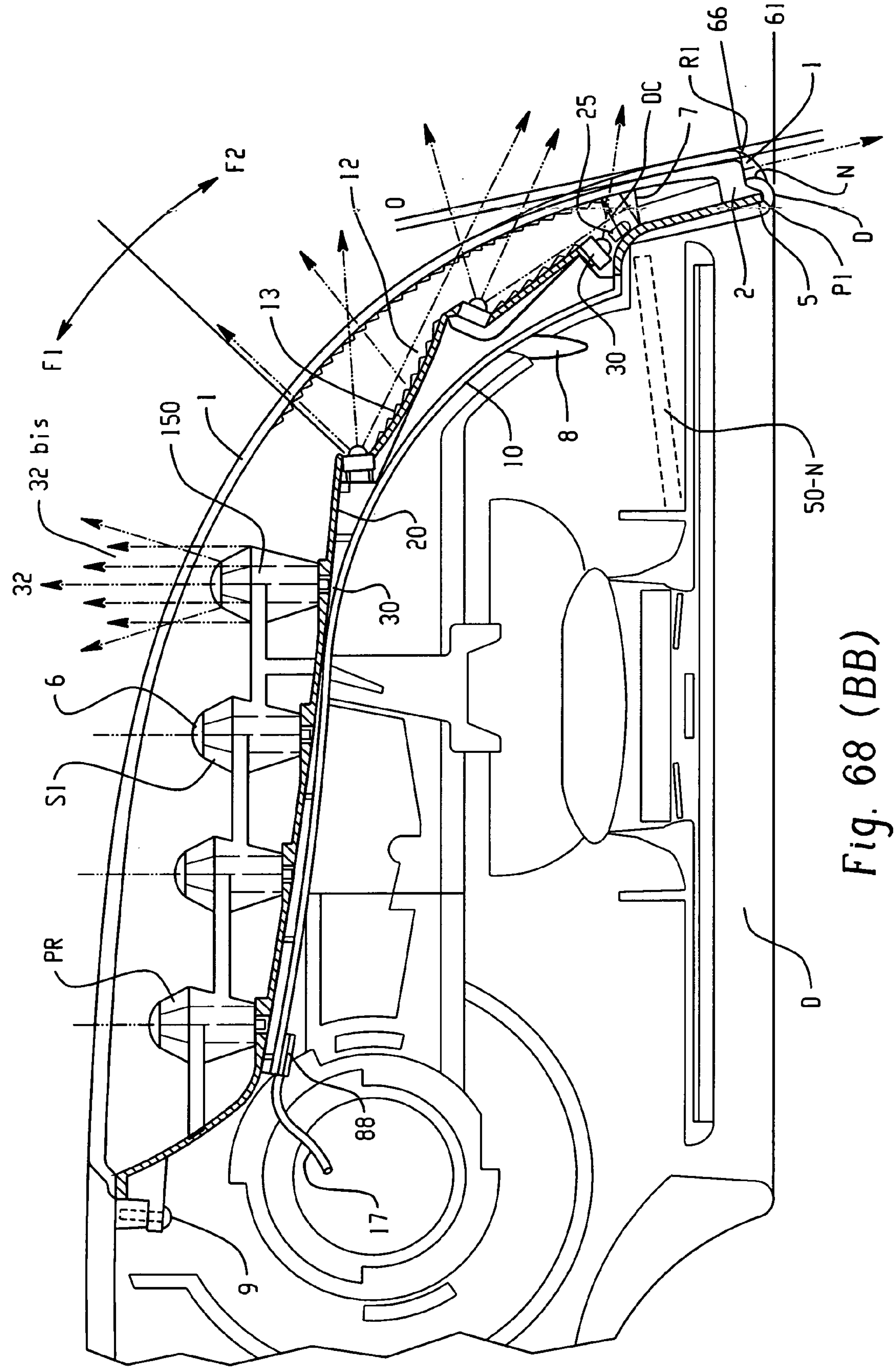
Fig. 68 (BB)

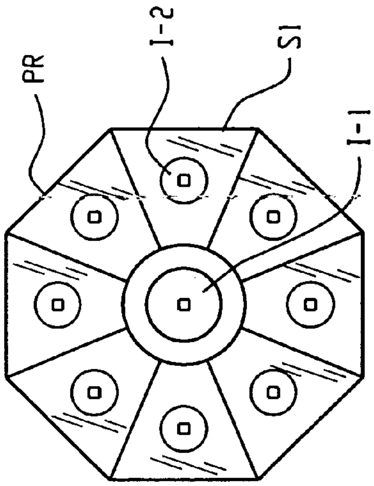
Fig. 70A (AA)
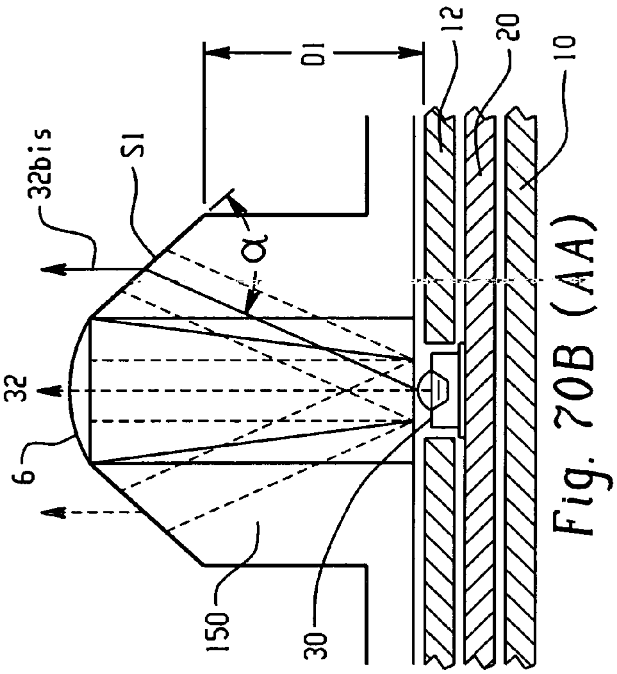
Fig. 70B (AA)
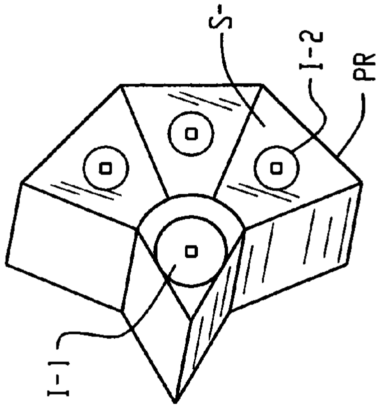
Fig. 69C
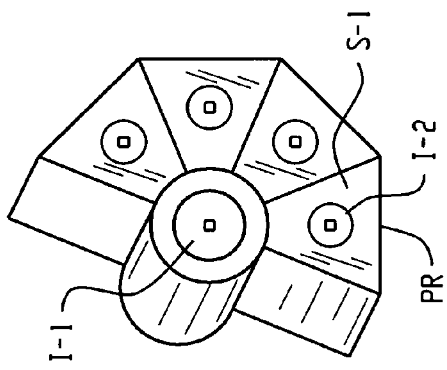
Fig. 69D
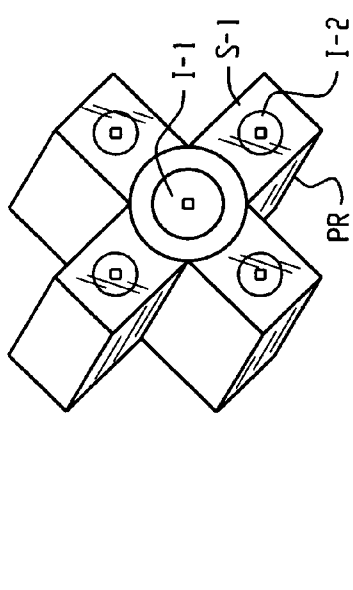
Fig. 69A
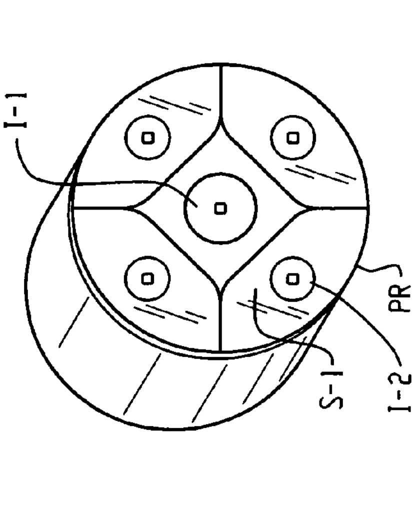
Fig. 69B

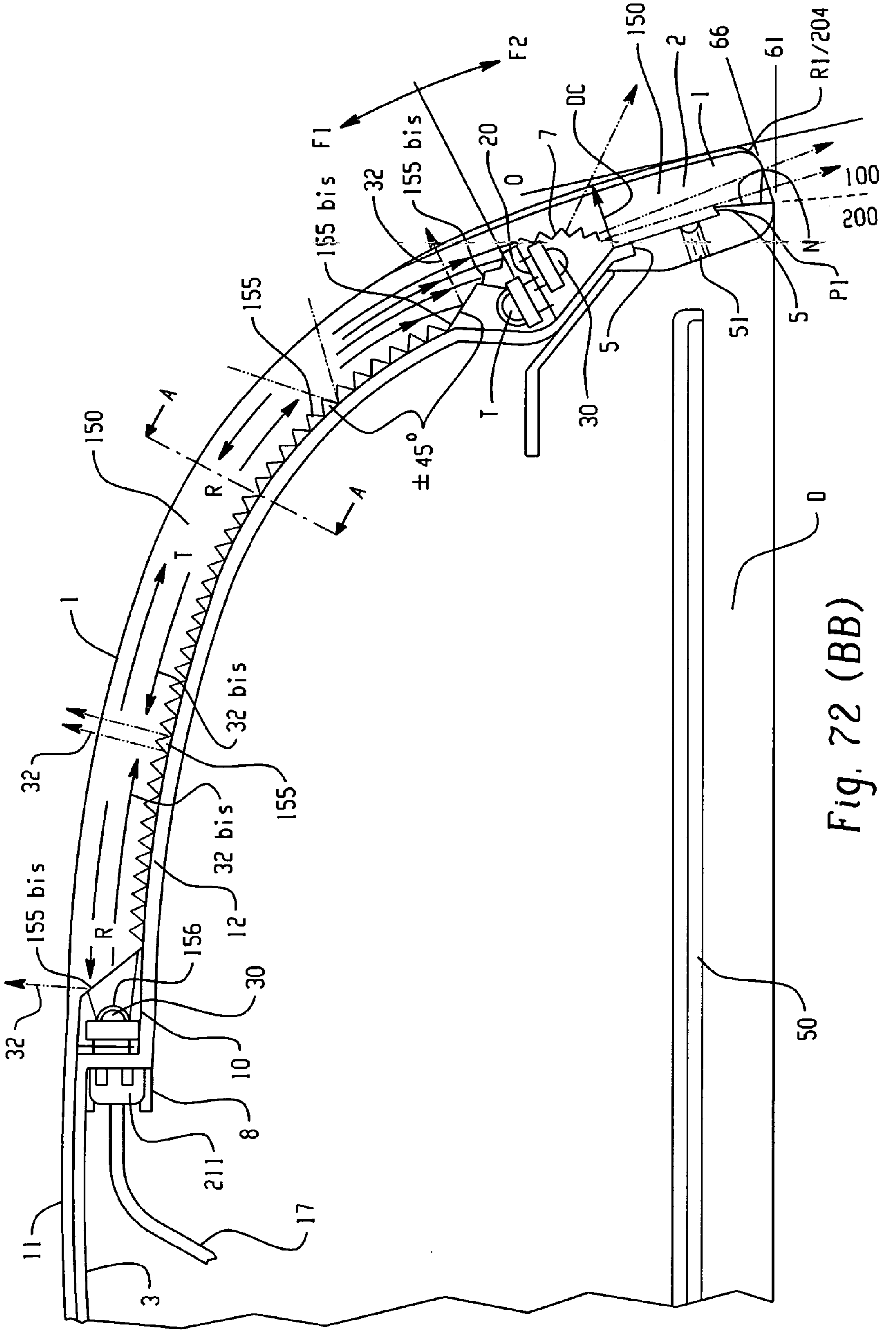
Fig. 72 (BB)

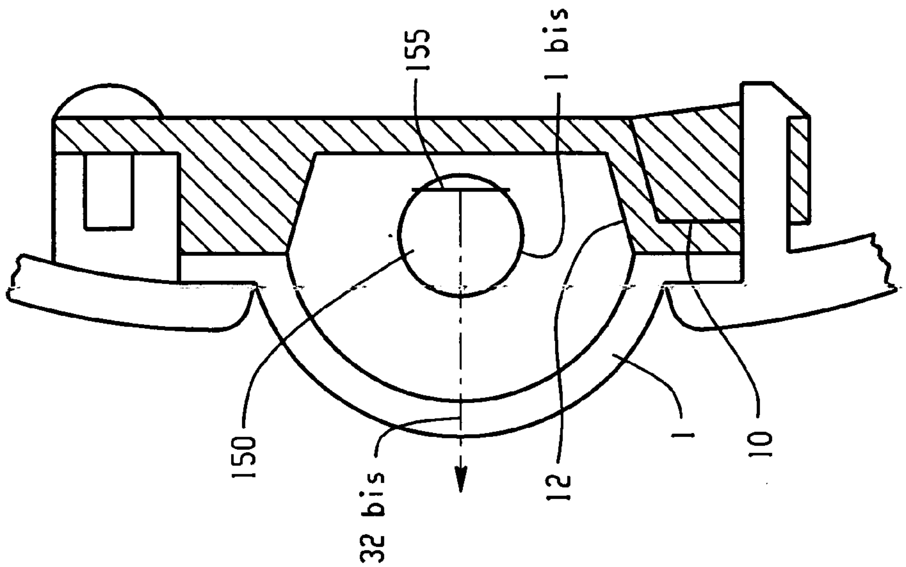
Fig. 73C (AA)
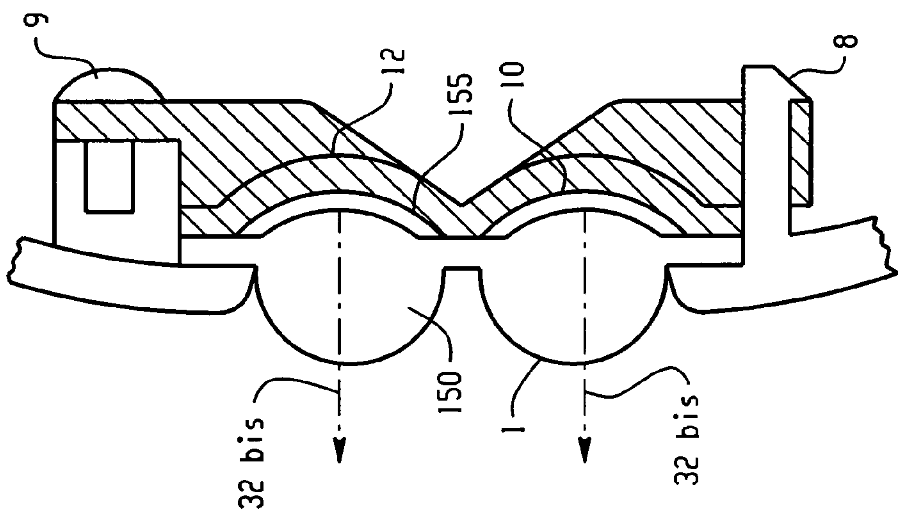
Fig. 73B (AA)
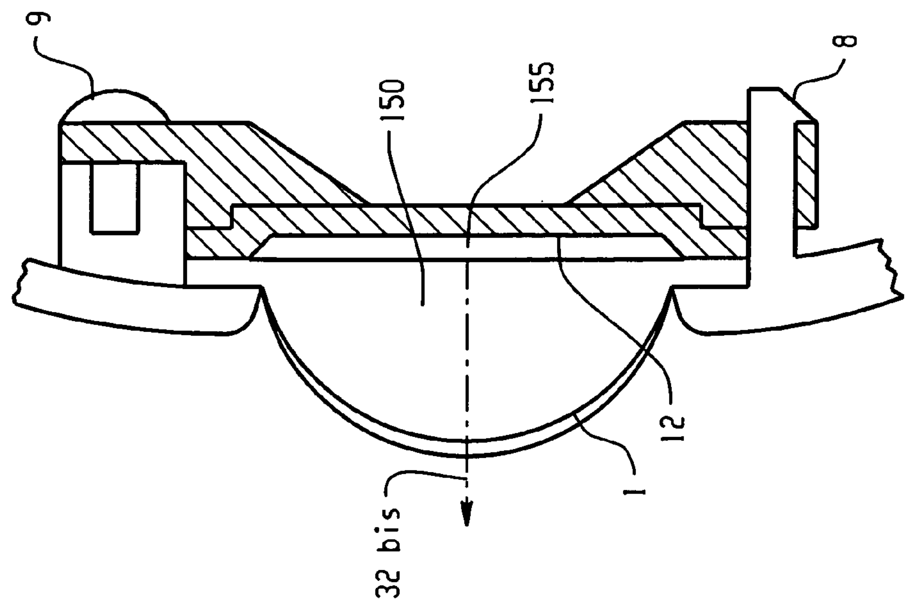
Fig. 73A (AA)

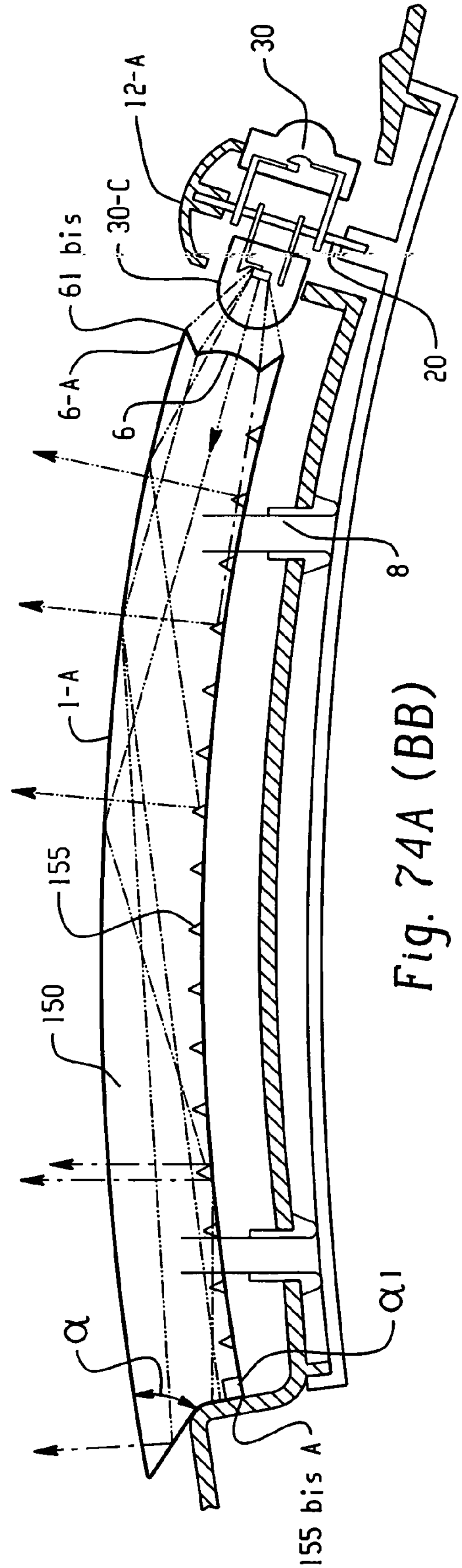
Fig. 74A (BB)
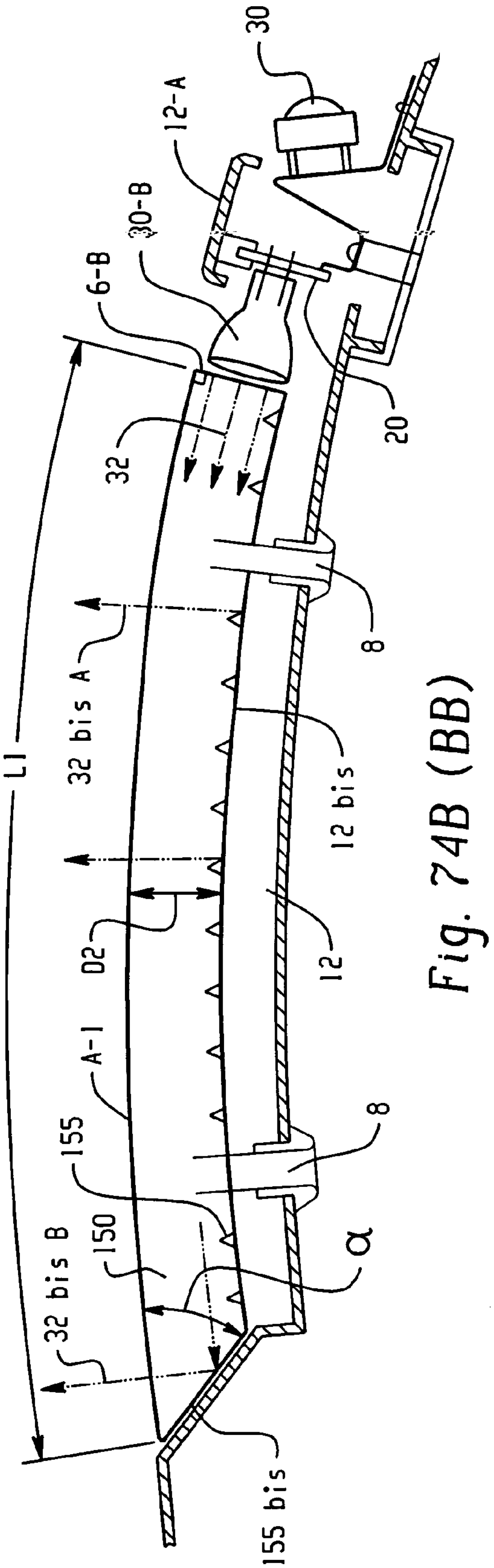
Fig. 74B (BB)

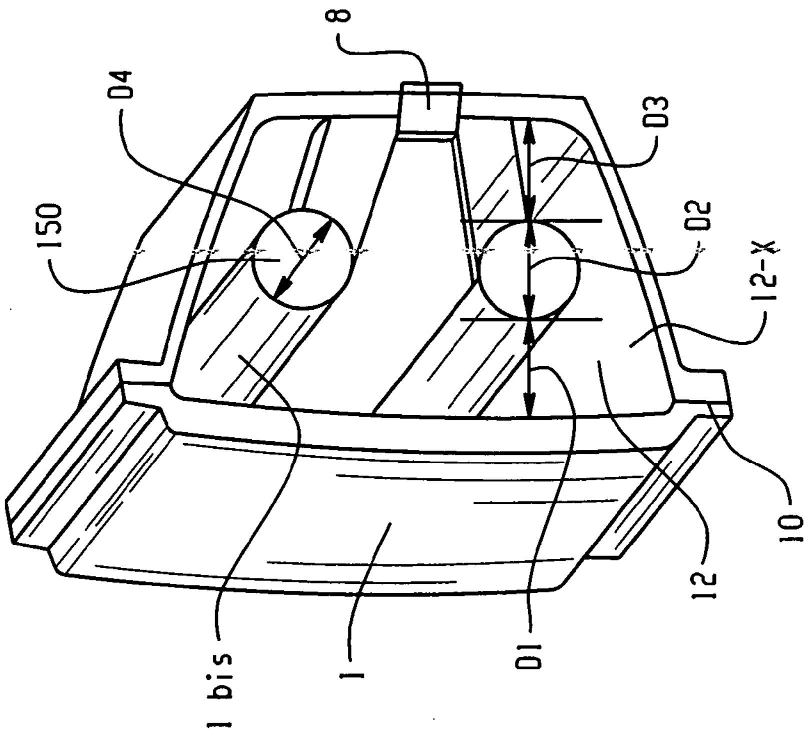
Fig. 76B (AA)
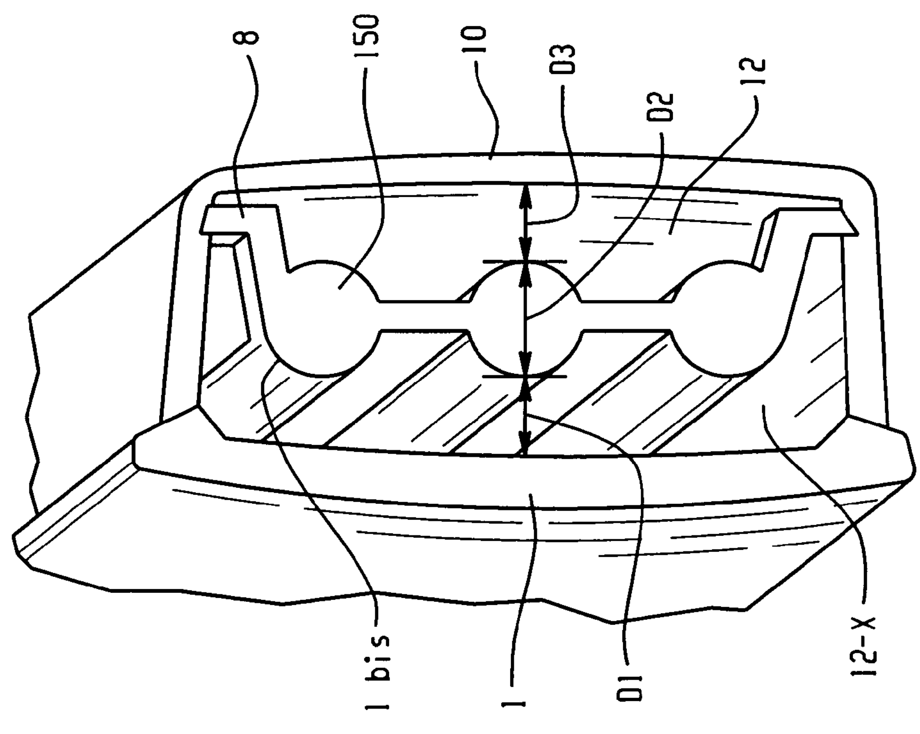
Fig. 76A (AA)

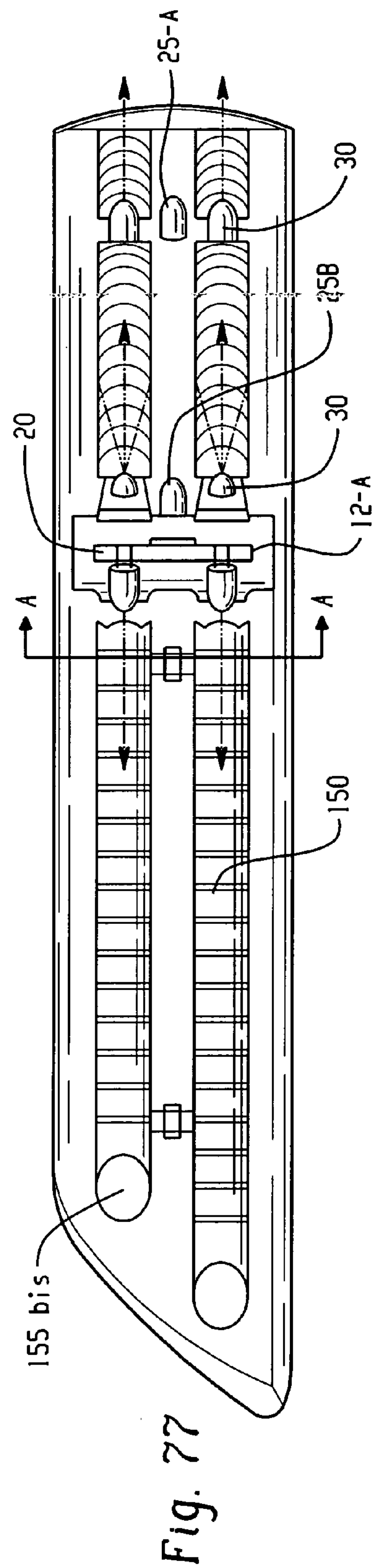
Fig. 77
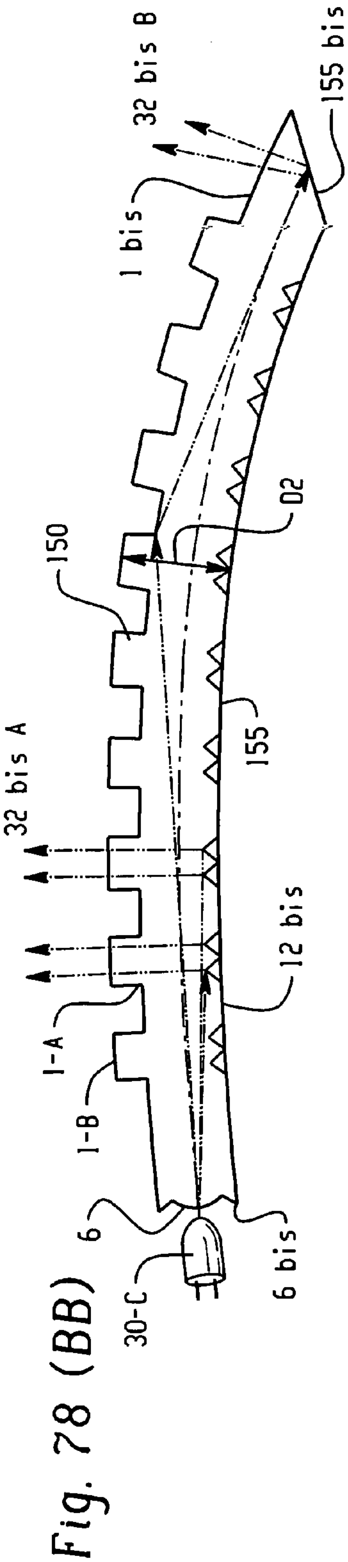
Fig. 78 (BB)
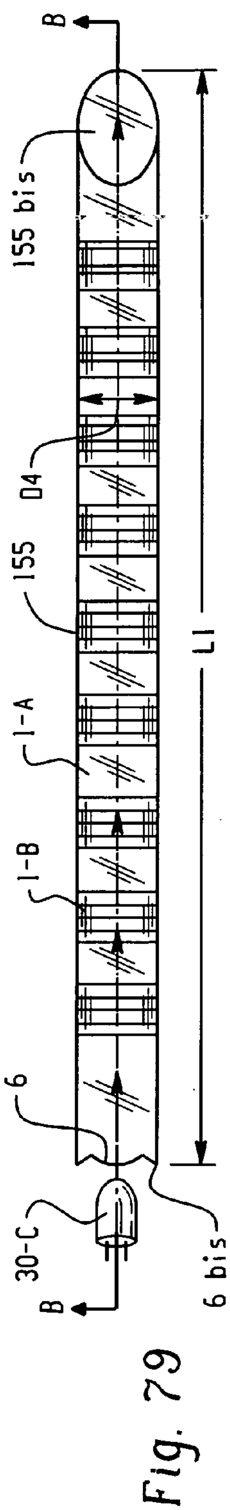
Fig. 79

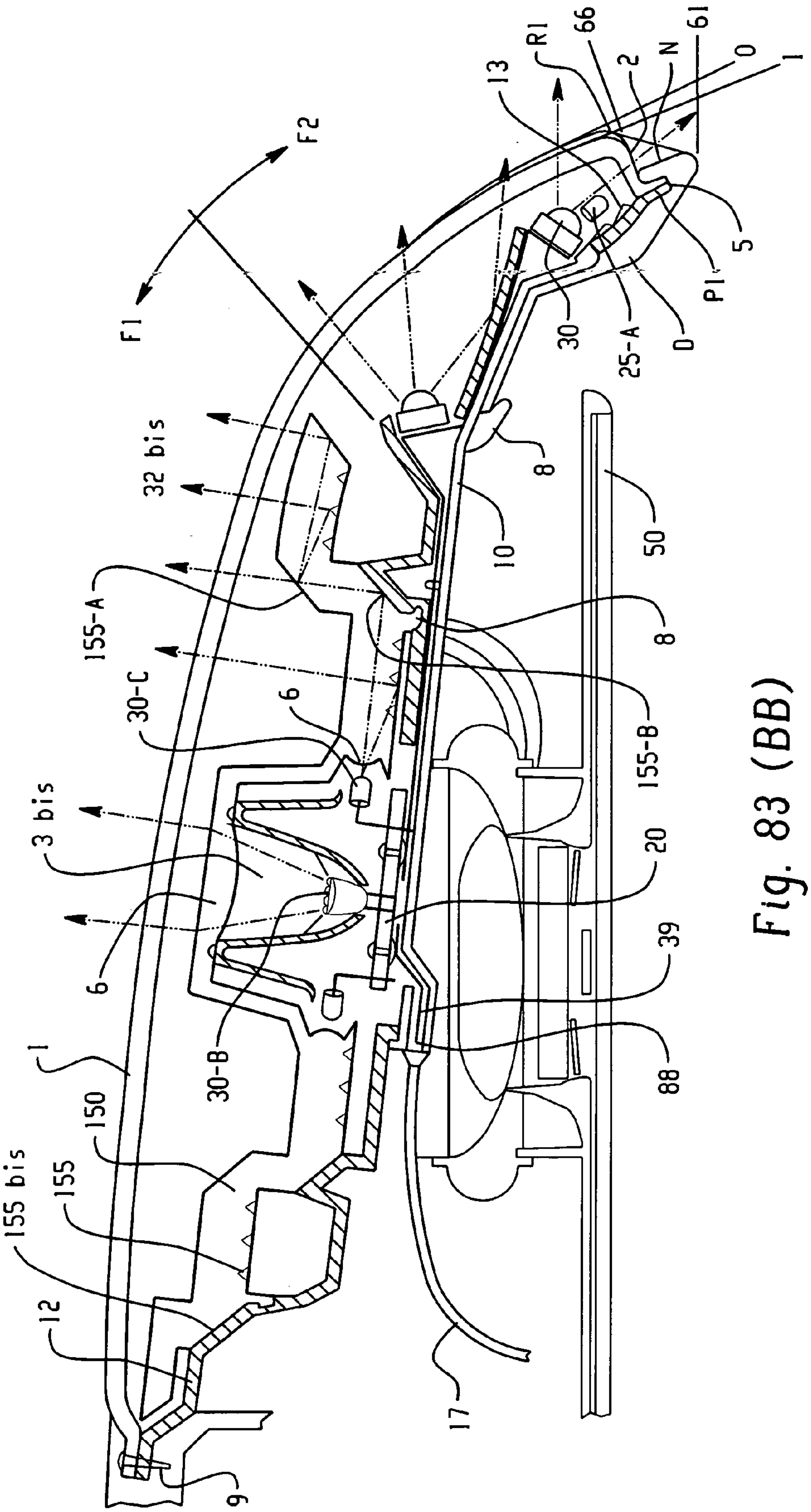
Fig. 83 (BB)

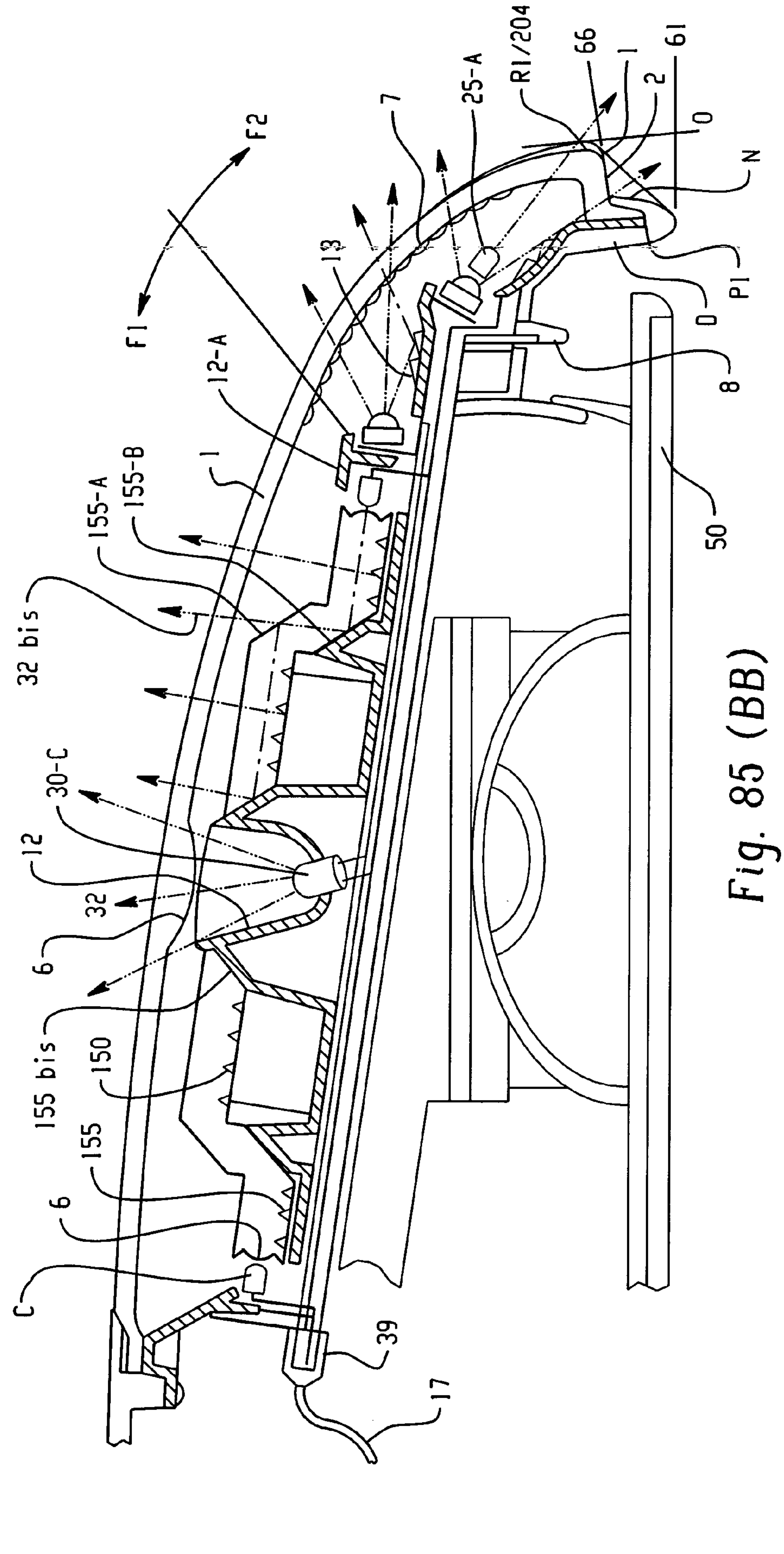
Fig. 85 (BB)

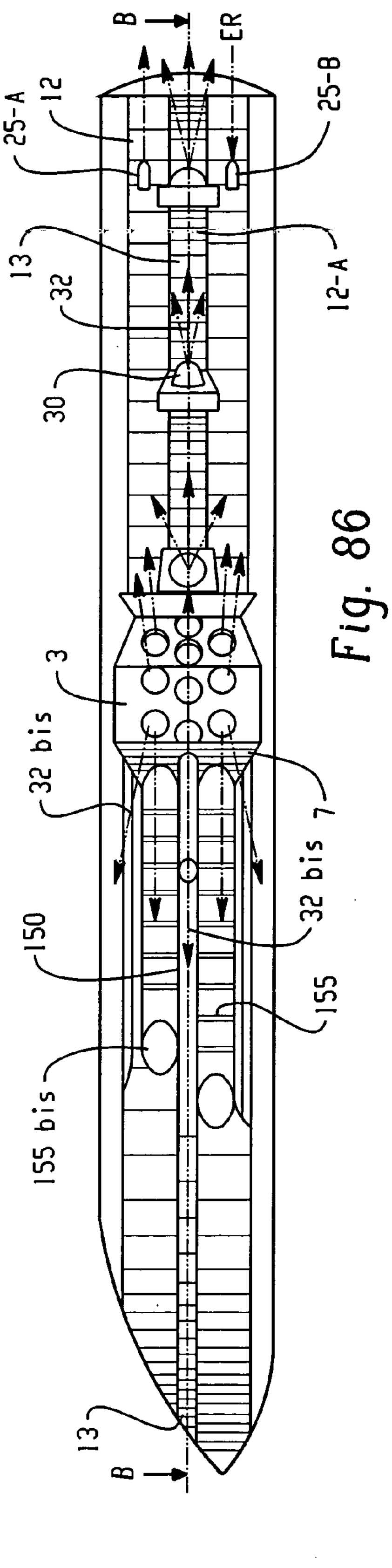
Fig. 86
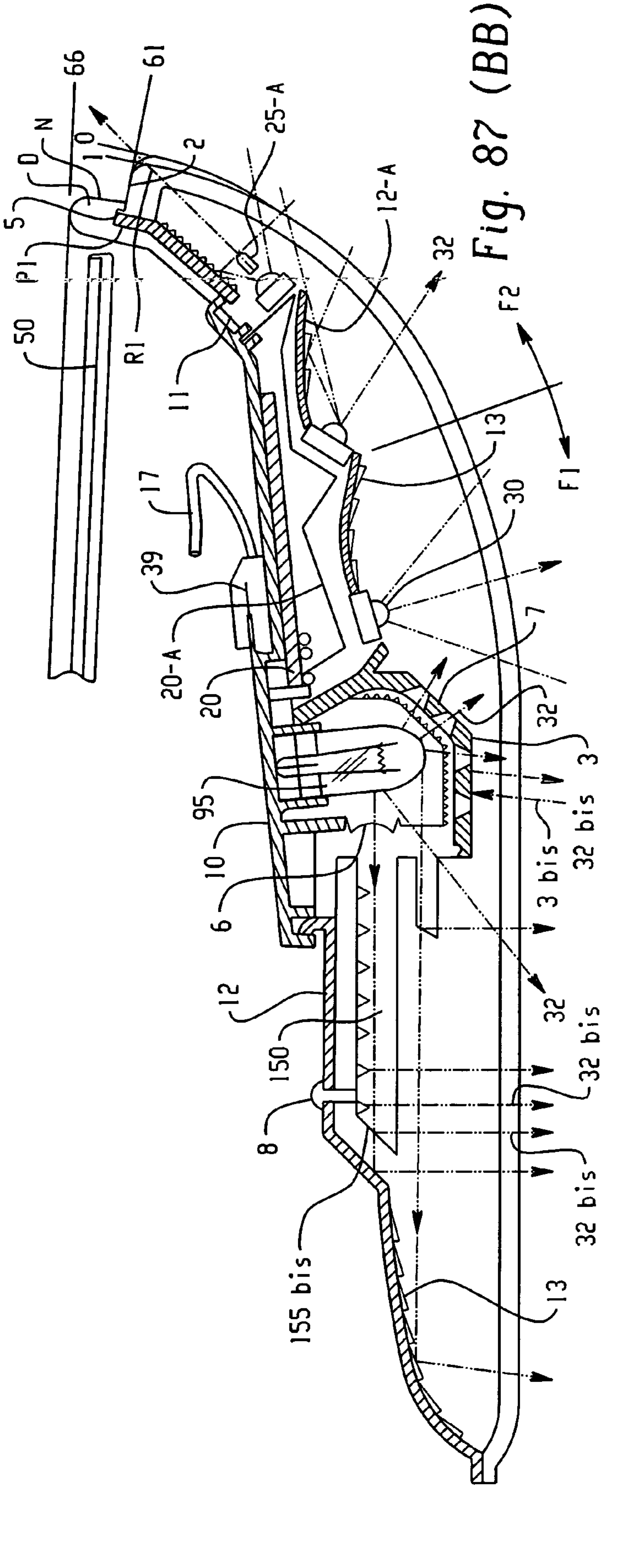
Fig. 87 (BB)

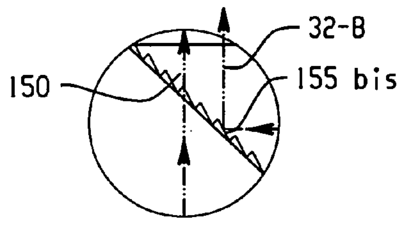
Fig. 88A2(BB)
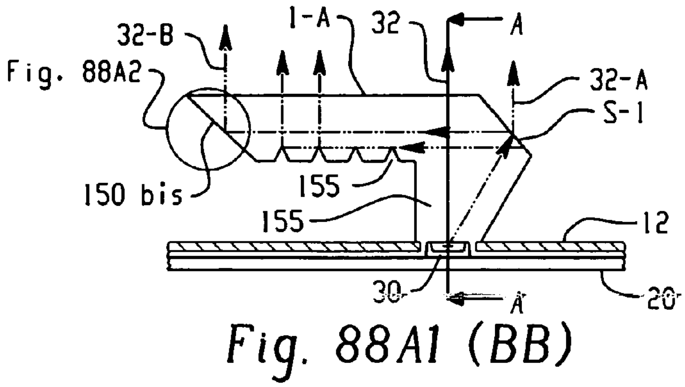
Fig. 88A1 (BB)
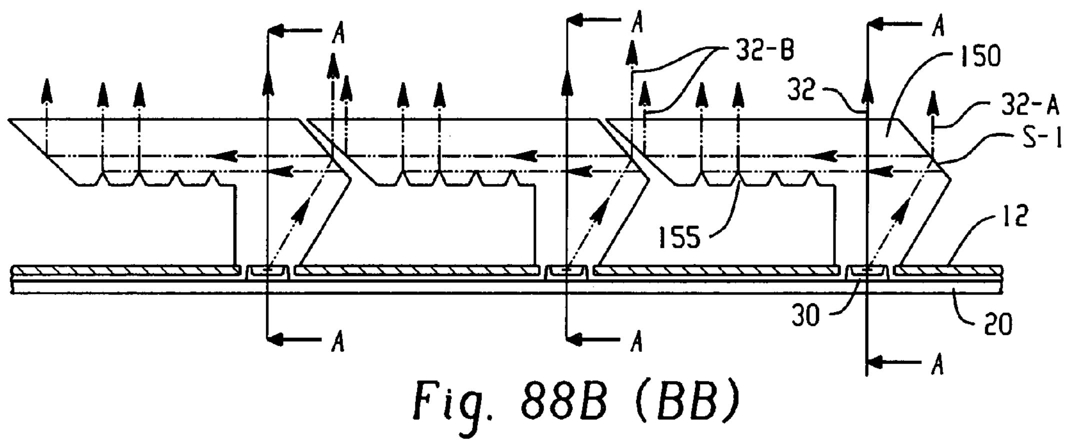
Fig. 88B (BB)
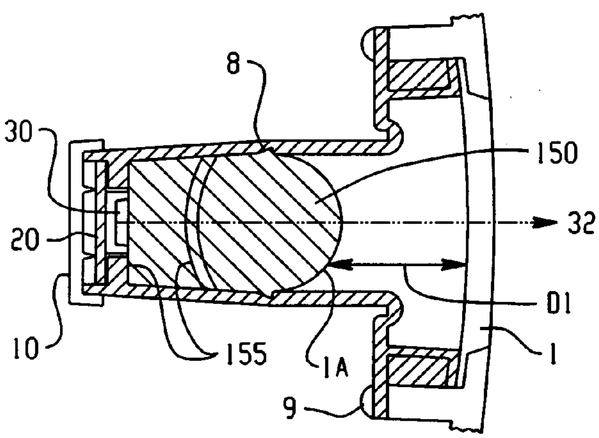
Fig. 89A (AA)
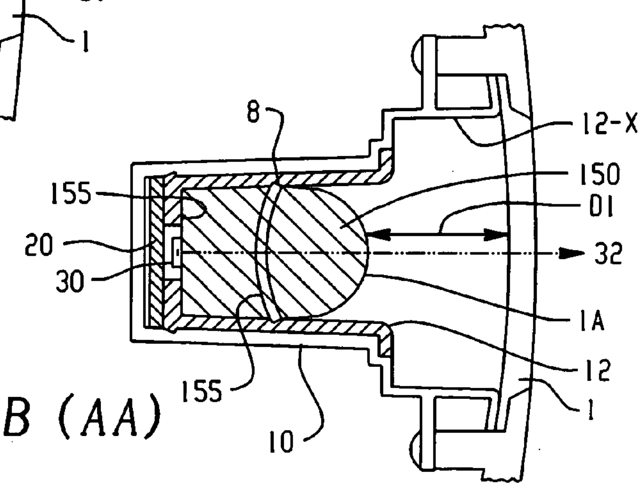
Fig. 89B (AA)

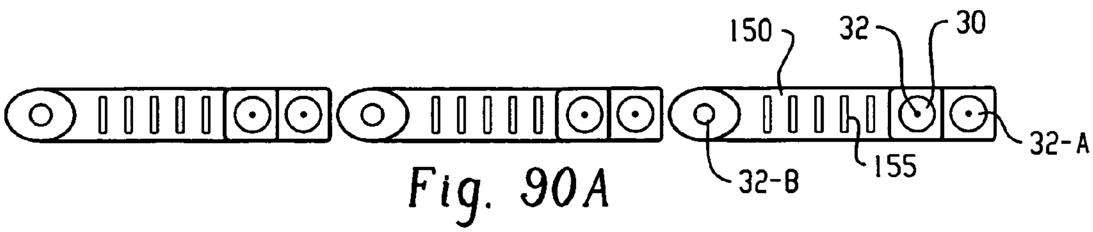
Fig. 90A
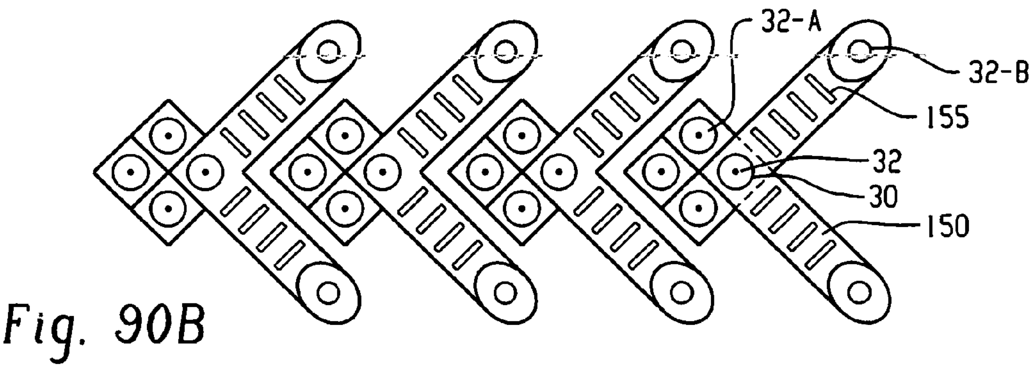
Fig. 90B
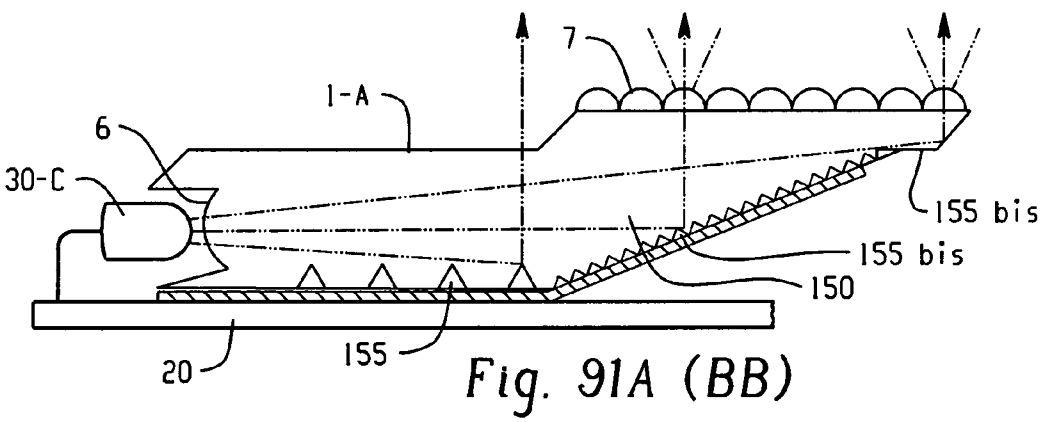
Fig. 91A (BB)
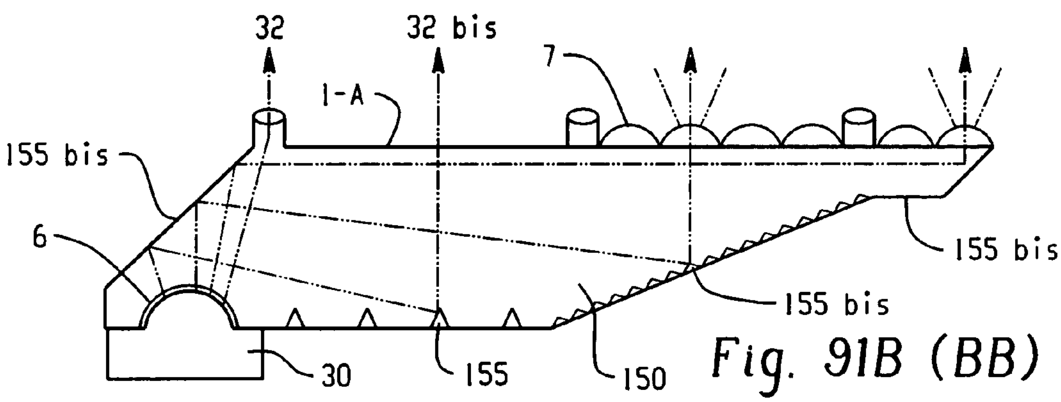
Fig. 91B (BB)
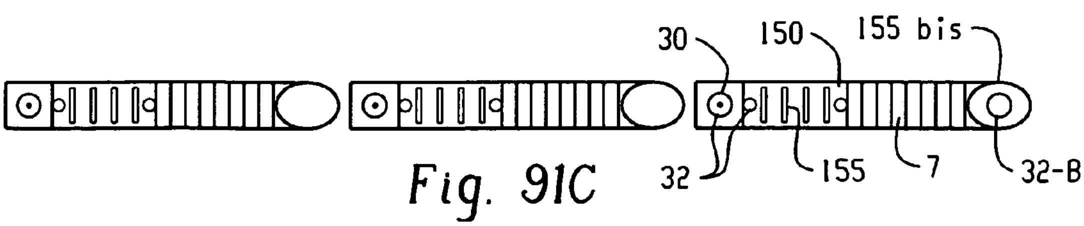
Fig. 91C

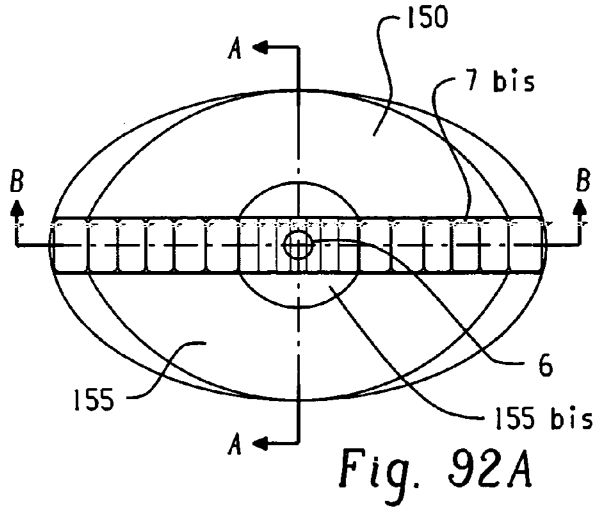
Fig. 92A
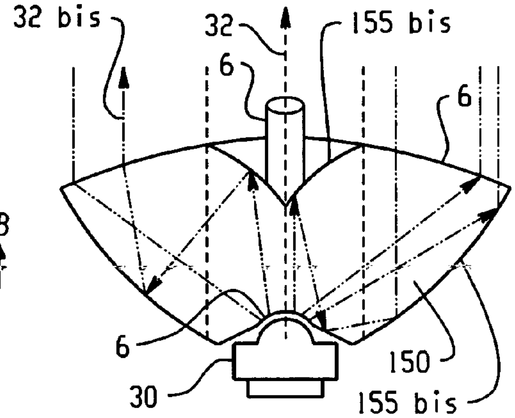
Fig. 92B (AA)
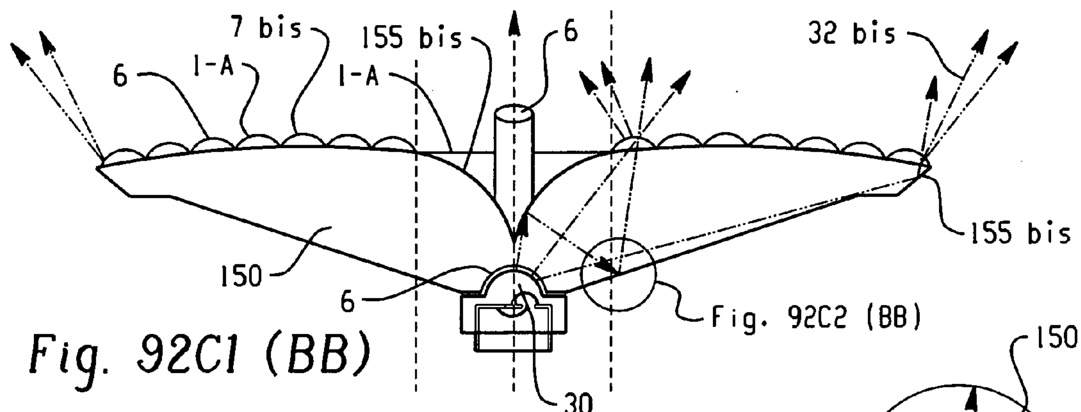
Fig. 92C1 (BB)
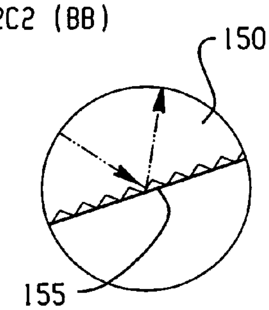
Fig. 92C2 (BB)
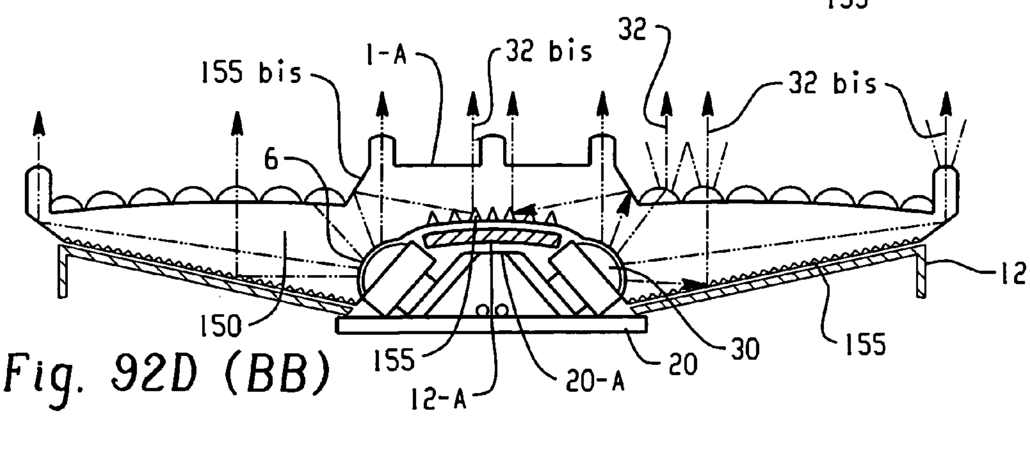
Fig. 92D (BB)

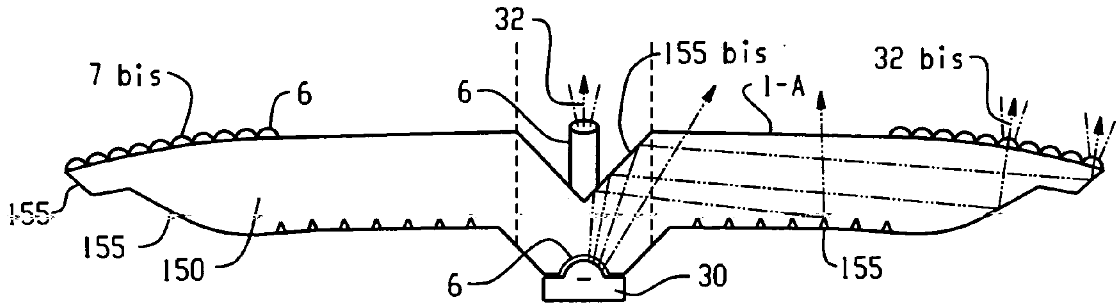
Fig. 92E (BB)
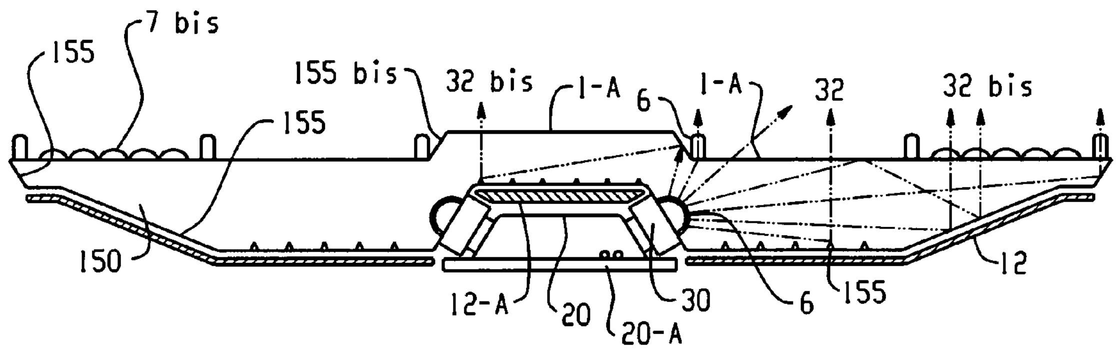
Fig. 92F (BB)
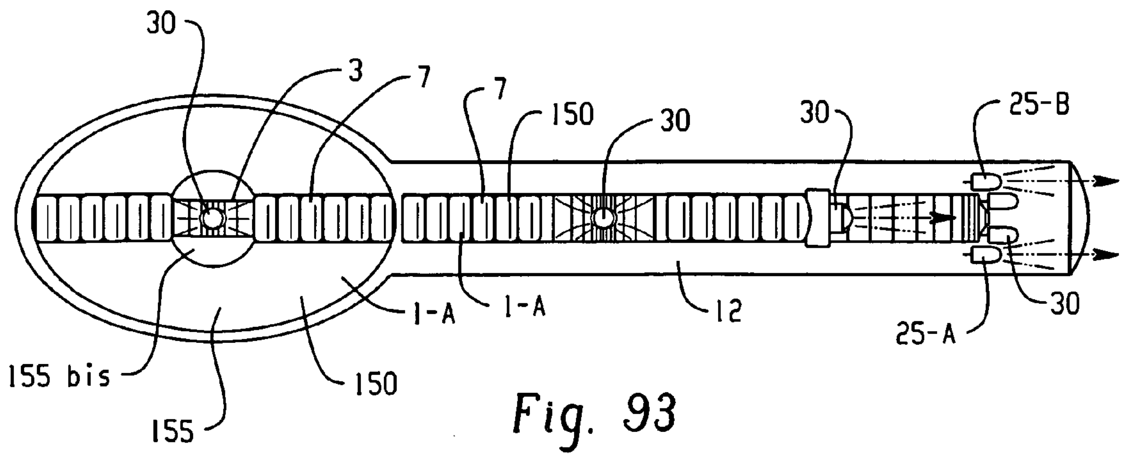
Fig. 93

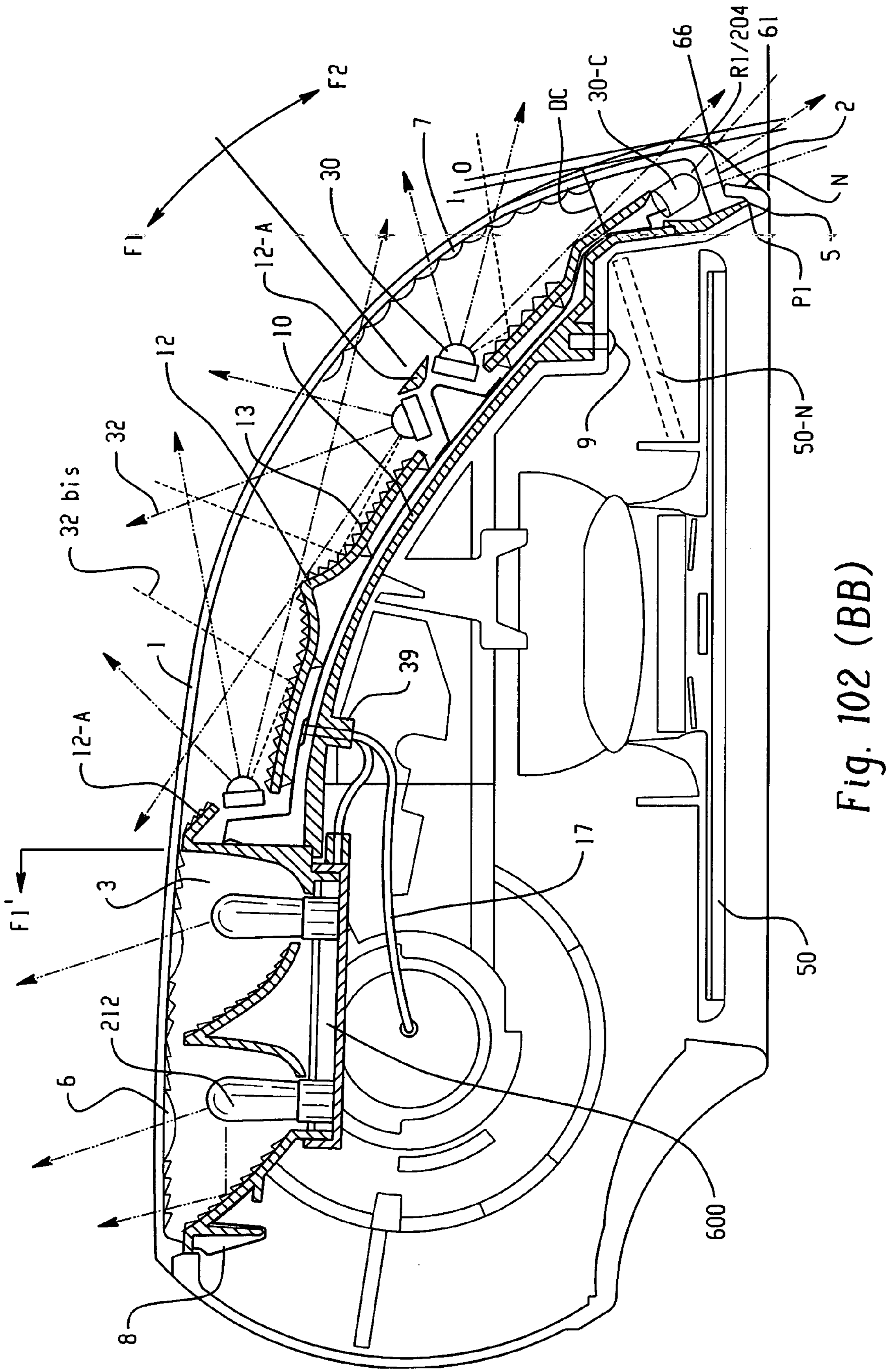
Fig. 102 (BB)

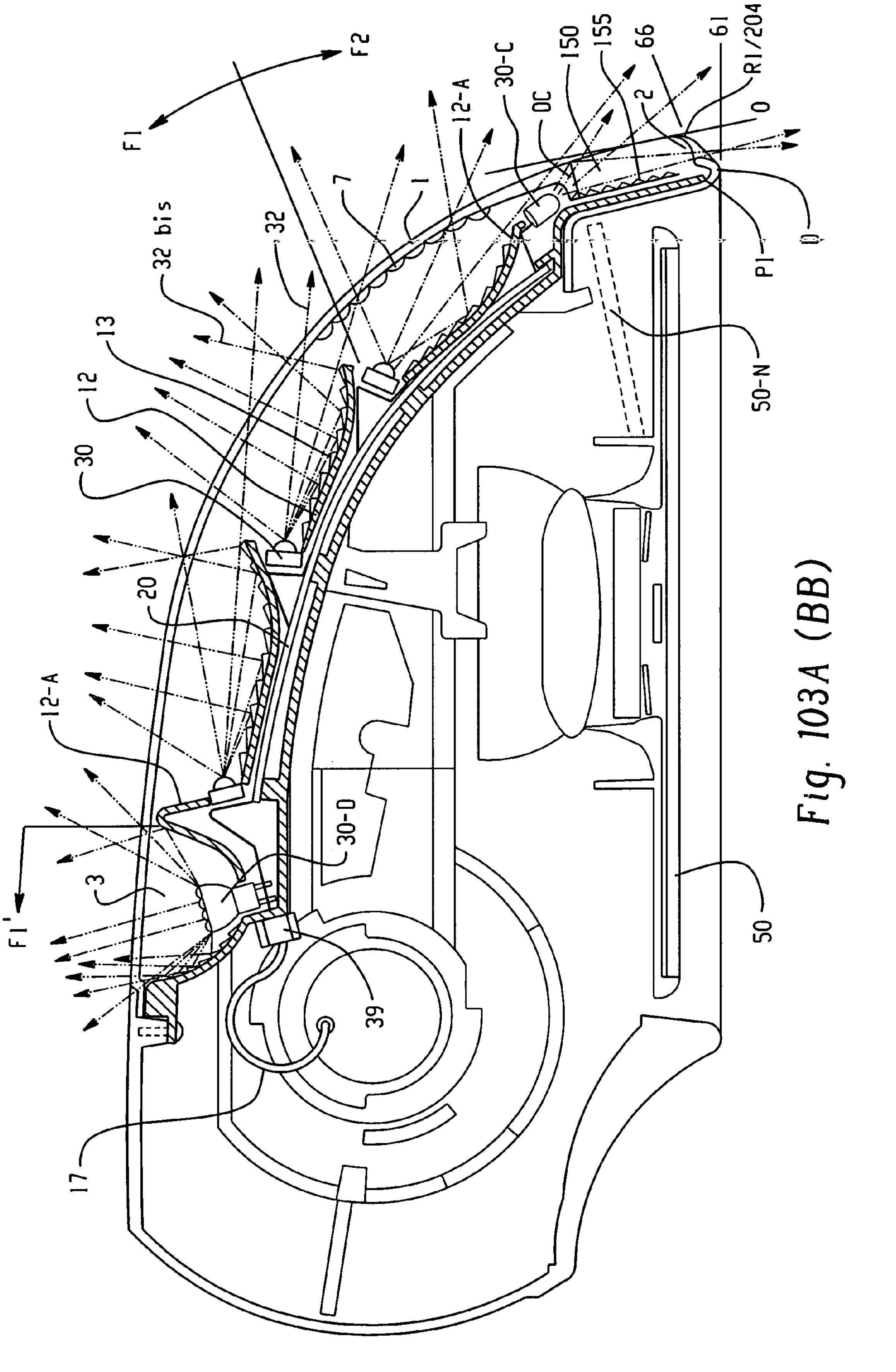
Fig. 103A (BB)

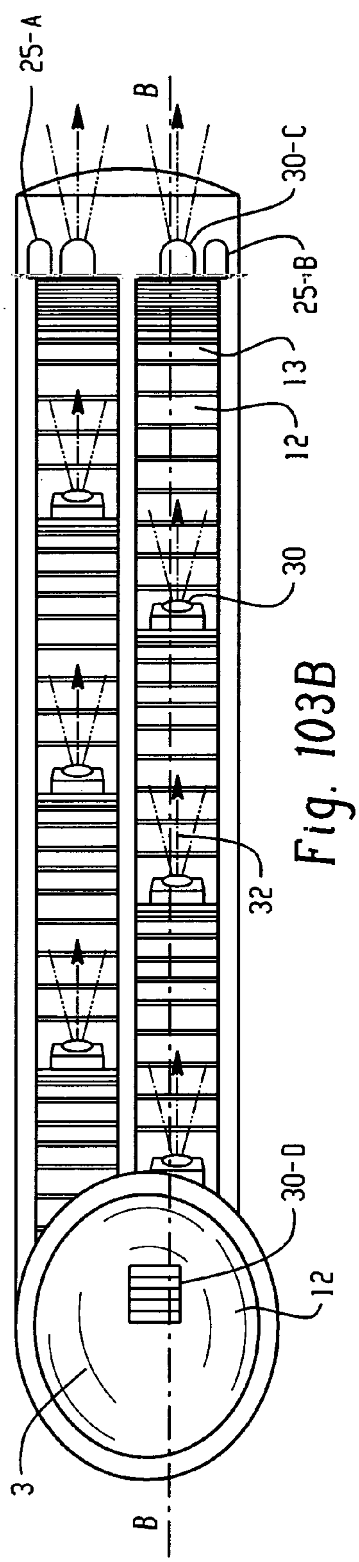
Fig. 103B
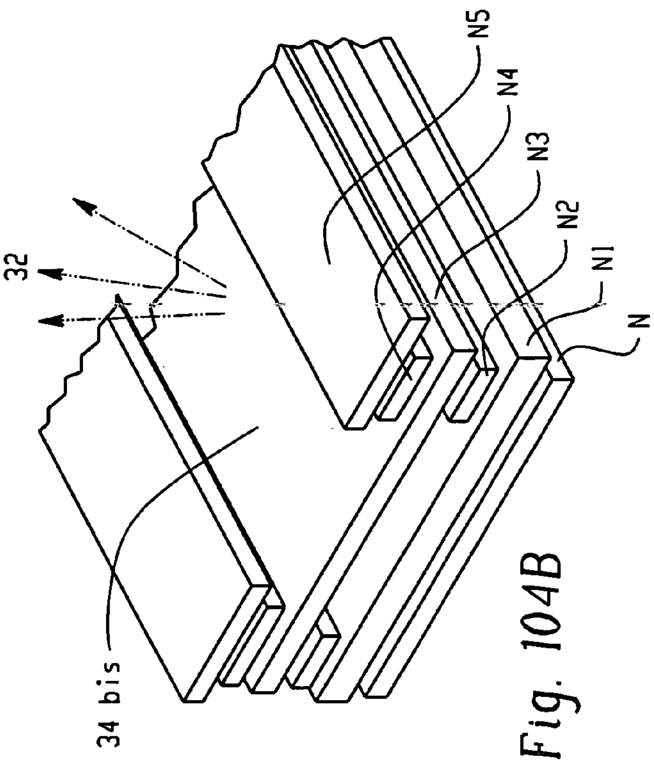
Fig. 104B
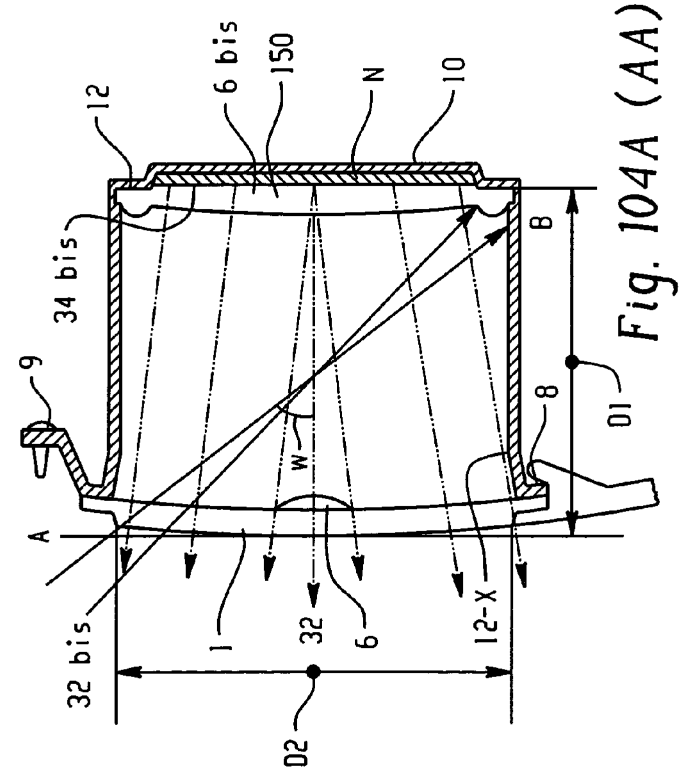
Fig. 104A (AA)

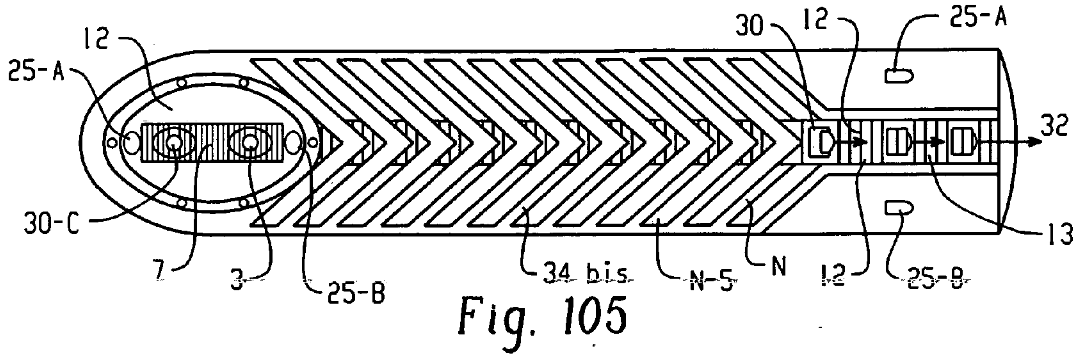
Fig. 105
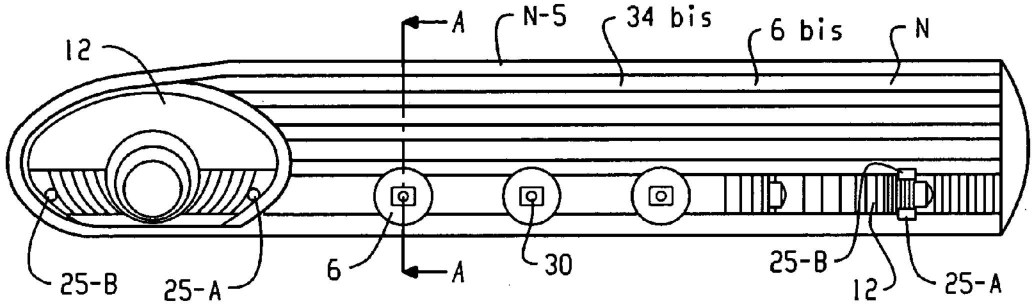
Fig. 106
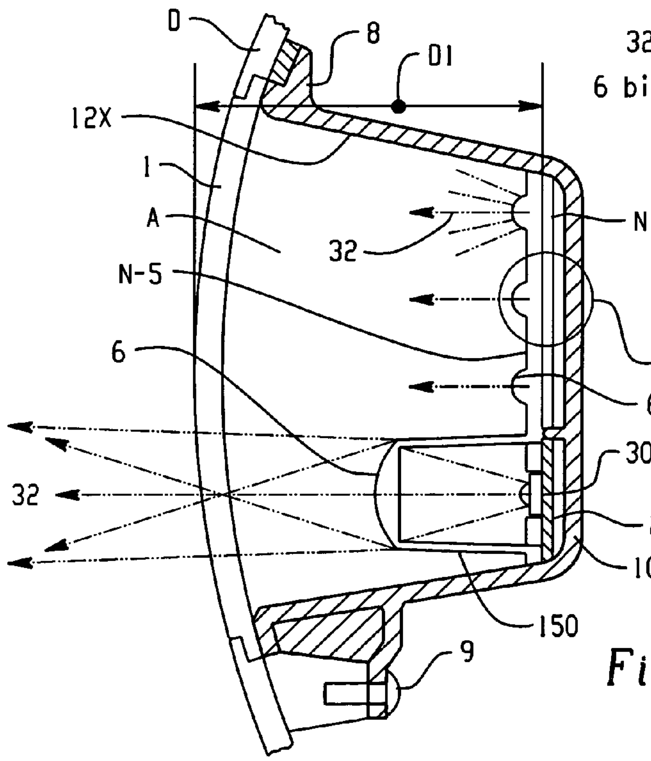
Fig. 107B (AA)
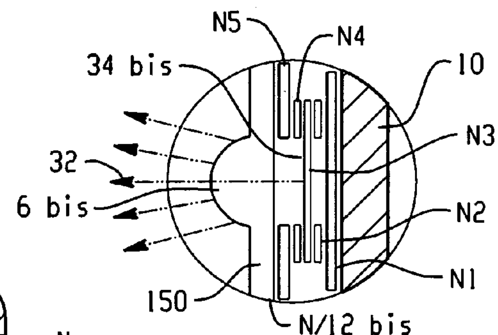
Fig. 107A (AA)

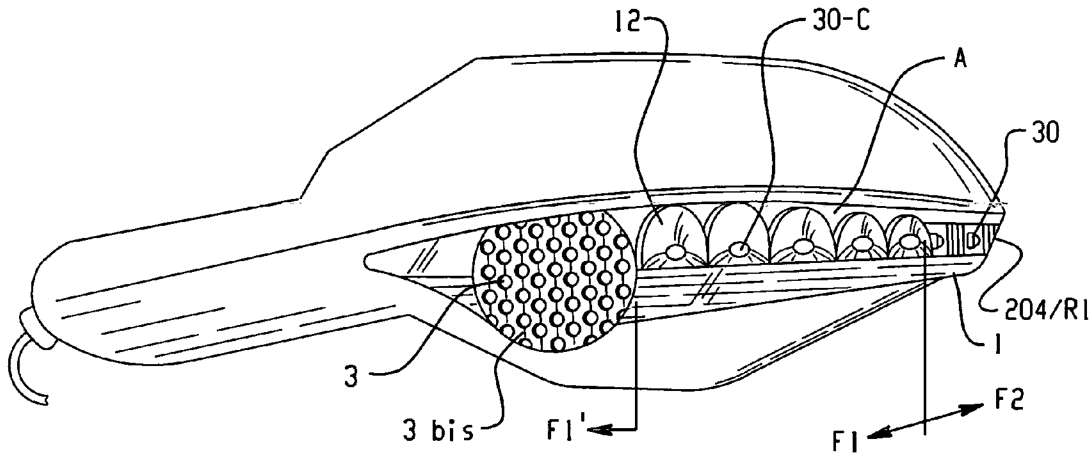
Fig. 108
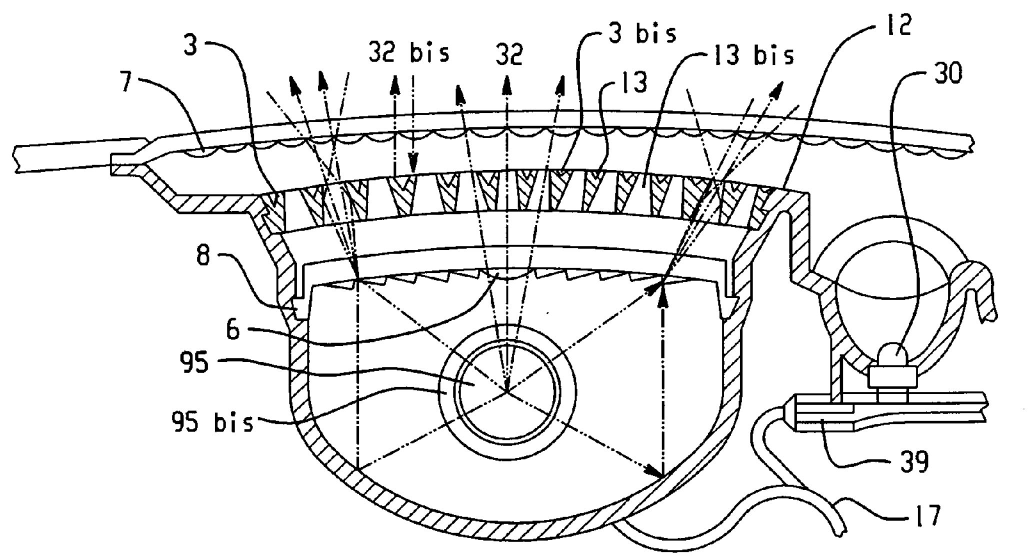
Fig. 109B (BB)

Fig. 109A (BB)

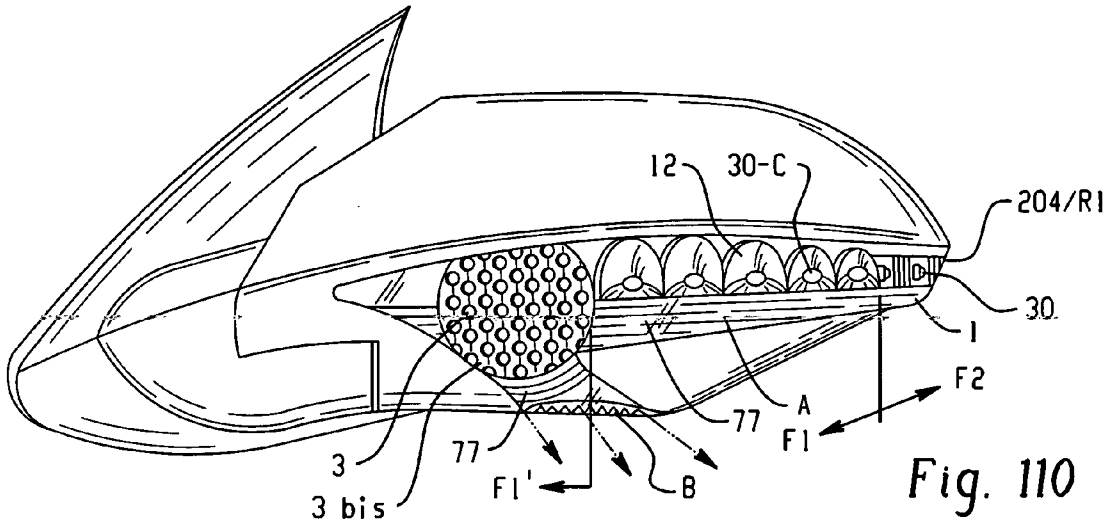
Fig. 110
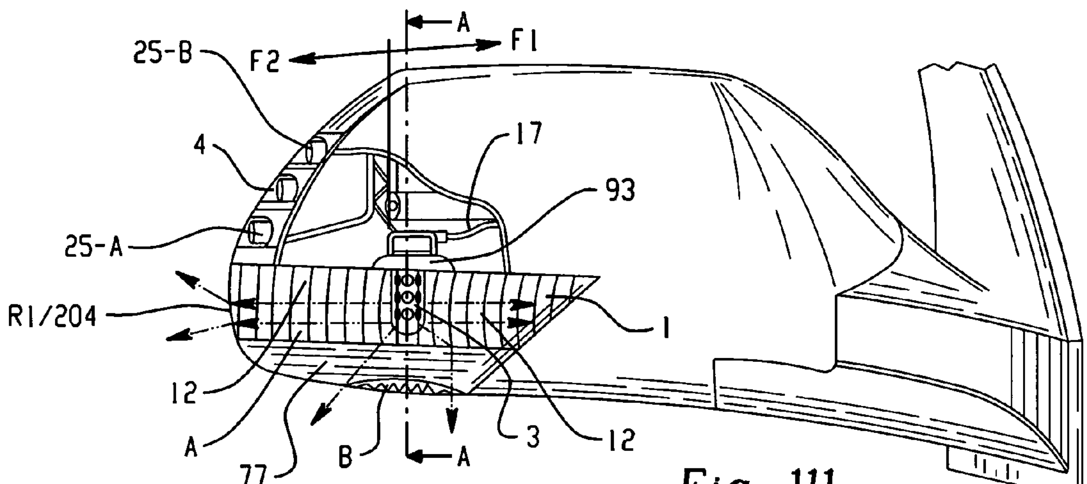
Fig. 111
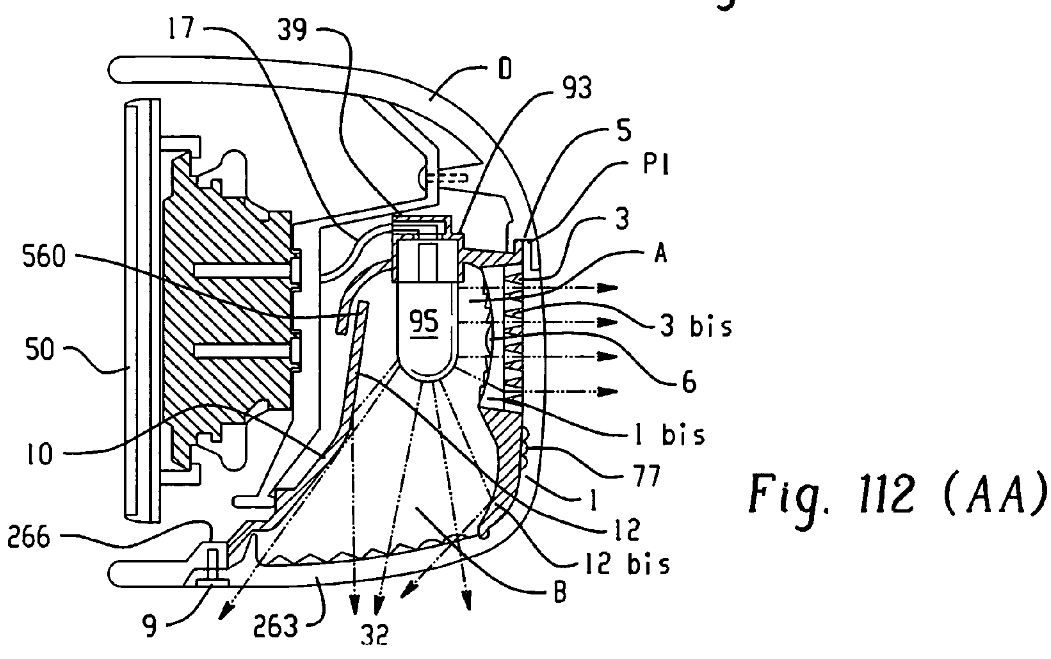
Fig. 112 (AA)

Fig. 113A
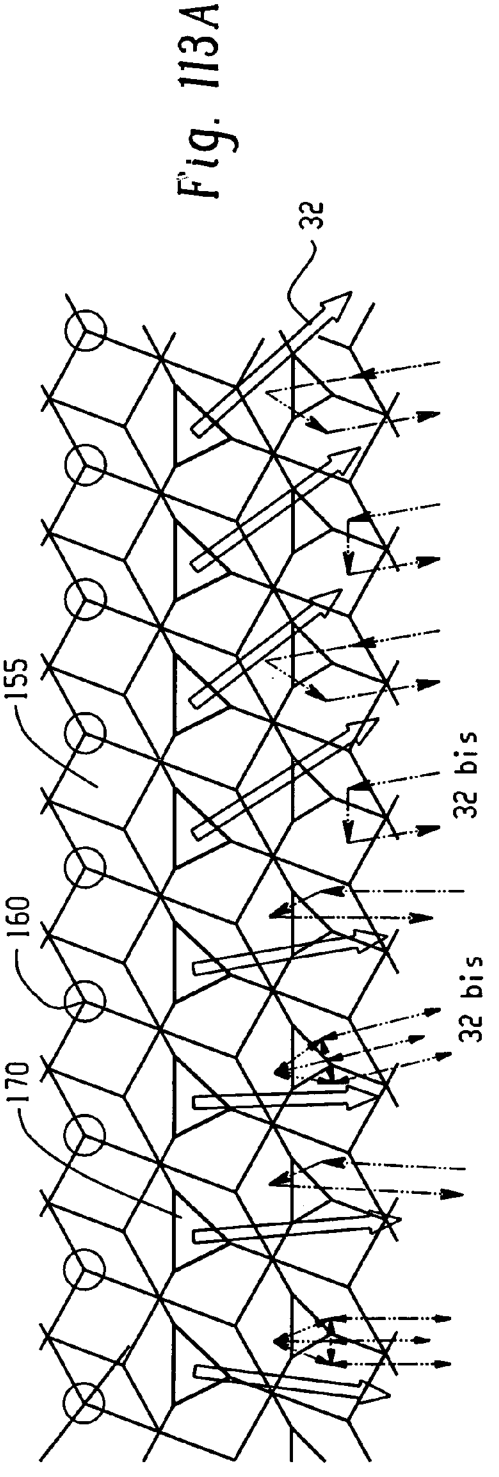
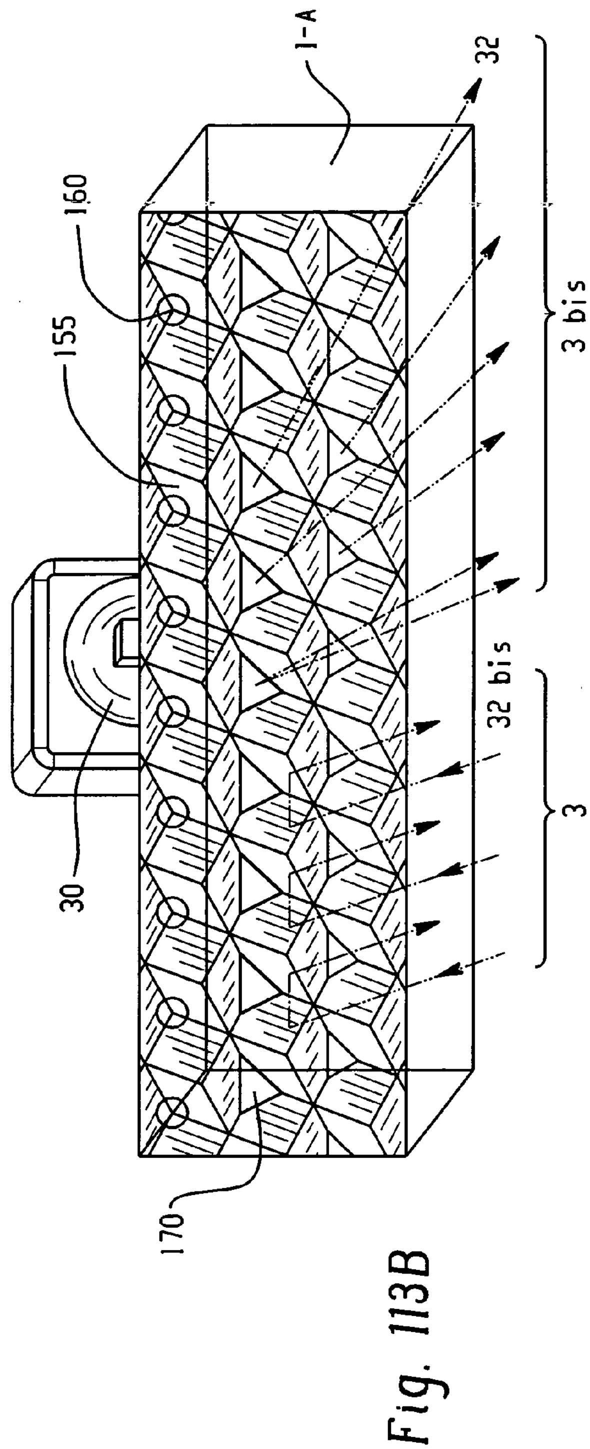
Fig. 113B

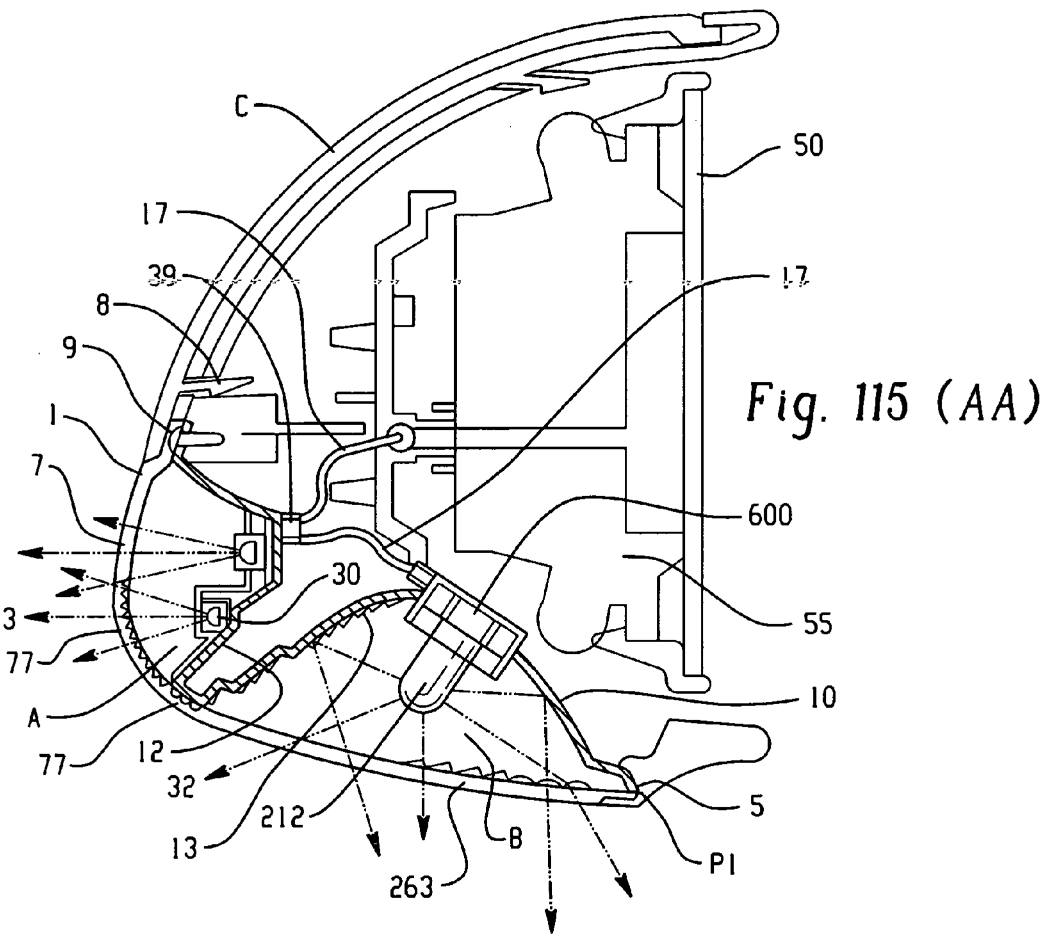
Fig. 115 (AA)
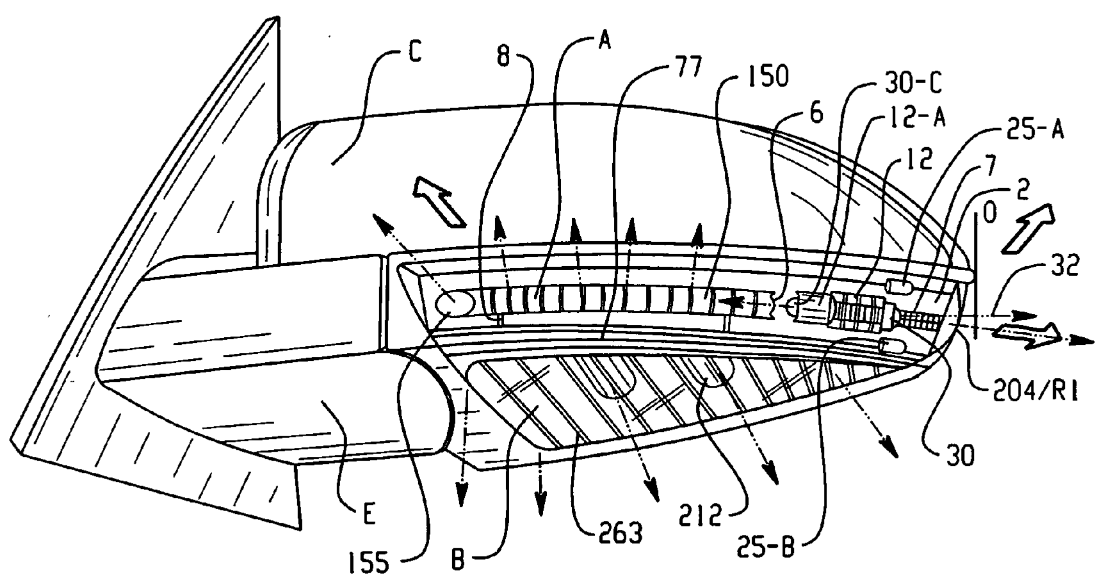
Fig. 116

Fig. 117 (BB)

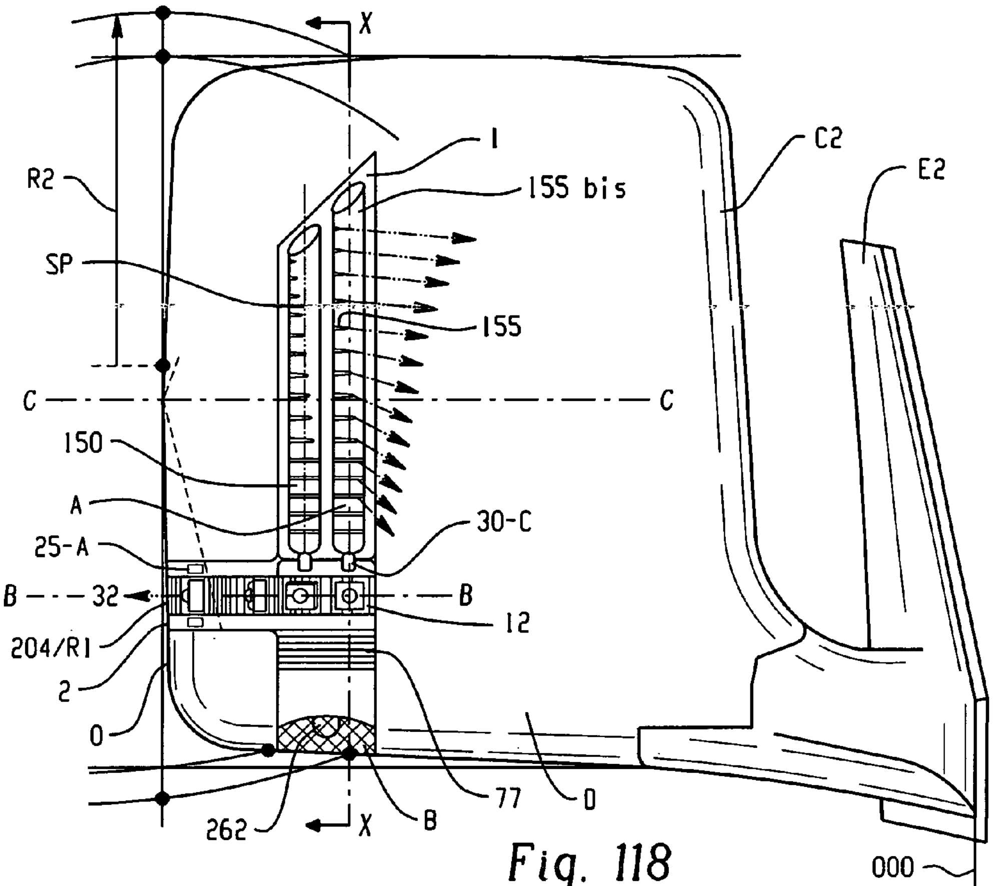
Fig. 118
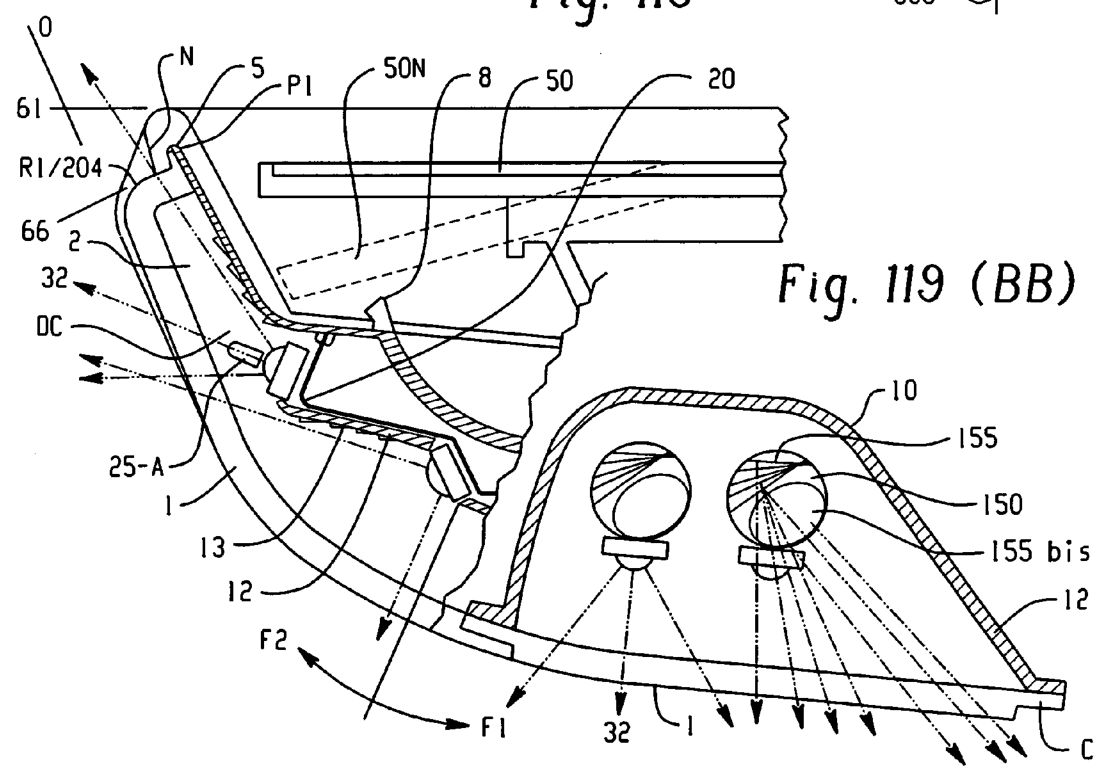
Fig. 119 (BB)

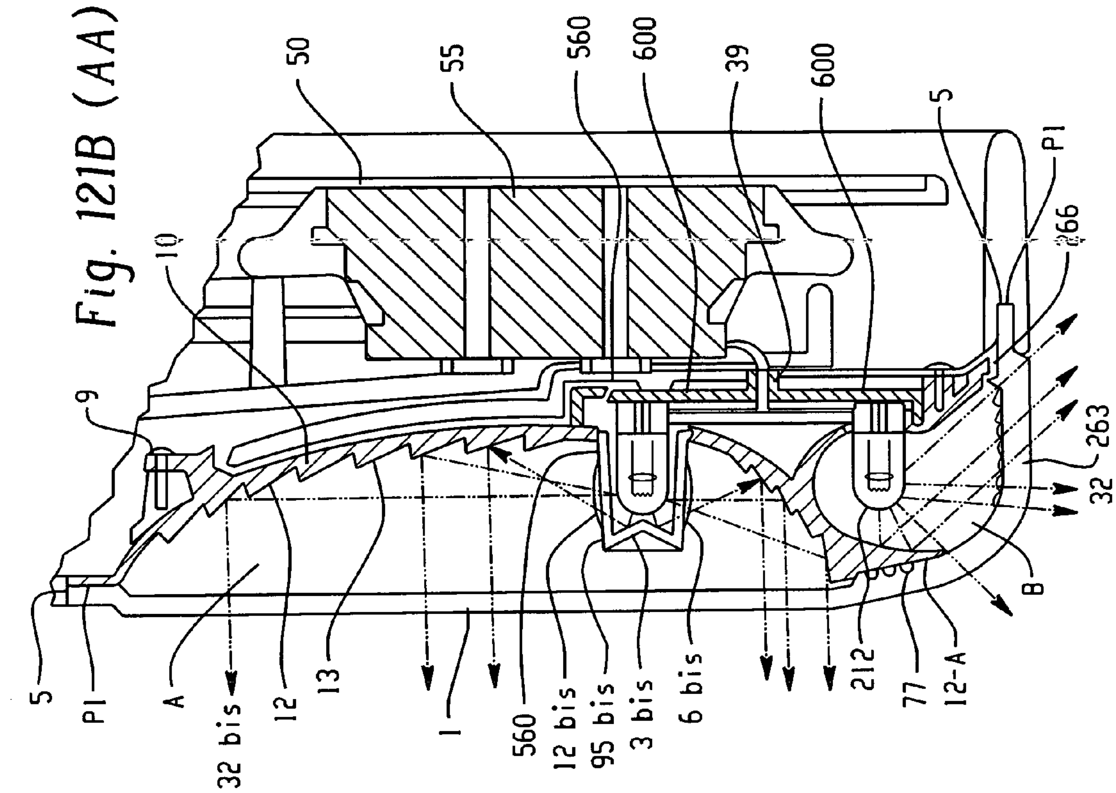
Fig. 121B (AA)
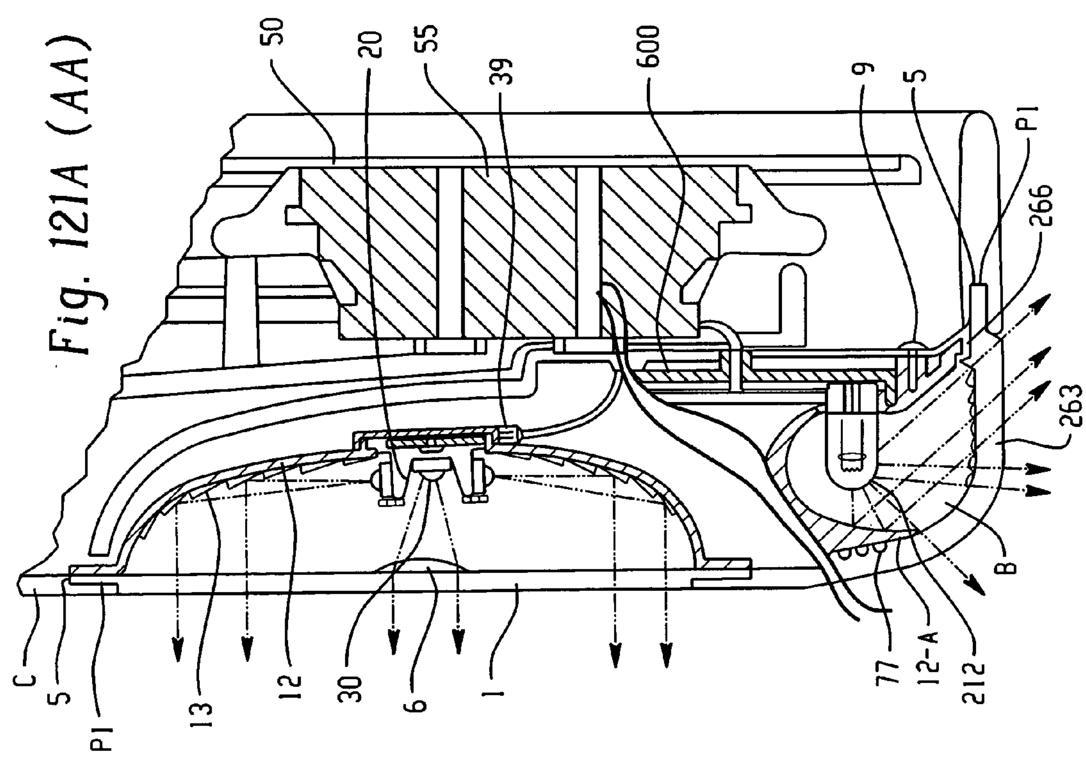
Fig. 121A (AA)

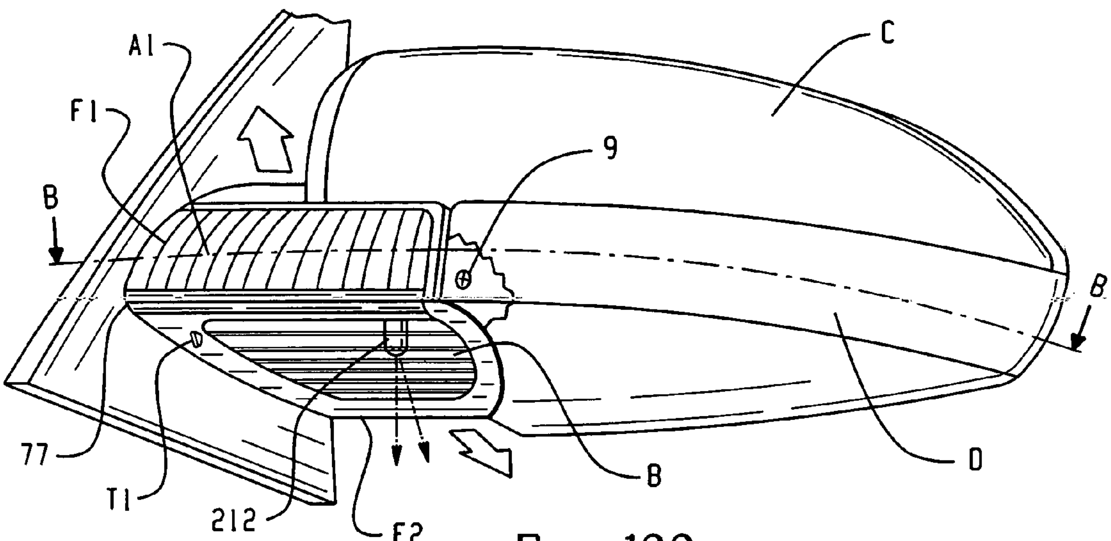
Fig. 122
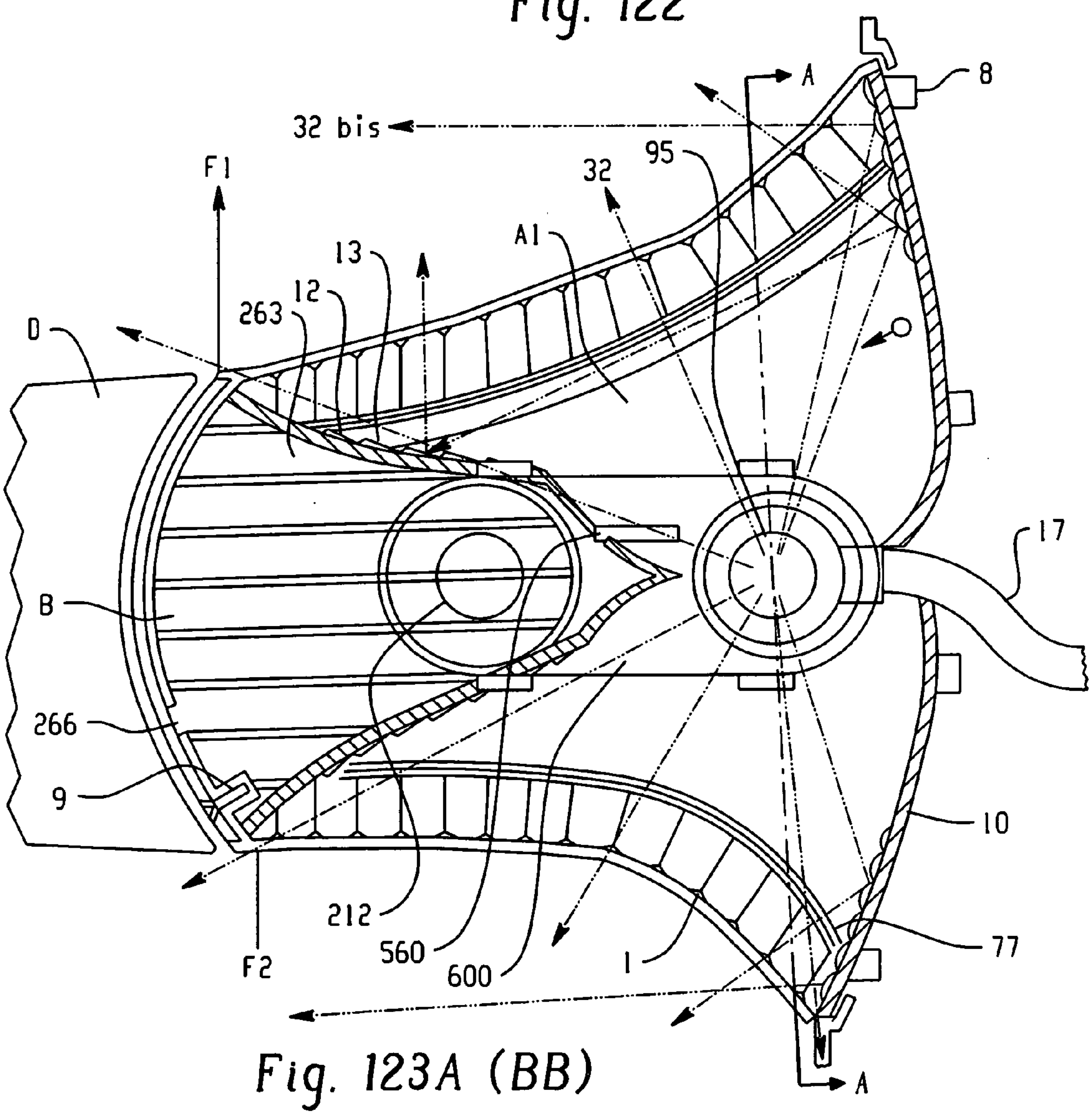
Fig. 123A (BB)

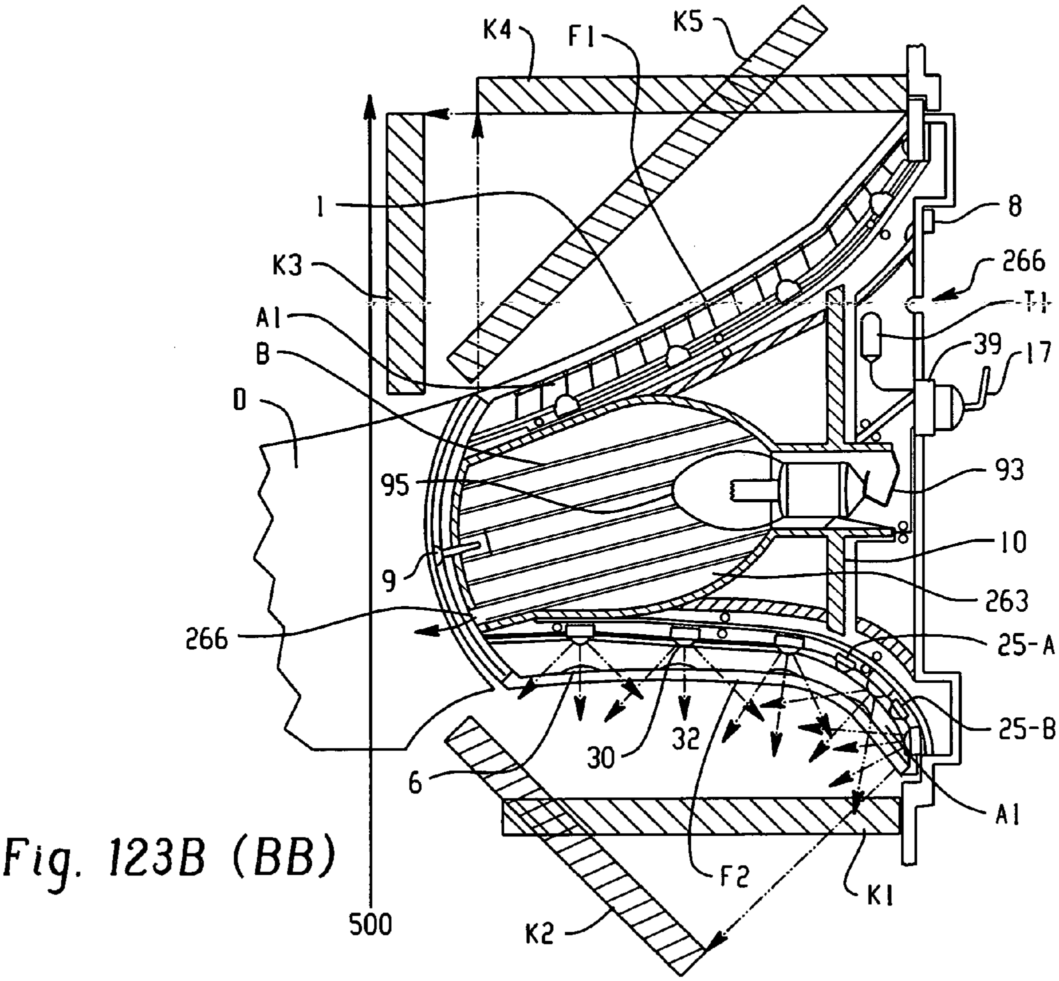
Fig. 123B (BB)
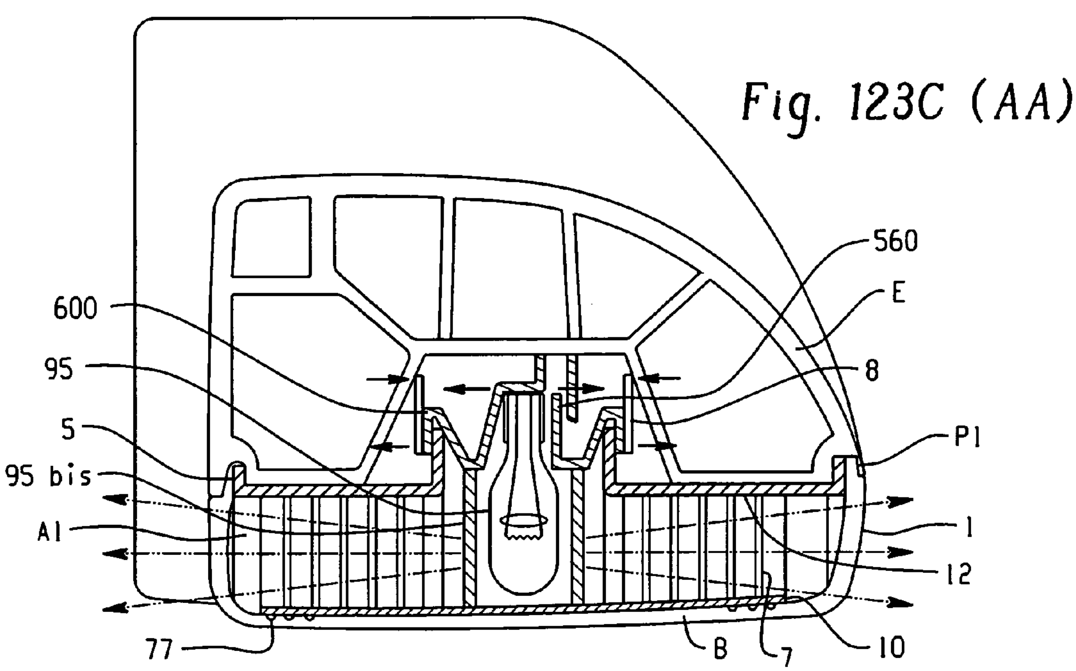
Fig. 123C (AA)

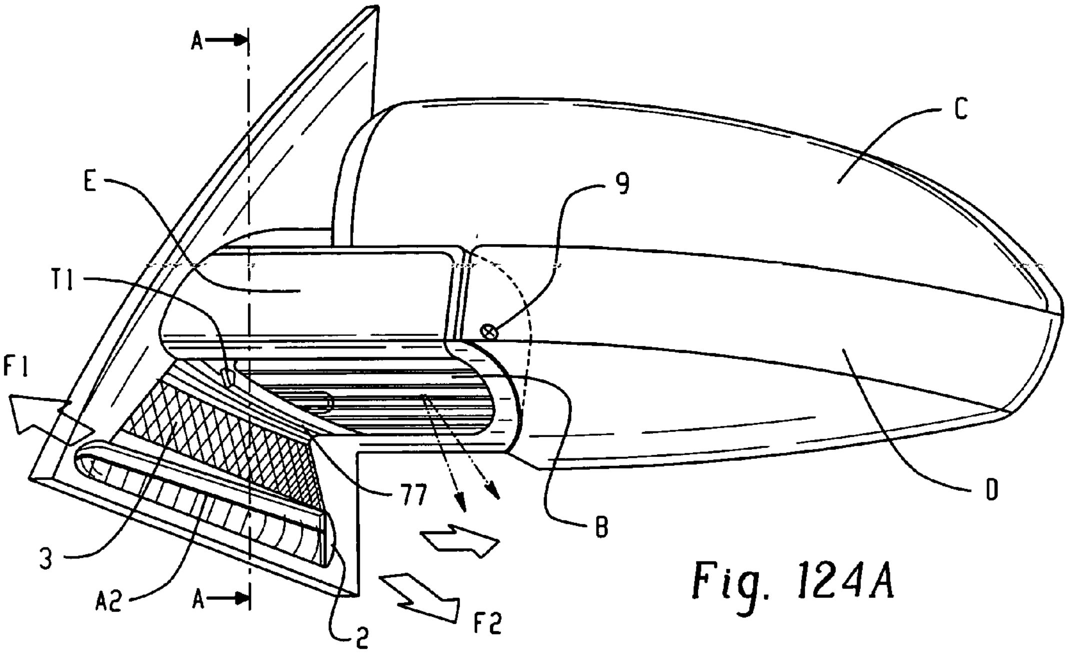
Fig. 124A
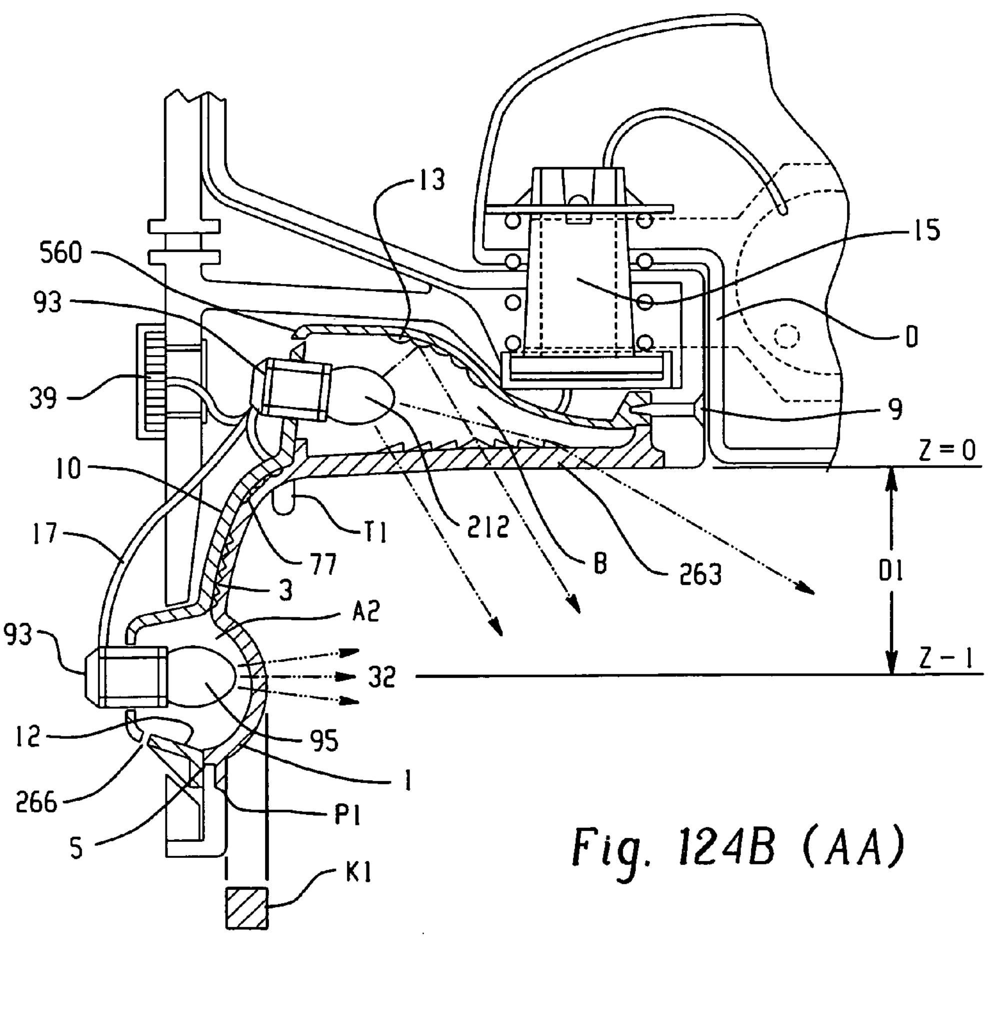
Fig. 124B (AA)

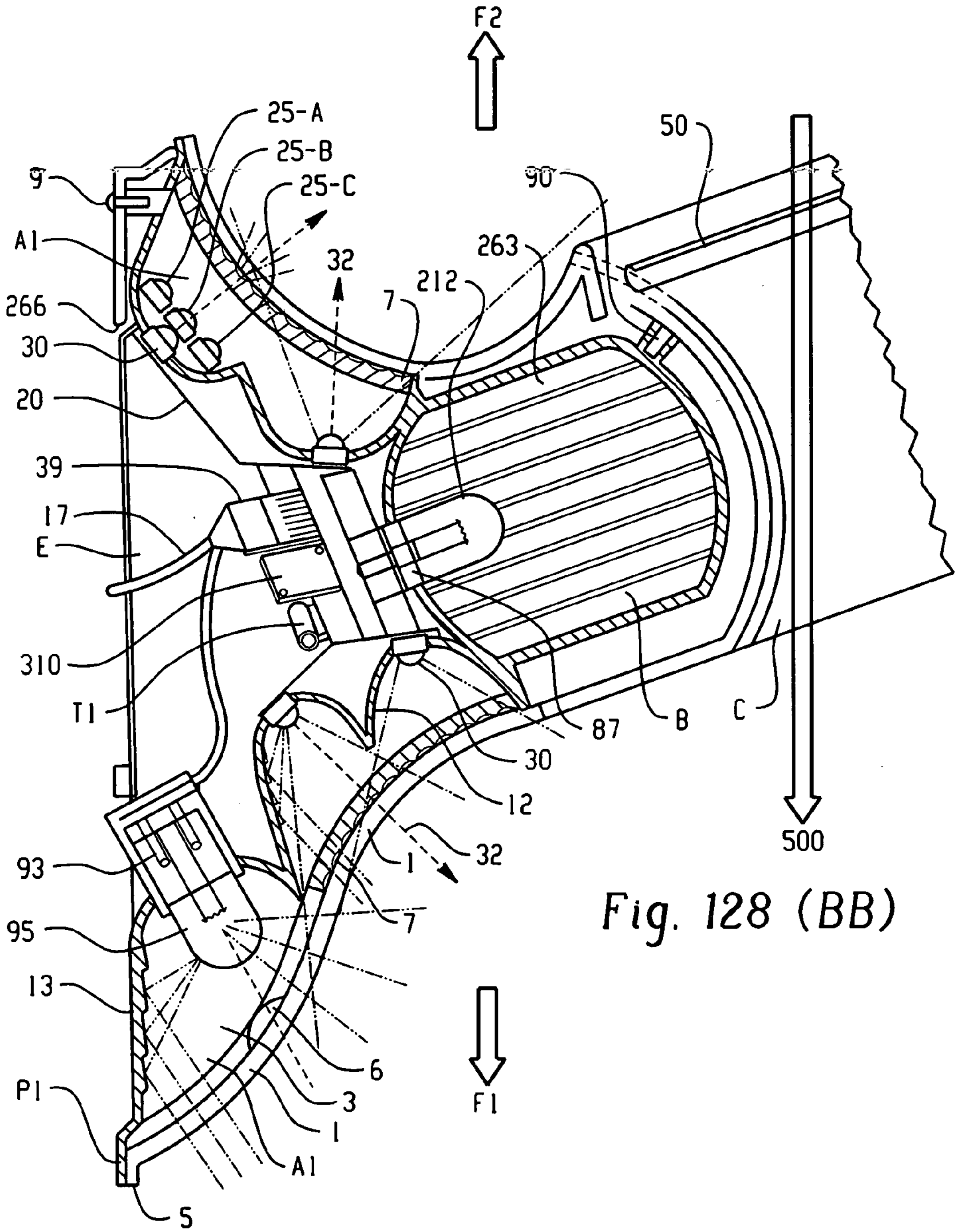
Fig. 128 (BB)

Fig. 134 (AA)

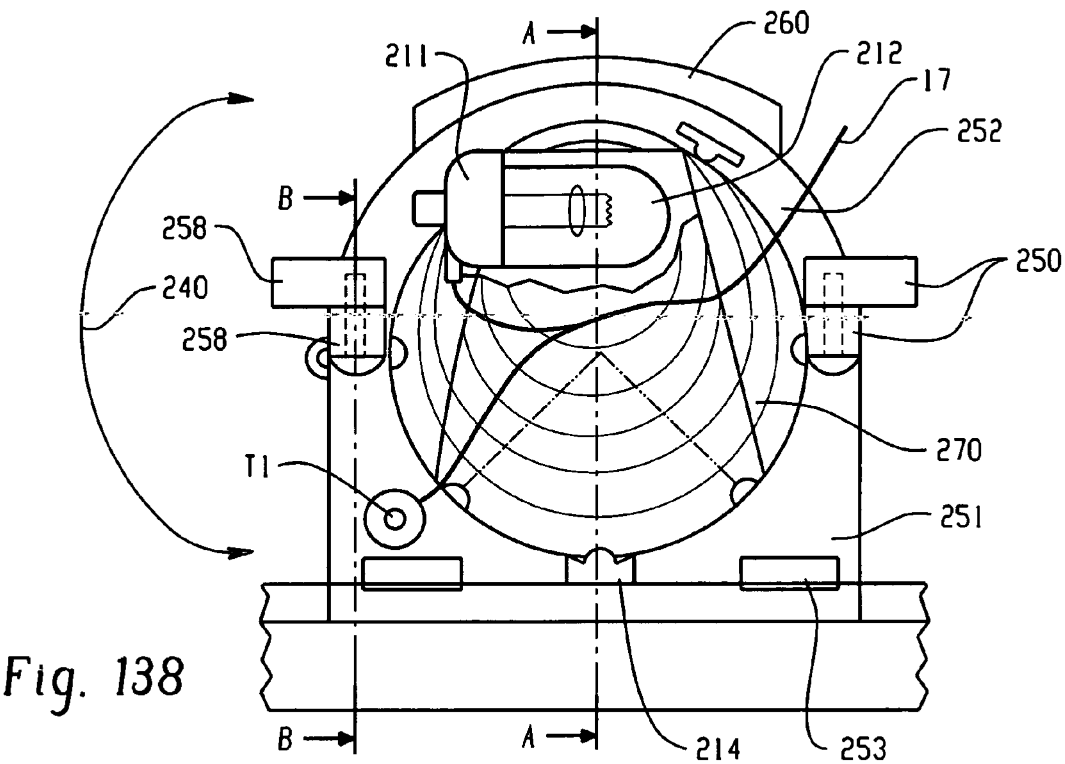
Fig. 138
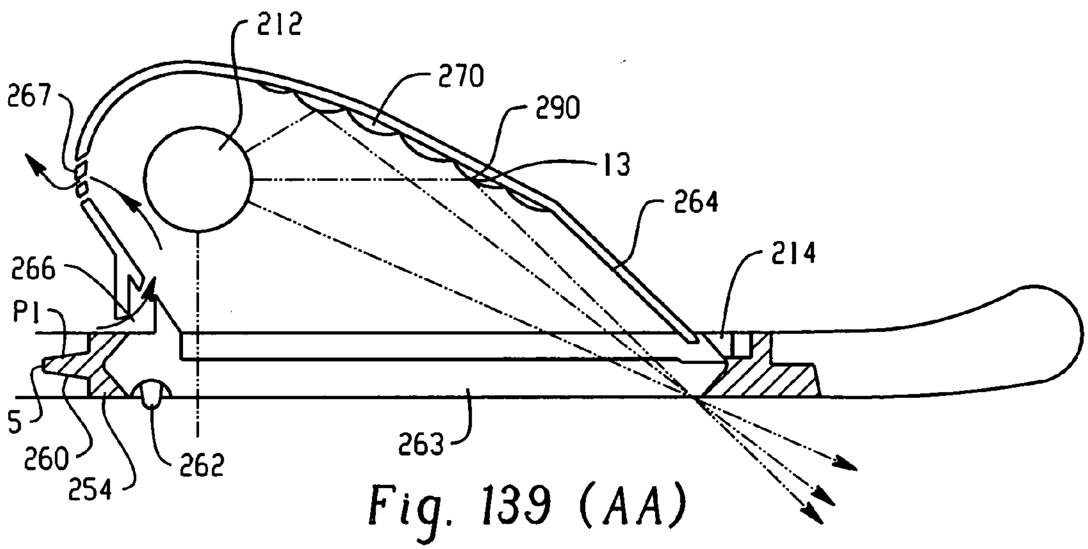
Fig. 139 (AA)
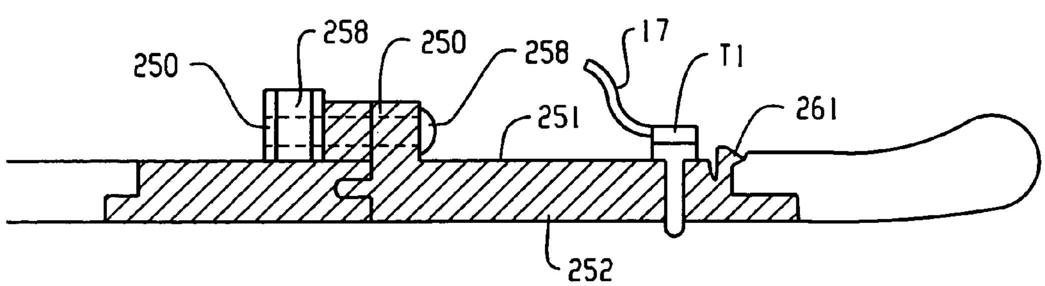
Fig. 140 (BB)

REAR-VIEW MIRROR WITH MULTIFUNCTIONAL SIGNAL

CROSS-REFERENCE TO RELATED APPLICATIONS

This application is a divisional of U.S. patent application Ser. No. 10/340,360 filed on Jan. 9, 2003 now U.S. Pat. No. 6,926,432, which is a continuation of PCT Application No. PCT/ES01/00251 filed on Jun. 22, 2001, published in Spanish under PCT Article 21 (2), which claims priority from Spanish Patent Application No. 200001834 filed Jul. 12, 2000. By this reference, the full disclosure, including the drawings, of said U.S. patent application is incorporated herein.

This invention relates to a new side mirror which normally uses direct and/or combined type optical systems, (mirrors, prisms, lenses and/or video camera). It is made up of signal producing and structural modules, of compatible shape and dimension, which cooperate with one another and can be interchanged, to combine subassemblies and form different models, using common parts for different vehicles having 2, 3, 4, or more wheels. Said modules are assembled in an anti-theft arrangement, since there is no visible access thereto from the outside. Said modules are made up of the following components:

Module (A), which emits and receives multiple light and sound signals and other types, to and from its surroundings, has a wide horizontal angle, ranging from limit (000) in module (E), to limit (204) which is the projecting side end at the apex formed between surfaces (1) and (66), shown in FIG. 1.

The innovative interior of this module offers various options for directing the light output and/or signal from the source that consists preferably in LEDs (Light Emitting Diode), and/or LEDs+bulb, and/or LED+OLES (Organic Light Emitting Substrate), infra-red LEDs, and for receiving signals through sensors, such as photodiodes, ultrasonic or radio frequency type sensors. Alternatives are shown of the direct, indirect and/or reflected by light conductors and/or reflecting surfaces outputs.

Direct light uses a new multifocal light source, based on LEDs inserted in a flexible circuit which can adapt its shape, bend and adopt a 360° horizontal angle. However, in practice its operational angle ranges from 0 to 240° according to the direction and angle of the signal to be covered (100), reserving an area of shadow for driver (200), as shown in FIGS. 1, 2, 3 and 5.

As a new option, indirect light avails of internal, transparent light guiding bodies (150), between source (30) or (95) and external surface (1); the light moves in a one or two-way direction inside bodies, diverting its trajectory at least once, until it is emitted as an output signal, becoming an optical part of the source, located as a focus at (32) and (32*bis*). The system also avails of the combined form of indirect light reflected in elements (13) of reflecting parabola (12) surrounding focus or source (30) or (95), as shown in FIGS. 42, 61 to 68 and 71 to 99.

In use, module (A) combines sound and light elements, invisible emissions (infra-red or ultrasonic) and photodiode sensors that can detect the spectrum of the output signal and/or the light of day and so, new functions are appreciable with their corresponding control lights even outside the module.

A new light output system is provided in zone (2), without prisms, see FIGS. 3, 6, 7 and 37, that redirects light to the rear into area (100), and so, indirectly, driver (202) can easily see more than 10% of the part of surface (1) that emits light to the rear, shown by projection (K1), but not direct light. Such part (1) does not colour because the light signal is rectified, not diverted.

The options provided by this module include, output (51) as function control light, and output (4) only to the rear and preferably within area (F2), either as support for emitting/receiving elements (25-A, 25-B, 25-C), as shown in FIG. 3, (ER), for detecting the presence of people or vehicles in that signal area under any visibility conditions, and/or as a complementary signal to the vehicle's rearward signals and the signals in area (3) which complement the signals in the front and/or in the reflecting area.

This area is also provided with the new anti-scratch surface, at level (0), projecting from the level of surface (1) in the end side area (2), as illustrated in the example in FIGS. 1, 40, 41, 43, 46, 47, 57, 68, 71, 72 and 85.

Module (B) illuminates the ground to the sides to facilitate maneuvering and perimetral security, and performs this function while still folded in its parking position, either by means of a fixed system having foci arranged in different directions, or by means of a mobile system, capable of rotating between 0° and 180° on a horizontal plane. Preferably said module is motor and/or manually driven, and for improved efficiency, it is provided with optical means to reflect and concentrate light. It can be used independently or as part of (A), as (A+B) and the versions thereof. Examples of this arrangement are shown in FIGS. 2, 4, 5, 9, 10, 110, 111, 112, 114, 115, 116, 117, 118, 121, 122, 124, 125, 126, 130, 131 and 133.

Other modules such as (C), (D), (E) and (G) are structural parts intended to support, locate and attach the new functional modules.

Module (C) is the housing cover, which can be either painted and/or decorated, as shown in FIGS. 1 and 5. In some versions, to facilitate assembly, (C) can be divided into 2 parts (C) and (C1), and/or incorporate other modules such as (A) and (B). Consequently, the module would be (C+A) and/or (C+B), and/or (C+A+B combined). Alternatively, (C) can be a cover substituting the signal module in mirrors not offering this function.

Module (D), housing, or (D+G) the integrated chassis and housing, is the central structure linking and strengthening the assembly of the overall system as shown in FIGS. 1 and 5. In some variants, module (D) or (D+G) can have an outer surface, and support (A), and/or (B) or the combined module (A+B).

Module (E) is a structural attachment support, linking the system to the door, body or cooling; and it is the base point around which the mirror pivots when folded, if this option is foreseen. In this way, the module can adapt the system to various doors and holds the attached part of module (A+, A1); and/or the combined module (A1+B) or (B+A1), as shown in FIGS. 1, 5 and 122 to 129.

In some versions, one module can also be mounted on top of another, for example the combined module (A+B) can be mounted on (C1). Likewise, in turn, (C, and/or C1) is mounted on (D), that is, (D)+(C1)+(A+B).

Other parts are standard, and mostly manufactured by specialists; motor for mirror folding movements, electrical or manual mirror glass operation, mirror glass frames, flat or curved mirror glass, heater, pressure springs. Virtually all of these are assembled in module (D) or (D+G).

Specific vehicle controls and/or remote controls operate the signal modules. These signals replace or complement those in another part of the vehicle. The electronic circuit provides new signals, double intensity, and/or combined, progressive or sequential switching up of the components, FIGS. 141 to 142B, and/or photodiodes which complete the LED control circuit, or reciprocal warning signals.

The mirror comprising the signal modules provides new options in security and comfort in standard vehicles and/or with certain functions, helps to identify particular vehicles such as taxis, police cars, fire engines, cleaning or loading vehicles. It also enables vehicles or bodies to be detected inside risk area (100), in the proximity of the vehicle, basically in area (F2). The way in which the mirror is operated, simplifies driving.

Exchanging the modules, simplifies altering the size and appearance of the mirror so as to adapt it to different vehicles, (i.e. utility, industrial, sport, transport, 4×4, loading vehicles) and reduces moulding and development costs, and part references. See FIGS. 6 to 13.

Some and/or all of the modules can be symmetrical and reversible (i.e.: can be used on the left or right hand side of the vehicle, indifferently), and/or they can be combined and standardised, as shown in the example (A+B), (A1+B).

PROBLEM AREAS

Several patents have been devised in connection with side mirrors, as they are typically visible, projecting elements on the vehicle body, and these specifications refer to how light signals are incorporated at the end thereof or in some part of their structure. However, none of these patents have had much commercial success, since they offer partial solutions in one forward or rearward direction, and their price-quality ratio is poor owing to the complexity of the automobile industry, the mirrors themselves, traffic conditions and user requirements.

Owing to determining factors in the industry, many of these patents are impractical, only apply to luxury vehicles, and do not provide complete solutions.

There is the need to reduce costs and weight, simplify the industrialisation process and increase reliability and efficiency; a system is required that can withstand tough life cycle tests and reduce possible faults, breakages, aerodynamic resistance, aerodynamic and mechanical noise and fuel consumption.

There is the need to provide the product in an anti-theft arrangement, internally mounted, without visible screws, and that is easily assembled, and resistant against vandalism, knocks and scratches. On the other hand, it must be easy to access and maintain, particularly if it has a limited life like a light bulb. It should not have a dangerous shape, in case an accident occurs (i.e. it should not be sharp, pointed, or rigid), but it should be aesthetically attractive. Essentially, it should increase security and, instead of being just a decorative element, it should facilitate various arrangements.

It must comply with the restrictions of approved industrial standards concerning mirrors and lighting signals, angles, photometry, colorimetry, location measurements and maximum and minimum angles, field of vision, possibility of using various types of mirror glass, curved and flat, safety standards concerning mirror folding, resistance to knocks, breakages, sharp edges, adhesives and the effect the system causes if an accident occurs.

Furthermore, the problems affecting current mirrors are insufficient space, too many elements contained within, reduced field of vision, various parts are required such as chassis and ribs for strengthening, anti-vibration elements, spring-based pivot mechanism for folding the whole system, and some systems are motorised with gears, using a gear reducer or friction, and two motors are needed to move the mirror glass, and spherical or electrochromic glass is used which occupies more space, sealing is required against water, dust, heat, ice, saltpetre, chemical products or UV rays, and others such as consumption, temperature loss, heater, traction cables for the manual version, electrical cables, connectors, temperature sensor, painted cover, memory units and protection circuits, inter alia.

These economic and industrial requirements need to be considered, but, driver requirements are the most important, such as the following operational advantages:

providing and receiving as much information as possible from the surroundings, at the front, sides, and rear, both in fast and slow traffic, and even in pedestrian areas; not only illuminating the front, but also the side perimeter, to facilitate parking manoeuvres, personal security, or less important tasks, or to provide information on the state of the surrounding ground.

Owing to today's traffic conditions, drivers require more comfort, easier driving, elements aiding safer driving, non-distracting controls, safe, visible signals even in bad conditions, it is not enough with complying with standards minima.

The proposed, new mirror considers and responds to these conditions and problems. The inventive step and new advantages it provides will be highlighted through an explanation of the particular solutions offered by other patents.

RELATED APPLICATIONS

This application is a partial continuation of documents in the applicant's collection of patents, and is the development basis of the new product.

ES U9103354 Rodriguez Barros A./Rodriguez J. M. 1991, provides a clear explanation of the purpose of the signal at the end of the mirror, being shaped like an arrow, with said signal being visible in three directions, to the front, the side and the rear, so as to provide turning and stopping signals, regardless of the operation of the mirror and its mechanisms. However, this description fails to specify a system for changing or attaching a bulb, or a precise signal angle.

AR P 247154 Rodriguez J. M./Rodriguez Barros, A. 1994, is similar to the previous utility model, and it mentions the option of a multi-lamp system with progressive switching up, and claims the arrow shape, without detailing the assembly.

ES P9500877 Rodriguez J. M./Rodriguez Barros, A. 1995.

ES P9601695 Barros A. R. 1996, discloses the accurate adjustment of the multidirectional signal concept to the degrees the side perimeter of the vehicle is illuminated, for turning and braking signals and new applications, such as the signal that warns when door is open, or the fog light and reversing light. It also refers to a function control light through the mirror glass; an attachment and maintenance system provided with a bead edge, adhesive seal, clips and screws. Reference is made to a dividing panel between the light function and the driver's field of vision, as well as other types of LED or neon lighting. However, no description is provided of the optical sources, or other energy sources. It proposes reducing the volume of said system which is compatible with moveable mirrors and other internal elements.

EP 9651000.7 Barros A. R. 1996.

EP 820.900 Barros A. R., publication Jan. 28, 1998

PCT 97/00188 Barros A. R. 1997

All these applications were filed in the name of Ficosa International S. A.

PRIOR ART

Other prior art applications:

U.S. Pat. No. 1,368,644 J. K. Mochizuki 1921

GB 207.271 John Edward Armstrong 1922

U.S. Pat. No. 2,295,176 Kelly 1942

These are very old and their concept is inapplicable, since the light signal is only visible to the rear and is dangerous as it shines in the drivers' eyes. Also they are very bulky.

U.S. Pat. No. 2,457,348 P. A. Chambers 1946, discloses a signal projected to the side and to the rear, however the panel separating the signal from the driver is so wide that it is counterproductive and limits mirror visibility. No further elements fit in the housing, and the mirror is provided with fixed glass and does not fold.

U.S. Pat. No. 2,595,331 P. F. Calihan et al 1952.

In 1958, following the Geneva Convention, the International Approval Regulations were created standardising mirrors, light signals and vehicle categories. This led to different countries introducing small modifications in the traffic code, according to their directives, basically in three blocks: America, Europe and Asia.

No major developments are disclosed. The patents are based on concepts similar to previous registrations, without any significant embodiment details until the 90's. However, after 1992, the solutions began introducing changes, partly owing to know-how advances in designs, prototypes and presentations to the industry sector, vehicle and parts manufacturers and official approval organisations.

GB 1.210.061 John Lacey Havill 1966

U.S. Pat. No. 4,475,100 Chin-Jeng Duh 1982

PCT/AU 88/00287 Peel, Robert 1988

These consider non-interference with the driver's vision, but also present several inapplicable concepts since they are very bulky and do not consider any solutions for the inside of the mirror. External screws are used and lighting surfaces that are impossible to approve. Some consider the signal to the side and to the rear, while others only consider it to the front and rear, without great angular accuracy. The mirrors project considerably to the side and would break easily, as this is a critical area for scratches and knocks.

GB 2.161.440 A—Michael J. Cooke 1984

Japanese Utility Model Sho 60-161646 K. Suzuki et al., discloses a signal to the front and rear, with the rear output being limited by a grating, at a closed angle. This is impossible to approve and is very bulky.

DE 35 15 922 A 1—Yugen Kaisha Yamazaki 1985 wherein the signal is produced to the side and rear.

U.S. Pat. No. 5,059,015 Donald Q Tran 1990

This offers a more simplified concept of an individual signal to the side, which is inapplicable, impossible to approve and, furthermore, it mentions a box for keeping articles.

U.S. Pat. No. 5,402,103 Tadao Tashiro 1991, discloses a shutter for directing the light and three light outputs to the side. However, apart from producing turbulence, it is impossible to approve or manufacture on an industrial scale.

GB 2.266.870 A—David Melville Louisson 1992

DE 4212258 Hopka Jens 1993

DE 9417510—U 1 Keil, Werner 1994

Since 1995, some new applications offering partial solutions have been filed, but they are expensive. Many are in the name of the main manufacturers who were probably motivated by know-how and the applicant's design presentations to all car manufacturers in Europe and US, promoted by Ficomirrors S. A.

DE 296 07 691 U 1 Chen, Chun-Mng Taichung T W Feb. 27, 1996, proposes signals to the front and side, but does not resolve assembly or mirror interior, and it is therefore impossible to approve.

EP 0738 627 A2 Patrick, Todd W. Apr. 22, 1996, claiming priority from U.S. Pat. No. 426,591, date 21 Apr. 1995, Donelly Corporation. The European application was belatedly filed. It comprises a complex module with intermittent and rearward, brake light and gratings that restrict the signal angle. This system is similar to U Sho 60-161646 Suziki and U.S. Pat. No. 5,402,103 Tashiro. It is impossible to approve and comprises a fixed floor light of little use, because at a short distance the area it illuminates is very reduced, although it does comprise an optical diffuser. It requires a very bulky housing that extends underneath and enlarges the lower edge. It can be applied to non-foldable mirrors or those used on large American cars, in which fuel consumption is irrelevant. If a fault occurs, the whole system has to be changed, which is very expensive.

Patents in the name of Donelly are intended to protect the construction method rather than new concepts. They do not introduce inventive step to the prior art, which is public knowledge. They contain several, very repetitive claims of the A+B+C type, concerning elements which are public knowledge and which are usually standard in lighting signals, such as regular lenses, red and amber colouring, the use of a fabric membrane, contacts, etc. It reduces the volume of light towards the floor, known as universal light. It consists of a sealed unit with a tubular-shaped, standard lamp, but if a fault occurs, the complete subassembly must be changed, which is cumbersome. Nowadays, cars are standard throughout the world, but not every country distributes the same spare parts, and furthermore, in the case of exclusive subassemblies, standard parts are more accessible on the market.

U.S. Pat. No. 5,371,659/93; U.S. Pat. No. 5,497,306/96; U.S. Pat. No. 5,669,705/97; U.S. Pat. No. 5,823,654/98; U.S. Pat. No. 5,863,116/99 in the name of Todd W. Patrick—Donelly Corporation. All of these patents refer to the intermittent signal in one single direction, rearwards, and its shape enlarges the lower part of the housing which, in turn, increases aerodynamic resistance. Furthermore, the signal is dangerous as it always shines in the driver's eyes.

EP 99650053.4 in the name of Donelly, the last in this group of patents, provides a three-way signal using LEDs and bulbs. However, the light is emitted in a radial direction, and is always located on the lower part of the mirror housing, making this element larger and, in turn, this increases volume and air resistance. It does not resolve lighting source systems, or provide access for maintaining and assembling elements. It is similar to above-mentioned GB 2.266.780 (FIG. 9), U1 GermanG 9417510.1 (with a lower signal but only in one direction). It is also similar to the concept and know-how of the applicant's patents AR 247154 and ES P9601695, in so much as the three-way signal to the front, side and rear. It also adds a light mounted on the glass, similar to the concept proposed by competitor Robers, John K, PCT US 94/03363 and others in that family of registrations. Its indirect, intermittent signal cannot be controlled, and, furthermore, it would be dangerous because when looking in the mirror, the signal would shine in the driver's eyes.

JP 62-191246(A) Kishosi Yamada, 1987, discloses a side light having one focus, but it increases the lower edge of the mirror considerably and does not determine the location of the motors that produce the relative movement of the various parts. It is impractical, particularly with respect to temperature and aerodynamic noise.

U.S. Pat. No. 5,774,283 claiming priority from DE95/1038770 does not have novelty and neither does it resolve the rearward signal output. It is based on the applicant's registration ES P9103354.

DE 297 02 746 U 1 Reitter & Schefenacker Feb. 18, 1997 considers a system for emitting the signal and light output to the front, side and rear, although only the latter is efficient. It is based on DE 35 15 922 A 1—Yugen K. Yamazaki 1985 and ES P9601695, Barros, Alex R., 1996.

The signal is generated by side light at one end of the illuminated surface. The light passes along the surface and is emitted at the other end. Although, this system occupies little space, it wastes more than 70% of the original light input along the extensive surface. To compensate, it uses several LEDs in a flat, traditional circuit, but does not manage to produce a strong enough light, and during the day when the outside light is more intense than inside light, the signal is only visible to the side and rear.

The principle of lighting the front of radio cassettes and dashboards in motorcycles and cars is already public knowledge. The system is very expensive and it has a sharp, protruding edge, which cannot be approved, since it is a dangerous design. According to sphere test value of R=50 mm, Reg. 46 for mirrors, EEC.

This document does not clearly specify the direction of the output signal—this is conceptual, and the attachment means and the detail of the projecting end of the housing as a dividing panel intended to create an area of shadow is similar to the applicant's module in ES P9601695 Barros, A. R. 1996 and is based on the know-how presented therein, and on the concept of DE 35 15 922 A 1—Yugen Kaisha Yamazaki 1985, being visible to the side and to the rear to avoid accidents when motorcyclists overtake.

GB 2 338 693 Werner Katz et al. Daimler Chrysler AG June 1999

This is equivalent to the previous case of Reitter & Schefenacker, and it is possibly their supplier. It only proposes a double exterior surface based on a film with Fresnel lenses to improve the front output, but the effective signal angle at 60° to the side and rear is visible. During the daytime the front output is not effective, as also observed in the previous case.

EP 0873910 Gatthergood Dale Emery et al.—Britax INC. 1998 This is based on the applicant's registrations, ES U9103354 and ES P9601695. It is conceptual and does not introduce any novelty with respect to the prior art and neither does it clearly specify the direction of the output signal.

PCT/US94/03363 Roberts, John, K. Claiming priority 1993. Muth Company. This proposes a relative solution that consists in applying an LED light behind the mirror glass with a micro shutter directing the light, so that the mirror acts as a illuminating surface. The system is based on an application of U Sho 60 161646 Suziki, and U.S. Pat. No. 5,402,103 Tashiro, and it is impossible to approve owing to the dangerous consequences when knocked, since the glass would shatter in this area. It has a very limited light angle to the rear that does not cover the minimal angles required for category 5 lights approval, EEC Regulation No. 6. It wastes a considerable amount of light energy and is expensive. In use, it reduces the field of vision in the mirror and this does not comply with EEC Regulation No. 46 concerning car mirrors.

DE 19808139 A1 Magna Auteca Feb. 27, 1998 is similar to the applicant's registration ES P9651000.7, A. R. Barros, EP 820900 A. R. Barros, PCT 97/00188 A. R. Barros and ES P9601695, A. R. Barros (in fact, this is mentioned in the search report) in so much as the light output, and it is similar to DE 297 02 746 U 1, but the light is generated by a perimetral neon tube, and this technology dates back to the 1930s/1940s. It is expensive, fragile and in order to operate, it requires an electronic circuit and 1500 V current transformer, which increases the system weight. It can be an alternative for large, expensive vehicles, particularly if there are developments in neon tube technology. It is not a very reliable system since faults occur easily, and when they do, the whole system has to be changed. The application of neon light is described in the applicant's registration ES P9601695 (page 5, paragraph 20 and claim 1, paragraph 11).

These applications do not cover all the above-mentioned problem areas, or if they do, they do so only partially. They provide some advantages and disadvantages.

The proposed new modular mirror offers advantages that overcome all these problems. Its functions respond to real user and industry requirements, particularly in terms of improving safety and consumption and reducing the relative cost of its use. Owing to its flexible composition, it offers several style and product possibilities. The innovations concerning the light source and its combinations produce the optimum light at a low cost.

DESCRIPTION EMBODIMENT AND REFERENCES

The mirror introduces new construction methods for the signal modules (A and B) and their various combinations.

Module (A) is a new, improved product defined by its shape, location, projection, use, interior and exterior design and the critical area of light output to the rear.

Its variants are based on the light and signal source used and the combinations thereof with a new combined flexible circuit (LEDs, LEDs+bulb, LEDs+OLES, photodiodes, LED-infra-red and/or other sources and sensors). Furthermore, variations can be achieved with the internal optical light guiding elements that produce output with this direct, indirect and/or reflected light, considered an extension of the source.

Preferably, signal (A) is made up of the following parts:

The external transparent surface (1) or tulip-shaped lighting surface.

The internal reflecting surface (12), reflecting parabola.

The support part of the internal source (10), housing or inner cover.

The light source, electroluminescent light generating elements (30), (95), (80), (140), (34*bis*) and (212).

The solid transparent bodies (150) between the source and (1).

Some design versions are the result of integrated and/or separated parts which form assemblies (A+A1), (A+B), (A1+B) and (B+A1). These combined parts are more economical, they are made from one single exterior surface (1), one single inner part (12) and/or (10), and share the same mixed circuit (20) and common negative connection, and can perform multiple functions.

(A1) is in (E) and/or in the area opposite the projecting end of the mirror and complies with the conditions defining signal (A).

Module (A), and/or (A1) and variants thereof, is defined by the following:

its design and location as an elongated signal projecting into the void, located at the side of the vehicle body, seen either to the front or to the rear, normally in the projecting part of the mirrors in the middle of the housing, so that it does not increase the volume of the mirror. The signal length is defined by (L) and can extend from (000) on the vehicle body fixing support, (E), to the intersection between (1) and (66) at the side projecting end or apex (204). Furthermore, at this end, level (0) extends beyond (1) to protect against knocks and scratches.

its optical and lighting configuration as a multifocal signal with three focal points that emit light at any wavelength to the front, side and rear, preferably simultaneously, according to functional requirements.

its use as a bifunctional signal; as (F1), the forward projection area, or front spot, that complements the vehicle's front signals; and (F2), the combined area to the side and rear that complements the side and rear signals. Also, its mixed circuit provides warning signals, using other emission and reception means, either sonorous or ultrasonic; and/or a reverse function whereby the system detects elements in the horizontal signal area by emitting infra-red signals, coded or uncoded; and receiving them in photosensors, or by emitting infra-red signals to control gateways and barriers, and receiving them in a remote control receiver and/or a temperature information sensor. Also its emission/reception function in area (F1) can operate in combination with the front spot on the other mirror to produce a range finder that warns when another vehicle approaches in the same direction.

Each of these functions is based on an integrated electronic circuit that regularises the function.

its five orthogonal projections from surface (1) with respect to driving axis (500) for any mirror design, height or position, which are as follows:

Rearward projection (K1) in a plane perpendicular to (500) is greater than 0.5 $cm^2$. It is always in the area from line (X) at the end, FIG. 39. It has a smaller surface area than the other projections from (1), but in the module (A1), (A1+B) and (A2+B), the surface area may be larger.

Rearward projection (K2) at 45° in a plane at 45° to (500), is always larger than 4 $cm^2$.

Side projection (K3) in a plane parallel to (500).

Forward projection (K4) at 45° in a plane at 45° to (500), and generally having the largest surface area in any variant of (A).

Forward projection (K5) in a plane perpendicular to (500).

Its appearance and design, as shown in FIGS. 6 to 13; (A) can be shorter and simpler, including only (L3 or L2+L3) at the side end, offset upwards or downwards with respect to the middle of the mirror, in accordance with its definition.

If the mirror is not foldable/moveable, it is made up of one single part, and at least one of the following three parts; (L1), the signal on the support and/or front spot, (L2), the relief, catadrioptic area and/or front spot, and (L3), the signal to the side and rear, on level and/or off level, that produces projections (K1) and (K2), as shown in FIGS. 1, 2, 3, 4, 5 and 40, 41 and 42, and includes submodule (4).

The part of surface (1) of (A) that generates projection (K1) and the rearward signal, is comprised in an end area defined by line (X) that passes through the intersection points (X1) and (X2) on the housing, the radius of which is equivalent to half the distance between its upper and lower tangent, plus 20%; and the centre of said radius is the middle point on the vertical tangent at the side end. The area extends from line (X) towards the end leading away from the vehicle body. This is shown in FIGS. 6, 9, 13 and 39 (A, B, C).

These areas do not always have the same optical solutions and/or light source, even though they are comprised in the same lighting surface (1), because the systems can be combined to emits one single signal in one of these areas.

Providing (A) complies with its functional definition, it can have a vertical configuration, according to the design variant and available space. This is shown in FIGS. 118 to 121, illustrating an optical, reflecting system spiralled on the vertical axis to produce the signal at all angles of (A).

If the mirror can be folded, see references (15) and (16), module (A) is divided into two parts; (A1) on the attachment support (E), normally provided with the same signals and functions as part (A), permits the same image and lighting as an integrated part from (L1) to (L3). It can exist as (A1) without (A), and combine with (B), forming (A1+B).

The wiring (17) is characterised in that it passes through the centre of rotation axis (60) of folding mechanism (15) of the housing, irrespective of the system and shape of the signal, if it is a support arm as in motorcycles for the centre of joint (16) in orifice (60) for such purpose, with a rotation stop (61) to prevent the cable from being strangled. See FIGS. 11, 12, 13, 43, 100 and 127. If the mirror is not provided with an axis-based folding mechanism, and/or the module in question is (A1+B), wiring (17) and (18) does not need to pass through (60). Also, similar to designs for motorcycles, lorries or sports cars, where the body of the mirror comprises an elongated support arm associated with the housing, the signal can be integrated in said arm, thus fulfilling the definition parameters. This is illustrated in FIGS. 9, 10 11, 12 and 13. Furthermore, in the event these arms have folding or rotation movement, wiring (17) will always pass through orifice (60) in the central axis of the rotation system (15).

None of these design variations changes the effect produced by projecting the signals at least 5 metres, on a photometry plan, from the emission focus, as shown in FIG. 2.

Modules (A), (A1) and (A+B) are positioned as lateral projections and therefore emit and receive signals to and from various directions, possibly simultaneously, for the left and/or right sides of the vehicle, and in some cases, according to the specific function, both sides simultaneously, preferably to the front, side and rear, (A, A1, 2, 3, 4 and B) and according to the horizontal angle required for the approval of each signal or for several combined signals integrated within one same module and under one same lighting surface (1), or according to the multifocal area for lighting the side when the mirror is folded in its parking position. See (A1, B) in FIGS. 2, 3, 4. Module (A) generates light at an angle between 0° and more than 180° with respect to the driving axis, normally 45°+180°−10°, without the light shining in the driver's eyes. This is based on the concept proposed in the applicant's registration, ES U9103354, and extended as shown in FIGS. 2 and 3, where the signal is projected along planes X=+1, Z=−1 and, Y=−1 without any interference from the vehicle body.

Module (A) complies with EEC Regulation N° 6 concerning pilot lights, which requires a minimum horizontal angle of 55° with respect to driving axis (500) and a light intensity of 0.6 candela (cd.), see FIG. 3. Furthermore, the module complies with regulations in other countries for different pilot lights and signals to the front, side and rear, without changing its appearance, that is, maintaining the same exterior surface (1), see FIGS. 3, 4, 42 and 43.

According to the type of vehicle, module (A) signals complement and/or substitute one or various signals, preferably the intermittent side pilot, category 5 of EEC Regulation No. 6; J 914 SAE; and/or front and rear intermittent lights for turning and/or braking, intended for vehicles having 4 wheels or more; pilot, categories 1 and 2, and signals derived therefrom; emergency lights and manoeuvre and movement indicators according to EEC Regulation No. 6, SAE J914, SAE J915, Japan, Article 41.

Module (A) signals can also complement and/or substitute front and rear pilots, or only the front light on motorcycles, bicycles, tricycles or derivations thereof, if feasible according to design and if the safety factor complies with EEC Regulations Nos. 51, 52 and 53. Therefore the signal is projected further as shown by arrows (3), (3*bis*) and (4). See FIGS. 3, 4, 11 and 46.

The signals operate by means of a resistor circuit (306), see FIGS. 141 and 142, which reduces the current to obtain two light flow intensities, that is, two signals with the same elements, one at low intensity, 20/30%, and the other at 100% current. Bright LEDs are used for these further projecting signals, and to improve performance, convergent lenses (6) or concentric prism lenses (Fresnel lenses), reflected spot (3*bis*) and/or submodule (4) are placed at the outlet, as shown in FIGS. 6 to 13, 46 and 81 to 110.

In the preferred embodiment, module (A) uses LED chips as the light source, LEDs with special optics (see FIGS. 32, A, B, C, D, E, F, G, H, I, J, K, L) and/or lamps, microlamps or tubular, halogen, minixenon, flash, neon, OLED or OLES lamps, and other lighting elements. For other types of signals and functions, the mixed circuit can include sonorous diodes, infra-red LEDs, radio frequency or ultrasonic emmission elements; photodiode sensors having a visible spectrum wavelength in the range of 350 and 1150 nm and temperature (T1), and/or timers, and/or circuits analysing the received signal.

In special vehicles or in order to perform other functions, the module has a particular inner structure that can use a joint circuit with a combination of elements for the same or different function. For example, bulb+LED, or OLES, as shown in FIGS. 100 to 110, there being a common negative connection in each case.

The basic functions are the light signals, where light output (32) from any type of source, can be direct, direct reflected, indirect and/or the combination of more than one of these solutions.

Indirect light is produced within solid, transparent light guiding bodies (150), that are normally elongated and cylindroid type, and divert and alter the light by more than 10°, and by more than 10% with respect to the primary beam (32).

Light is absorbed inside these bodies by surface (156) or (6) and reflects inside at a low incident angle until, when colliding with a polished surface inclined at 45° with respect to its trajectory or inner prism (155), it changes direction and exits (32*bis*). See FIGS. 71 to 99.

The shape of these bodies is defined by their dimensions, (D2) or thickness, greater than 0.8 mm; (L1) or length, greater than 10 mm; (D4) or width, greater than 0.8 mm, and also by their position because they are inside the module, between the source and surface (1), separated by a distance (D1) greater than 1 mm and (D3) greater than 0.5 mm. See FIGS. 74-A-B, 76-A-B, 78 and 79.

The new indirect output is also a bi-directional light, travelling along opposite directions, (T) to (R) and (R) to (T).

There can be individual light guiding bodies for an LED and/or a lamp, placed at each end, or for more than one LED, and as a result signals of more than one colour can be produced in the body and on surface (1).

In a simplified version, there can be one-way travel inside the body, with the entrance at end (T), partial output along its trajectory at (32*bis*) when reflecting against prisms (155) and the remaining light reflects against plane (155*bis*), similar to a prism, that truncates the end of the body that can be either cylindrical or irregular.

The light conductors can reflect the light more than once and make it develop at different levels by means of a lenticular output surface (1*bis*) and (6*bis*), smooth or irregular (1A) and (1B), as shown in FIGS. 78 to 85.

The bodies (150) can also reflect light by means of a reflecting cover on surface (l2*bis*), see FIGS. 78 and 80, preferably made from titanium dioxide or the like; or it can comprise an adhesive or serigraphed cover made from Baytron type electroluminescent polymer, as illustrated in FIGS. 104 to 107B.

Module (A) can also comprise intermediate internal transparent bodies, but in order to produce direct optical effects, as shown in FIGS. 61 to 67, or optical effects that multiply front vision of the light focus, which becomes an optical part of the source, as shown in FIGS. 68 to 70B, or directly LEDs with special design optics to concentrate or diffuse the chip light, as shown in FIGS. 27 to 33 and the variants thereof.

All the variants of the internal light guiding bodies (150) between the source and surface (1), regardless of their shape, maintain a distance (D1) to produce a contrast against external light and optimise daylight. Furthermore, the bodies are subjected by pressure from teeth or clips (8) and positioned on the internal walls of (A).

Inner surface (12) which surrounds bodies (150), is not always chrome or total chrome, since it can also be dark chrome or tinted varnish and/or any other colour, or black, and/or preferably it has a non-glossy finish, so as to avoid reflecting the exterior light and increasing the contrast. See FIGS. 73 to 77, 81 to 86 and 89.

The distance (D2) of bodies (150) from the bottom of module (A) is characteristic and design dependent in order to produce a depth effect.

In FIGS. 51 and 142, module (A) comprises an optional system having an independent, emergency power supply, which is disclosed in the applicant's registration, ES P9601695, that consists of at least one intermittently flashing LED, that is powered by the rechargeable battery (72) that is constantly charged from the main electricity connection.

Charging and running the system is regulated and connected automatically by circuit (74), by interrupting the current. The battery can also be activated voluntarily by a reversing switch (73).

The operation thereof can be synchronised with the connection of an alarm, which also serves to draw attention to the width of the vehicle when it is parked.

The base of the LED circuit comprises at least one photodiode having a sensitivity range greater than 750 nm (infra-reds) (25), which receives commands from control (360), and a circuit that decodes the signal received so that it acts as a connection indicator for the alarm and centralised locking system, and connects the motors controlling the movement of module (B).

Area (3) of surface (1) in module (A), see FIGS. 1, 7, 8 and 51, can undergo reflecting treatment according to the catadrioptic regulation, and the colour thereof will correspond to the direction of orientation, and/or a low relief sign or logo is attached to this area by means of any usual graphics technology or serigraphy, with methacryllate having a metallic background of lettering for the inside, against a painted background, and/or a low relief or etching on surface (12) underneath surface (1) in area (3).

Special functions are also applied to this area, such as two brightness intensity signals, with more powerful LEDs, front spot with a concentrated light beam or flashing mechanisms with discharge thyristors, stroboscopic effect, and/or mini xenon lamps for special functions such as emergency, fog or running lights. Furthermore, white light can be produced by means of the RGB effect (red-green-blue), superimposing three light colours.

The catadrioptic effect of area (3) created by inner pyramids or prisms at 45°, can use truncated pyramids, thus producing a mask that fulfils the double function of letting light from inside pass through while reflecting light from the outside (3*bis*), and can be applied to the whole of surface (1) thus hiding the light source. See FIGS. 108 to 114.

Module (A) offers the option of a light source with a mixed LED and OLES circuit, in which the LEDs are applied to the light that must be more concentrated, and the OLES are applied to the light that has to be superficially more uniform (34) since it is a flexible, plastic support substrate, preferably made from polyester (N) that contains an electroluminescent polymer semiconductor substrate (N3) between two metallic tracks, and when a potential difference occurs between the tracks, it produces light (32) according to the established design or shape (34*bis*). The OLES or OLED circuit is flexible and is less than 2 mm thick.

In order to shape the reflected light output, module (A) uses micro mirrors (13) on surface (12), including a collimator that diverts and diffuses outwards more than 10% of the light produced by any type of source. See FIGS. 50, 56, 57, 100 to 102; 120 and 121. It can also use spot type, double reflection, consisting of an inverted divergent type reflector applied to the source (12*bis*), that reflects light towards another larger or main parabolic reflector (12), normally of the convergent type, as shown in FIGS. 92, 93 and 121-B.

Module (A) can use a combination of various light output options, including, source and optics, whereby it can create new design shapes, sensations and aspects for the output light.

Module (B)

See FIGS. 2, 4, 5, 110 to 112, 114 to 118, 120 to 140. This is a short distance light at a large angle, that illuminates the side area next to the vehicle. Normally, the mirror is between 80 and 100 cm high. It is safe and comfortable and can be applied to tasks such as changing the wheels or looking for the keys. It needs to diffuse the light without losing intensity, and achieving this with just one single focus can lead to temperature-related problems, because a powerful focus has to be used to distribute more candelas in the side area, but the focus has a reduced volume, and so it may lead to overheating problems.

The new proposed options overcome this problem by means of a combined system that comprises an air circulation channel or duct with water trap, the mass of metal acting as cooler and heat diffuser (510), chimney (560) and chassis (D) having surface contact in (568) and (588) for a halogen lamp (212), see FIGS. 134 to 140. Optionally, the system comprises a timer (310) that limits the time switched on, as shown in FIGS. 35 and 36.

In the LED version, the base circuit (20) has a metallic support adhered to the positive track, and owing to its proximity it dissipates the heat generated by the high brightness LEDs cathode (30), and establishes a channel or duct of upward ventilation owing to thermal difference, with input in (266) with water trap, or (265) and output in tower (560), which helps to constantly remove calories from the module. See FIG. 137.

This new module includes a fixed or mobile option consisting of a light diffusing system based on several foci and more than one LED or lamp, preferably facing in different directions and at different angles, so that, even when the mirror is folded, the same function can be performed according to the groupings (111) and (222). By separating the focal points, the light is optimised, distributed more efficiently, occupies less space and also guarantees performance of the function should the element burn out.

In some versions, the W10W bulb can be replaced with two W5W type bulbs to reduce the height. The module is based on a double lamp support of the type having a clipped cover (600), which can comprise timer (310), the ventilation outlet and simplify the cables with a common negative connection, even for sensors such as the temperature probe (T1) included in (B) o (A+B). See FIGS. 35 and 36.

In order to achieve greater efficiency, the module includes a rotary, adjustable option comprising a single and/or multiple foci light source. It includes at least two mutual mobile parts, the fixing ring to body (251) and the rotation ring supporting the motor or manual rotation base (270), as shown in FIGS. 135, 136, and the thermal channel for dissipating heat and refrigeration (266) and (267). The module is a chrome reflecting parabola (264), with the machined, reflecting, micro-mirror collimator (265) that multiples the focal points, interchangeable lamp (212), of the halogen, tungsten or minixenon type, and lamp support (211), light concentrating optic (263) smooth or prism-based (274); and ring (251) which links the module to the housing by means of clips (261), projection (250) that regulates pressure to avoid vibrations, screws (258) between the two half parts, the part that rotates with respect to the mirror housing being fixed by the conical flanges (260) and (254). Flexible tooth (214) provides a stop whereby scales of different positions of horizontal rotation can be obtained between 0° and 180°, and it can be activated manually by the rounded lever (262).

The different versions thereof are based on the light source, which can be fixed or mobile:

The type with one focus:

A—Manual, rotation. FIGS. 132 to 140.

B—A single motor, rotation. FIG. 138.

C—Manual with halogen lamp and in contact with (D) as cooler. FIG. 134.

The type with more than one focus.

A—Fixed foci with bulbs, FIGS. 114 to 117 and 130 to 132, preferably of the 5 or 6 W type, and either ordinary bulbs or alternative technology bulbs (such as xenon), or LEDs with temperature dissipation facility.

B—Rotary with LEDS on support with greater metallic mass as cooler and/or source of a bulb or more, the same as in point A, FIG. 136.

The motorised version can also be operated manually.

The motorised version operates by remote control (360) or by means of a command (351) located inside the door coincident with the command for directing the mirror, but which is energised by a three-point inverting switch (352) for this movement.

The memory-based version is also activated in reverse and first gear to facilitate parking and illuminate the ground to the side, thus synchronising the manoeuvre. This synchronisation can also be achieved with (B) fixed and two foci facing in different directions.

In the more powerful halogen lamp based versions normally the lighting surface (263) and housing (264) are made from the same material, i.e.: glass, and they are sealed. The interior is chrome to facilitate reflection, and the lamp assembly is retained by teeth (8) pressed by the safety ring (64). Maintenance is easy because module (B) is separate from the housing, as shown in FIG. 134.

Module (C) and versions thereof (C1) show the finishing cover which is normally painted, but can be covered with a film having a grid-like design, drawings, graphics or logos, in turn, coated with a transparent finish and protection varnish. See FIG. 132. The cover is normally fixed with clips (170) and (550) whereby outside assembly is fast. It is independent from other modules. For maintenance purposes, screwdriver (F) is placed in between glass (50) and housing (D) provided with edge (171) which is a flap of clip (170), which acts as an anti-theft device. (The unit cannot be disassembled from the outside). Parts of the signal module requiring maintenance can be accessed by disassembling the unit. See FIG. 132.

Cover (C) can comprise characteristic external surfaces with aerodynamic channels, or low relieves, as a stylised version.

EMBODIMENT

Its construction and assembly are simple. The mirror modules are interchangeable and can be combined, and the signals do not alter the outer appearance, whereas, the inside contains options for the source, light output, non-visible signals and sensors. There are three basic stages in the construction of the new modules (A), (B) and (A+B).

1. The structure composed of outer surfaces (1), internal housing (10) and the interconnections, fixing and shape features and access for changing parts (17), (39), (8), (9), (600), (P1), (DC), (50). See FIGS. 39, 40 and 42.

2. The composition of the circuit/source, components, flexible base, mixed circuit, LEDS, OLES, bulbs, sensors, photodiodes, LEDs, IR, operation circuits (20), (30), (32), (25), (310), (95). See FIGS. 32 to 38.

3. The optical variants, reflection elements, light conductors, and intermediate optics (6), (7), (12), (13), (150), (155).

Housing (D) or chassis-housing (D1), glass (50), support (E), cover (C), light signals (A), (A1), (B), in combination, enable different products to be formed for different vehicles. For example, berline, sport, loading, compact and luxury versions, with more or less sophisticated operative equipment according to requirements. Furthermore, the shape, size and colour can be changed, as shown in FIGS. 1 to 13.

This is due to the new signal modules (A), (A1) and/or (A+B) which each have a different inner configuration, but coincide in so much as the parts of the mirror are concerned, such as the edges (11), perimeters, surfaces, fixing and assembling systems (8) and (9). In this way, development and moulding costs are reduced, and various design and operational configurations can be achieved with equal investment. See FIGS. 5, 7, 9 and 10, 43, 46, 49, 51, 52, 57, 71, 87 and 97.

In the preferred version, modules (A) and (B) offer a new interior configuration which consists of at least an LED circuit as signal source. See FIGS. 14, 33, 46, 104, 123-B, 136.

The circuit is printed onto a flexible base (20) onto which LEDs (30) and other elements are inserted to produce and receive different types of signals according to the required function, whether directly, indirectly and/or reflected, thus occupying a minimum space.

The general construction of the mirror defines the shape of the modules. Module (A) normally has an integrated outer shape (1), (2), (3) and (4), which is standard and can adapt to different mirrors without projecting from the level of the general surface of the housing, however if it does project it constitutes surface (66) in accordance with a design requirement in area (2), and projects the critical distance (DC) so that light can pass and maintain the rearward signal projection (K1). Furthermore, preferably there is a height difference (0) on the lighting surface (1) to protect against knocks and scratches, in the same way as the height difference between (66) and the edge of housing (61).

On the outside, the lighting surface comprises a smooth, transparent plastic surface, normally colourless (1), and the signal colour is achieved by emitting light from the LED, neon, flash masked microlamps or OLES, which are colourless when switched off; or indirectly by the second inner light reflected in the front side area (13), as shown in FIGS. 43, 46, 48, 49, 50, 61, 68, 87, 105, 108 and 112.

The standard material that is used today for part (1) is PMMA, PC, or a transparent polymer, with a emission coefficient of 0.95 which is considered optimum, and sometimes it is machined on the inner face thereof, preferably, in the form of vertical prisms (7), total or partial, or a combination of Fresnel, prisms and convergent lenses (6) and (7), as in FIGS. 8, 11, 41, 42, 46, 51, 96, 102 and 114 variable along the extension of surface (1) and in accordance with the angle, signal and approval regulations for complement or substitute pilots.

In some cases it does not include machining, and the surface is almost smooth and transparent. However, the inner bodies (150) are machined with prisms (155) or lenses (6). See FIGS. 61 to 93.

In other cases, the optics are conditioned to make the signal more effective; like the new solution and the variants thereof, at the end of signal (F2), the detail in area (2) to rectify rearward projection (K1), see FIGS. 1, 3, 8 and 40, 41 and 42, and obtaining the non-coloured light in that area so that it does not affect the driver, although, in some cases, more than 10% of the surface producing the light can be seen. However, the signal is re-distributed by the combination of optics in this area (2), so as to differentiate area (100) with light, from area (200) in shadow, for the driver. This is the preferred embodiment of the applicant's application AR-P247154, Rodriguez J. M./Rodriguez Barros A. and ES P9601695—Barros A. R. where the edge of the housing and its inner parabola act as a panel separating the illuminated area from the non illuminated area, with respect to the driver's eyes.

The light source is made up of various light generating elements, basically a minimum of two high brightness LED chips (30), connected to at least one series and/or various series in parallel arrangement.

The source can be made up of light generating elements of a different type forming one single mixed circuit, for example LEDs+lamps and/or LEDs+OLES. If an element or series fails, the other parts guarantee that the basic function will be maintained.

An electricity surcharge protection circuit, based on resistors and diodes (22), also designed to stabilise current so that each LED receives the same current regardless of the fact that it is arranged in series, and to avoid the premature ageing cycle of the LED chip. In this way, it guarantees optimum performance and long life. See FIGS. 19, 20, 33 and 35.

In some cases, it comprises a microcircuit (81) or (310). See FIG. 33, 34, 35 and 52 which can organise the switch on, switch off, sequences, frequencies and time, for example, of the two way signal that warns when a body or vehicle is present in area (100) by decoding a certain wavelength received in photodiode (25-A), (25-B), (25-C), submodule (4), FIGS. 6 to 13, or reflected ultrasonic wave frequency; and/or a complementary sonorous diode (70), see FIGS. 43, 46, 47, 52 and 53, to draw the attention of those in a pedestrian area, with their back to the signal and/or another buzzer (66), see FIG. 141, or to draw the attention of those inside the car and control and give warning of special functions, the pre-braking light (301) for highway driving, located among the highway commands (300), submodule (4), see FIGS. 141 to 142B, and/or the door opening (303) warning light. These components (30) are inserted onto circuit (20), by welding, clips or ultrasound (29) and (39), as shown in FIGS. 24, 29, 30 and 31, onto a base of very flexible material, a sheet of fibreglass having a thickness, preferably, less than 2 mm, of treated polyester, soft metal or similar (20), as illustrated in FIGS. 14 to 19 and 33 to 35, that withstands the welding temperature, the pressure of the clip machining or melting by ultrasound. The welding is of the SMD superficial type, or perforates the base plate.

On the other hand, if for stylistic reasons, it is not necessary that surface (1) be homogeneous, mixed optic variants and/or sources can be used, while still fulfilling the regulation signal function and producing a heterogeneous, contrasted, irregular, sectioned and particular light, using new tubes, lenses and/or specially designed cannon-shaped foci. See FIGS. 46, 53 to 55, 65 to 70B, 93 to 95 and 100 to 105.

As an option, and in some cases for dissipating heat or for aesthetics, circuit (20) can be mixed, i.e.: one stiff part, adhered to a metal base to dissipate the temperature, or a combination of two materials, one metal and the other fibreglass or polyester.

In this way, a mixed light source can be created with new design and function possibilities for a light element.

The new flexible base (20) adapts to different surfaces, curved and/or flat, regular and irregular or a combination of both, and adopts the shape of the guide support, and in this way, a greater light emission angle is obtained than the actual LED used unitarily, directly, indirectly and/or reflected.

The signal obtained is the product of a series of connected foci, the sum of the light emission angles of each LED, and the orientation of each element along the surface (1) is studied. The signal is homogeneous irrespective of the shape of (A) and occupies minimum space. See FIGS. 16, 19, 31, 43 and 47.

On the other hand, if for stylistic reasons, it is not necessary that surface (1) be homogeneous, mixed optic variants and/or sources can be used, while still fulfilling the regulation signal function and producing a heterogeneous, contrasted, irregular, sectioned and particular light, using new tubes, lenses and/or specially designed cannon-shaped foci. See FIGS. 46, 53 to 55, 65 to 70, 93 to 95 and 100 to 105.

In order that each LED is orientated as required and can adopt scale positions in a minimum space, the flexible base is provided with slits (21), see FIGS. 14, 15, and 16, which permit accordion-like stretching movements, twisting, height differences, scales, wings and radical flexing at angles between 0° and more than 45°. See FIGS. 14 to 19.

To achieve a greater or inferior light intensity, side mounted LEDs can be combined (30-A), with the light being emitted at 90° with respect to the base plate and the LED is considered as an electronic component, and therefore, a mixed signal circuit with LEDs and/or different type elements is included. See FIGS. 31, 33, 34 and 35.

For an even better signal, with an individual LED, the optic surrounding the chip is given a new shape, with particular developments that either concentrate or diffuse the light, and at the almost microscopic proportions of the light generating chip, using 20 mA and up to 350 mA chips or greater. See FIGS. 24 to 30 and FIGS. 23, 30, and 32.

The LED generates the light by means of a P-N connection on a microchip of different semiconductor substrates, and it is applied by vaporisation in a high vacuum on a transparent base. A1 In GaP generate red, orange, yellow preferably, between 580/635 nm. The chip is square and/or rectangular and small (0.1 mm×0.1 mm approximately), consequently the light source is considered to be theoretically concentrated.

The beginning of the signal is the wavelength produced between the anode and the cathode of this chip, and accordingly, this wavelength is the light colour we perceive, that avails of the energy with an electron to photon conversion factor of 55 to 80%, which is between 5 and 14 times greater than the incandescent lamp (according to the wavelength) which is only 11% efficient at the same current and furthermore, dissipates calorific, infra-red and UV radiations, which leads to a greater consumption of energy for the same result.

However, it has a disadvantage because its light emission angle is small, in one direction, and it is not radial like the incandescent bulbs. As a solution and novelty in terms of the signal requirements, optical bodies (150) are placed between the chip and outside surface (1), and therefore the disadvantages are now advantages.

The light energy obtained is very limited, i.e.: between 1.5 and 5 lm per LED. In order to obtain sufficient light for a signal, several LEDs need to be used in a multifocal system, as illustrated in FIG. 31, with the new mixed flexible circuit re-directing each LED towards a spherical stereoradian sector of rectangular projection. See FIGS. 21 and 22, 29, 30 and 32. A new optic, preferably oval-shaped is used, with cylindrical section (36) and/or irregular convergent lenses that project the light output (32) with the amplitude determined by (33), with proportion between diameters D1=3 on (45); by D2=4 or greater on (44), with (45) always being a larger vertical angle between +10° and −10° (from the intersection of (D1) with (D2); and (44) a horizontal angle that is equal or greater than the vertical.

In this way, the light is distributed from the beginning at an optimum angle, in rectangular projection (111), see FIG. 22, coincident with photometry regulations for vehicle signals, which is between +15° and −15° in the vertical direction and a larger angle in the horizontal direction. If the view of a classic LED or optics (38) in FIG. 21 is compared with the new ones (36) shown in FIGS. 26, 27, 28 and 29, the light is used more efficiently.

Using the same principle, light emission can be optimised by means of a new rectangular-shaped chip (34) or two adjacent square-shaped chips in one same capsule and on one same base (35) and optic (36), and emission is equal to that of a rectangular chip in one same capsule. The chips are provided on a reflecting base, preferably rectangular or oval (35) or (43), slightly concave (35-A), which also acts as an element for removing heat from the capsule by one or more pins of type (39) including those corresponding to the two poles, positive and negative, preferably, the positive pole. See FIGS. 29 and 321 and 32J.

The chip receives the current connecting the anode and cathode to bases (40) and (41), and by means of micro cable (42), being fixed to circuit (20) by contacts (39) and welding (29) being in the positive pole (+) where temperature increase or overheating occurs that reduces the light performance. In order to overcome the problem, the positive pole (+) is expressly connectedly to a metallic track (28), wider than the negative pole (–) and in this way the temperature increase is dissipated. See FIGS. 14 to 35. However, as for high brightness LEDs such as those used in lighting module (B), see FIGS. 4, 33, 131, 136 and 137; and 3 bis of FIG. 46, a metallic base (20) with greater mass and thickness is used, which being adhered to the tracks of the support circuit acts as a cooler and, optionally, if required, a ventilation canal with input in (265) and (266) and outlet in (560).

Light is visible to the human eye in a sensitive spectrum ranging from 400 to 780 nm wavelength and when this wavelength is varied different colours are produced. The latest generation LED chips, given its composition, produce almost all wavelengths, including different tones within a colour, and light intensity is 30 to 100 times greater than in traditional LEDs used as operation control lights in electronic equipment, and they range from 1.5, 2, 3, 5 lumens or more per unit, with energy consumption between 50/80/150 mA for a unitary voltage of 2.1 volts. In development, LED s with 5, 10 or more lumens per unit are being used.

With this high brightness, by grouping together a small quantity of LED chips, the sufficient values are obtained for a perfectly visible signal, and, in addition, the circuit or source enables a series of LED chips with other characteristics, wavelengths and colours to be incorporated in the same space inside the module, as well as non visible 800 nm LEDs such as infra-red (IR) diodes, and combined with other light elements such a stroboscopic flash, or discharge lamp, and in this way, as well as circuit (20), a new multi signal is obtained that complies with more than one approval regulation, and is concentrated from one and the same translucent outside surface, having alternated and/or simultaneous operation, and which is independent or whole, as required. Alternatively, LEDs having two light intensities as shown in (3_bis_) and (4) in FIG. 46, can be combined inside the module, by means of the resistor attenuating circuit (306), illustrated in FIGS. 141 to 142B.

There are LEDs that produce a white light, which is obtained by covering a blue light emitting chip with phosphorous. However, the blue LED itself has low light intensity and this is even lower if it is covered. A more economical solution for achieving an equally intense, or greater white light signal, is the simultaneous emission of three chips with three wavelengths equivalent to RGB light (red, green, blue), approximately (red 630 nm, green 540 nm and blue 470 nm) in one single LED or in three separate LEDs facing the same direction with direct and/or reflected light, and the new mixed flexible circuit (20) can achieve this, mainly for function (F1) or (F1_bis_). FIG. 46 can be equivalent to the flash function of FIG. 52. Also, a white light can be obtained with two LEDs, blue and red, and/or red and green.

This principle can be applied to module (B). See FIGS. 131 and 136.

In order that the LEDs are positioned perfectly in all signal modules (A), (A1) and/or (A+B/A1+B) combined, flexible circuit (20) provided with slits (21) is automatically supported between inside housing (10) and the chromed surface or parabola (12) and internal bodies (150) when closing, together with lighting surface (1) and is positioned by teeth, fixed by ultrasound, pins, guides and clips (24). See FIGS. 41, 43, 44 and 48.

In order to ensure this position, in any variant, subassembly (A) is normally sealed by ultrasound along edge (14) and/or along the edge of cover (10) with parabola (12) in some cases, see FIGS. 83, 85, 94, 103 and 109, thus obtaining a sealed assembly, with the output of cable (17) or direct connector (211) being fixed by clips (550), FIG. 131, module (B). Alternatively, direct connector (88) in the multiple option of module (A), shown in FIG. 57.

The spaces between circuit and housing can be sealed with silicone or a joint sealer to complete the water tightness. In some mixed versions with bulb and LED, the cover part of the lamp support is not sealed, but it is water tight owing to the pressure of an elastic material or a joint to avoid problems with humidity, pressure washing, dust and saline environments. There is an exception if the ventilation duct is included in a combined module, however the air inlet and outlet are provided with a water trap or a filter.

In order to ensure the long life of circuit (20), a tropicalised process is applied, which consists of a colourless resin bath that covers the welding and metallic tracks to prevent corrosion anodes from forming. This process is very important if the circuit is external (87), only for contact, by means of tracks (91) and (92) for the mini lamps in FIGS. 50, 51 and 82 of module (B).

Having defined how to put into practice the direct light source on the basic, mixed flexible circuit (20) and the features for optimising the light of LED (30) for the module's (F1) front spot and (F2) side light, FIGS. 1, 14, 15, 41 and 43, reveal the preferred version of module (A) and its variation of combined signals and/or different shapes of direct, indirect or reflected light output, irrespective of the optics on surface (1). According to requirements, the optimum version can be based on a mixed circuit that avails of the advantages of the LEDs as well as those of the bulb, particularly for motorcycles and/or people carriers. See FIGS. 100 to 102, 108 to 110 and 120/121.

Direct light output is characterised in that the signal preferably in area (F1) has direct output when more than 20% of the light generated in the source is directed in the direction of its focal centre, according to the manufacturer, from the source element, directly to surface (1) and from there to the outside. FIGS. 42, 43, 46, 51 to 68, 93 to 96, 108 and 123 to 129.

Direct-reflected output is characterised in that to achieve the signal preferably in area (F2), more than 10% of the total light generated in the source is diverted and directed from the source element to surface (1) and from there to the outside, with at least one change of direction in this inside trajectory, produced by reflection on the metallic means, parabola (12) or machined sectors (13); as a whole, the parabolic, staggered surface or collimator, (series of small directed metallic surfaces), so as to leave from the lighting surface (1). FIGS. 40-B, 41, 50, 96, 100 to 104, 114, 115, 120, 121 and for almost all the versions of (A) in area (F2).

Indirect output, characterised in that more than 5% of the light generated by an element of the source runs along an intermediate transparent body (150), between source (30) or

(95) and surface (1), and it diverted by said body at least once in its trajectory, before leaving it and directing itself to (1) and/or (12) and from there to the outside. The function of (150) becomes an optical part of the source preferably in area (F1). FIGS. 48, 50, 61 to 65, 71 to 95, 97 to 99 and 116 to 119.

Outside surface (1) can be smooth or partially machined in the standard way for prisms (6) and (7), generally vertical, combined with convergent lenses on the focus of each light emitting point on lighting surface (1) or interior light guiding bodies (150), (134), (112) and (113) which will be variable, coinciding with the different functions and directions of light output and developed with the aim of optimising the light in a determined direction and angle which can have 2, 3 or 4 different colours and functions. See FIGS. 8, 41, 43, 44, 54 and 55.

The inner back portion of parabola (12) can be a non flattened surface, divided into small, staggered parabola, flat or spherical-shaped sectors (13) forming a collector or collimator, which receives an axial beam of light smaller than that which said source element emits and which is distributed among these small sectors which each reflect a smaller percentage than the source light towards a certain area, concentrating or diffusing the light, according to the signal requirements.

These sectors form a vertical or oblique grid or set of lines, which can also be arranged spirally on an axis for the vertical signal. See FIGS. 50, 86, 87, 120 and 121.

A spherical mirror reflects wide angle images of its surroundings and it is also visible from a wide angle, however, the image is smaller. Therefore, the bottom of surface (12) is divided into spherical micro mirrors which each capture the light source and reflects an image from as many light foci as there are spherical micro mirrors, and this produces a multiplying effect on the light source, providing a more intense and homogeneous light sensation. To complete the light output, surface (1) is used, which is smooth and without prisms and/or as an alternative, it has internal bodies (150), (143), (112) and (113).

If the lighting surface has vertical prisms of any profile, of the binary type, the grid multiplying effect is achieved with an internal reflector (12) of tubes or horizontal, convex half cylinders.

As a particular design option, contrary to homogenising the light on the lighting surface, the internal parabola of chromed cones (112) on a smooth background, see FIGS. 53, 54, 55, isolates and defines each LED, sectioning the image of individual points of light on the lighting surface. This still enables compliance with photometry approval, according to EEC Regulation No. 6 for pilots, class 1, 2 and 5.

The new multisignal and multifocus module is also characterised in that the critical area (2) in (F2), see FIGS. 1, 3, 40 to 43, reveals a new solution for the light output in the direction of projection (K1), which consists in combining three optical effects:

A—the output surface is transparent and smooth, without any form of prism either on the inner (2) or outer (66) surface, and so the lighting surface is easily directly visible to the driver (202) from outside the angle area of signal (K1), FIG. 3, 40-G and 41. The light is redirected and emitted in a lineal format towards (K1) without being reflected within transparent body (2). It is colourless and does not produce flashes which could affect the driver's vision.

B—In order to direct and rectify the light signal, area (2) can include the anticipated prism covered surface (7) to complement surfaces (2) and (66).

C—The purpose of surface (5), which absorbs reflections and remaining light which is normally a black, matt colour, is similar to the principle of partition (13) according to claim 3 of ES P9601695, FIGS. 3, 5 and 8, but perfected, and in Ar. P. 247154.

New light output (2) permits further design possibilities so that the block surface is at the same level between the housing and lighting surface. See FIG. 40-G.

This new system overcomes the drawbacks or flashes in the driver's eyes, although the driver directly views a part of the lighting surface and sees a percentage of the signal. However, in versions designed to avoiding scratches and knocks in area (2), this area can be offset a few millimetres from the edge of the housing and even outwards to improve the rearward projection of signal (K1), and in this case, the edge of the housing acts as partition separating the area of light from the driver's vision, as already proposed in the applicant's registration ES P9601695. Obviously, the light output remains outside the driver's field of vision (202), and the percentage of this light is not determined because it is zero. See FIG. 3.

The design versions of area (2) of (A) for avoiding turbulence, aerodynamic noise and increased volume and for projecting the signal rearwards have the following common characteristics. See Figure to 40 to 43:

A—Between surface (66), (outside end part (1) visible from behind the vehicle), and the tangent to the end or edge of the housing in this point (61) there is always a distance (Dl) which determines the partition (N), except FIG. 40-G, where (61) and (66) coincide, with (N) being inside and the particular optical solution of rectified light being applied.

B—The attachment of (A) to end or projection (5) is always contained in a shell, perfectly coupled (avoiding movements in the direction of the arrows surrounding (P1) to the outside, inside and rear, thus avoiding the three grades of freedom) to the end of the body of mirror (D) or (D+G), except if (A) is mounted on (C), see FIG. 40-E, when the end of (C) acts as projection (5) and is contained in the body of the mirror having the same concept as (A). This is a development of the applicant's registration ES P9601695.

C—There is a critical distance (DC) along the line continuing from mirror glass (50) when it is tilted in its maximum position (50N) and from the clearance between the mirror glass and the housing, which is the sum of the thickness of the housing, plus the thicknesses of the outside and inside parts of (A). There is usually a space inside these thicknesses for conducting the light in its projection towards (K1). (A) is characterised in that (DC) is shorter than five times the sum of these thicknesses. See FIGS. 40 to 42.

D—Module (A) is characterised in that element (00), the LED or bulb generating the light projected towards (K1) is located along a length which is half the total horizontal length of surface (1), (L1+L2+L3) of module (A), and the starting point of said length is the intersection between (DC) and (1) with consideration for 50% to the front and 50% to the rear thereof.

E—The defense of level (0) on surface (1) is provided in the form of a small, gradual, protective projection which, in any solution of zone (F2), will always act as the contact area before surface (1) on side sector (2).

F—The edge of housing (61) also protects the rearward light emitting surface (66) in the event of knocks from behind.

G—In any version, apex (204) formed by the curve turn or bend between surface (1) and (66), has a rounded radius (R1) greater than 1 mm to prevent accidents.

The signal does not interfere with the driver's vision. In all cases, the signal output is rectified, the clear rearward light angle defined, and projected towards (K1). There is no light remains or colouration in the output as occurs within a transparent, machined body, where light is reflected therein in an uncontrolled manner. See details in FIGS. 40, 41, 42, 43 and 46.

Attachment is reversible, see FIGS. 1, 5, 8, 38, 39 and 40, and is preferably achieved, according to the design, on various position points, edge (11), stops (5) which generate point (P1) which fixes the three grades of freedom, clips (8) and pins (9) perforated with through holes for at least one pressure screw. The novel concept is that the type of attachment is conceived as a reversible element, so that one same module can be screwed and clipped in two directions and therefore, be fitted to chassis (D) or housing (D1) indistinctively, separate from housing cover (C) which is attached by means of clips so that part maintenance is quick, or on the contrary, so that it can be fitted only to module (C), (C1) or (E), according to the requirements of the assembly system.

The attachment system is associated with access to the signal modules (A), (B), (A+B) and (A1+B) in which the element is mounted, and the access points are as follows:

A—Internal access. Mirror glass (50) is removed. The signal mounted on cover (C), (C1) and/or (D) provides access to elements which are released internally by first removing the mirror glass. It does not matter that other parts like the chassis or internal motors are disassembled. The signal can exit internally or externally and/or externally even when cover (C) is mounted previously, and the way in which the mirror glass is disassembled is not important. See FIGS. 43, 46, 47, 49, 51 to 53, 57, 58, 68, 94, 95, 98, 99, 102, 103, 109, 117 and 121.

B—External access. Cover (C) is removed (without removing mirror glass (50)), by means of its security clips, see FIG. 132, even when the signal is mounted between the cover and chassis. See FIGS. 42, 83, 96 and 115.

C—Lower and/or external access. Without removing cover (C), or mirror glass (50); by means of a lower orifice or screw, and/or by removing a lower cover (C1) or module (B) proper acting as access cover to the attachment of (A), either by means of the gap between mirror glass (50) and housing (D) shown by arrow (Q), or by rotating the mirror glass to its end position where (B) is accessed as well, FIGS. 130, 131, together with clip and screw (8) and (9). If (B) does not exist, only to fixing elements of (A). See FIGS. 41, 45, 48 and 112.

D—Side access. By rotating the whole mirror on its folding axis or folding point and by means of the gap thus created between the housing and the door attachment support. See FIG. 43 for (A1), 122, 124, 127 and 128.

There are several ways to remove mirror glass (50) from the rotation mechanism, as shown by the examples in FIGS. 45-A, B1 and B2, by means of a pressure washer or screw (55-A); FIG. 45-D, by means of the safety (55-A); or FIG. 45-C, by means of the new mirror glass support plate, which avails of the inherent material flexibility in arms (50-B) to move plate (50-A) which is not adhered to mirror glass (50-E), by pressing on (50-C) in the direction of arrow (50-H) and thus increasing distance (D1) between clips (8), and releasing the glass. It is worth mentioning that the plastic piece is an integral element.

In order to prevent vibrations and aerodynamic noise, internal housing (10) is preferably moulded from bi-material, design permitting, whereby edge (11) is made from softer, more adaptable material than the rest of the housing. In this way, the part joined to the other part of gap 0, can be precise. Also, the autoadhesive soft seals described in ES P9601695, claim 2, can be used.

In order to increase stability, the edge on which module (A) is mounted has a projecting flange (67) on perimeter (11) of the housing. See FIG. 44.

The signal operation control light (51) can also be improved with a mini LED (30), see FIGS. 41 and 43, normally on the dashboard, and which is envisaged in ES P9601695, FIG. 2 (5), claim 2, and which is provided in the same module (16) and produces the light output with the regulation colour, and also other operation control lights of the sensors detecting the presence of people or vehicles, such as two-way signal, at least one external control light (25-B) which indicates when a vehicle has entered the signal area, or the actual indicating light as a whole, and any other control LED in any other part inside the car which notifies the driver when cars approach.

Power cable (17) for light modules (A), (B) and (A+B) runs through the inside (60) of tower (15) where the mirror folding mechanism axis is located with its rotation stops (61) that prevent the cable from being strangled, and when spring (16) is used, it is included inside this mechanism.

Module (A) can be divided in two parts (A) and (A1), with both parts performing the same function, but (A1) maintains the direction of the signal with respect to the driving axis (500) even if the mirror body is folded, see FIG. 4. In this case, even if the mirror is not folded, cable (18) runs through module (E) without having to consider any axis. There are two ways of running the cable through, since module (A) has two parts (A+A1). If (A1) is joined to (B), the same principle applies and the cable does not have to consider any axis because the module in on support (E). This principle can be applied to the mirrors on various vehicles, such as motorcycles, cars, lorries. See FIGS. 1, 4, 5, 7, 9, 10, 11, 12 and 123, 124, 126 and 128.

As an option for special vehicles requiring bright, flashing emergency type light signals, module (A), see FIG. 52, has a second direct signal located in area (A bis), instead of the reflecting light at (3). This signal is emitted from a discharge and voltaic arc flash tube (80), by means of an electronic light-up circuit (81) comprising a thyristor and condenser for producing the stroboscopic effect discharge, and provide power to the flash output by means of reflection in parabola (12). The same effect is achieved with a group of LEDs (RGB), see FIG. 46, described previously. (A) offers the option of producing various signals from one same surface (1), and varying the internal construction thereof for special vehicles such as police cars, taxis, ambulances and fire engines.

The second or third signal, according to the module version, is a reflected, diffused type signal, see FIGS. 43 to 46, that covers the side area of housing (10) and is produced by means of a circuit of LEDs (120) arranged in the vertical direction, so that the light is reflected in (13) and (12), and normally emitted to the front and side by the same surface (1). Alternatively, the source can be a neon tube (140), with a similar configuration to the LEDs, but including the electronic light up and voltage increasing circuit of neon tube (144). The tube is maintained in position by means of teeth (142). The focal light output is (32), direct light, and (142) and (141), indirect-reflected light. Furthermore, these modules can be combined with (B) to reduce mould costs. See FIGS. 47 to 50.

The light produced by LEDs (130) is not visible directly. It reaches (1) in a homogeneous format and the focal centres (132) are distinguishable from those (32) of direct light. In turn, these LEDs can be added to the circuit with other LEDs of a different colour, which together with an individual light-up for groups of the same colour, would produce a third signal from the same lighting surface (1).

In its interior, the light can contain transparent partial light guiding means (134), with output through prisms (7). In this way, the signals are produced with output focal centre (32) directly and (132) and (133), indirectly-reflected from the other signal.

Edge (14) is the join of the ultrasonic or adhesive seal for engaging tulip-shaped transparent body (1) or lighting surface and the housing part (10) in a watertight manner.

Module (A), FIGS. 56, 57 offers the option of using several lamps or microlamps, already described but not detailed in the applicant's registration ES P9500877 claim 1, and page 5 last paragraph, and in ES P9601695 claim 1, and page 7, paragraph 25.

In order to provide a long extension for surface (1), a multilamp system is used together with a series of connected, chrome parabola (12); the same collimator and variants (13) as used for the multi-LEDs, with foci (90), and light output at a progressive angle.

The lamps have a short life and are affected by vibrations and therefore an easy maintenance system must be considered.

This option includes several micro lamps of the type without a bushing, with low power normally W2W or similar (95), that are either transparent or tinted, whereby each one is introduced by guide (96) in series into their corresponding lamp support (93), which by means of metallic contacts (97), receives the current from tracks (91) and (92) printed onto track support (87) treated with a tropicalised bath of anti-corrosion resin and which, in turn, receives current from the general circuit by means of connector (88). The lamp supports are positioned by a one quarter turn system or by pressure and by means of stop (98) and elastomeric O-ring (94), or they are made from a semi-soft material that serves as a seal or watertight cover, see FIG. 36. If the tracks are external contacts (87), tracks (91) and (92) for mini lamps, lamp support (93) makes contact by means of points (91) and (96) and applies pressure by means of one quarter turn teeth (98), and/or in the solution without tracks, the lamp supports are connected by cables in parallel or in series, depending on whether they are 6V, 12V or 42V microlamps, and their contacts are covered with bi-material or insulation material to avoid corrosion points, and/or the micro lamps can be clipped to inner tracks of bent metal and in this case, the lamp support is an elongated cover with a watertight seal, normally fixed to the reflecting parabola with clips. See FIGS. 36, 96, 102 in (F1) and 130 of module (B).

For this version, (A) must afford colour to surface (1), either in the covering of bulb (95) and/or tinted bulbs, and/or a mask which can be partially chromed in order to produce double reflection or axial light output. In this way, a direct-reflected light could be achieved, always complying with the regulation colour in the focal centres (90). See FIGS. 42, 56, 57, 95 to 97.

Module (A), see FIGS. 52 to 55, has several variations such as a minimum size or minimum version, that comply with approval requirements for pilots, category 5, of EEC Regulation 6, and as a signal which shines to the front, side or rear at more than 180° with respect to axis (500). These options comprise a lamp, normally of the W5W type, either transparent or tinted (95), its corresponding lamp support (93) and sealing and fixing system which is similar to the multilamps. Its can be positioned in either a horizontal or vertical direction, design and space permitting. In order to optimise the light output, appropriate optics are used in area (F1), preferably, Fresnel lenses, vertical prisms (binary system) combined with a faceted, reflecting parabola, or collimator, and/or an internal light guide (150) which forms part of the source and provides extense light distribution and effect despite the lack of depth. In (F2) there is direct light and/or a re-directional prism (7). See FIGS. 42, 58, 95 and 97.

The combined module (A+B) can show a minimum size version, with the source for (A) being the same as that for (B) and in order to differentiate the colour when function (B) is white and function (A) is orange, it employs a mask or front spot (3) and (3*bis*) in (A), with an orange filter (1*bis*). While in order to optimise (B) mask (3*bis*) acts in a reversible fashion as parabola (12) to improve the reflection towards the floor. See FIGS. 111 and 112.

The minimum size LED version comprises a reduced circuit containing at least 2 LED (30) placed on a flexible base (20), with tabs (21) to produce the lighting camp (111), the group of LEDs act as a bulb with light emission in two directions, but according to the case, it can use a traditional rigid plate and/or a mixed circuit of die-cut metal, fibre and opposed LEDs of the type producing side light output (30-A) as in FIGS. 33, 34 and 35.

Other minimum size versions, for larger modules (A), combined modules (A1+B), are based on a double, cover-type lamp support (600) with two W5W type bulbs or two LED groups, where each group acts as a bulb, and the large angle LEDs, facing in the opposite direction, are used to provide a direct-reflected light emission similar to the two bulbs, by means of reflection on surface (12), designed for collimating or distributing the light. See FIGS. 100 to 104, 114 and 115, 120 and 121.

Module (A), see FIGS. 57 to 63, offers a particular novelty whereby since the LEDs (30) form a multifocal light emission system, created in an almost concentrated transparent nucleus, and since the light is at a determined wavelength when it is activated (which is seen as a coloured light), the new combination of light output is used, based on a transparent tulip (1) without prisms, or with prisms on one part (7), and the other part being smooth. Furthermore, transparent, internal light guiding bodies (150) show the light's trajectory and contribute to producing optical effects in the form of lines of light (7), flashes and reflections (12), (13) and (158), colouring (153) and (155), or to multiplying the points of light output (151).

Depending on shape and design limitations, and the convenience of the direction in which part (160) is stripped from the mould, these elements can make part of tulip (1) and (1*bis*) integral, although they appear as two parts. See FIG. 59.

Alternatively, the former can be a separate part (113), see FIGS. 48 and 49, or have a second light output surface (151) seen from the outside, or be directly located on lighting surface (1). See FIG. 63.

These light guiding bodies (150) capture the photons by means of surface (156) next to the LED focus, and then the light is emitted within the body or nucleus (159), where it reflects with very low incidence angles until it coincides with either a surface whose incident angle causes the light to exit from body (151), or a surface provided with machining (158), prisms (155), or relief (153) that produce colouring or flashing according to the visual effect desired. All these elements can be located in an inner cavity (12) that is provided with reflective machining (13) and (157), and painted with light, dark or metallic colours, depending on whether it is desired to highlight these effects to a greater or lesser degree. Bodies (150) can be provided with rear faceted machining of the type that creates the diamond or indirect flashing effect. Some part of these bodies, which are normally transparent, can be chromed in order to optimise the reflection or retroreflection. For example, the spot in FIGS. 53 to 55, 92, 93 and 108 to 112.

In some versions, it is possible to use intermediate optical bodies (150), between source (30) and surface (1), that produce effects that disperse and/or concentrate direct light (32), and maintain a distance (V1) greater than 1 mm between LED (30) and the optic of intermediate body (6) and, in turn, there is a distance (V2) greater than 1 mm, between (6) and surface (1), see FIG. 67. Optics (6) can be arranged in a same or different direction. See FIG. 65.

It is possible to optically create a multiplying or diamond effect of the LED as direct light, when body (150) is a prism having a flat light input surface (151) and an outlet surface parallel to inlet (6) that may comprise a slight convergent lens while also being wholly or partially surrounded by faces with incident angles between <90° and >45°, see FIGS. 70A and 70B. Then when the LED light crosses said face (S1), it changes direction (32*bis*) parallel to the central or direct (32) beam, and the LED image is multiplied in the light output area (12) as many times as there are faces on the prism, imitating the effect of a shining jewel. In order to produce this effect, the outlet faces by means of which light exits body (150), are separated from the light input face by a distance (D1), greater than 1 mm. See FIGS. 68 to 70B.

These faceted prisms form a body comprised of a succession of prisms with almost equal and/or equal orientation. The light input area is located on a surface that is normally chromed and smooth (12), and it is used basically for front spot (F1). The parallelopipedic body of prisms can have a different shape and section, for example, octagonal, hexagonal, circular, frustopyramidal, cross-shaped, star-shaped, or irregular and/or a half figure. See FIG. 69.

A double effect is created when the inside of surface (1) consists of three-sided pyramids (160) and produces a catadrioptic effect, reflecting the light. However, if the ends of these pyramids are frustopyramidalconical or fattened (170), light can pass through from the inside of that area, thus producing a double effect: catadrioptic which reflects the external light and lighting surface of the internal signal, whether the source is LEDs or bulbs, by means of the internal reflection means. In accordance with the necessary focal point and areas (F1 and F2). See FIGS. 87, 108 to 112 and 113 to 115. In the indirect light system, see FIGS. 71 to 85, the tubular or semi-tubular guiding elements can also have a different shape and section, inter alia, hexagonal or octagonal, or they can be a light guiding body or tube for an LED at each end, or for more than one LED, see FIGS. 73-B and 76, where the conducting element is shaped as a series of combined tubes.

Basically, outside surface (1) is dome-shaped and convex, inside (150) is solid and transparent, and the back is provided with prisms (155) at 45° with respect to (1) on the metallic, reflecting surface (12). At the ends (T and R), surface (156) captures the photons so that they pass along the conducting tube, but at another level, surface (155*bis*) at 45° serves as an exit point for the light.

When the light completes its double trajectory, it exits with greater intensity per surface area. The output is reflected by means of the two prism faces (155), but a central focus (32) is not determined, but a several of them, since the whole surface is a homogeneous outlet for the light. The rearward light in area (100) is of the direct type and machining (7) produces a lens effect.

In the minimum size version, the source of (A) is a lamp or a pair of LEDs, and the light conductor is passed in one single direction, since one part of the source light covers function (F2) directly, and the other part covers (F1) indirectly or as reflected light. Plane (155*bis*) at the opposite end of the source, causes the remaining light to exit, which has not been affected by prisms (155) in its trajectory.

Vertical version. The minimum size version can be arranged in the vertical direction, design and space permitting, with the prisms arranged in a spiral sequence so as to face the light outlet at all envisaged angles. See FIG. x50.

For any light guiding element with a single or double trajectory, single or multiple bodies, the guides have a convergent lens for light input, and a meniscus type edge, which is normally better at capturing the source light and makes it easier to control the direction thereof, while LEDs with reduced angular opening perform better, unless on the contrary, it is desirable to obtain sideways light emission at the beginning.

The simplified version for more economical moulds, is subassembly (A+B) with its integral lighting surface, and parallel lines (XX) to avoid light colouration in the area of the other signal. The reflecting housings and interior optical element supports are also integral parts, and if the source is LED-based, it has a combined circuit, and if it is a bulb, it can have a combined multiple lamp support. The connector centralizes the functions with a common negative, also for complementary circuits and functions such as the temperature probe. The attachment and the light output forms are the same as for the separate modules.

Generally, the interphase structure and the parts and systems of module (A) and (A1), (A+B) are similar to other assembly options such as attachment means, watertightness seals (5), (8), (9) and (11), optical and reflecting combinations (12), (1), (2), focal points (32) and (90) and connections (88) and (17).

The internal elements are provided with teeth and clips for positioning and facilitating their assembly (18) and (24); also versions (3), (3*bis*) and (4) and module (B), and its different versions, are provided with the ring for attachment to housing (251) with adjustment system (250) and (258), positioning teeth (260), (261) (253) and rotation teeth (214), while in the metallic version serving as heat diffuser, the lamp assembly is retained by ring (64) and, in turn, chimney (560) is linked to chassis (G) by the elastic metallic part (568) attached by means of screws and teeth (8) and (9).

Module (C and/or C1) are fixed by rapid action anti-theft clips (170) and (550).

APPLICATION AND ADVANTAGES

The advantages, applications and principles of this invention can be applied to other lights and signals for vehicles, or for other purposes outside the vehicle sector, as an extra application.

By means of this new LED system inserted onto a flexible circuit, a variable signal angle can be obtained in a minimum space; and a direct, indirect and/or reflected light output achieved with intermediate optics, can be applied as a solution to other external lights, signals and external pilots such as those in category 1 and 2, pursuant to Regulation 6 of EEC Aprroval Regulation, for vehicles with four wheels or more, and Regulation No. 51 and 52 for motorcycles and mopeds. It can also be applied to internal lights or to reposition these pilots and lights in small spaces such as ailerons, and/or spoilers or other parts of the vehicle body which would be impossible with the classic bulb-based methods, owing to space, temperature and volume requirements, and the assembly and disassembly engineering for maintenance.

ADVANTAGES

The new signal is wider and the combination of source elements distributes the light more effectively, optimises energy consumption and occupies less space, while also providing new functions by adding more electronic elements to the circuit, such as photodiodes and infra-red LEDs.

The new LED chips are transparent and their colour is only evident when they are on. Their light efficiency, long life (100 times greater than the life of an incandescent lamp) and strength in terms of mechanical stresses and vibrations, owing to their solid condition (their inside is not hollow), also increase their design and function possibilities.

Their modular, interchangeable and compatible construction standardises the parts, simplifies the work involved in their development, and basically saves time and money.

A whole range of models can be obtained with less specific parts, and yet the product can be personalised and adapted to the user's requirements or special applications, with only small modifications being required on the inside.

The system is flexible and the modules are independent of one another, although for certain design and assembly options one module can include another. For example, (C+A and/or C+A+B; and/or E+A and D+A), and/or (E+A+B) and (D+A+B).

The functional signal modules have new qualities, are multifocus, multiple signal, area (F1) and (F2), flexible base, combined signal output, direct, indirect and reflected with new optical elements, all in the one signal, create an important element for security because information can be emitted and/or received with an angle greater than 180° to and from surrounding vehicles in a new and different manner. Furthermore, the modules occupy little space.

Occupying little space and providing a large signal angle are two key advantages of the new flexible circuit and the indirect light by means of light guides that multiply their function and design possibilities. They are particularly applicable in such small spaces as the end of the mirror housing, without its internal structure or mirror glass movement interfering in any way. Neither do they affect the vehicle aerodynamics or fuel consumption.

The larger angle is obtained for an homogeneous signal using less energy, according to the function, with an equal flow of light. However, the light can be sectioned as in light channels, front spots or diamond effect, and clearly differentiated stylistic features can be obtained without losing the signal function. When combined with OLES, the electroluminescent parts, in contrast to anti-reflecting areas, can shape the light, generally, in the form of an arrow so as to augment the signal.

By means of the mixed circuit, maximum light energy conversion can be achieved, by dissipating a minimum quantity of heat. It is used in a minimum space to obtain a direct, direct-reflected and indirect signal, availing of the maximum light provided by each element according to the requirements in each sector. It is not necessary to filter the light with coloured tulips.

By means of the new circuit, different coloured signals can be emitted from one single, transparent lighting surface.

Novel, distinct signals and functions are obtained with the same external modules (A+B) for all types of vehicles: passenger cars, sports cars, family cars, utility vehicles, and special vehicles such as police cars, taxis and industrial vehicles.

Mirrors can be obtained with new features and shapes, thus saving on moulds, references and developments.

By modifying the composition of the flexible circuit, different equipment compositions and features can be obtained having the same exterior shape.

Owing to the very nature of LEDs and OLES, these elements afford advantages to the product. Owing to their solid construction, they are not affected by vibrations. Also they switch on more quickly, consume less energy and last longer, while also being operative under extreme conditions. They are currently more expensive, but they are developing.

Since the circuit has a long life and is provided with a protection circuit, it does not require maintenance engineering.

Furthermore, the new circuit obtains and provides new information to the side area within area (100) (which together with the other side area, covers the whole perimeter of the vehicle) such as a presence-detecting signal and sensor for security and comfort, and more precise lighting angles.

In the event the circuit has no current, it is provided with a new option whereby it has an alternative, rechargeable energy source, which enables a new automatic emergency signal to be activated.

The circuit complies with angle, photometry and colorimetry requirements for the new functions, which are impossible to perform with conventional methods, and which incur equal costs and occupy the same space.

The new emergency signal with blue LED stroboscopic flash produces more flash for police cars, and is more aerodynamic and lightweight.

Equivalent advantages can be obtained for special vehicles having advisory or emergency functions, either in yellow, or red for ambulances or fire engines (355). See FIGS. 141 to 142B.

The new module B, or side lighter has a dispersed focus with a wide range angle, and acts as a multifocal, adjustable parking light, that may or may not be provided with a timer. It can be adjusted or rotated so as to illuminate the side perimeter of the vehicle, particularly during parking manoeuvres at low speed in first gear or reverse, and so as to reveal any obstacles or carry out repairs or any other activity where side lighting in the proximity of the vehicle facilitates the task. In this way, the modules acts as a security and comfort element, even when the mirror is folded in its parking position. See FIGS. 4, 80 and 84.

The module functions manually, even in motorised versions, and rotates on a horizontal plane. Its movements and positions are synchronised and memory-based in order to coincide either with certain commands, such as reverse and first gear that operate at low speed, or with a voluntary command directing element located in the door that coincides with the mirror positioning element.

The mobile lighting module B, can benefit from the complementary light, wherever it is necessary, and it can have more than one application, according to the source to be used: multifocus with high brightness LEDs, microlamps or xenon gas, halogen lamps or neon tubes.

The module includes a channel or duct of cooling air, that comprises a water trap, and extends the life of the lamp, enabling it to be lit for a longer duration without overheating. Air inlet (265) and outlet (560) are shown in FIGS. 72 to 83. It uses mass and metallic bodies as a cooler (510) and (D). See FIGS. 81 and (20). See FIGS. 76, 77 and 83.

The new commands provide safer and simpler driving conditions so that the driver can concentrate solely on the road. The new functions are advantages in themselves. See FIGS. 89 and 90.

Some functions are automatic, such as the following:

Highway headlights (300), or slow down warning light (301), low intensity (4). High intensity (4) brake warning light (302)+indicator, emergency (304) with timer for highway driving (305).

A door opening warning light (308) when loading and unloading lightweight utility vehicles in city conditions.

A door opening warning light, and stroboscopic, green taxi vacancy light, which enable taxis to stop more safely and facilitate passengers entry and exit therefrom, combined with the taximeter stop and with a timer (307).

The inverse signal function that detects the presence of people in signal area (100) by means of photodiode sensors (25-A) that are equipped with a corresponding circuit, which decodes random frequencies emitted by an IR LED (25-B).

The combined detection feature to the front, provided by sensors in each mirror, where by means of telemetry, a warning could be provided when a vehicle is approaching from behind.

The module also comprises a protection circuit against surcharges and a micro electronic circuit for controlling and activating new, different functions. The applications can be increased with synchronised and combined movements for switching on and off the various LEDs placed in series, or alternated according to colours, position or on/off switching, or light intensity. For emergency situations, fog lights, position lights, alarms and centralised locking (320) can be provided.

The option of a second emission circuit (120), see FIG. 44, provides new indirect-reflected signals, thereby multiplying the number of different signals emitted from one single external surface (1), and in one horizontal plane.

Furthermore, the flexible module uses a central, electronic circuit that provides non visible functions, such as sonorous diode (70) or infra-red photodiode sensor (25), which complement the indicating function in pedestrian areas, where it is necessary to warn people of reversing manoeuvres and/or receive remote control information.

It is also possible to contemplate a radio frequency emission element for opening a gate or parking barrier or for providing access to the motorway, or an infra-red emission element with a variable, adjustable and emission frequency which can be encoded.

The module extends as far as the base of the door attachment support and in the event it includes a rotation mechanism, the lighting module is completed with a complementary element in this support module (A1 or A2).

Some of these new functions and signals were mentioned conceptually in the applicant's registration ES P9601695, page 7, paragraph 35 and claim 1, and the applicant claims them herein particularly as novel, perfected elements comprising new embodiment details.

The structural modules (C, D and E) provide advantages for the assembly system and moulding injection process. They also make the moulds more economical, because the type of mirror can be changed by altering just one part or module. Module (C) and the versions thereof (C and C1), which can be painted or covered with a grid-like design, can personalise mirror aesthetics by means of an easy, quick alteration. According to design requirements, (A+B) can replace (C1), or be similar thereto. See FIGS. 48, 50, 100, 110, 111, 114 to 129.

In the combined (A+B), minimum size versions, also with bulbs and/or with one single bulb, see FIGS. 111 and 112, the functional advantages are still maintained, costs are reduced, the wiring is connected to a common negative connector, even for complementary elements and sensors which it supports, such as the temperature probe.

DESCRIPTION OF THE DRAWINGS

FIG. 9 van, FIG. 10 coach-lorry, and FIGS. 11, 12 and 13 motorcycles.

FIGS. 23 to 28 show the basic details of the LEDs, slits, optics and contacts including details of emergency light with complementary battery.

(P1) the area or attachment tooth (5) inside housing (D).

Figure 41:
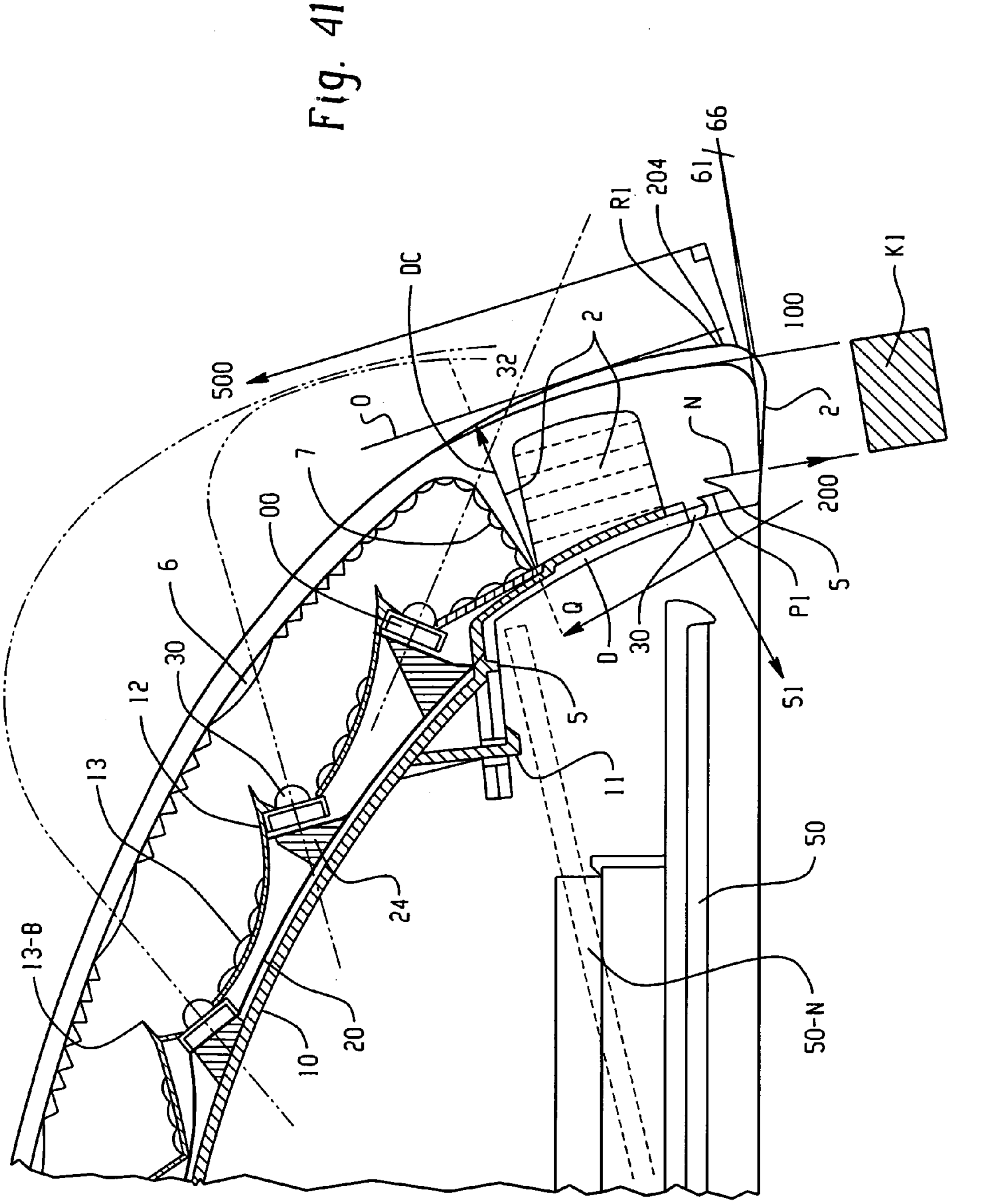

(D1) the distance or difference between the edge of housing (D) in (61) and the most projecting point of (A) on side (66) (they can coincide as illustrated in FIG. 41).

(DC) is the Critical Distance which is the sum of the thicknesses of all the structural parts when mirror glass (50) is in its maximum adjustment point;

(1), (12), (10), (D) and the space or corridor for the first diode (00) to emit and/or receive signals.

level (0), with respect to the housing and/or cover (D) or (C) to protect (A) from knocks and scratches.

(N) which is the part of the housing and/or cover, forming the panel that helps to rectify the light signal in projection (K1) and does not affect the driver's (202) vision.

internal prism (7) which rectifies the light signal in the direction of projection (K1).

radius (R1) in the apex between surfaces (1) and (2) of (A) so that the surface does not have a sharp or dangerous point if touched.

Figure 42:
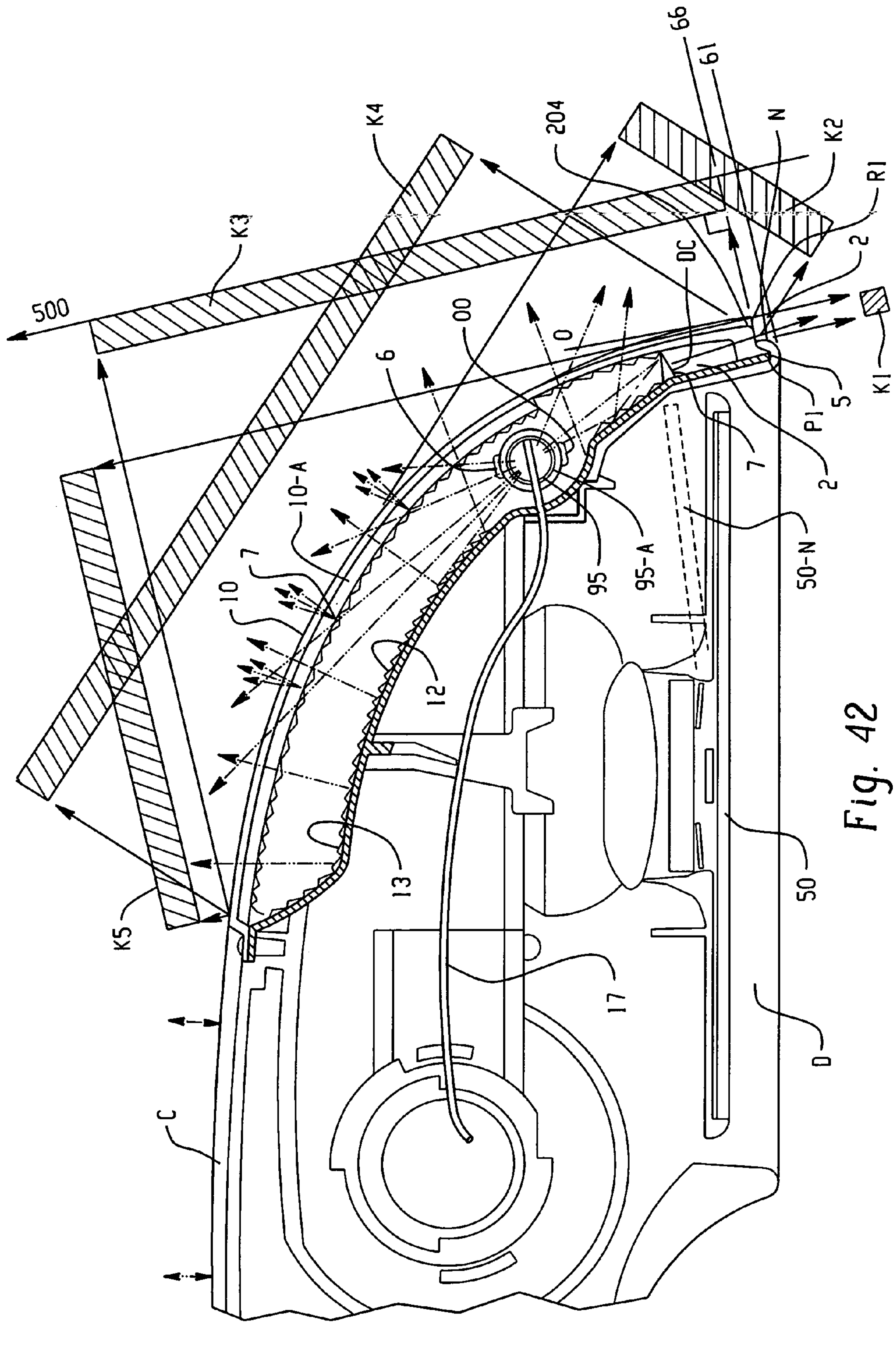

FIG. 42 shows the projections of an example module having external surface (A).

projection (K3) parallel to driving axis (500).

projections (K1) and (K5) perpendicular to driving axis (500) to the rear and front, respectively.

projections (K2) and (K4) at 45° with respect to driving axis (500) to the front and rear, respectively.

FIG. 43 is a sectional view BB of module (A), two part version; (A) being in the foldable mirror, extending to the module (E) support which has (A1) forwards and backwards, showing the position of the lighting elements and sensors for direct-reflected emission/reception.

FIGS. 44-A-B area sectional views AA of module (A) showing details of reverse attachment (8) and (9), and positioning of characteristic parts, lighting surface or tulip (1), reflecting parabola (12), combined reflecting convex surfaces which produce a multiplying effect on the image, housing (10) with elastomeric bi-material or seal (11), positioning elements (24), prisms (6) and (7) and central focus (32).

Figure 45C:
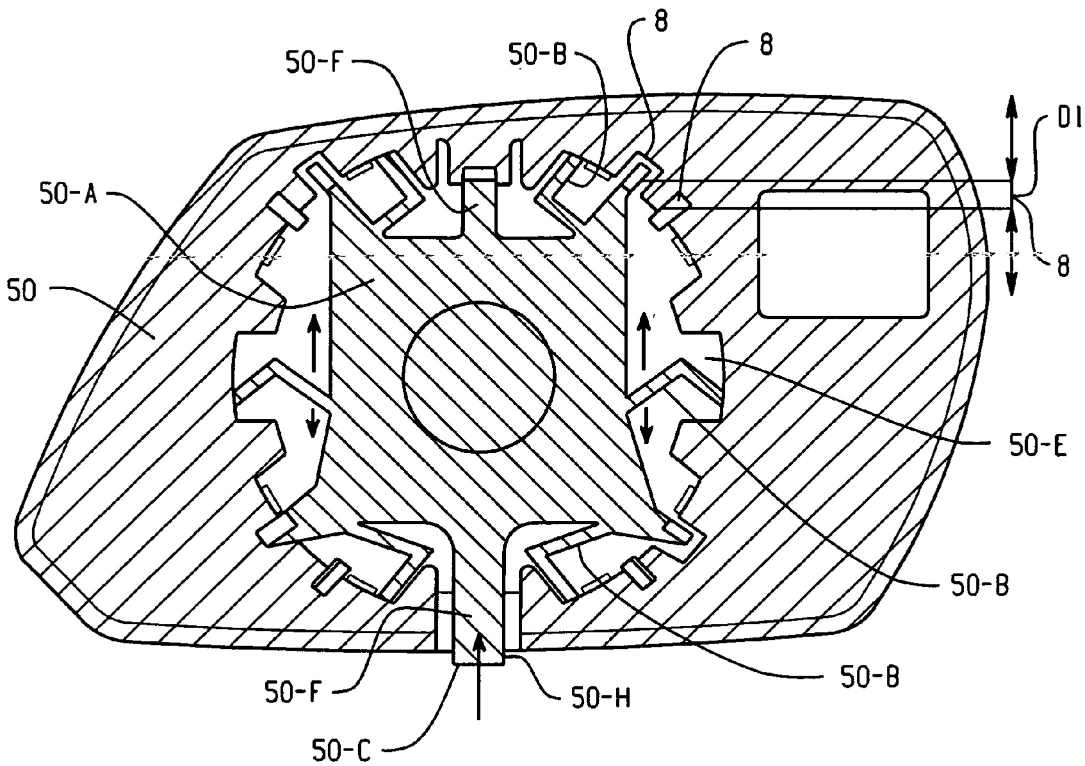
Figure 45D:
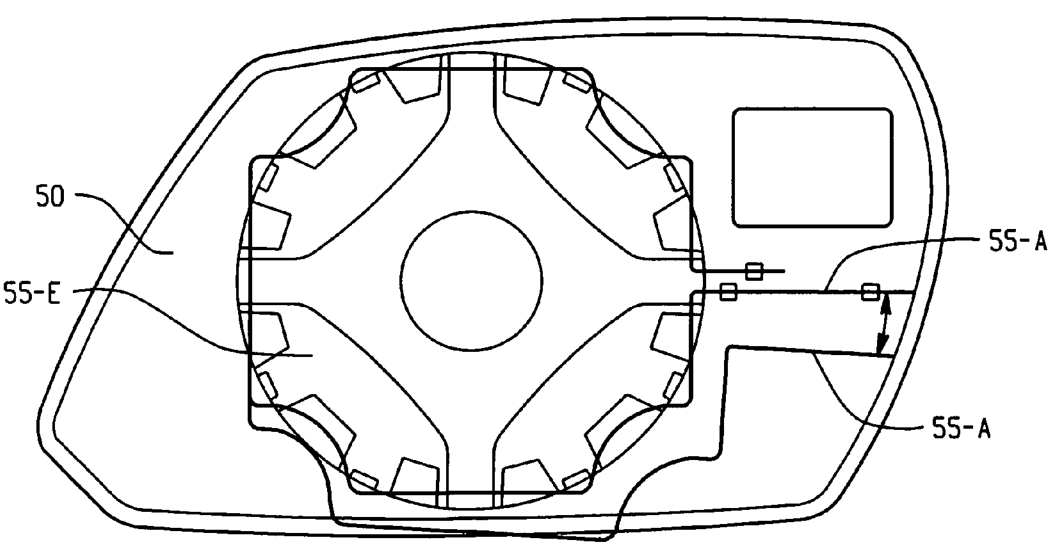

FIGS. 45-A-B1-B2-C-D are different types of the mirror glass (50) module and glass support plates with facilities to be maintained more than once.

Figure 46:
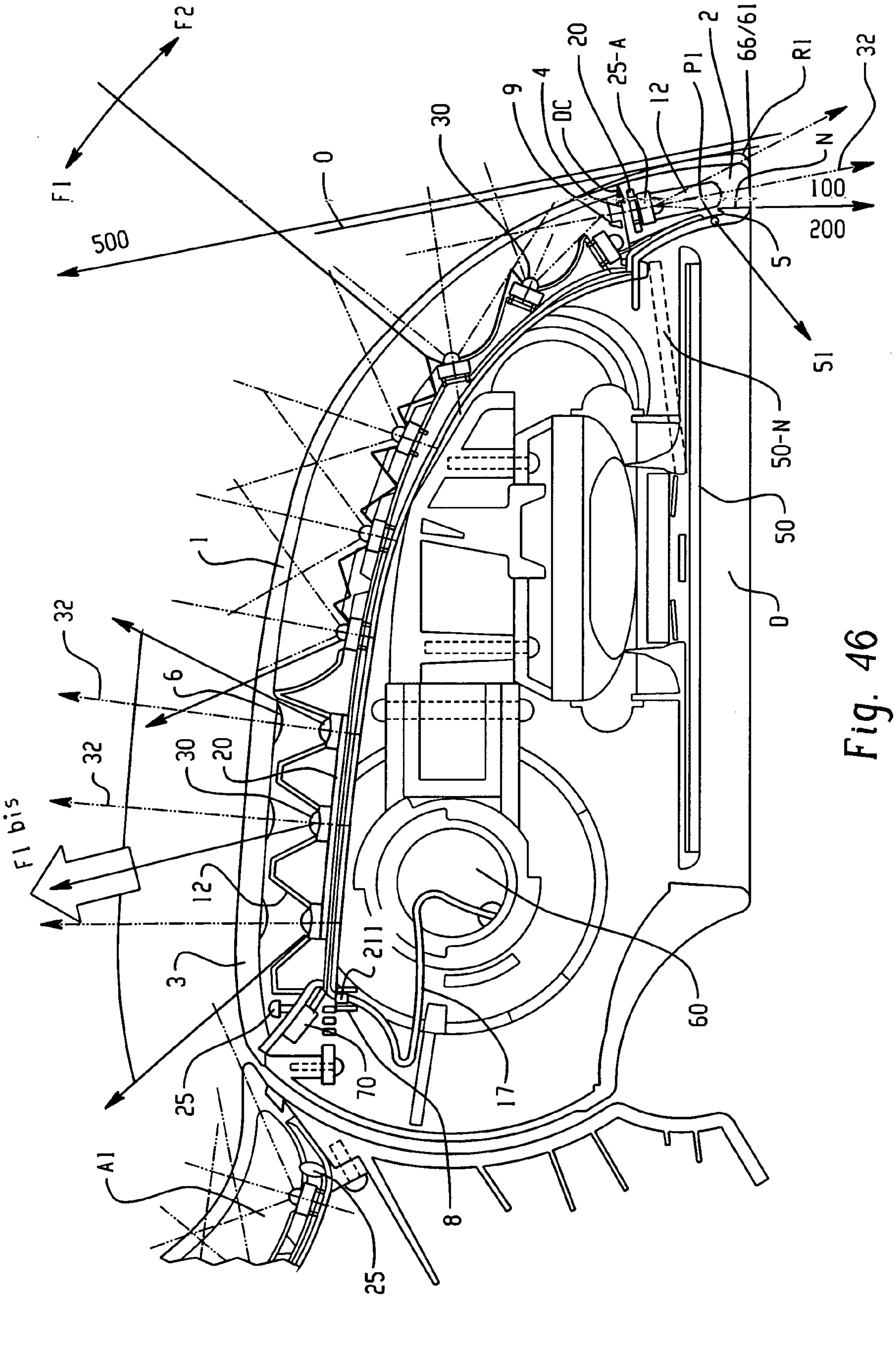

FIG. 46 is a sectional view BB of module (A) provided with front spot, double light intensity in area (3*bis*) with high brightness LEDs (30), and metallic circuit base (20) as cooler and photodiode sensors (25).

Figure 47:
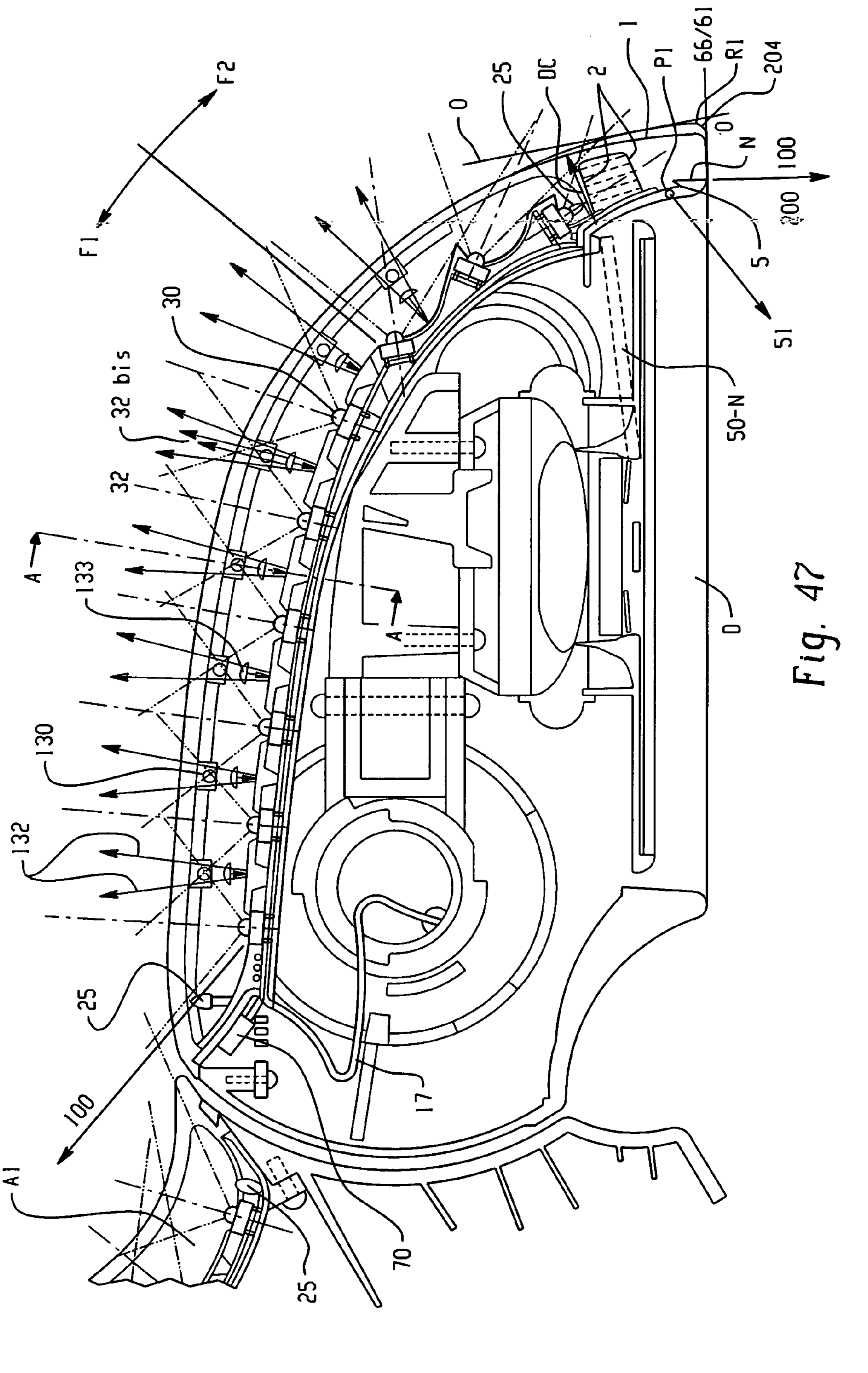

FIG. 47 is a sectional view BB of module (A) showing second circuit (120) for emitting an indirect signal with LEDs (130) and internal orientating elements (133).

FIGS. 48-A-B are sectional views AA of module (A), as it appears in FIG. 47, showing direct (32) and indirect (132) double central focus, and orientating element (133).

Figure 49:
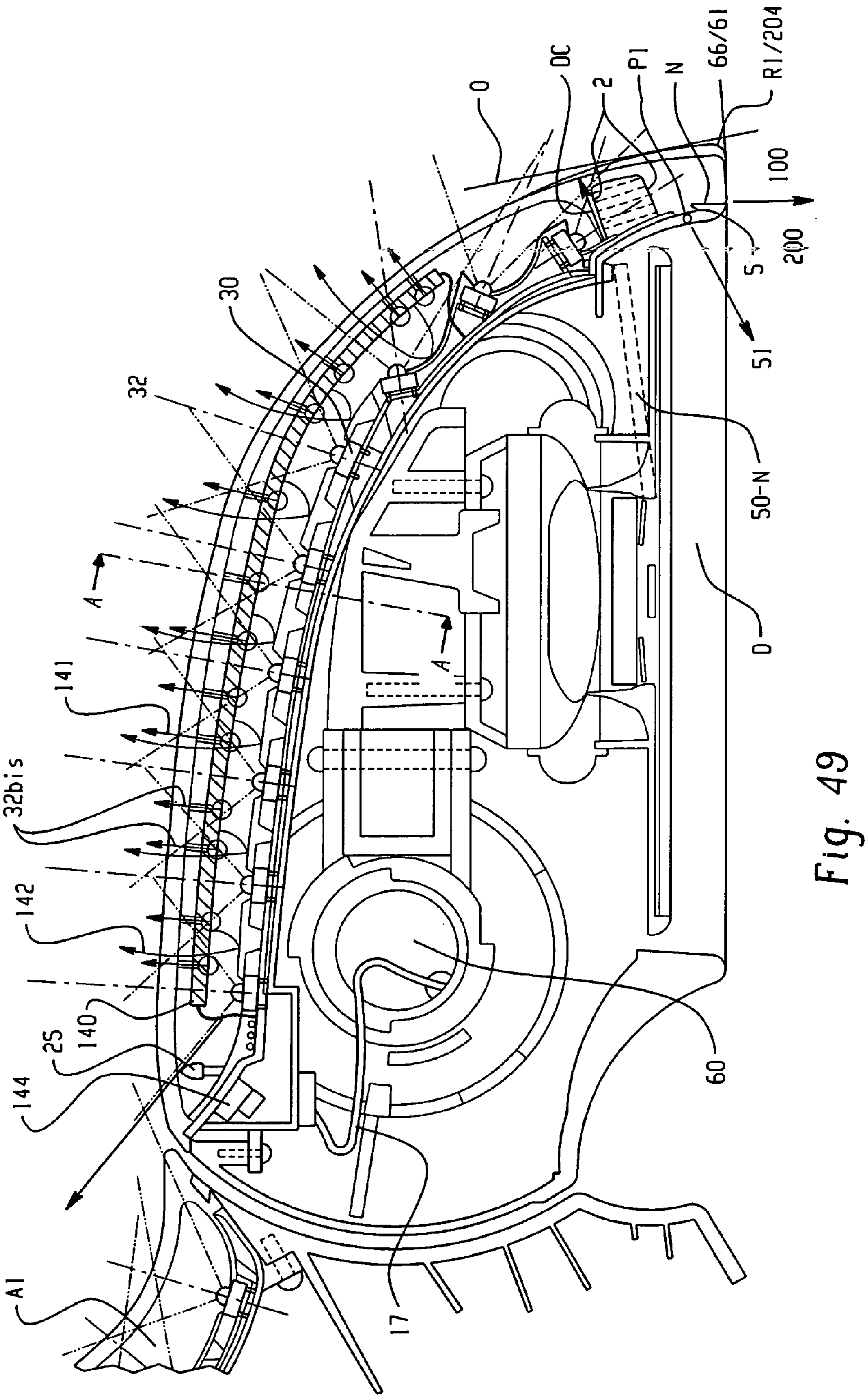

FIG. 49 is a sectional view BB of module (A) showing the indirect neon type signal (140), internal light guiding elements (141) and electronic light-up circuit (144).

FIGS. 50-A-B are sectional views AA of module (A), as it appears in FIG. 49, showing the neon positioning element (142) and direct light output (32) and reflected light output (40) and (13B). The version appearing in FIG. 50-A is the combined module (A+B), but has the same neon source (140) for functions in (A) and (B).

Figure 51:
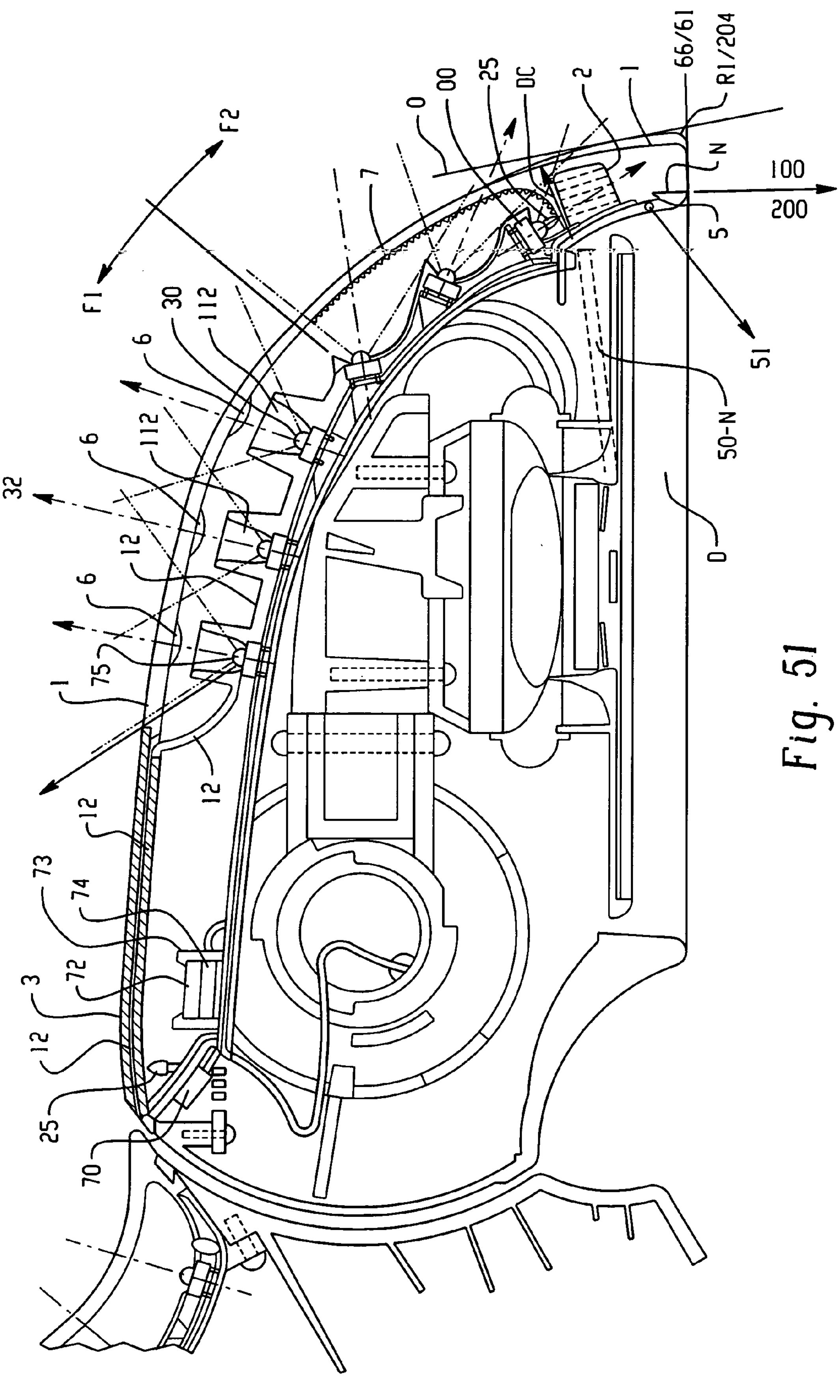

FIG. 51 is a sectional view BB of module (A) showing reflecting or graphic area (3) and circuit with its rechargeable battery (72), and emergency LED (75).

Figure 52:
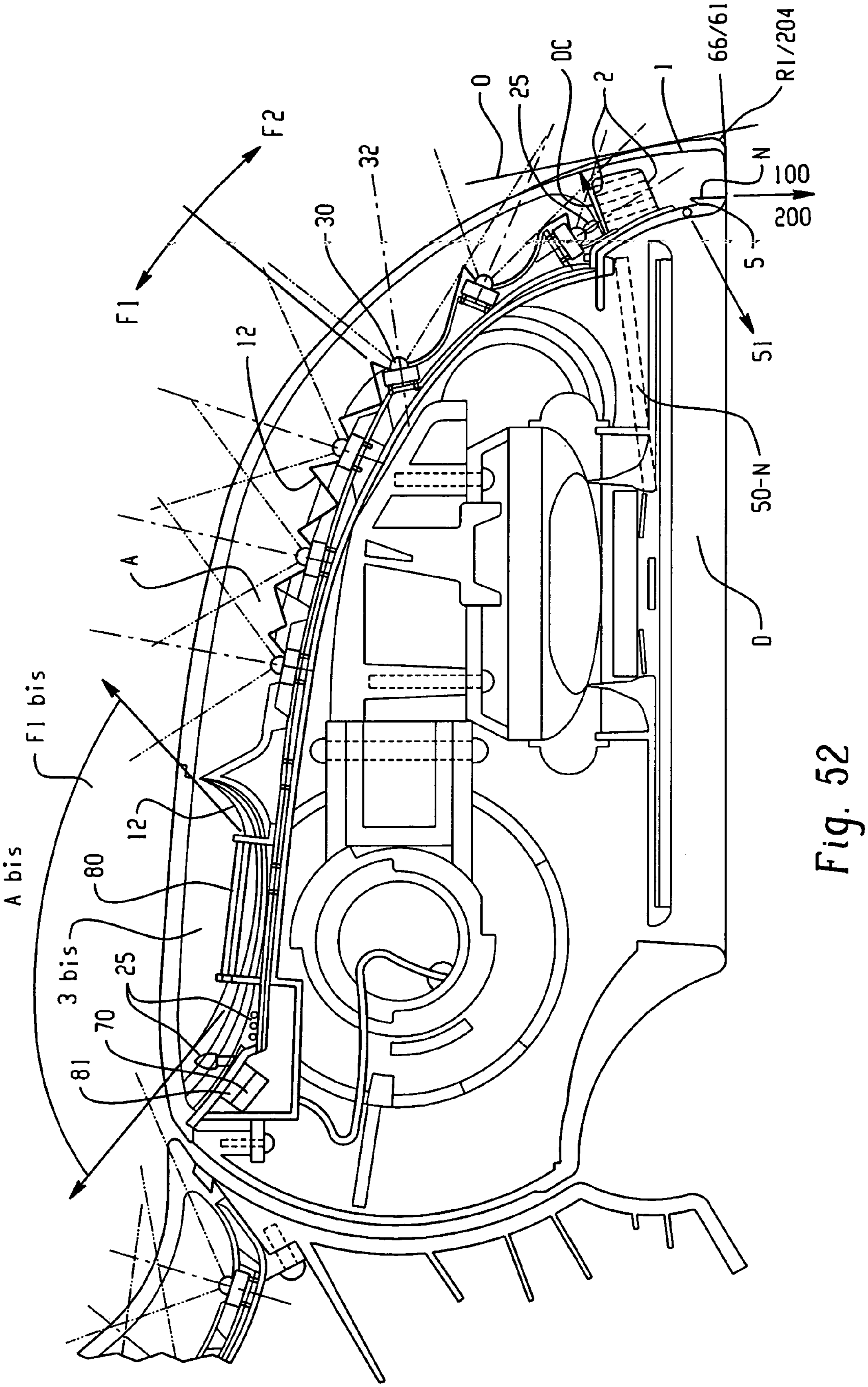

FIG. 52 is a sectional view BB of module (A) showing the special light of the flash type discharge lamp (80) in area (3) with its electronic circuit (70) and (81).

Figure 53:
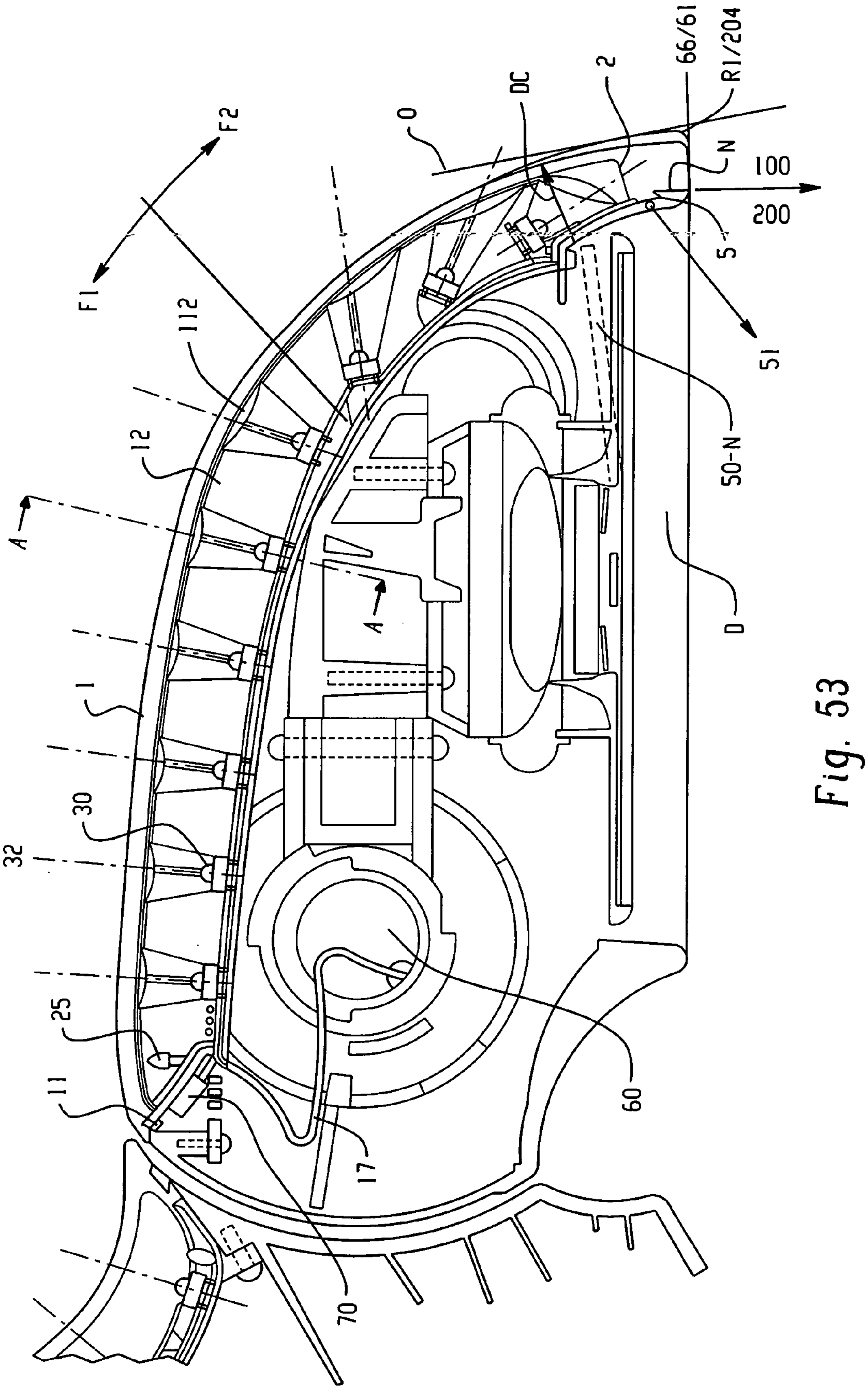

FIG. 53 is a sectional view BB of module (A) showing interior reflecting element (12) with cones (112) as separator with definition of foci (32).

FIG. 54 is a sectional view AA and FIG. 55 a view of module (A) as it appears in FIG. 53, showing interior chromed surface (12) with divider cones in isolated foci (112) and transparent orientating elements (113).

Figure 56:
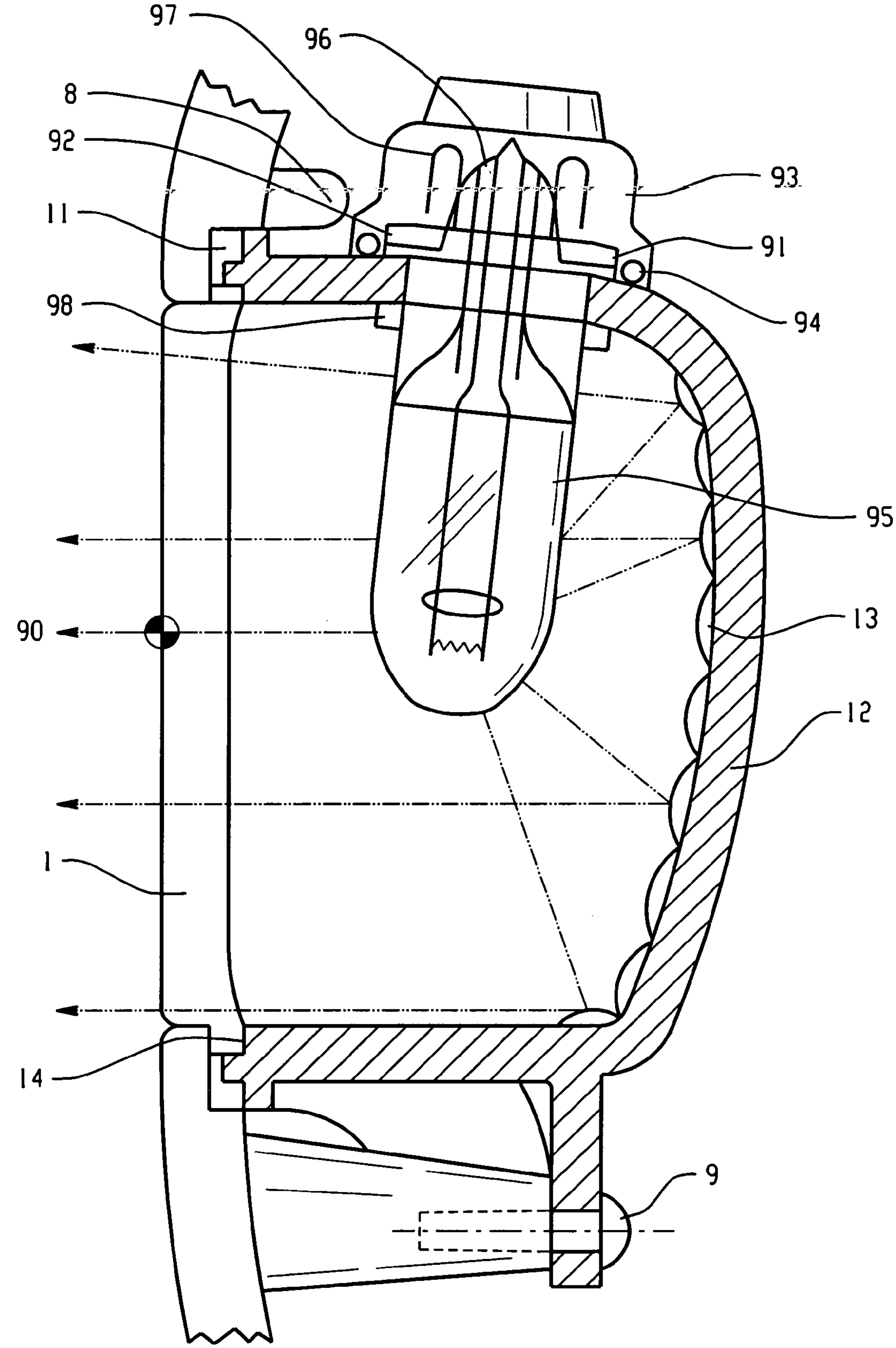
Figure 57:
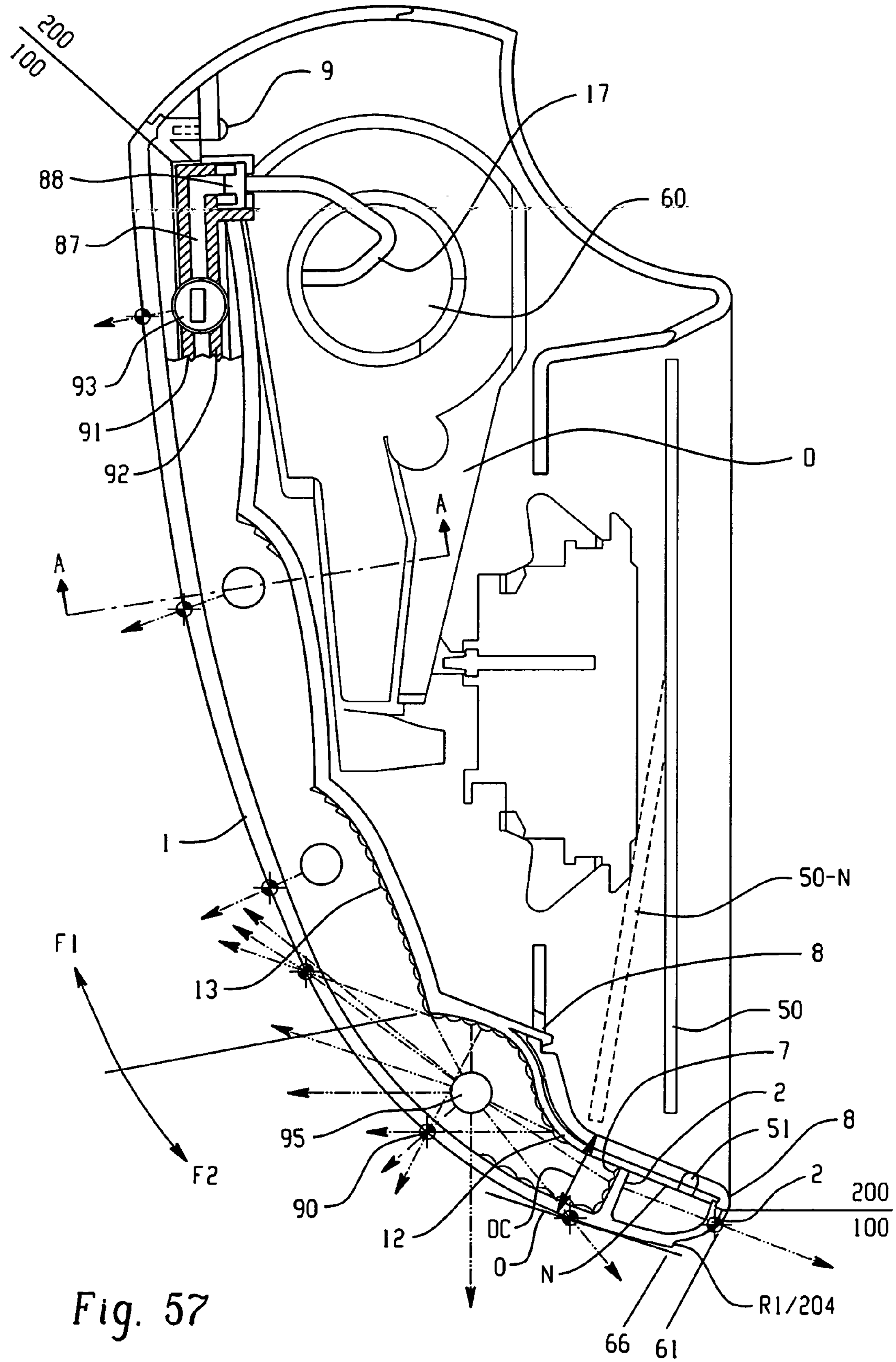

FIG. 56 is a sectional view AA of FIG. 57 showing lamp support (93) with seal (94).

FIG. 57 is a sectional view BB of the multilamp version (95) of module (A), showing focal centres (90), contact track (87), lamp support (93) and connector (88).

Figure 58A:
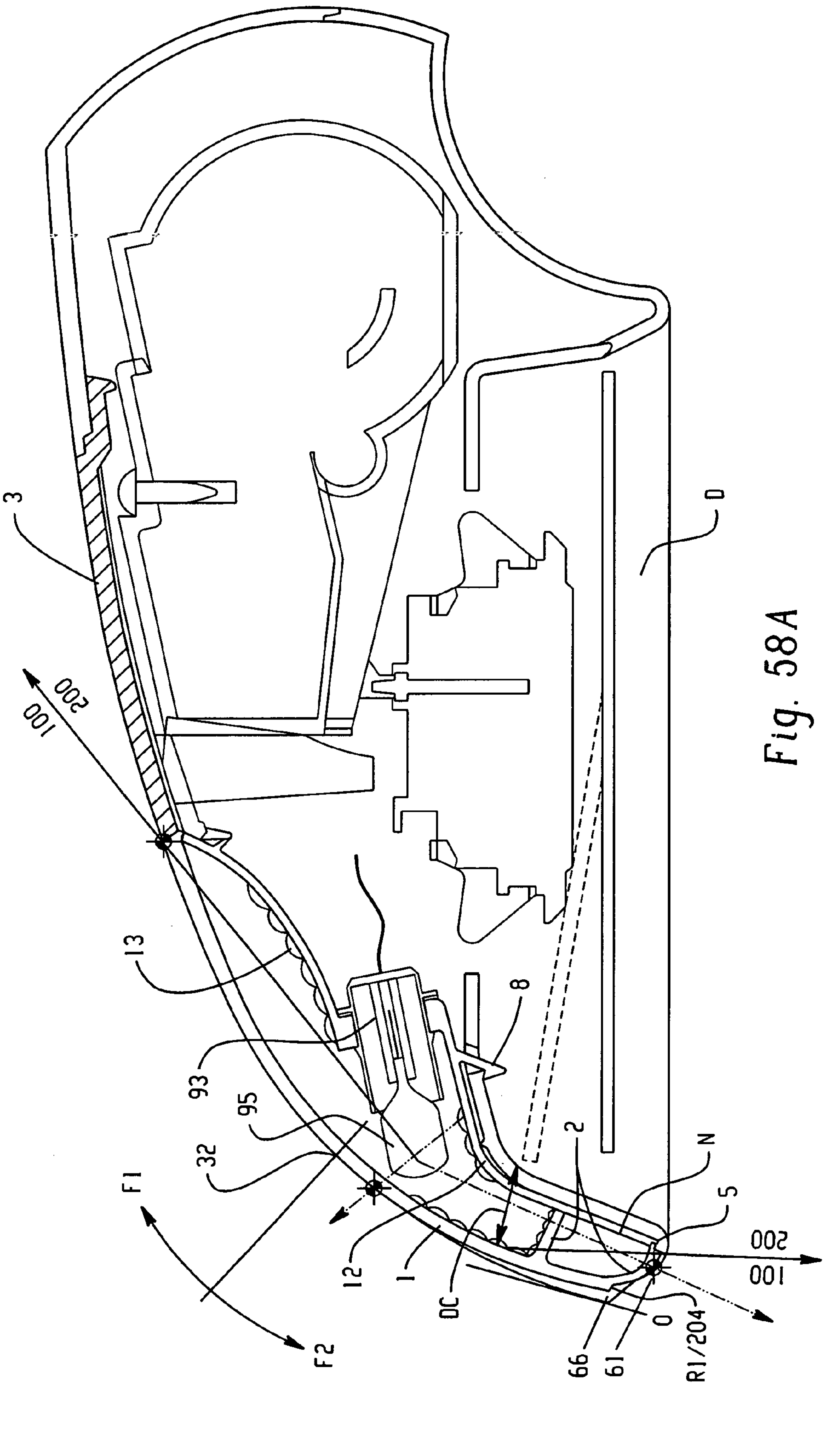
Figure 58B:
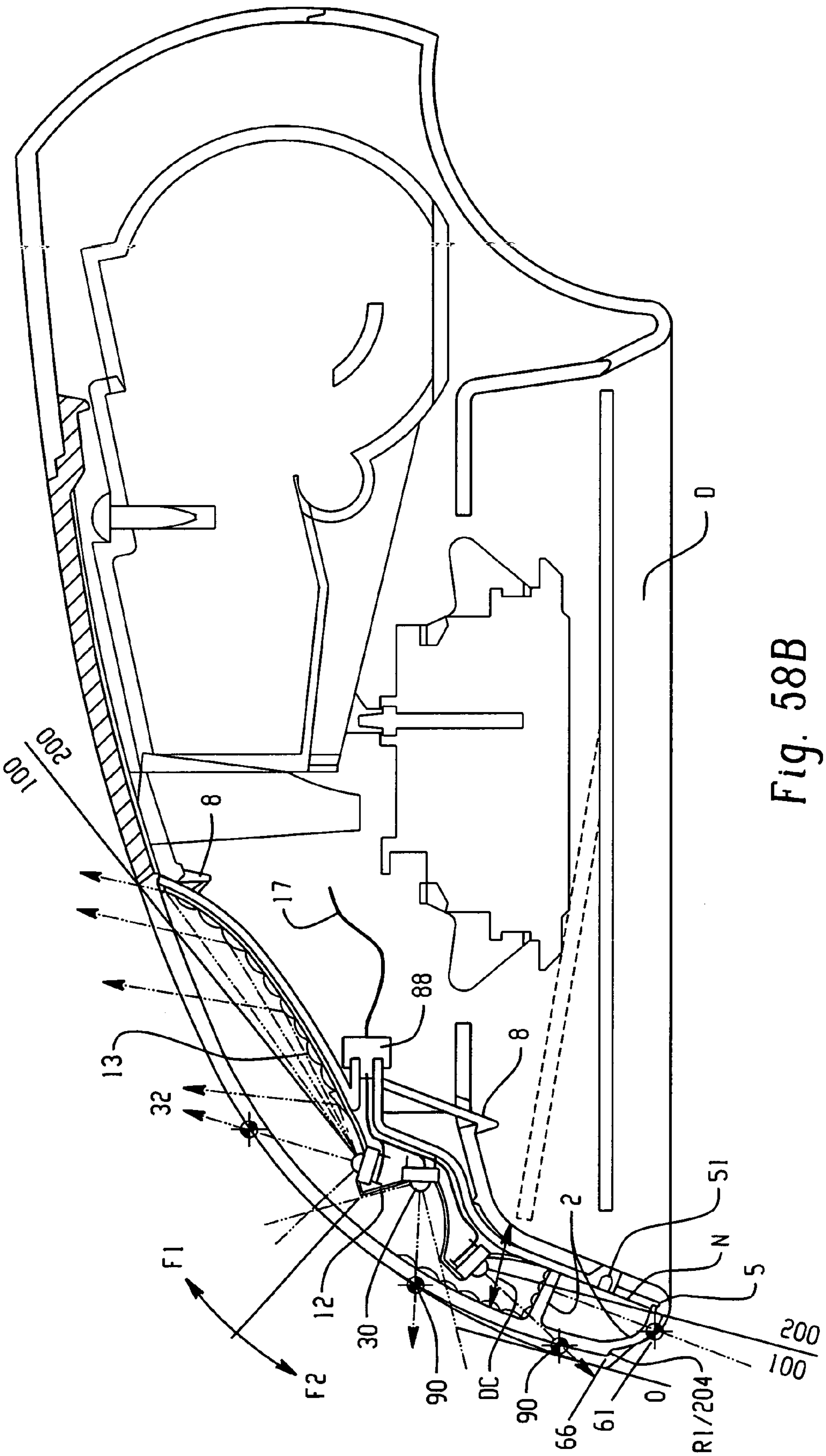

FIG. 58-A is a sectional view BB of the single lamp version of module (A).

FIG. 58-B is a sectional view BB of the minimum size, LED version of module (A), similar to one lamp, showing side reflection (13) of LED (30).

Figure 59:
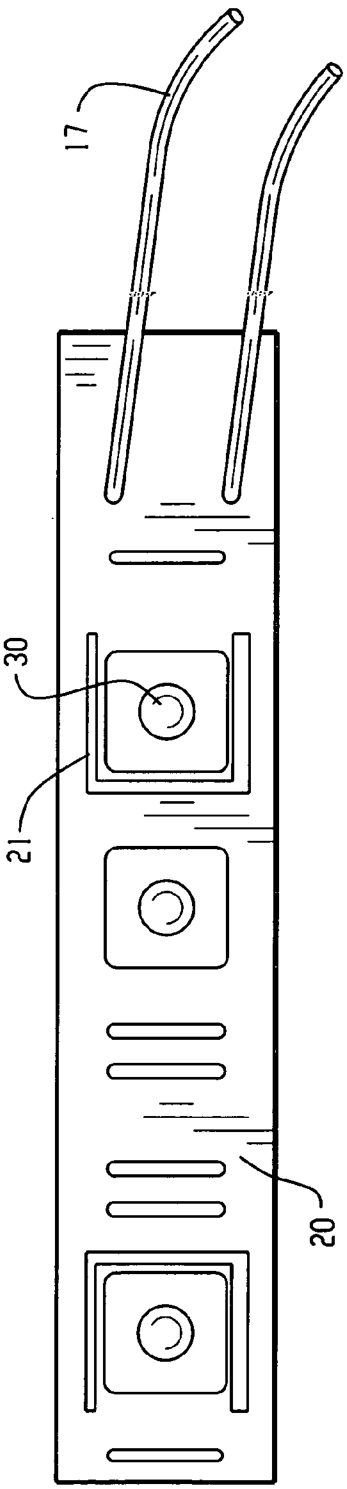
Figure 60:
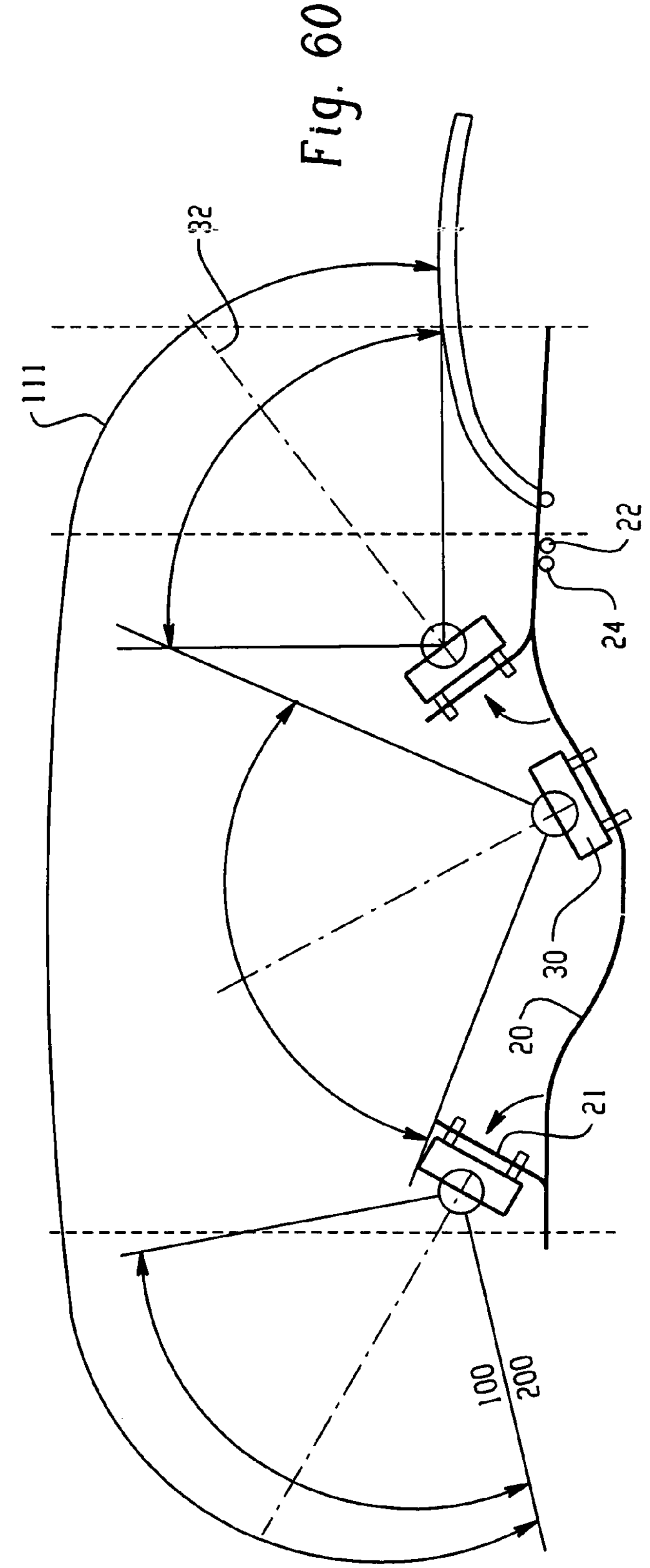

FIGS. 59 and 60 show the flexible or non-flexible, minimum size circuit provided with two or more LEDs as shown in FIG. 58-B.

Figure 61:
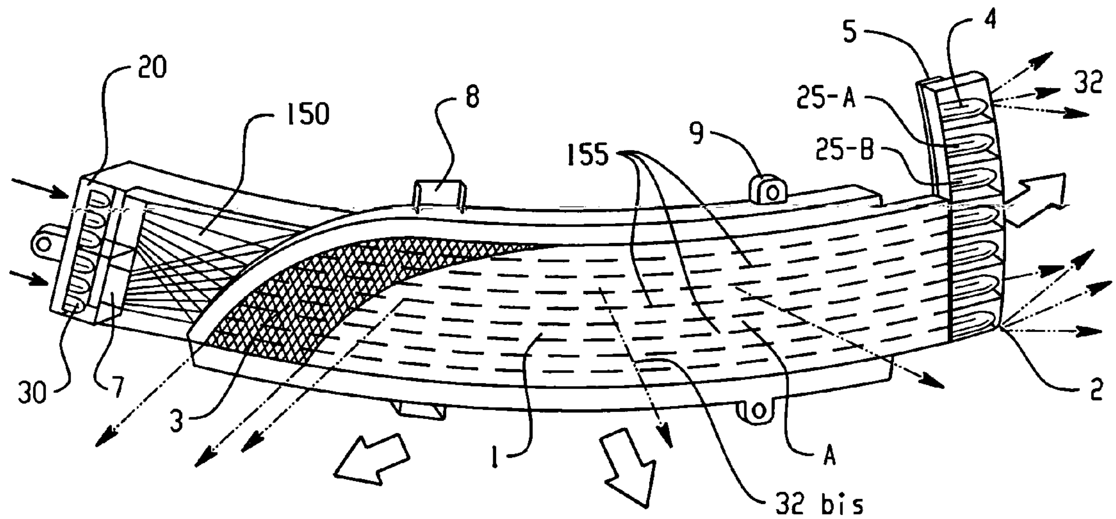

FIG. 61 is a frontal detail of the surface (1) providing an indirect exit of the light in an embodiment comprising interweaving optic fibre element (150) and two light source cores (30) with zones concentrating the fibres (7).

Figure 62A:
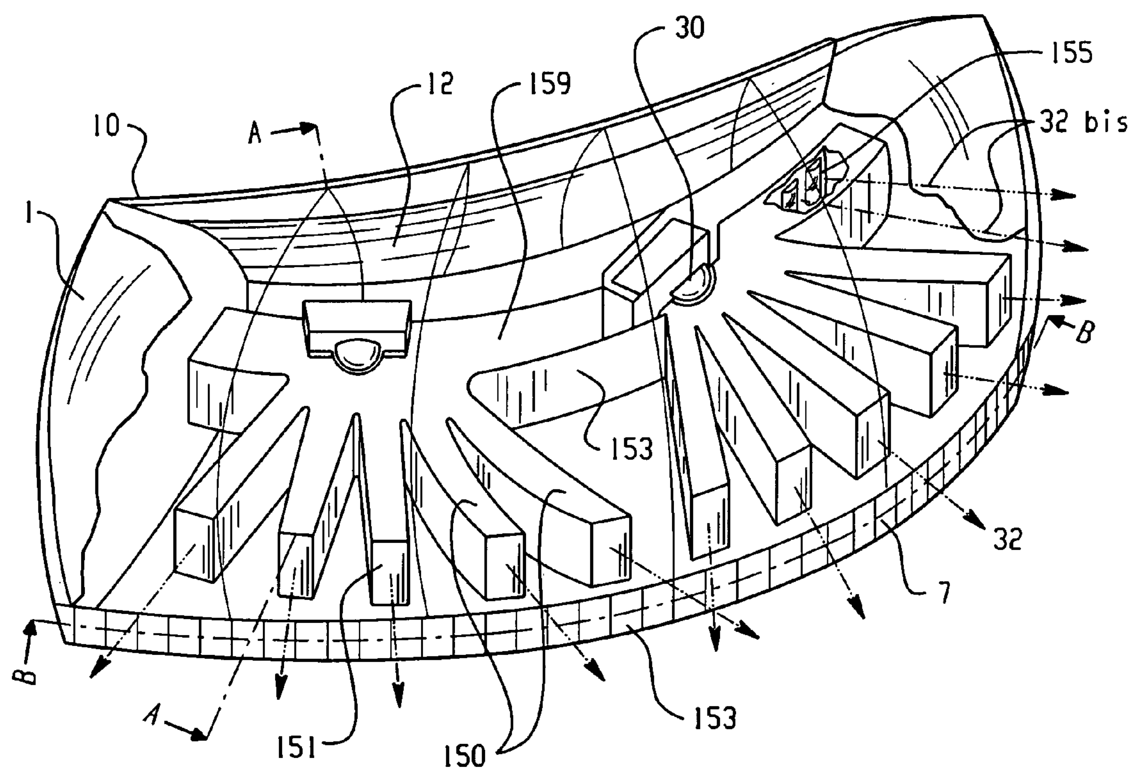

FIG. 62A is a transparent view of module (A) showing its interior light guiding element (150) and (159), radial output (150), machined colouring area (153) and direct output area (151).

FIG. 62-B is a sectional view AA of FIG. 61 showing that surface (1) and (151) are one part, with the mould stripping direction being (160), and that said surface has other output points for indirect light (155) and (158).

FIG. 62-C is a sectional view BB of FIG. 61 showing surface (156) which captures light so as to redirect it.

FIGS. 63-A-B are sectional views M and BB of FIG. 61 showing guiding elements (150) which are parallel and form another part, with mould stripping (160) being in the opposite direction.

FIGS. 64-A-B are sectional views AA and BB of another version of the light director, which is part of surface (1), and a body (150) corresponds to each LED.

FIG. 65 is a sectional view BB of module (A) with intermediate optics (150) and lenses (6) faced so that they emit a sectioned and condensed, direct light output.

FIG. 66 is a detailed perspective view of FIG. 65.

FIG. 67 is a sectional view AA of FIG. 65 showing details of the SMD type LEDs and focal distance (V1).

FIG. 68 is a sectional view BB of module (A) with intermediate optics (150) that produce a multiplying effect by means of prisms at source (LED-SMD), in this case, on surface (S1).

FIGS. 69-A-B-C-D are perspective views of the regular and irregular prisms.

FIGS. 70A and 70B are sectional views AA showing a prism of FIG. 68, representing the light trajectory and its multplying effect (11) and (12) on surfaces (S1) and (6), and the angle of these surfaces (alpha).

Figure 71:
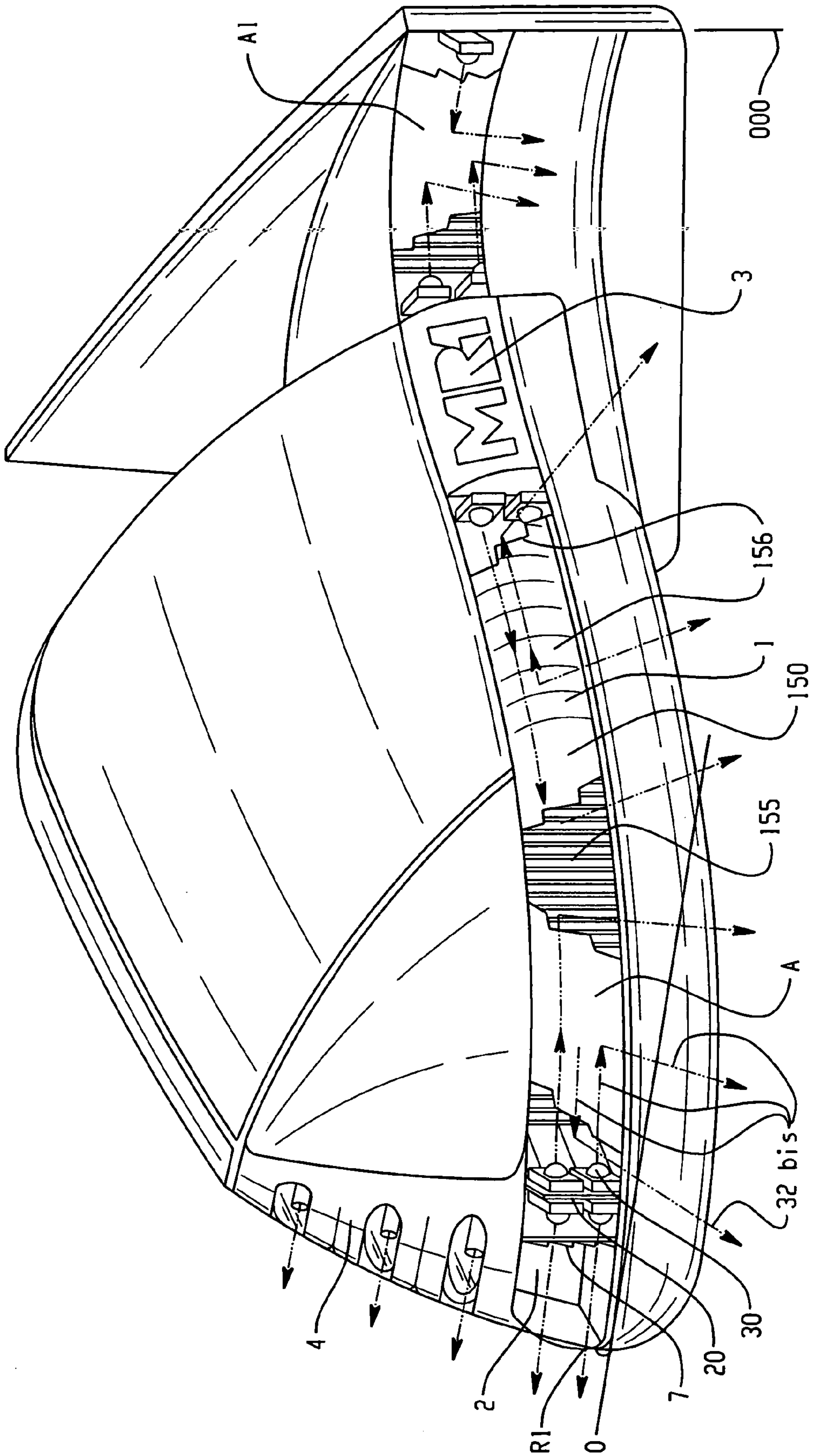

FIG. 72 is a detailed sectional view BB of FIG. 71 showing the light trajectory (T to R and vice versa), and prisms (155) and (155*bis*), connectors (211) and also the position of LEDs (30).

FIGS. 73-A-B-C are sectional views of FIG. 71, showing attachment (8) and (9), for example, different types of light guiding elements.

Figure 75A:
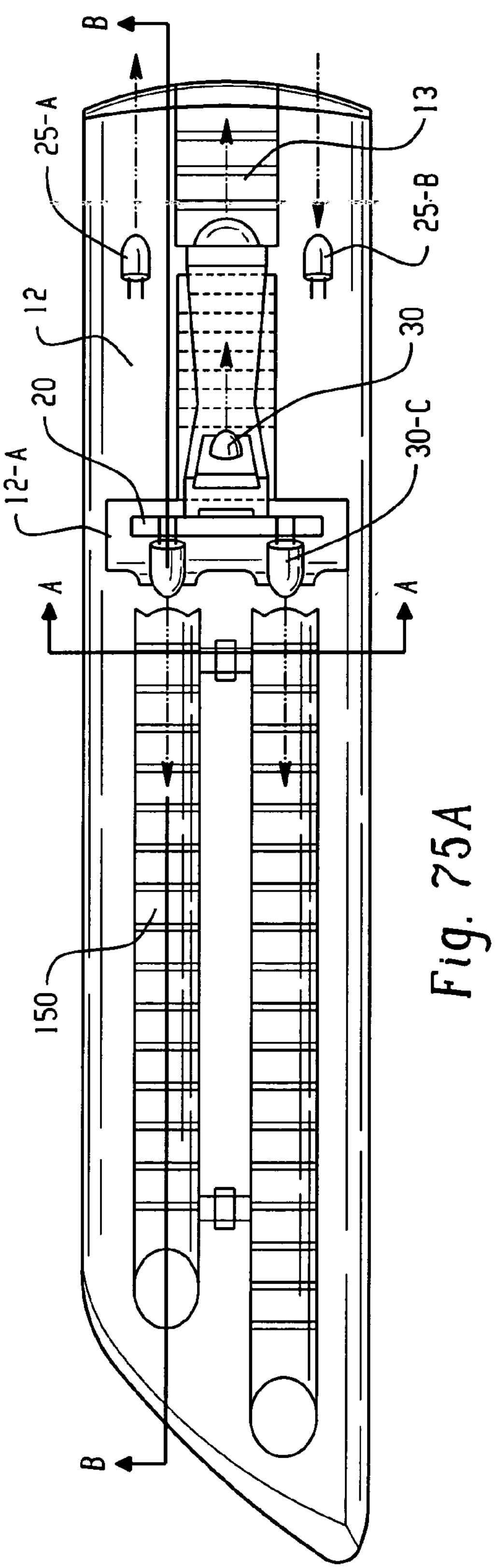
Figure 75B:
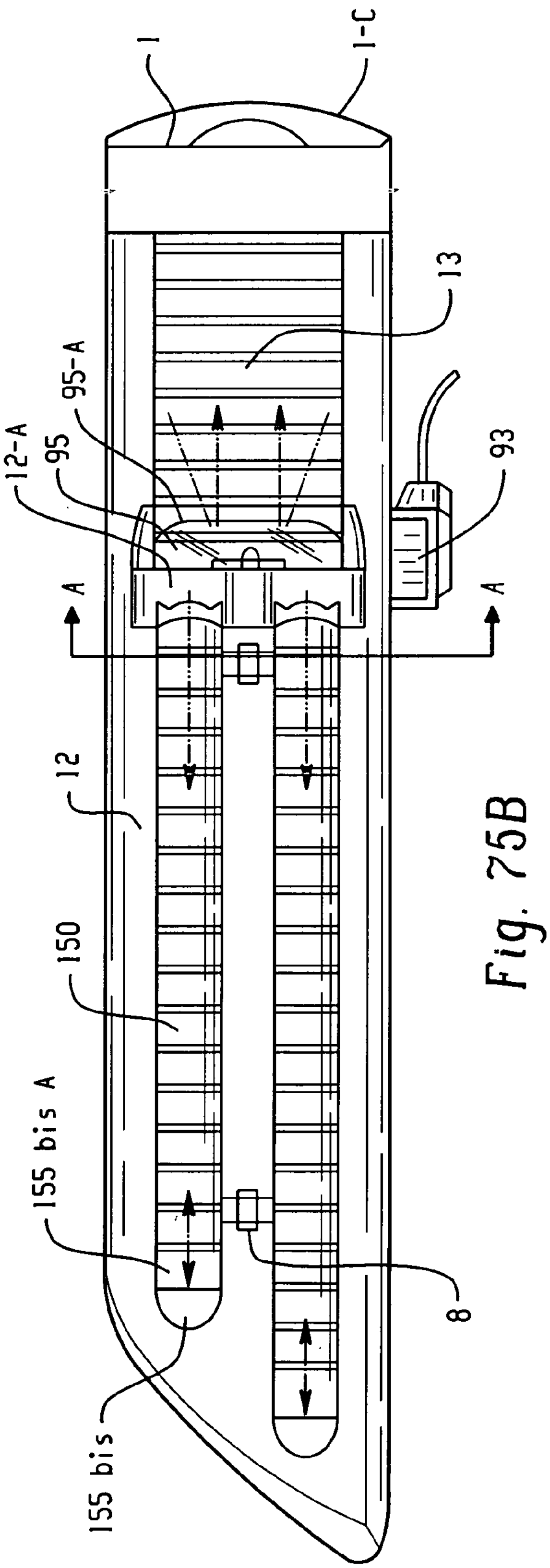
Figure 80C:
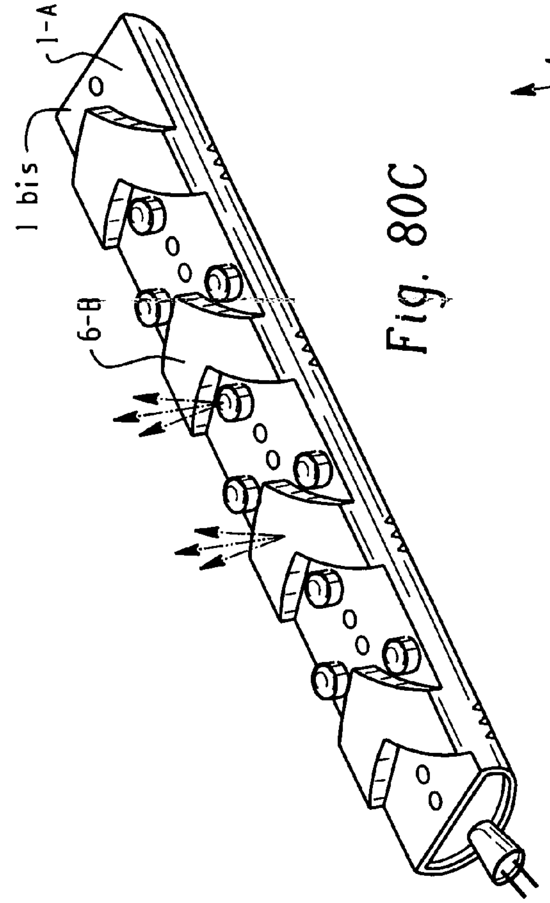
Figure 80D:
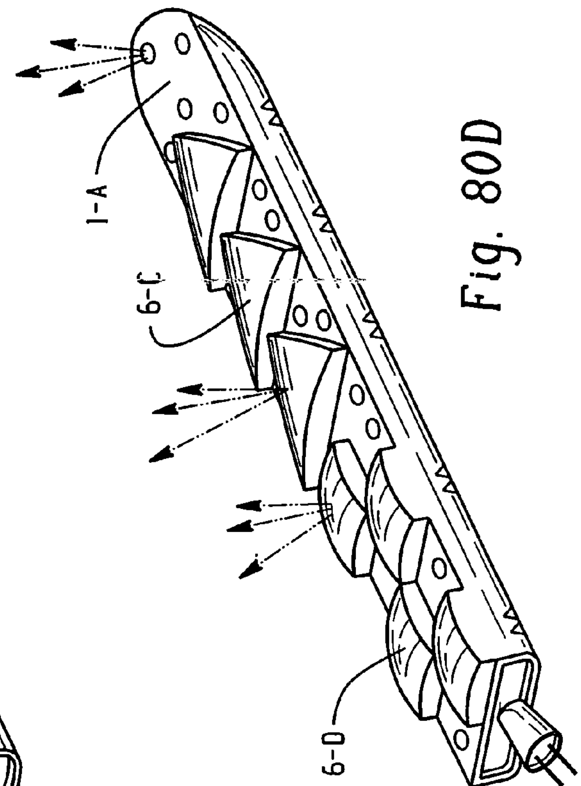
Figure 80A:
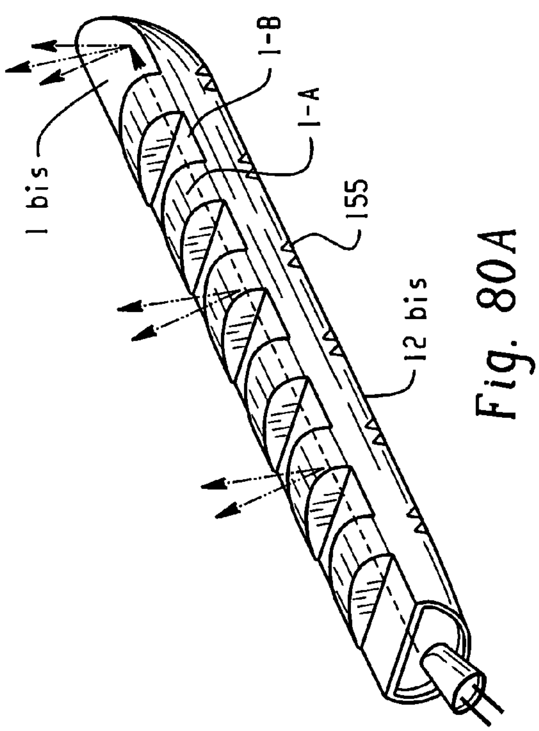
Figure 80B:
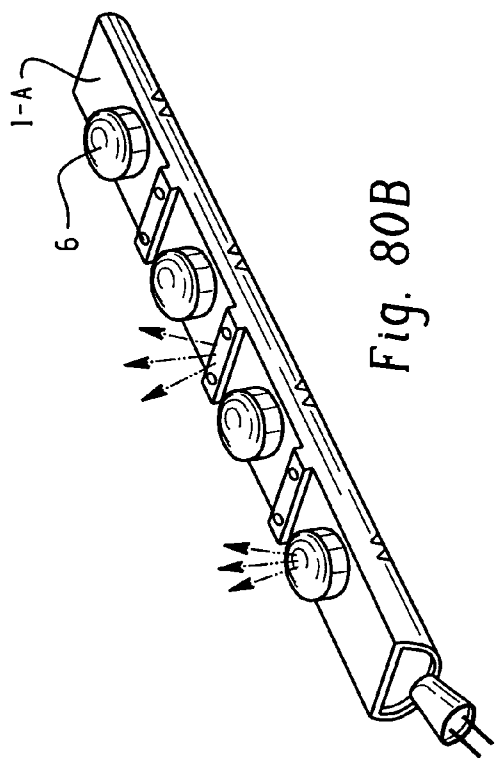

FIGS. 74-A-B are sectional views BB of a light guiding element of type (150), FIG. 75-A, showing fundamental common features (6), (6-A), (6-B) light input control optic (30-C), (30-B), LED with directed light optic; cover (12-A), either chromed or non-chromed, for the light source circuit, and prisms (155), (155*bis*), (155*bis*-A) for light output, generally at 45° with respect to the direction of the light.

FIGS. 75-A-B are inside views of module (A) with light guiding element (150), version A with an LED source, IR emission diode (25-A) and receiver (25-B), and version B with a bulb source.

FIGS. 76-A-B are a sectional view AA of FIG. 75-A showing the features of all the light guiding elements (150) irrespective of their section, with surface (1*bis*) being preferably independent of surface (1), with the distances separating body (D2) from surface (1) and from the reflective inside back (12) are (D1) and (D3), respectively.

FIG. 77 is an inside view of module (A) showing more than one line of LEDs and parallel light guiding elements.

FIG. 78 is a sectional view BB of FIG. 79 showing surface (1*bis*) as irregular and/or comprising different levels (1-A), (1-B).

FIG. 79 is a front, detailed view of a light guiding element (150) comprised of irregular lenses, surfaces and prisms (155).

FIGS. 80-A-B-C-D show variations of light guiding element (150) with irregular bodies, lenses and surfaces (1*bis*).

Figure 81:
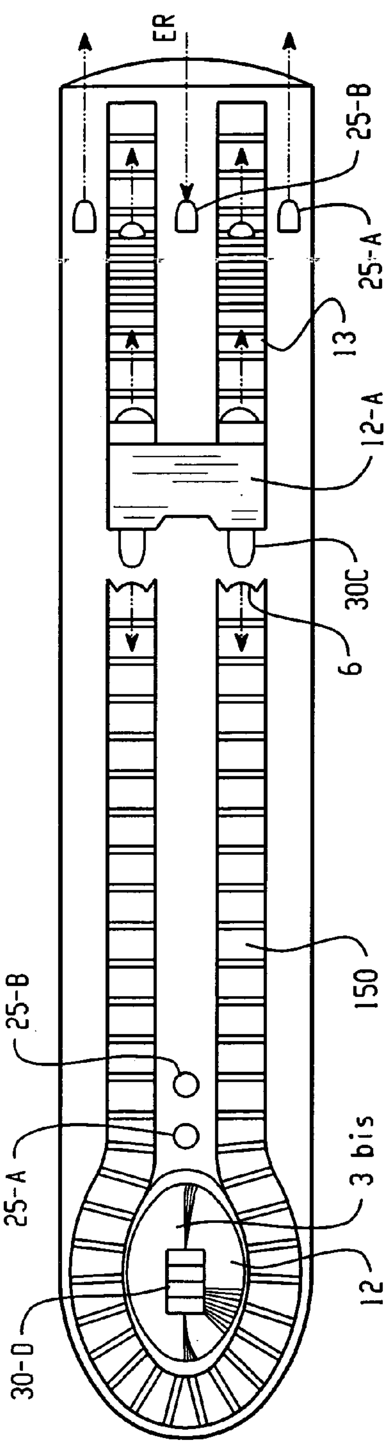

FIG. 81 is a front view of the inside of module (A) showing a curved light guiding element (150), extending in two directions, and emitting/receiving diodes (25-A-B).

Figure 82:
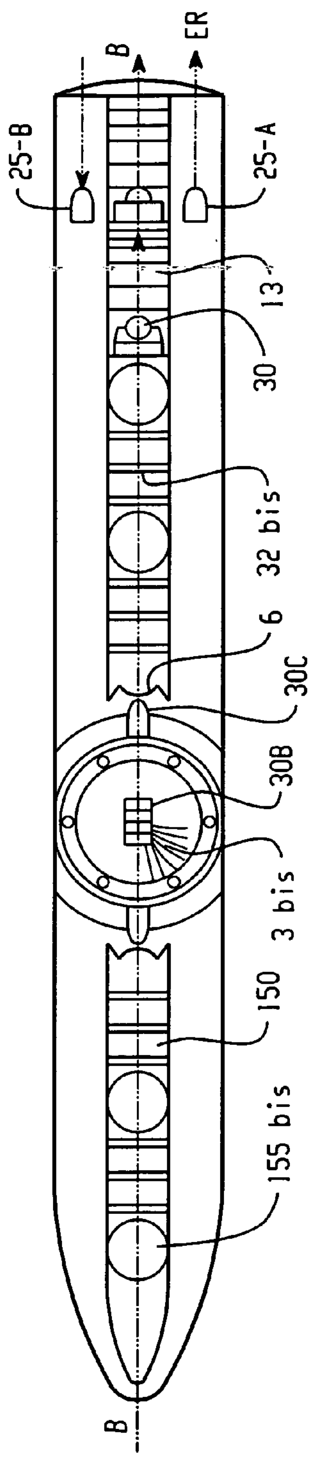

FIG. 82 is a front view of the inside of module (A) showing a split-level light guiding element (150), photodiodes (ER) (25-A-B), and front spot (3*bis*).

FIG. 83 is a sectional view BB of FIG. 82 showing a split level element (150) and the trajectory of the light diverted by prism and counterprism (155) and (155*bis*), and also stiff-flexible mixed circuit (20).

Figure 84:
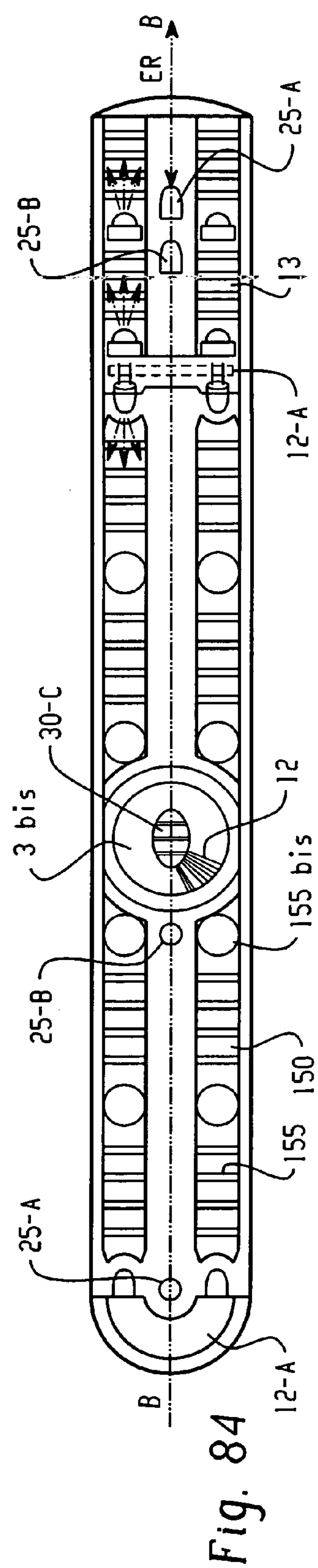

FIG. 84 is a front view of the inside of module (A) showing light guiding elements (150) parallel and at a split level, front spot (3*bis*) and emitting/receiving (ER) (25-A-B).

FIG. 85 is a sectional view BB of FIG. 84, showing the same elements as FIG. 82.

FIG. 86 is a front view of the inside of module (A) showing mixed LED and bulb circuit, and including the mixed, direct-reflected light output in area (F2), and the direct-indirect light from light guiding element (150) and collimator parabola (13) in area (F1), and also emitting/receiving (ER) through photodiodes (25-A-B). The bulb is also provided with the mask effect so as to conceal its colour and front spot (3).

FIG. 87 is a sectional view BB of FIG. 86 showing how mask (3*bis*) emits light through the conical holes of (3) and the reflecting part (12):

FIGS. 88-A1 and A2 are side views of modular light guiding element (150) which works with direct light creating a diamond effect on surface (S1), and indirect light on prisms and/or microprisms (l55*bis*), which is preferably for SMD type LEDs.

FIG. 88-B is a series of modular guiding elements, according to FIG. 88-A.

FIGS. 89-A-B are sectional views AA of module (A) comprising modular guide elements, as shown in FIG. 88-A, where distance (D1) is highlighted to give contrast and depth to (150), and anti-reflecting area (12-X), so as to avoid external light (32-X) and increase the contrast of internal light (32).

FIGS. 90-A-B show variations of the modular light guiding elements combined with the diamond effect, arranged in a line, or at an angle similar to the arrow type in FIG. 90-B.

FIGS. 91-A-B are side views of modular light guiding elements showing various direct light input points, FIG. 91-A; or indirect, reflected light, FIG. 91-B; for different types of LED and variations of prisms and counterprisms (155) and (155*bis*) and output lenses (7), on surface (1-A).

FIG. 91-C is an example of consecutive modular guiding elements, as in FIGS. 91-A-B.

FIG. 92-A is a front, detailed view of an intermediate optic, preferably for front spot, where the light changes direction more than once, and lenses (7) amplify the light's horizontal projection.

FIG. 92-B is a sectional view AA of FIG. 92-A, showing the light's double trajectory when it is reflected in (155*bis*) and concentrated by passing through (6) of surface (1-A).

FIGS. 92-C1 and C2 are sectional views BB of FIG. 92-A showing the light's double trajectory, as in FIG. 92-B, but surface (1-A) has an elongated horizontal extension with dispersing lenses and prisms (6) or (7*a*).

FIGS. 92-D-E-F are variations of the elongated extension of FIGS. 92-A-C, for one or two LEDs. It is the modular light guiding element principle, but these variations are symmetrical and integral.

FIG. 93 is a front view of the inside of module (A) showing an application of a double trajectory, light concentrating-diffusing optic (3) such as front spot, FIG. 92-A; symmetric double guiding element, FIG. 92-C-D or E; and photodiode sensors (25-A), (25-B).

Figure 94:
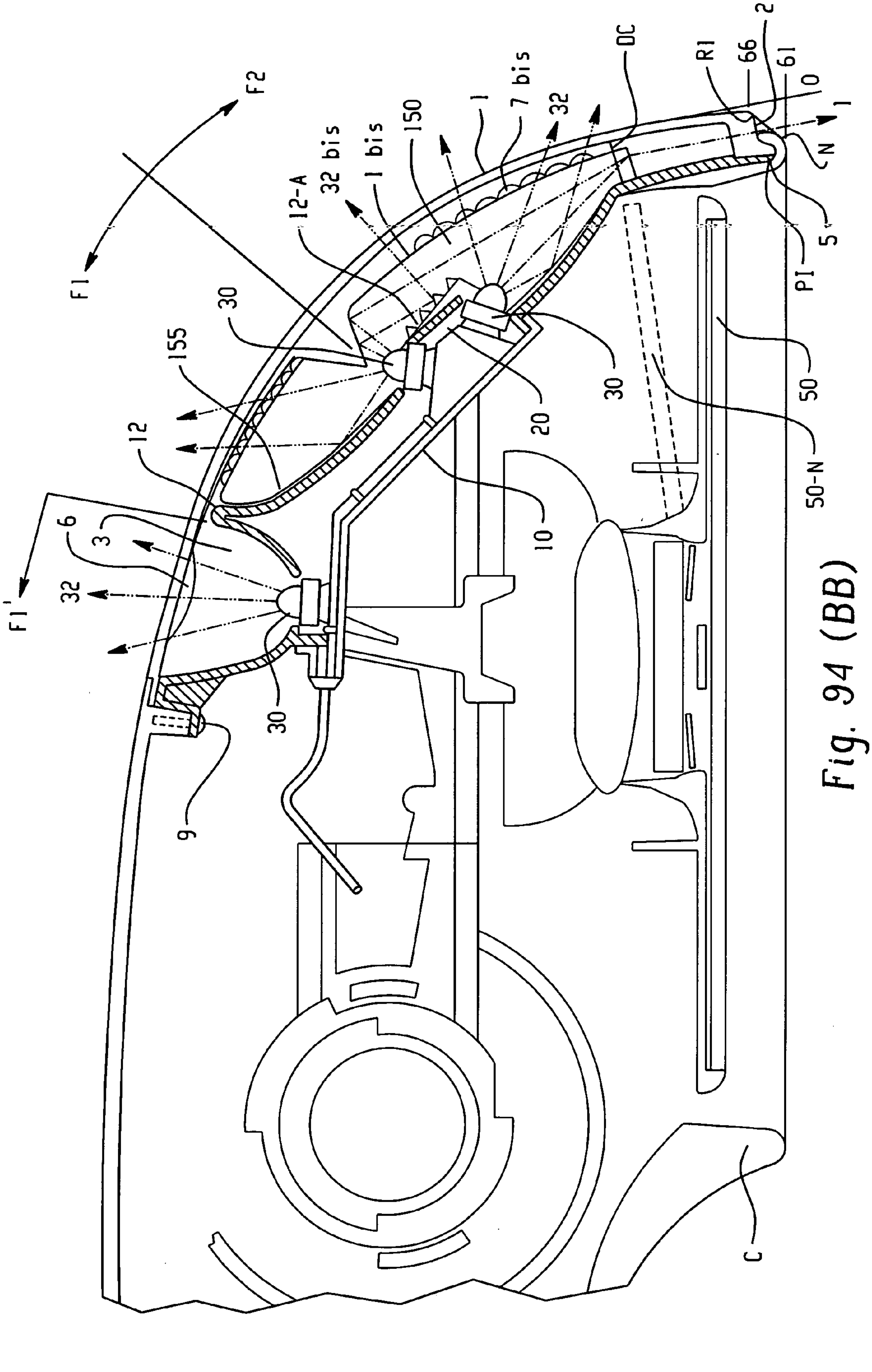

FIG. 94 is a sectional view BB of module (A) with a double trajectory, asymmetrical, minimum size internal guiding element (with two LEDs), and front spot (3).

Figure 95:
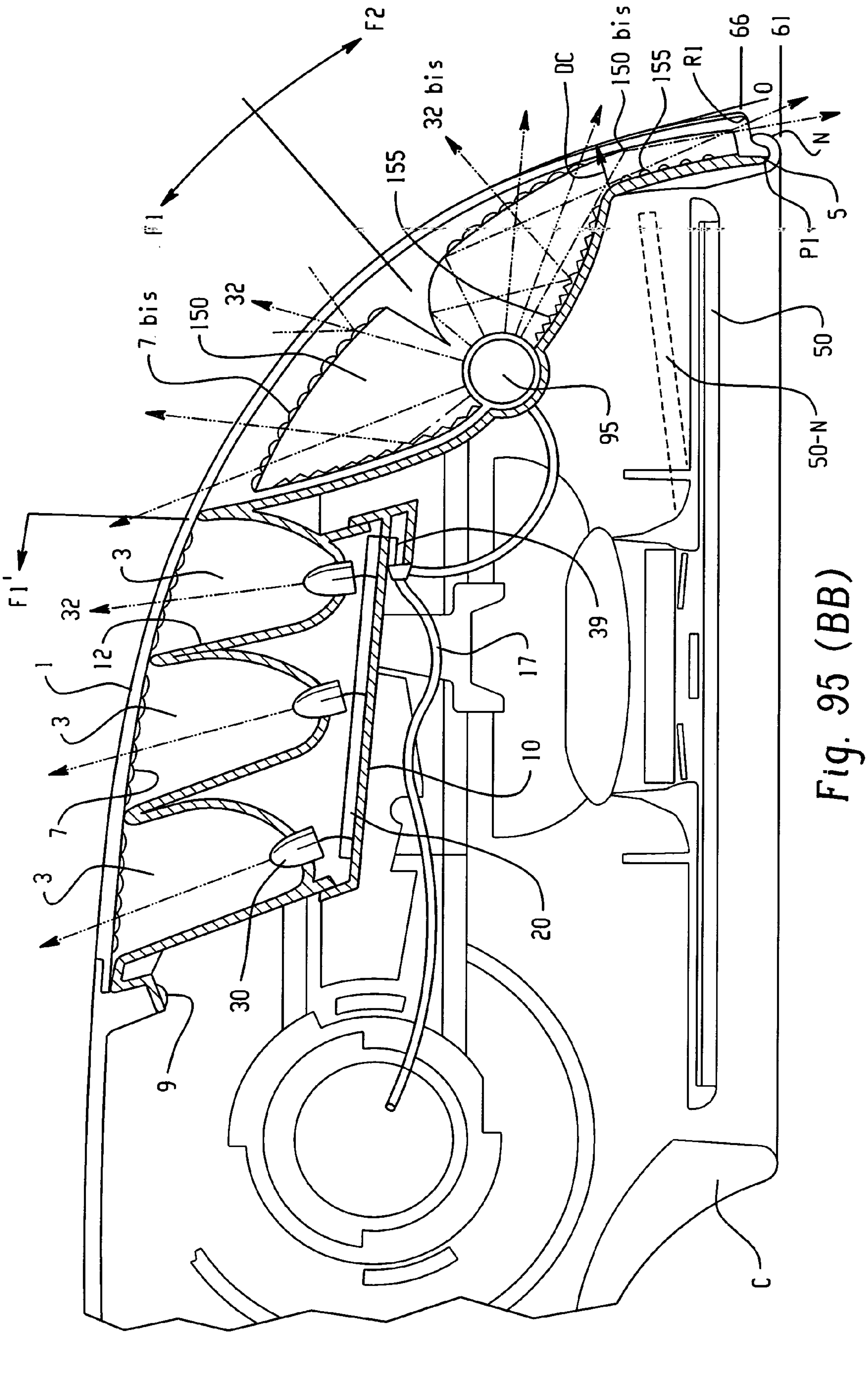

FIG. 95 is a sectional view BB of module (A) with a double trajectory, minimum size guiding element provided with a bulb for functions (F1) and (F2) that produces light output towards (K1) by means of light guiding element (150*bis*), +LED front spot with combined circuit.

Figure 96:
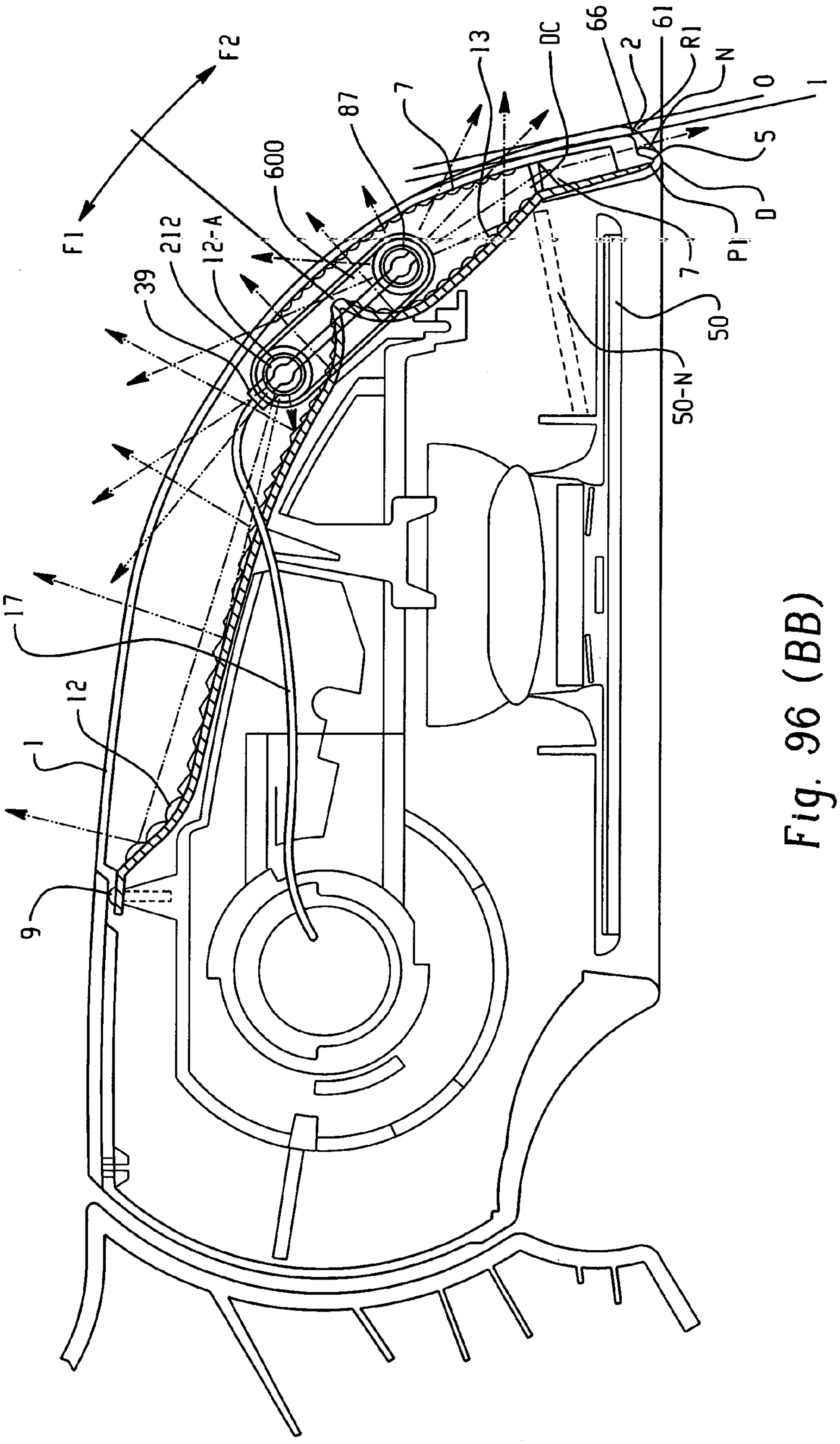

FIG. 96 is a sectional view BB of module (A), minimum size, provided with a source comprising one or more bulbs for direct-reflected light in collimator (12), (13) for functions (F1) and (F2), and chromed masks (12-A) for concealing the direct light output and/or the bulb colour and prisms or Fresnel diffuser on surface (1). This is an example of the application of double lamp support (600).

Figure 97:
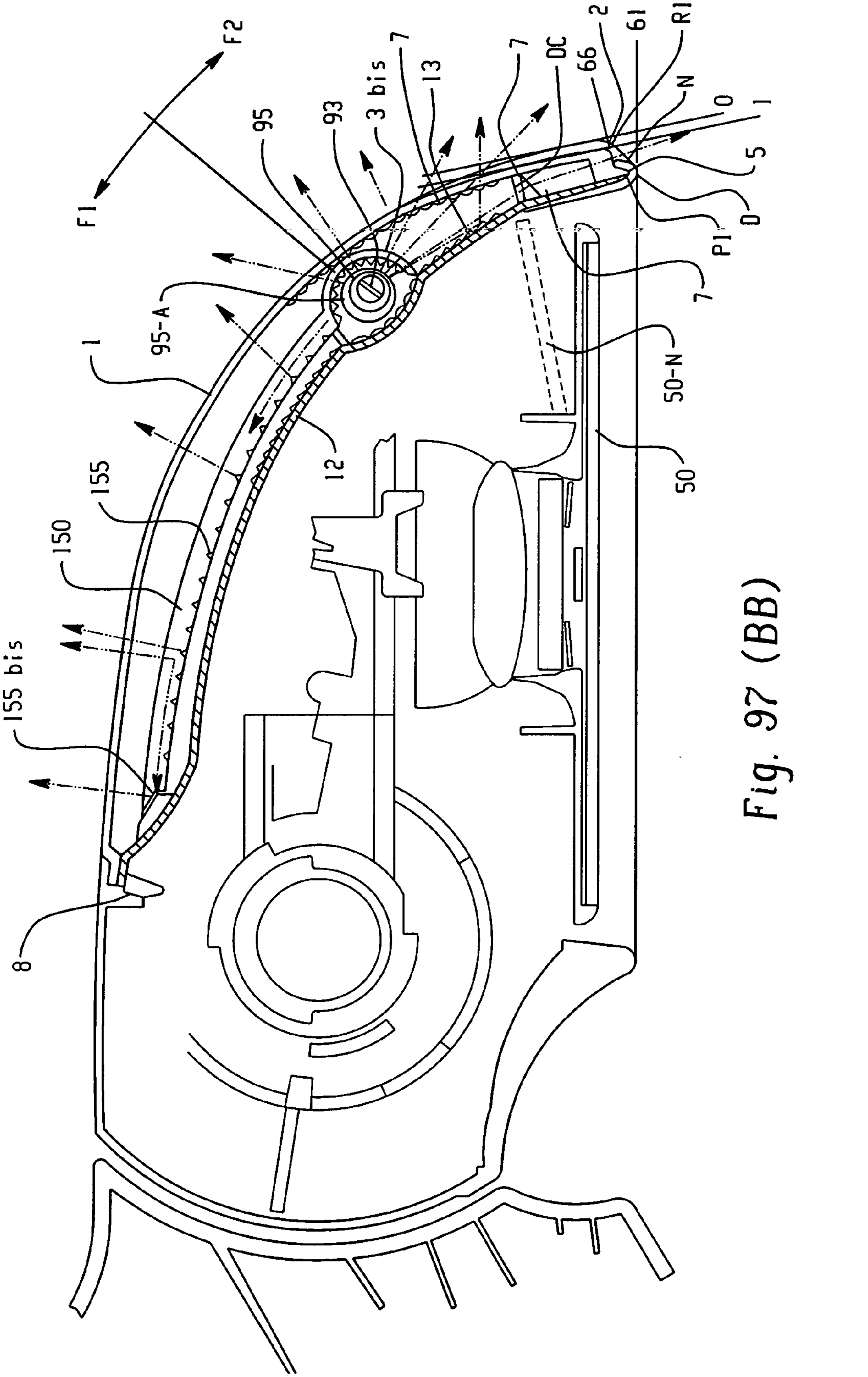

FIG. 97 is a sectional view BB of module (A), minimum size, provided with at least one bulb (95), light guiding element (150) for function (F1), bulb mask (3*bis*) and direct-reflected output in (F2).

Figure 98:
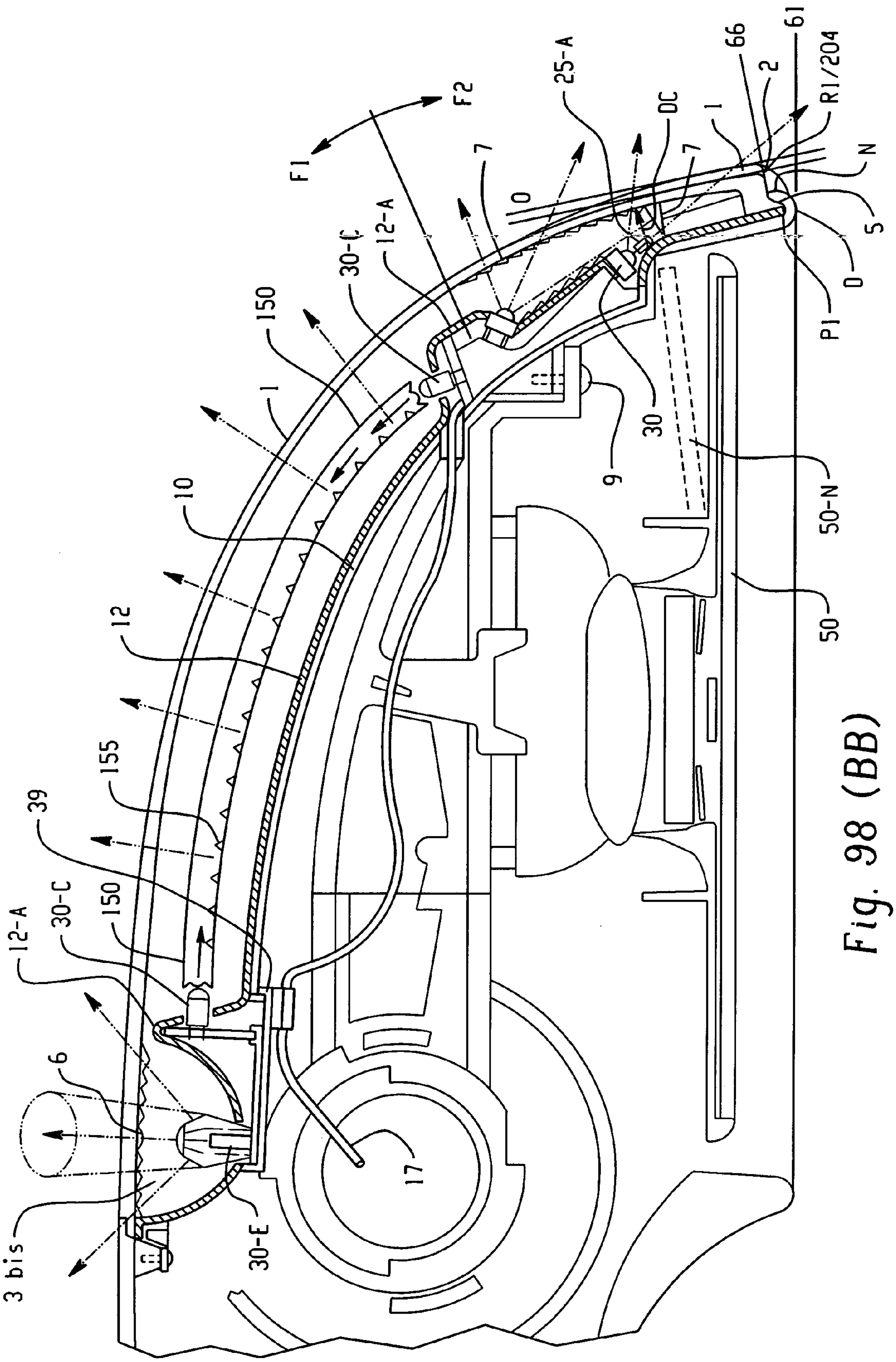

FIG. 98 is a sectional view BB of module (A), (F1) with guiding element (150) having double light trajectory and front spot with concentrating LED optic (30-E) or bulb, and (F2) direct-reflected light output and photodiodes (25-A-B), and showing mask (12-A) that conceals the LED circuit.

Figure 99:
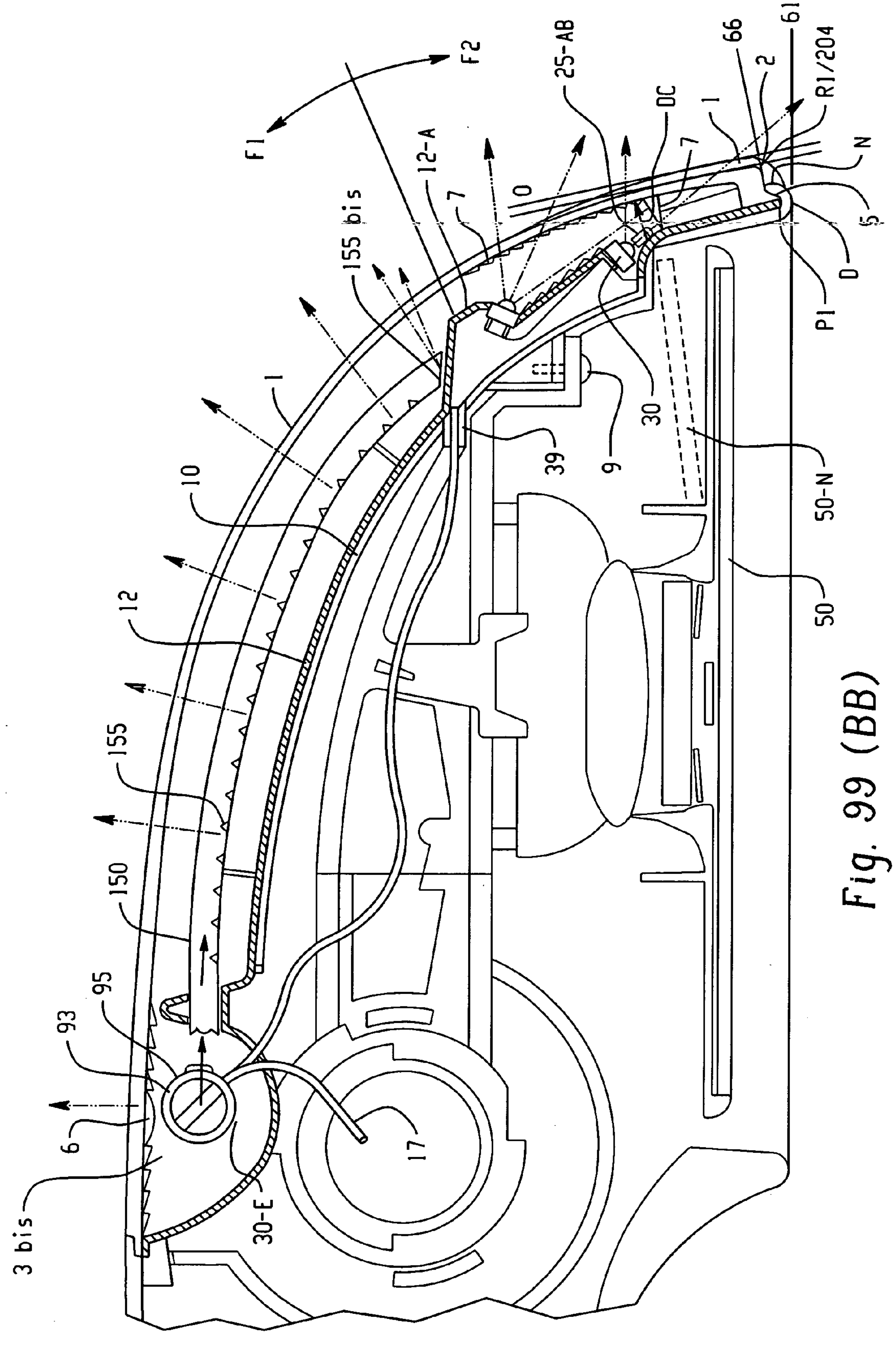

FIG. 99 is a sectional view BB of module (A), minimum size, with light guiding element (150) having its bulb (95) source starting from front spot (3*bis*); and direct-reflected output (F2) and combined sensors, photodiode/emission element (15-A-B).

Figure 100:
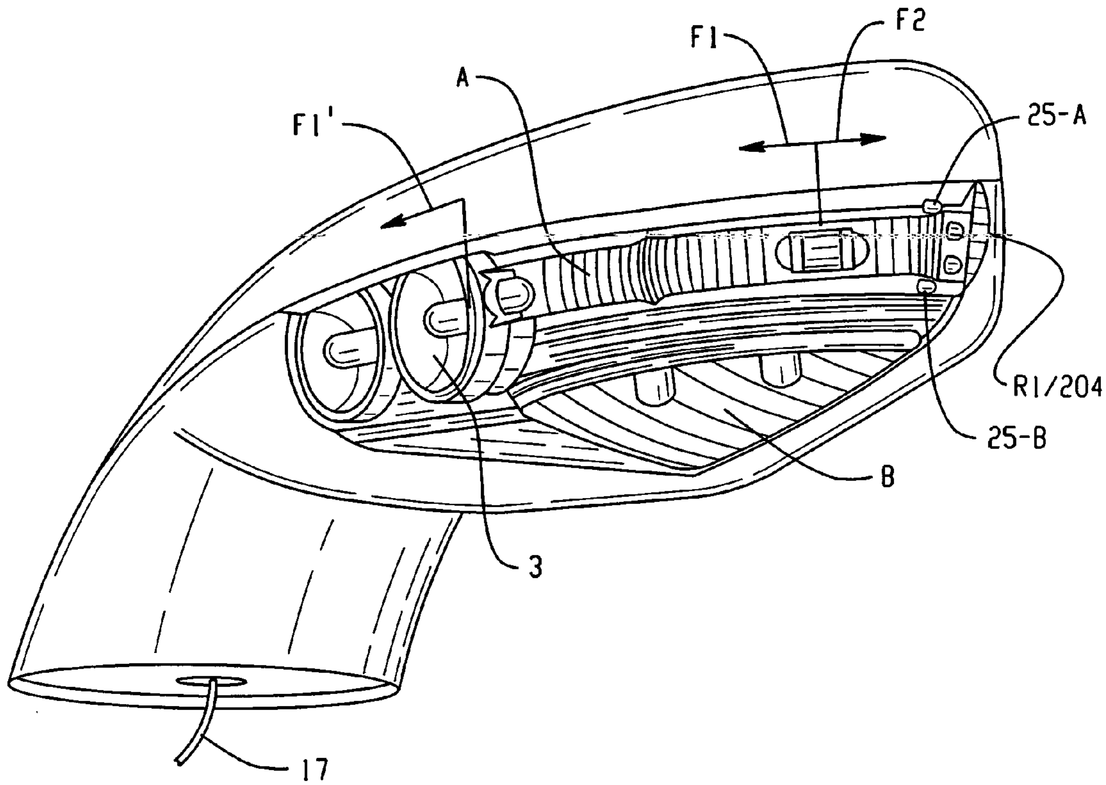

FIG. 100 is a perspective view of the combined module (A+B).

Figure 101:
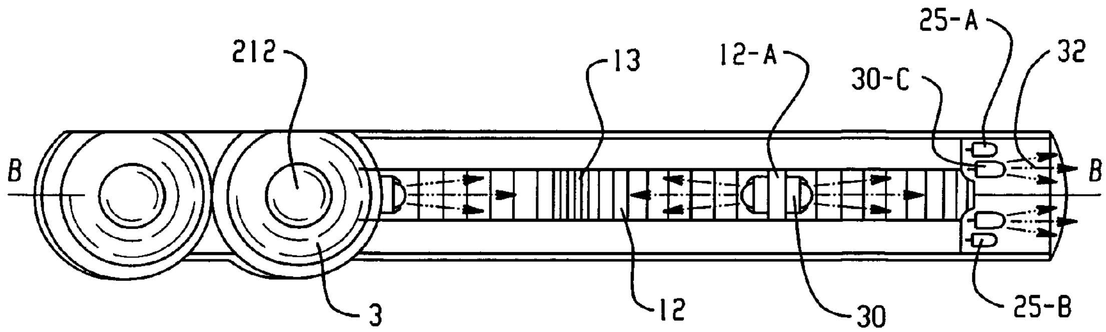

FIG. 101 is a front view of the inside of module (A), as seen in FIG. 100, showing front spot for double bulbs (3), the combined circuit having LEDs (30) facing in an opposite, symmetrical direction, producing indirect-reflected light by means of collimator (12), (13) in opposite directions, which exits through direct, rearward projection (K1)+ emitting/receiving diodes (25-A-B). Also mask (12-A) is shown, which conceals the LED circuit.

FIG. 102 is a sectional view BB of module (A), according to FIG. 101, showing the critical area (DC) and that the first LED is positioned behind said distance.

FIG. 103-A is a sectional view BB of module (A) showing front spot (3) provided with a special light dispersing LED optic (30-D), producing direct-reflected light by means the collimator, according to the same principle shown in FIG. 102, but with all facing the same direction. It is shown that the first LED with projection towards (K1) is behind the critical area (DC).

FIG. 103-B is a front view of the inside of module (A).

FIG. 104-A is a sectional view AA of module (A), as a complementing light source (34*bis*), formed by electroluminescent surface (N) on a plate, or as substrates produced with serigraphy or any other printing style, on the front surface of the internal transparent body (150), showing in detail its position on the inside back of module (A) to improve its contrast against external light and optimise light output, by determining angle (W), which is always less than 89°, between the external light (32*bis*) which goes from A to B, and is generally absorbed by the anti-reflecting black matt surface (12-X), and the focal centre of light output (32), where distance (D1) is always greater than 1 mm.

FIG. 104-B details sheet (N) or electroluminescent substrates which, when current is passed between tracks (N2) and (N4), produce light in polymer (N3), forming source (34*bis*), with light output (32).

FIGS. 105 to 106 are front views of the inside of module (A) with electroluminescent surface (N) combining with LEDs (30) in a mixed circuit with photodiode sensors (25-A-B) and front spot.

FIGS. 107A and 107B are sectional views AA of FIG. 106, detailing internal optic (150) with lens (6*bis*) to control the light output of (N) and (34*bis*) and internal optic (6) for LED (30).

FIG. 108 is a front view of module (A) in mirror assembly, with a mixed source comprising bulb and LEDs sectioned in individual parabolas, and front spot (3), with mask (3*bis*) which conceals the colour of the bulb and/or has a filter which colours the light. In area (F1').

Figure 109:
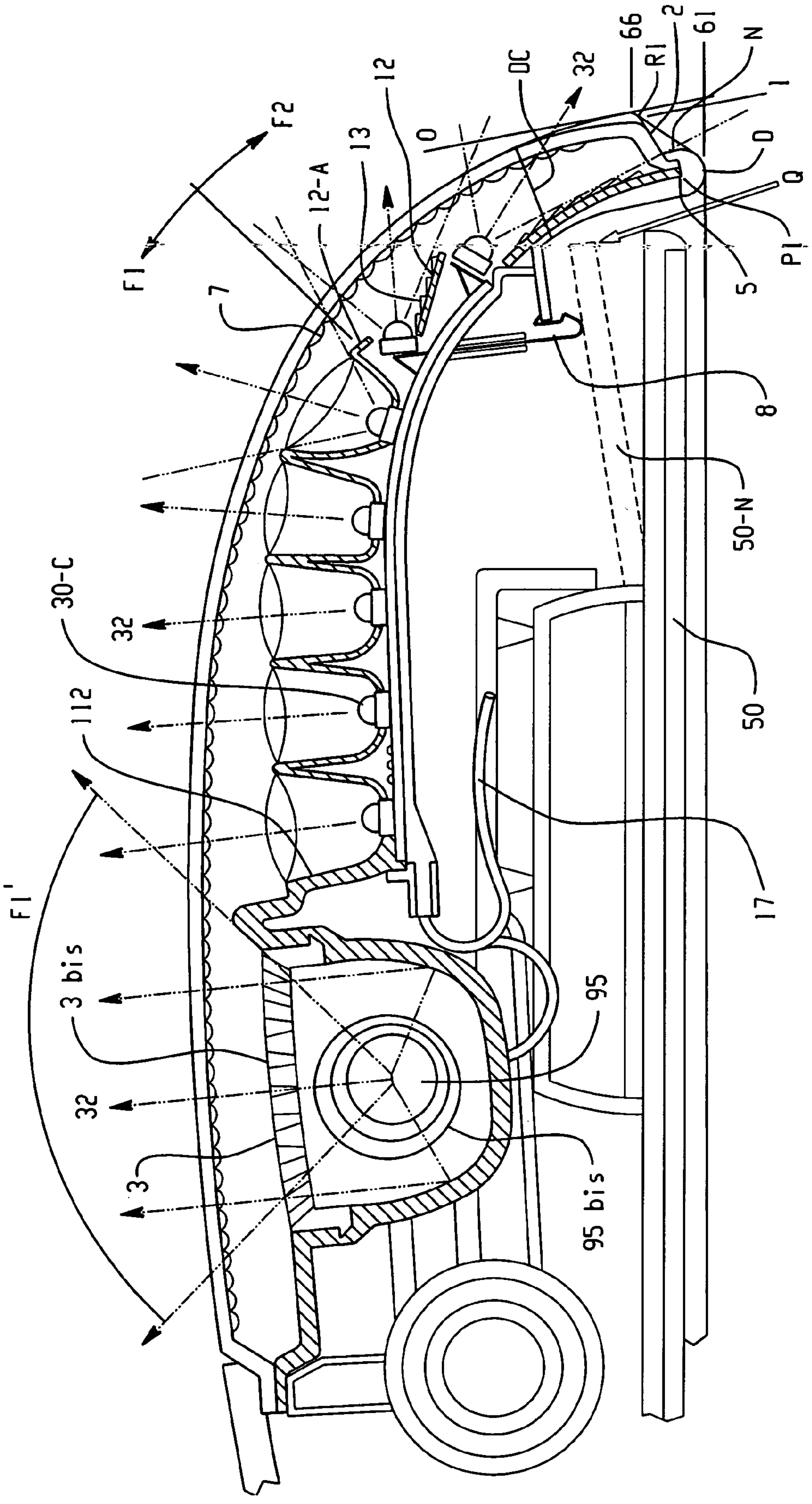

FIG. 109-A is a sectional view BB of module (A).

FIG. 109-B is a detailed view of FIG. 109-A showing front spot (3) with the normally chromed mask (3*bis*), which acts in the front to reflect external light (32*bis*), by reflecting it against (13), and cones (13*bis*) angled at less than 30° with respect to the beam of direct light from (95), which through transmittance and reflection, direct more than 50% of the light from the source to the outside in the form of beams (32) through the mask and lenses or Fresnel (6), without the colour of source (95) or its filter (95*bis*) being visible from the outside.

FIG. 110 shows the mirror assembly according to FIG. 108, but the source of front spot (3) produces output in a downward direction, with the assembly comprising a combined module (A+B) having a common source.

FIG. 111 is a minimum size, combined module (A+B) with a common source comprising a bulb and complementary signal (4) and photo sensors (25-A-B).

FIG. 112 is a sectional view AA of FIG. 111 detailing mask (3*bis*) of signal (A) which, for the same bulb, emits a different coloured light to that emitted in function (B), without this difference being noticeable from the outside, since the mask has a uniform chromed appearance. The attachment to (P1) on the edge of (D) and lower screw (9), are shown.

FIGS. 113-A-B detail the catadrioptic effect produced when external light (32*bis*) is reflected in prisms (155) on surface (1) and a machined element which, in turn, allows internal light (32) to pass through points or planes (170) of frustopyramidal elements (160), thus producing two types of light, direct and reflected, on surface (1-A).

Figure 114:
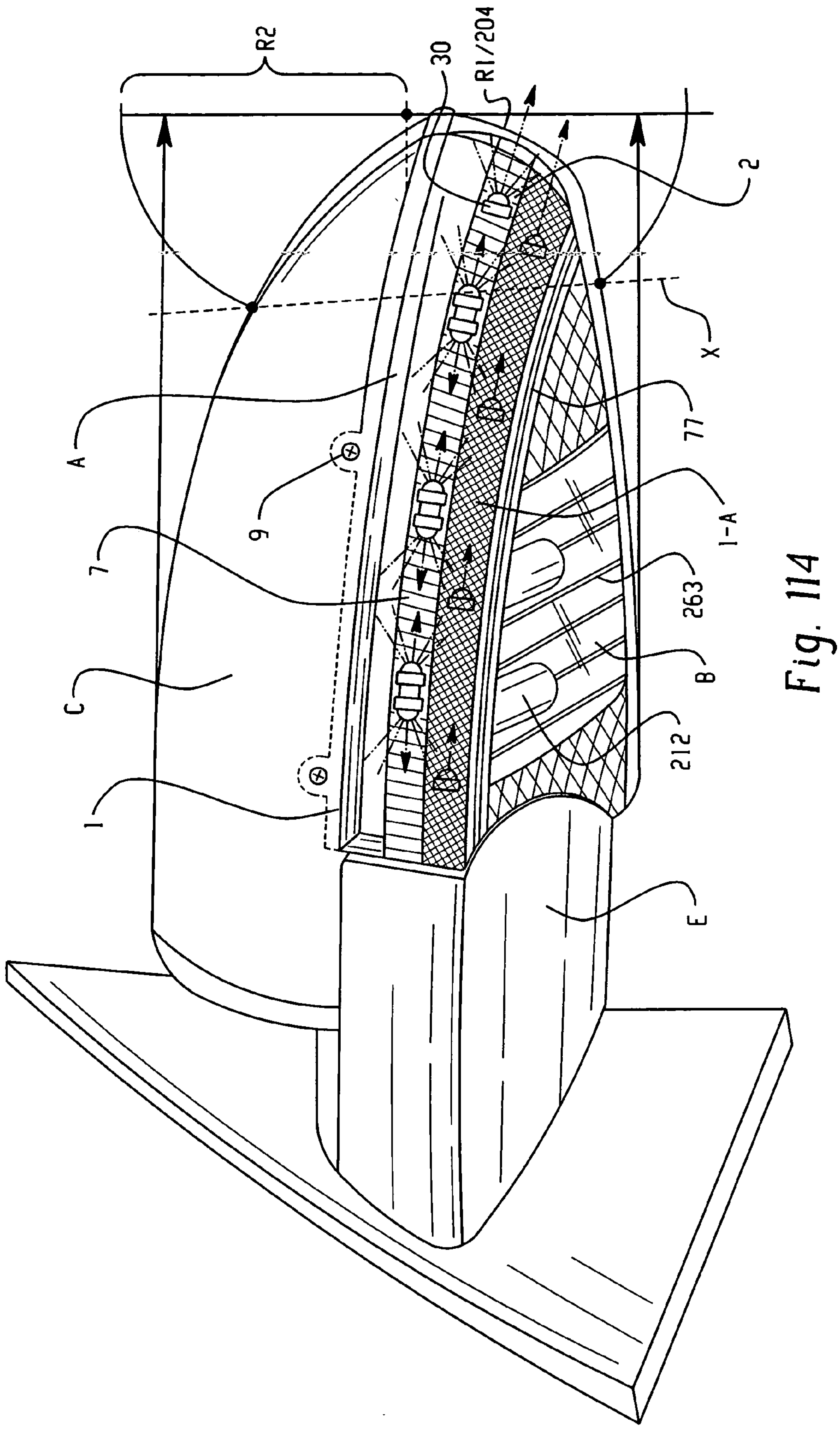

FIG. 114 is a view of the combined module (A+B), comprising an axially arranged LED source, reflected by collimator and surface (1) together with catadrioptic band (1-A), and double bulb for part (B), and showing the attachment which can be accessed at the front by removing cover (C); and horizontal bands (77) or internal split-levels of (1) to avoid colouring or transmitting the light from one function to another.

FIG. 115 is a sectional view AA of the combined module (A+B) where external surface (1) is an integral part and internal housing (10) is an integral part, showing bands (77) and the attachment between (P1) on point or edge (5) and the access underneath cover (C) to screws (9).

FIG. 116 is a version of FIG. 114, with module (A+B) having a light guiding element (150), seen as a whole, and photodiode sensors (25-A-B).

Figure 117:
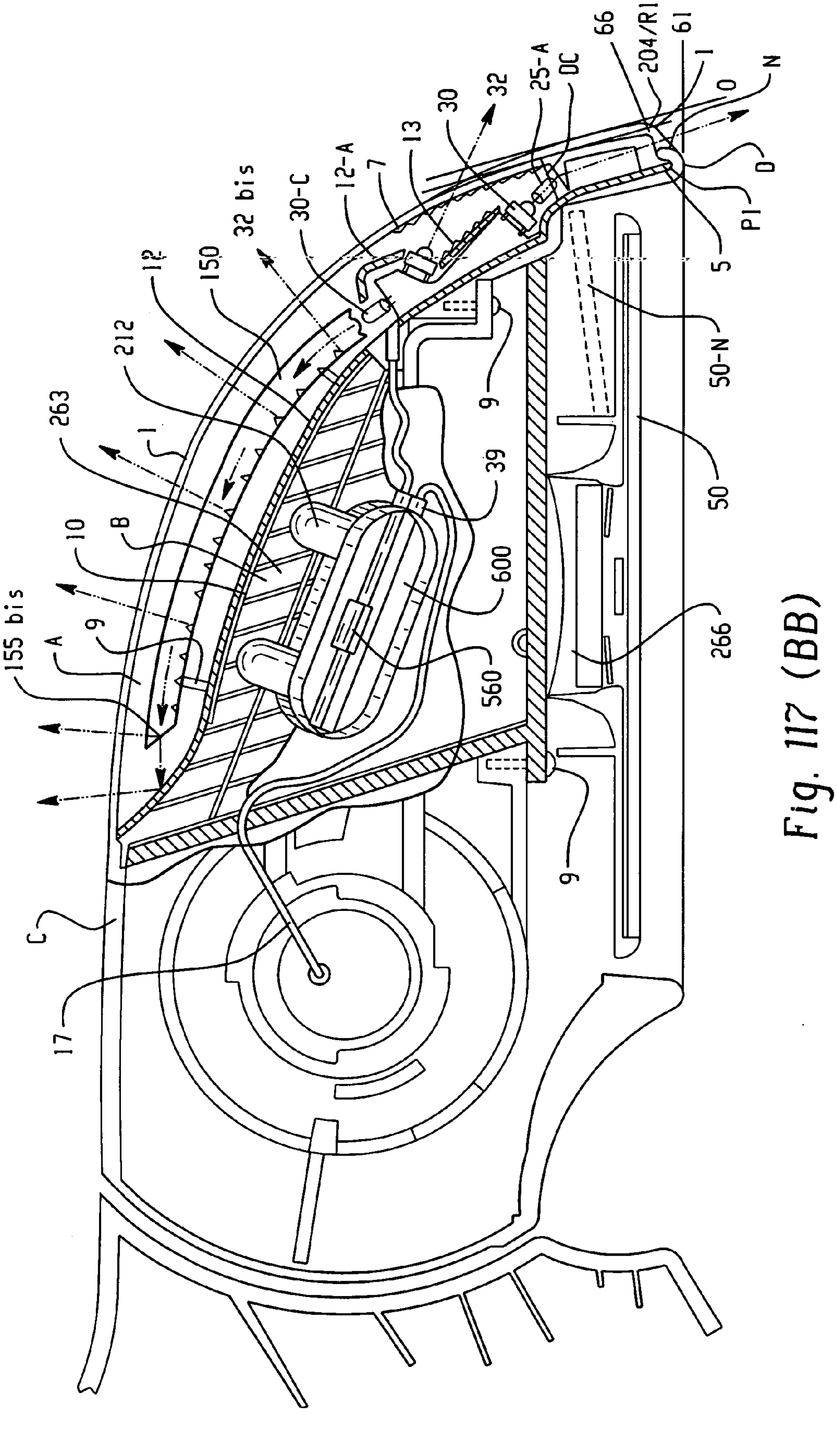

FIG. 117 is a sectional view BB of FIG. 116 showing double lamp support (600) with ventilation (560), for part (B) and maintenance access for (9) by removing mirror glass (50).

FIG. 118 is a view of module (A+B) in the vertical direction, comprising a light guiding element containing prisms in spiral arrangement (155), and a mixed circuit comprising bulb+LED (horizontal and vertical (30-C)) together with photodiode sensors.

FIG. 119 is a detailed sectional view CC of the spiral prism arrangement (155) for directing the light to area (F1) on guiding element (150) and remaining light output (155*bis*), and showing the LEDs and sensors in area (F2).

Figure 120:
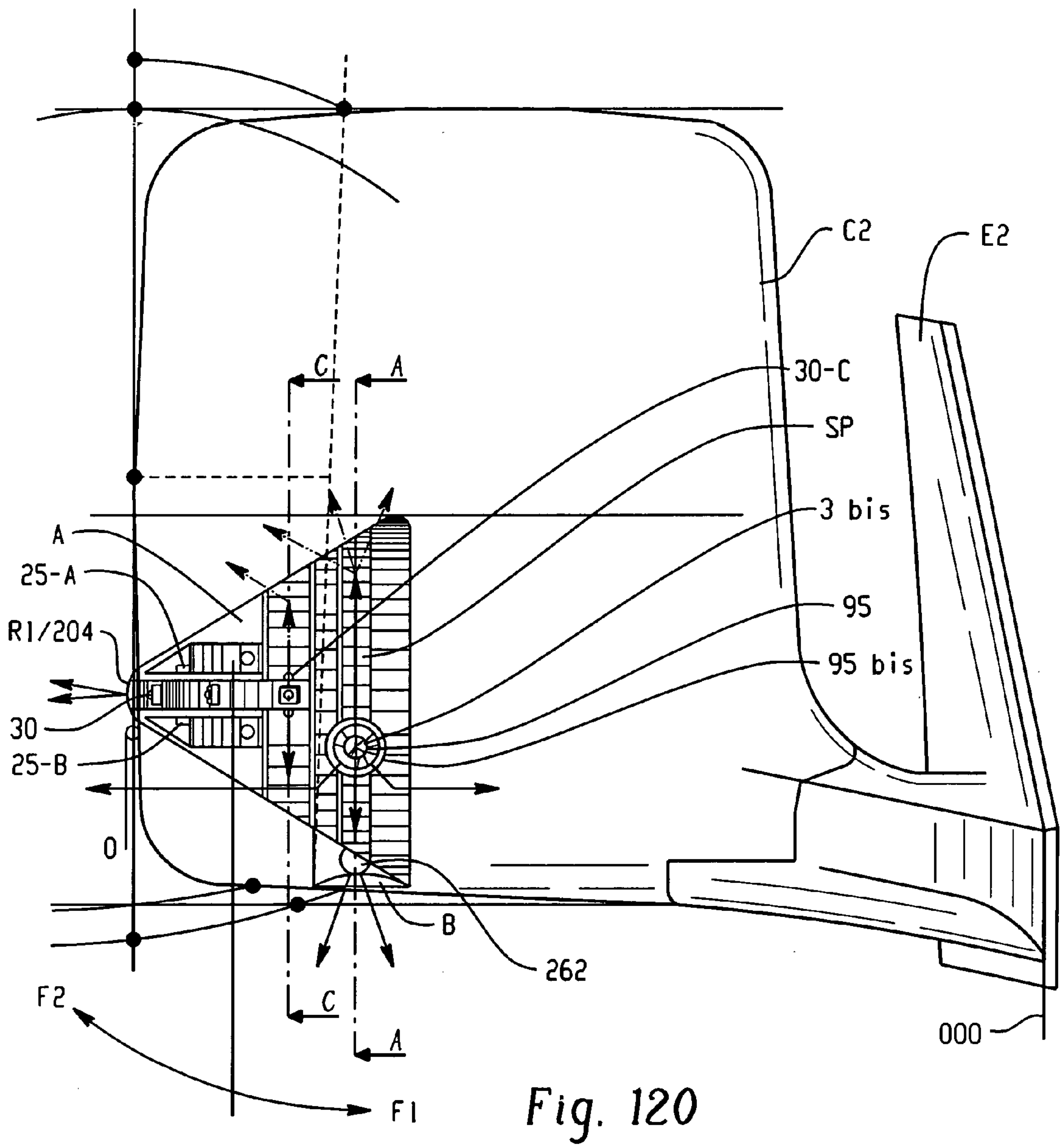

FIG. 120 is a view of module (A+B) in the vertical direction, with the direct, indirect light being reflected by collimator (12), and showing the mixed circuit comprising bulbs (95) with mask (95*bis*) for (A) and (262) for (B), and also showing LEDs and photodiodes (25-A-B) for area (F2).

FIG. 121-A is a vertical sectional view CC of module (A+B), as seen in FIG. 120.

FIG. 121-B is a vertical sectional view AA of module (A+B), as seen in FIG. 120, showing the chromed, reflecting mask (3*bis*) for concealing bulb (95) and producing direct-reflected light output in the axial direction which is collected by collimator (13) which has progressively facing surfaces, producing output (32*bis*). Anti-colouring bands (77) and an external part (1) are also indicated, together with internal part (10) and double lamp support (600) having air inlet in (266) and outlet in (560).

FIG. 122 is a view of the combined module (A1+B) on support (E), seen as a whole.

FIG. 123-A is a sectional view BB of the combined module (A1+B) with bulbs on support (E), as seen in FIG. 122, showing the use of double lamp support (600), and the attachment providing access to (9) by rotating the body of the mirror, and the channel of air with inlet in (266) and outlet in (560).

FIG. 123-B is a sectional view BB of the mixed circuit of combined module (A1+B) on support (E), showing projections (K) equivalent to those applicable to module (A), the use of LEDs for signal (A) and a bulb for (B), and also photodiodes (25-A-B) and temperature probe sensors (T1).

FIG. 123-C is a sectional view AA of FIG. 123-A, showing bands (77).

FIG. 124-A is a view of combined module (A2+B), seen as a whole, where (A) is understood to be (A2) as it is underneath (B) on the door attachment support (E), with this module fulfilling the same signal and light projection conditions.

FIG. 124-B contains section AA of FIG. 124-A and shows that (1) and (10) is one integral part, while also illustrating projection (K1), anti-colouring bands (77), catadrioptic reflecting part (3), temperature probe (T1), and the attachment with maintenance access by rotating the mirror body.

Figure 125:
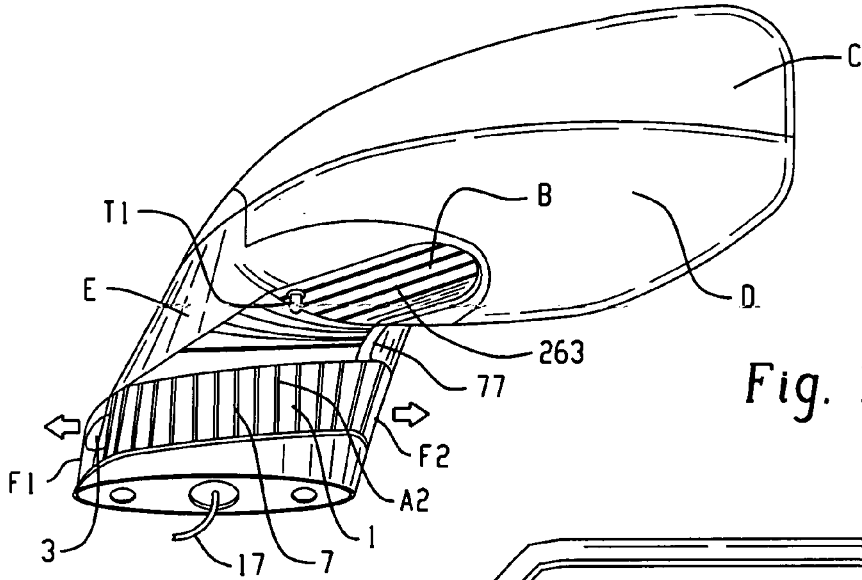

FIG. 125 is a view of combined module (A2+B), seen as a whole on the door attachment arm of a sports car type mirror, which can be fixed or rotational.

Figure 126A:
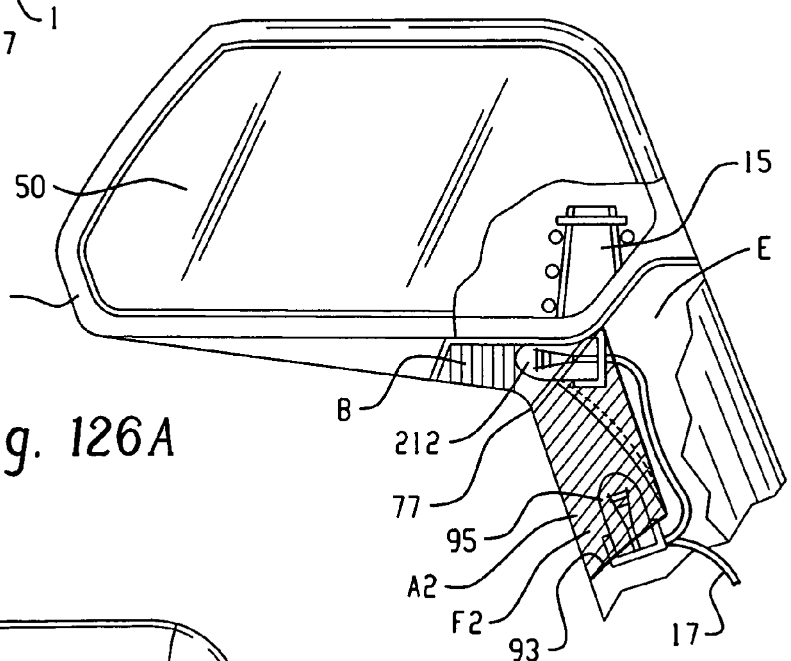
Figure 126B:
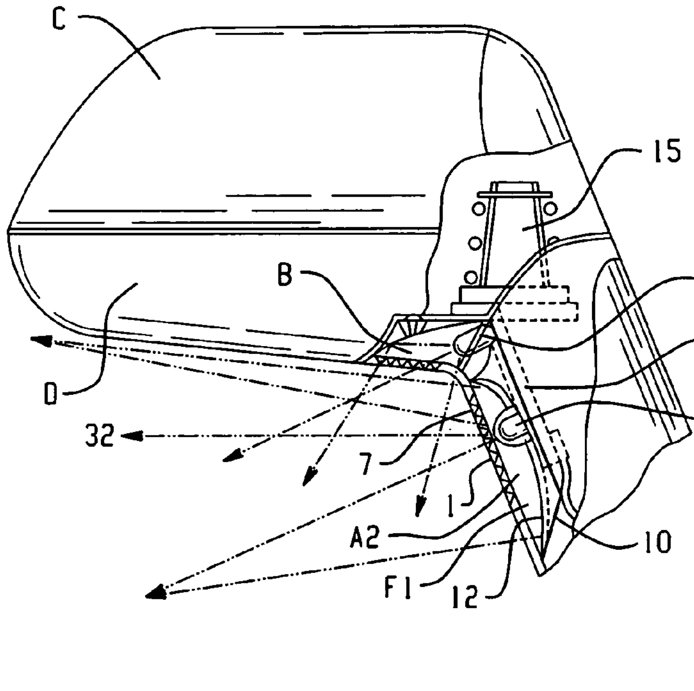

FIGS. 126-A-B are detailed front and back views of module (A2+B) of FIG. 125, a bulb version showing that the module normally fulfils functions (F1) and (F2). Anti-colouring bands (77) are also shown.

Figure 127:
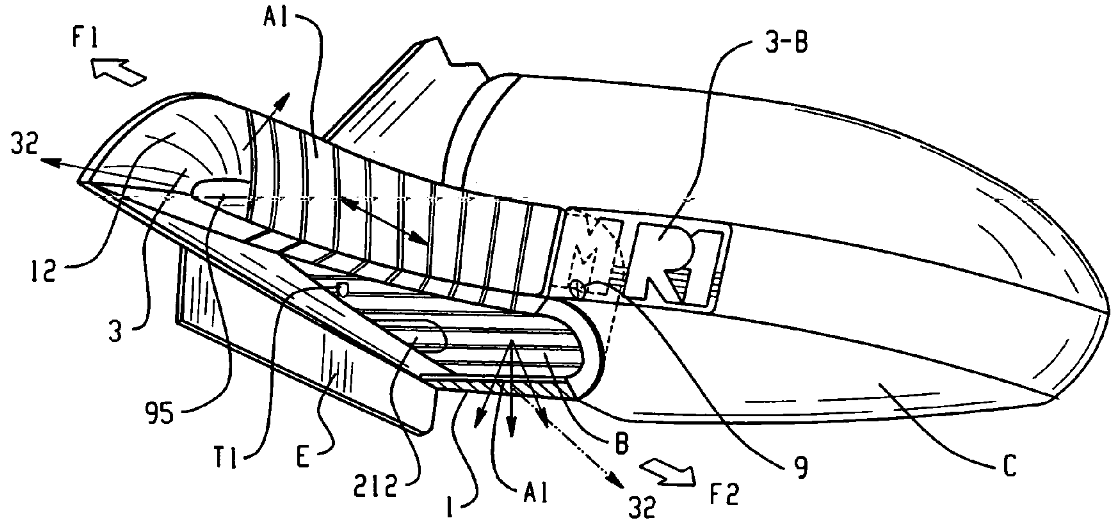

FIG. 127 is a view of combined module (A1+B) with front spot, seen as a whole and including a view of part (B).

FIG. 128 is a sectional view BB of module (A1+B) of FIG. 127, showing a mixed circuit comprising a bulb for (B) and LEDs for (A1), functions (F1) and (F2), the connector with common negative (39), timer (310), probe (T1), attachment with access to (9) by folding the mirror, front spot (3) with concentrated optic (6) and emitting/receiving IR photodiodes (25-A-B-C).

Figure 129:
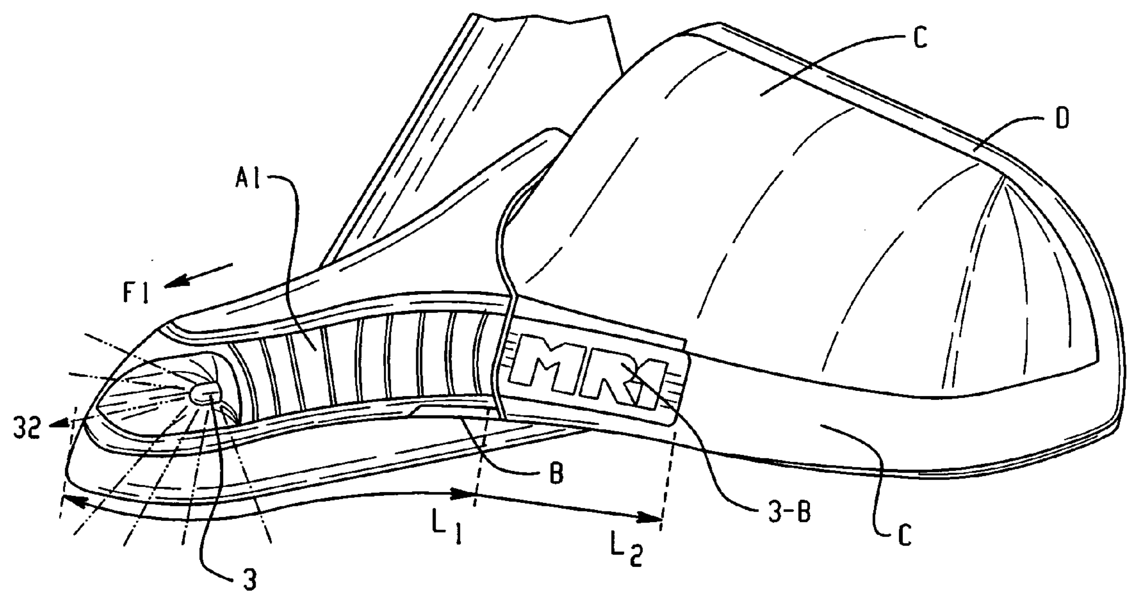

FIG. 129 is a view of combined module (A1+B) with front spot, seen as a whole in perspective from above.

Figure 130:
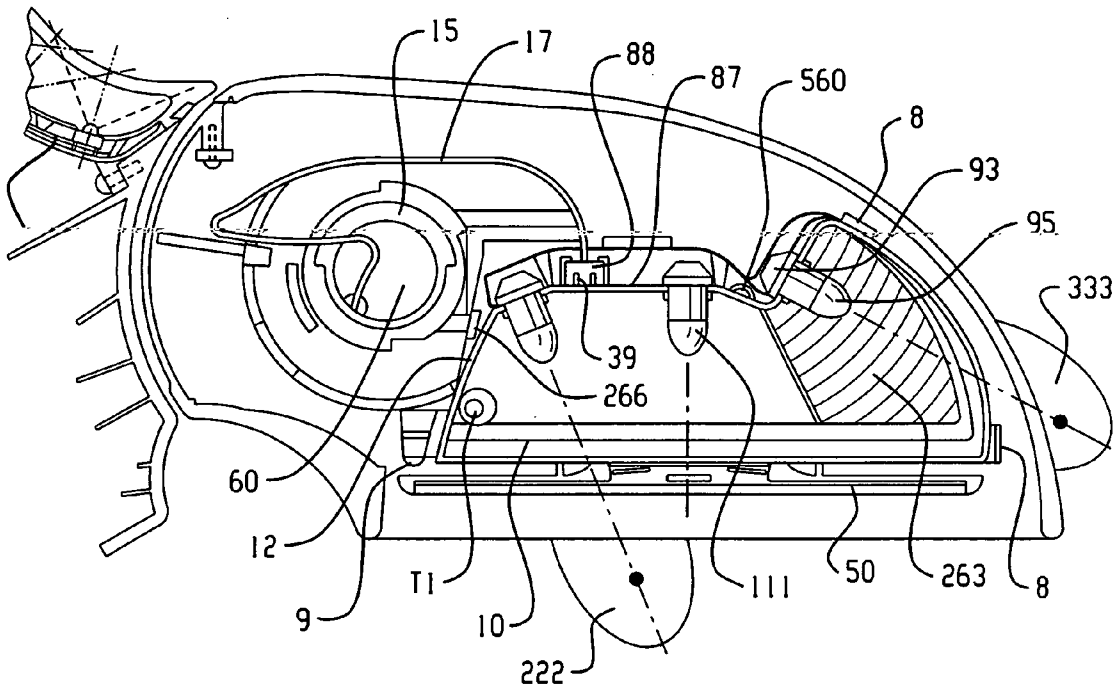

FIG. 130 is a transparent sectional view of module (B) in its fixed version, based on light being dispersed by lamps (95) with various foci, and facing multifoci (111), (222) and (333). Construction is similar to that of module (A+B) illustrated in FIGS. 50, 51 and 72, except that optic (263) is a combined prism.

Figure 131:
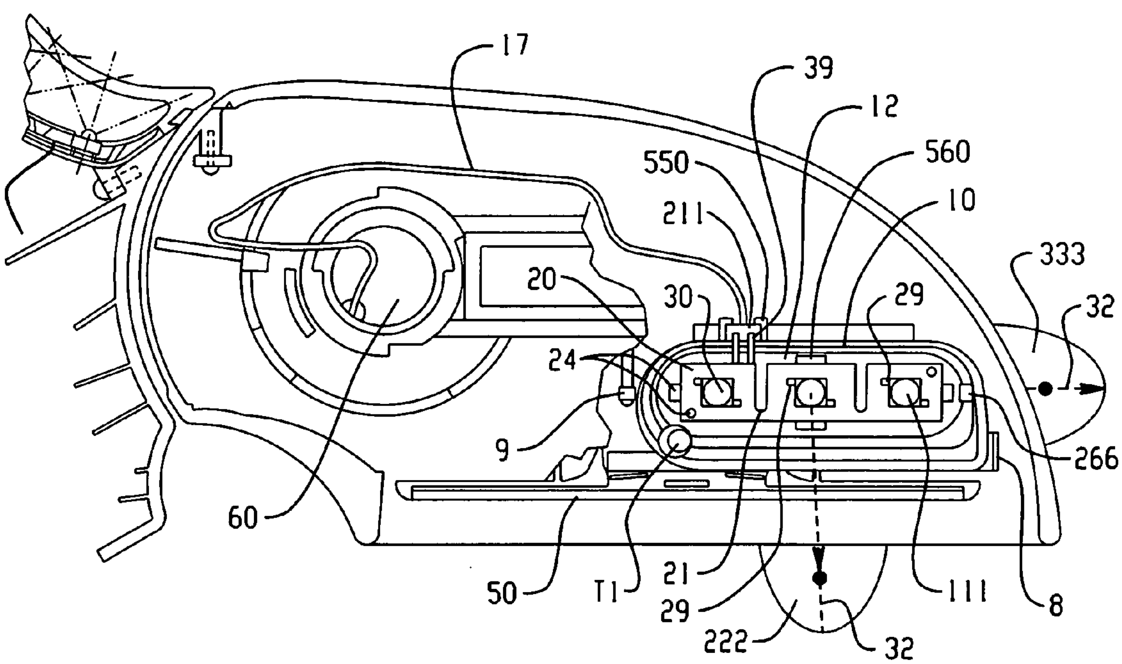

FIG. 131 is a transparent sectional view equivalent to FIG. 130, but provided with high brightness LEDs. It shows details of the metal light diffusing base in circuit (20,) provided with slits (21) for directing the LEDs according to focal centres (111), (222) and (333).

Figure 1:
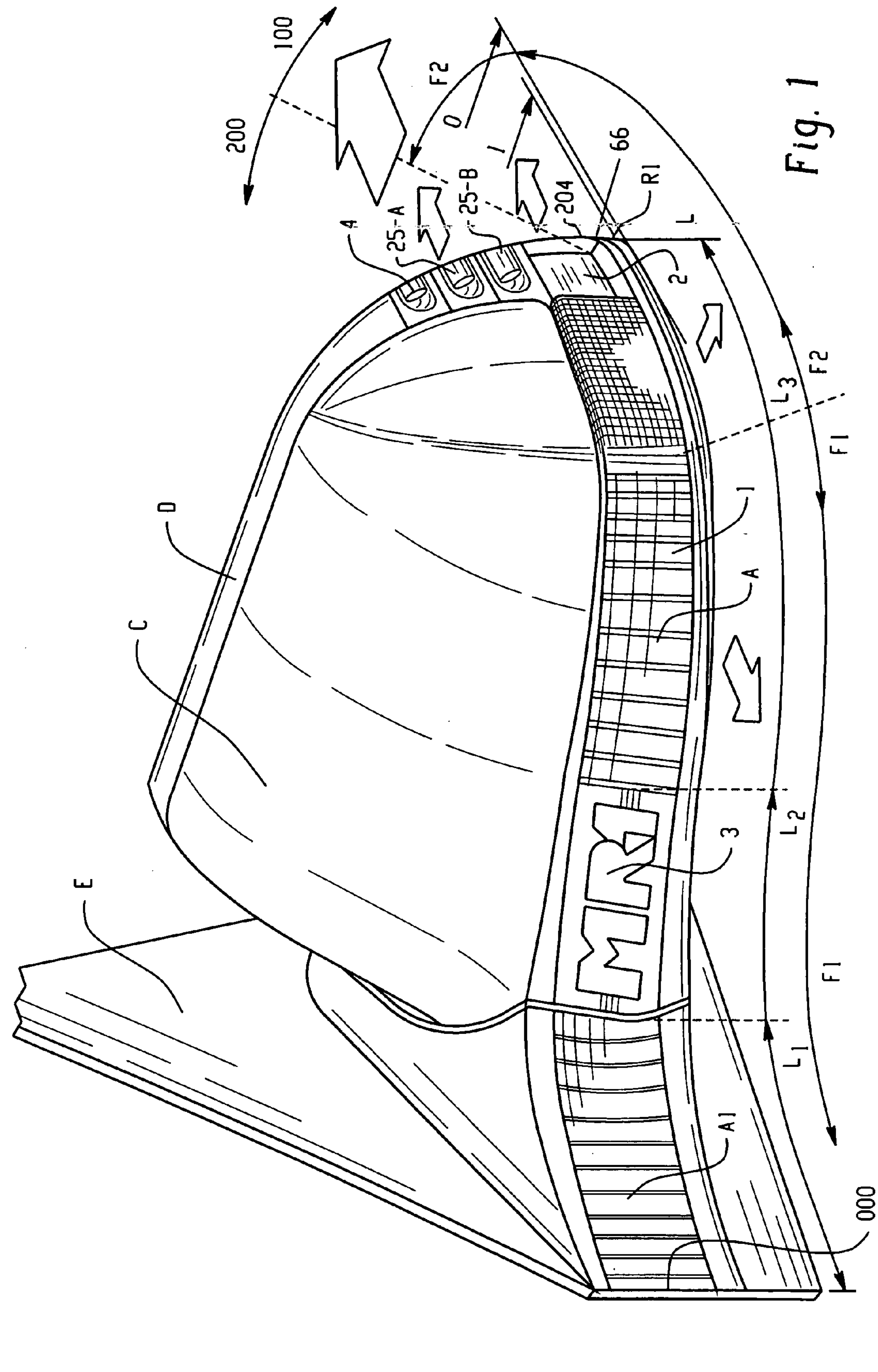
FIG. 1 is a front, main view of the product, showing the position of the modules, their extension and basic shape and output areas for the various signals and functional areas (F1) and (F2). The initial area (00) is visible in module (E), the end external areas (204, (66); the protection projection (0).
Figure 2:
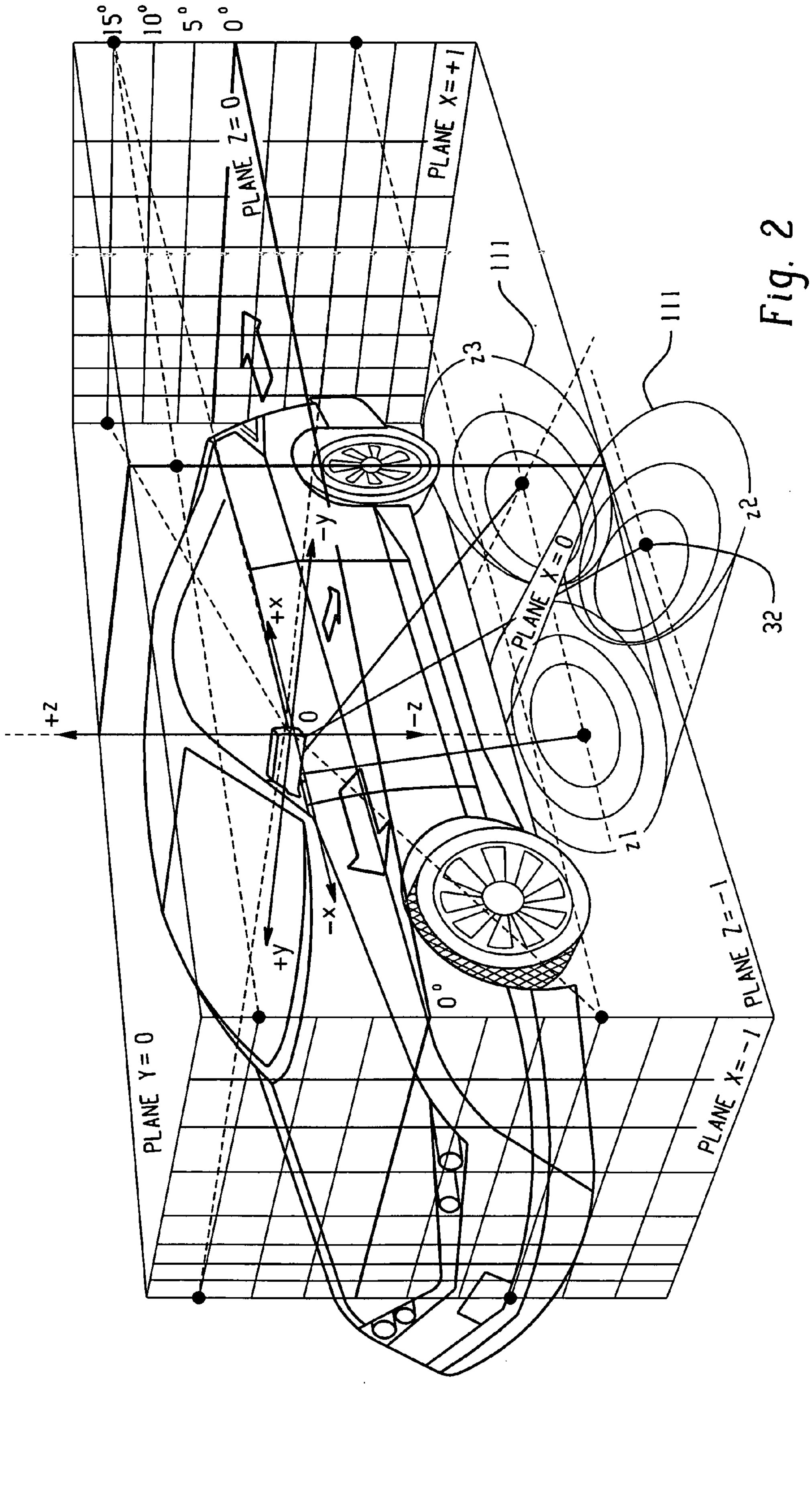
FIG. 2 is a view from above the vehicle of the signal planes.
Figure 3:
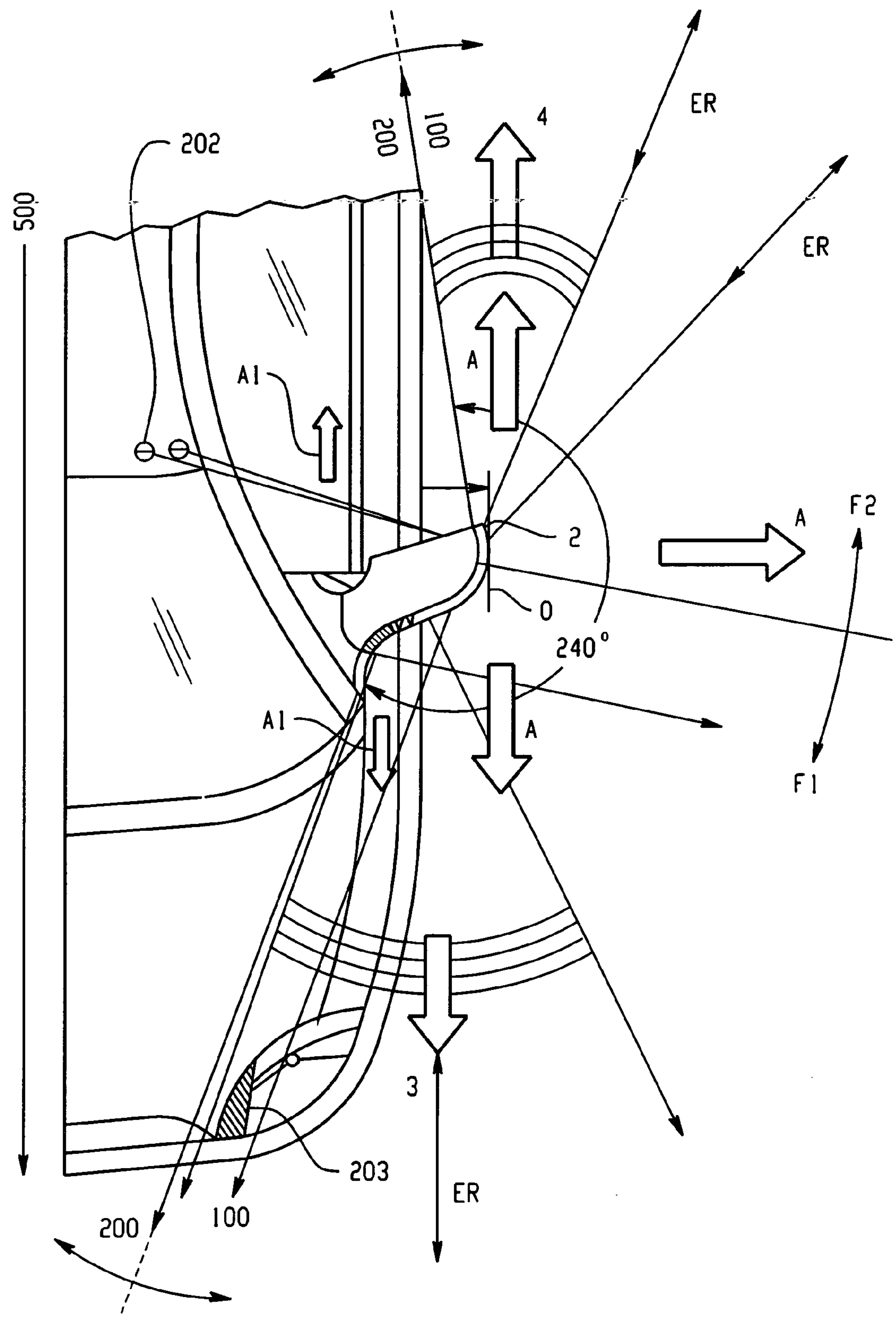
FIG. 3 is a plan view of signal projection, sensor reception, and the driver's field of vision (202).
Figure 4:
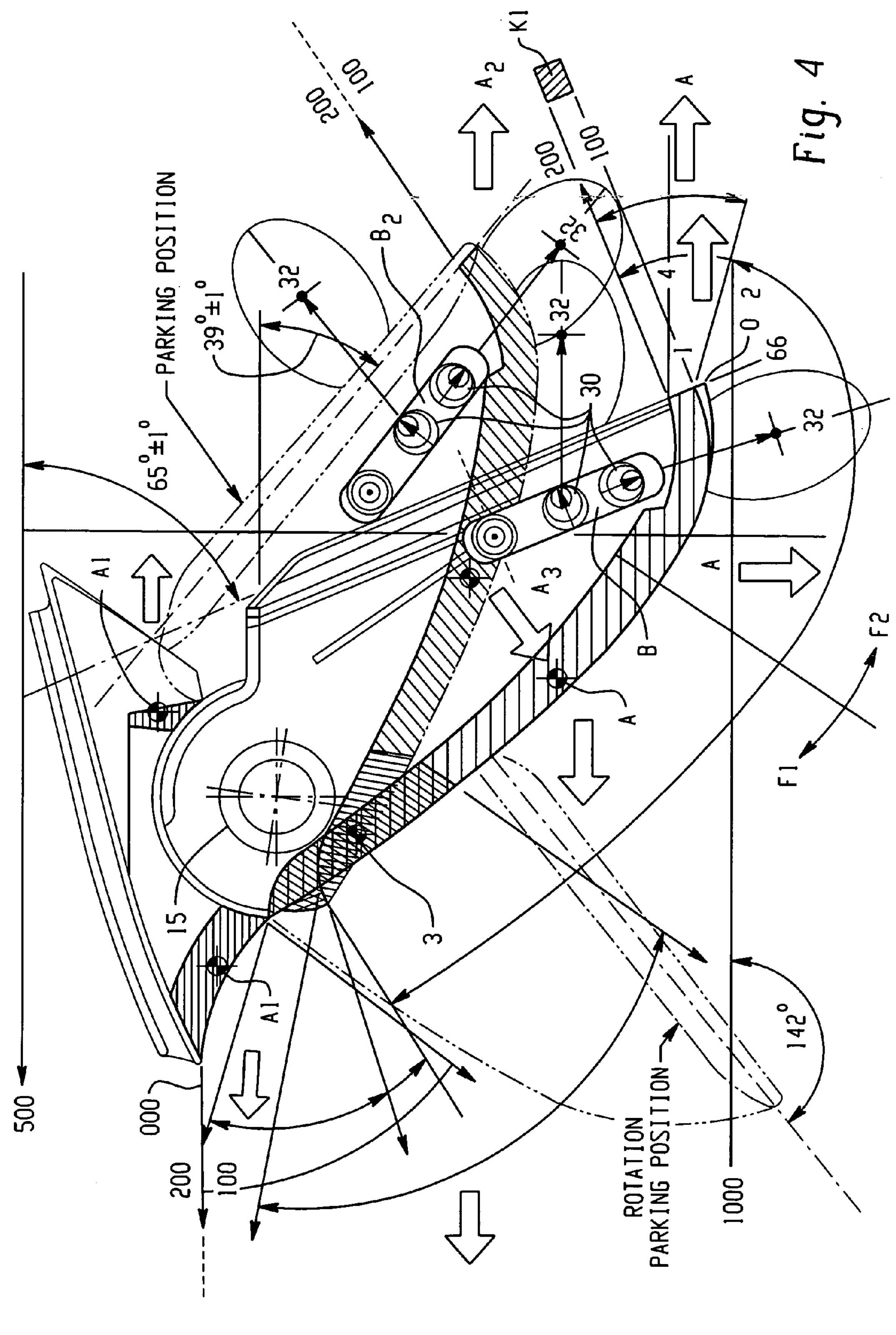
FIG. 4 is a detailed view of signal projection (A, A1 and B) which still operate even when the mirror is folded.
Figure 5:
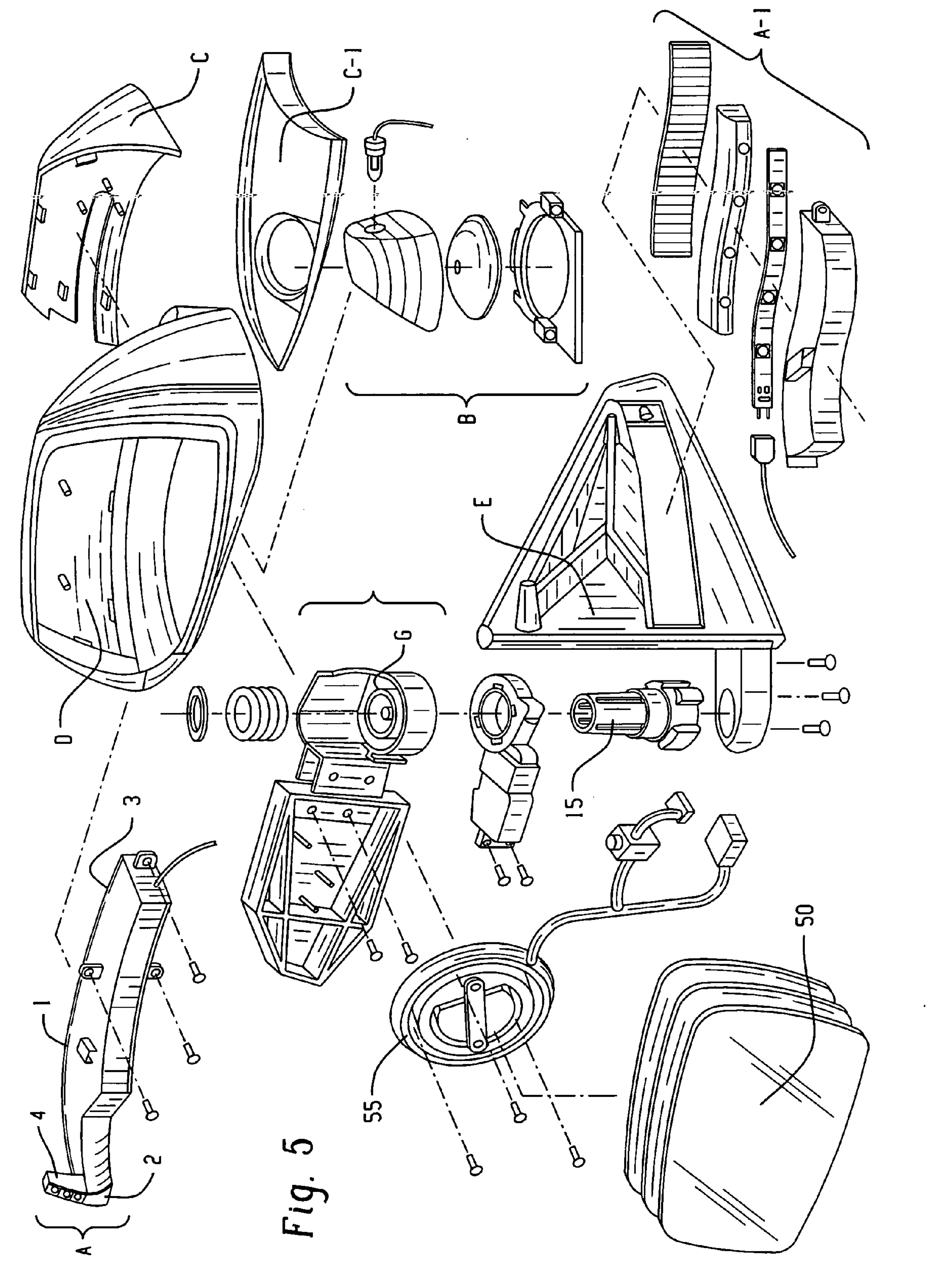
FIG. 5 is an enlarged, separational view of the interchangeable modules, showing how a module can be divided into two parts (C, C1).
Figure 6:
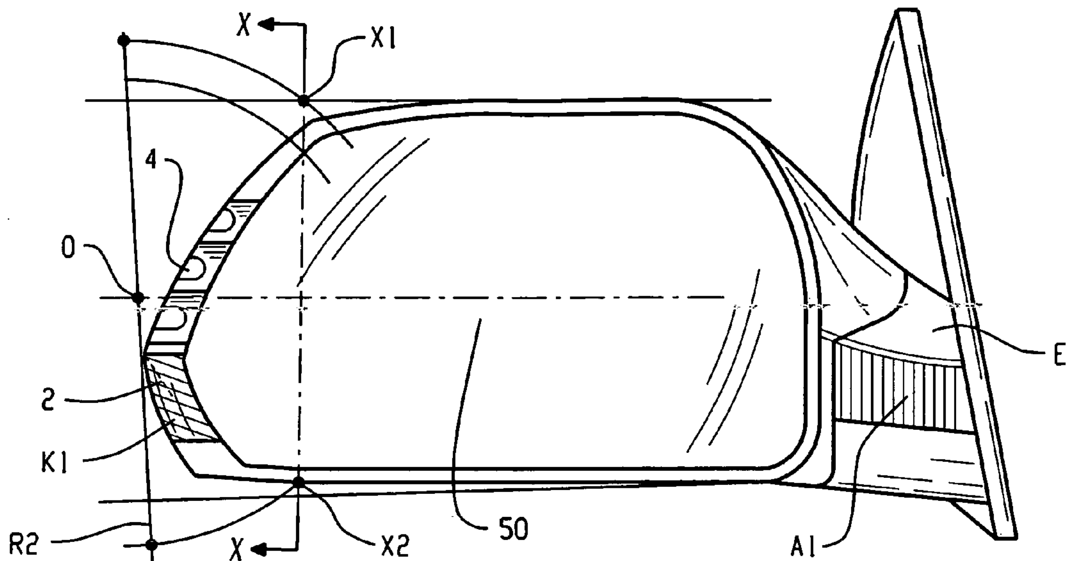
FIGS. 6 and 7, front and rear views and basic sections AA and BB. Position of sensors (25-A, B, C) and submodule (4), definition and location of end area (K1).
Figure 7:
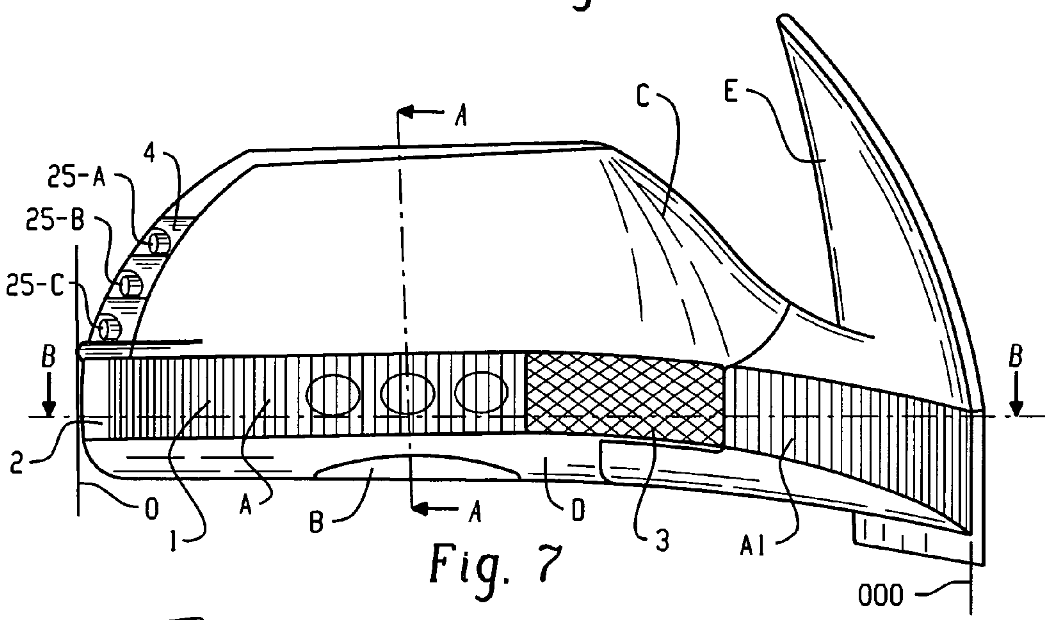
Figure 8:
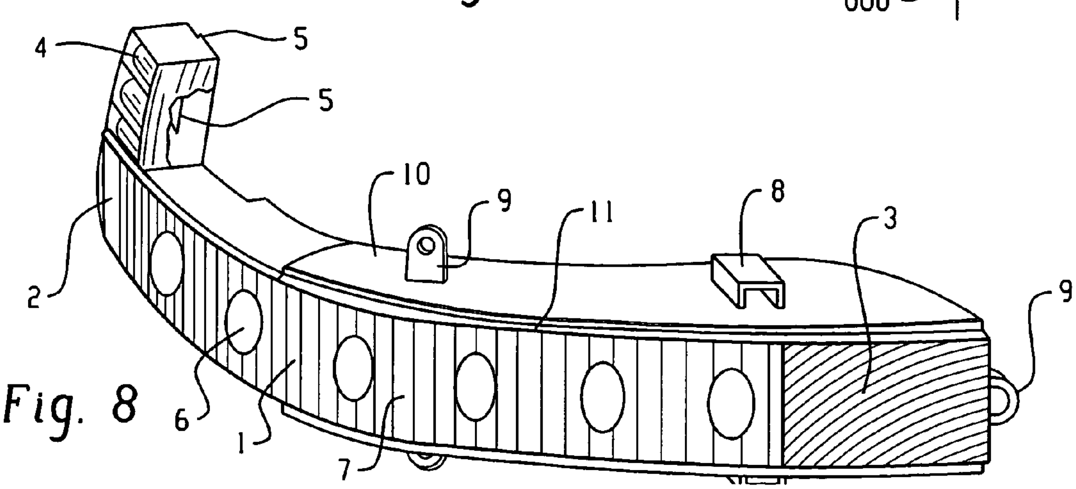
FIG. 8, shows external details of module (A) and light outputs (1), (2), (3) and (4).
Figure 10:
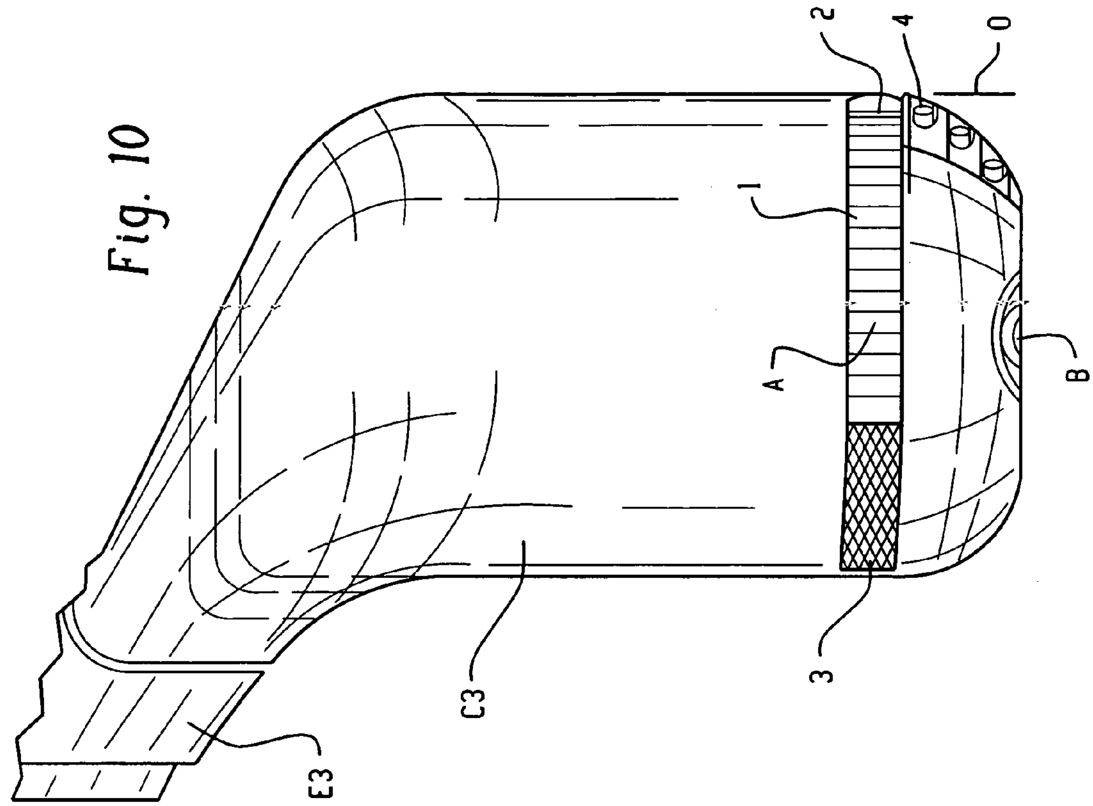
FIGS. 9 to 13 show composition and design options for different vehicles.
Figure 9:
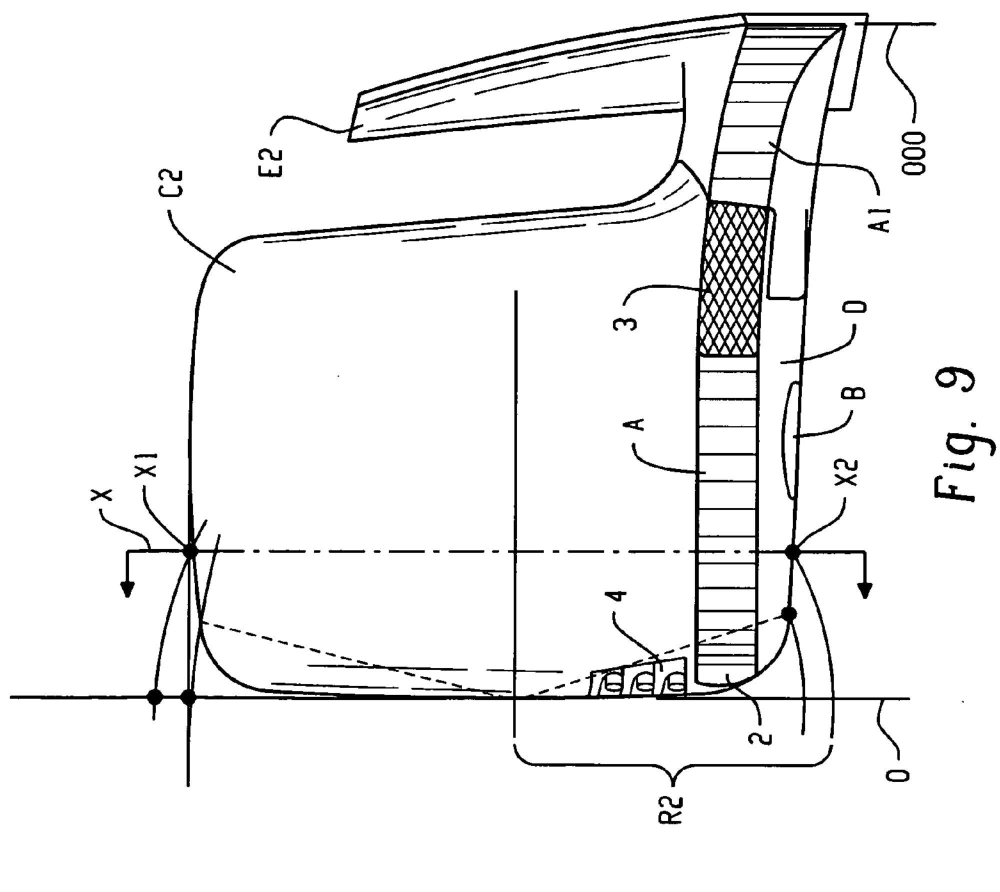
Figure 11:
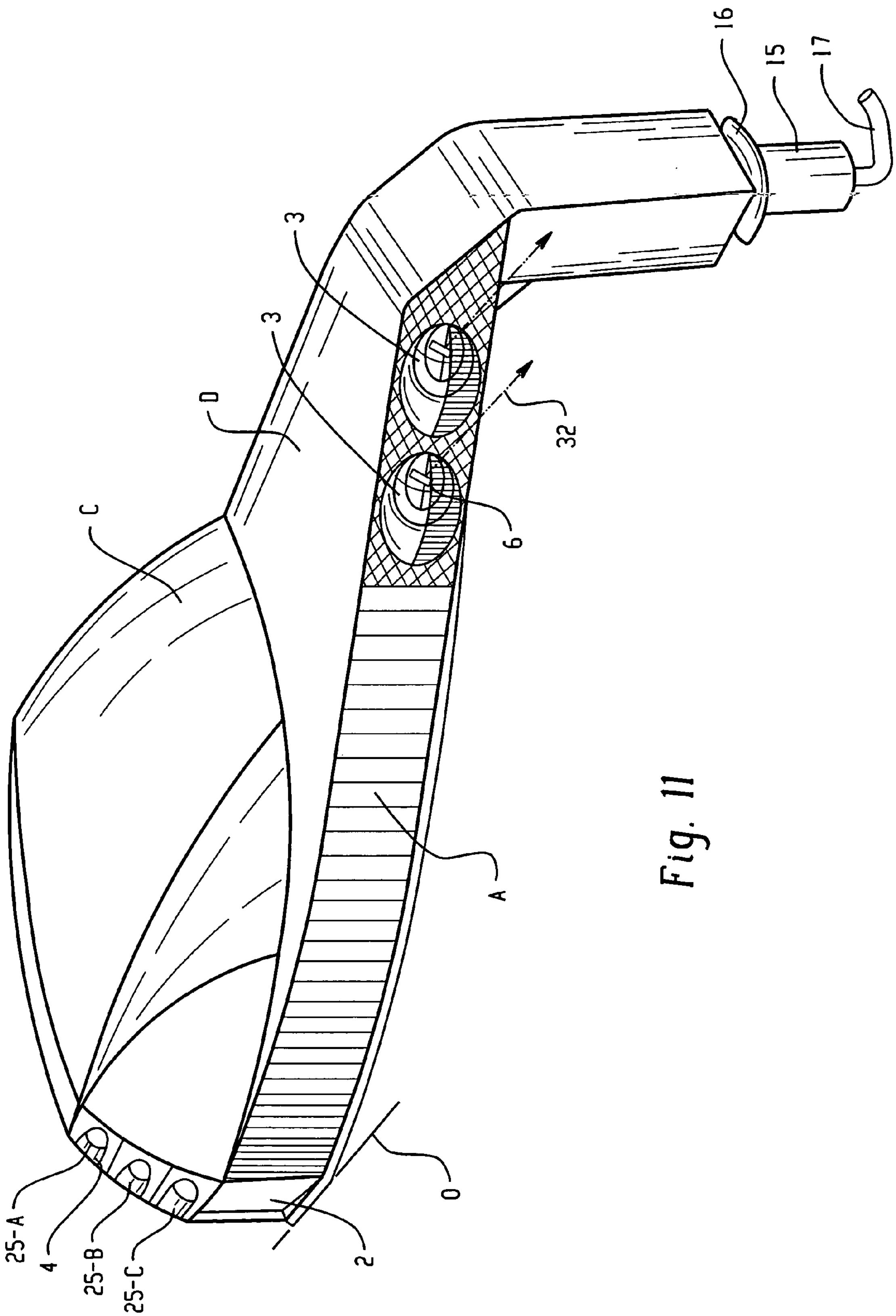
Figure 12:
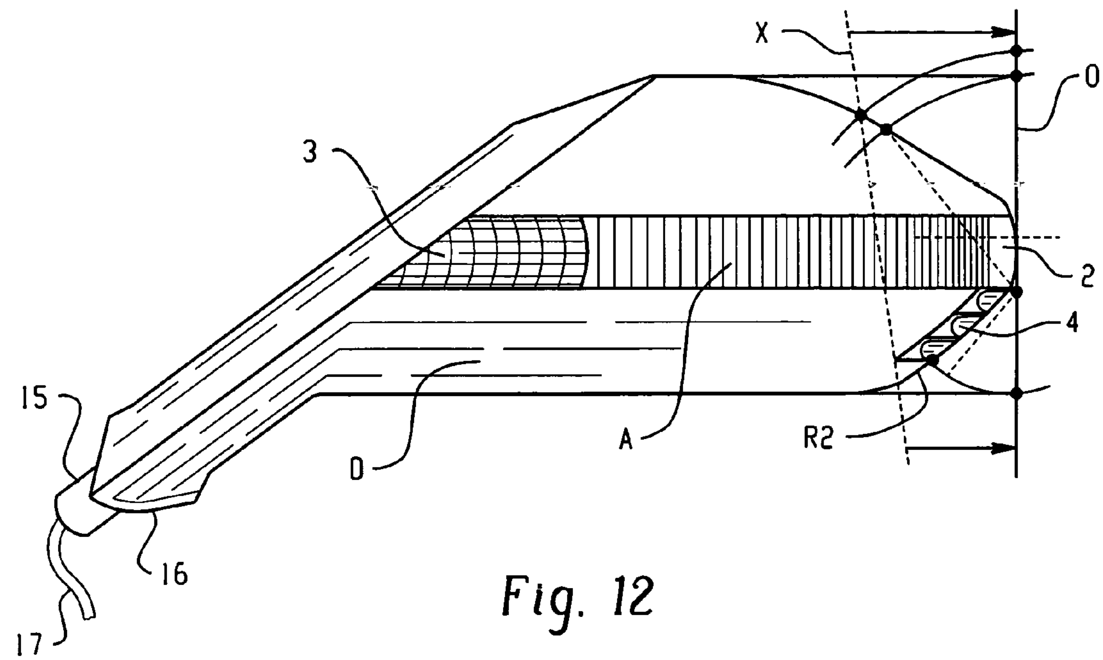
Figure 13:
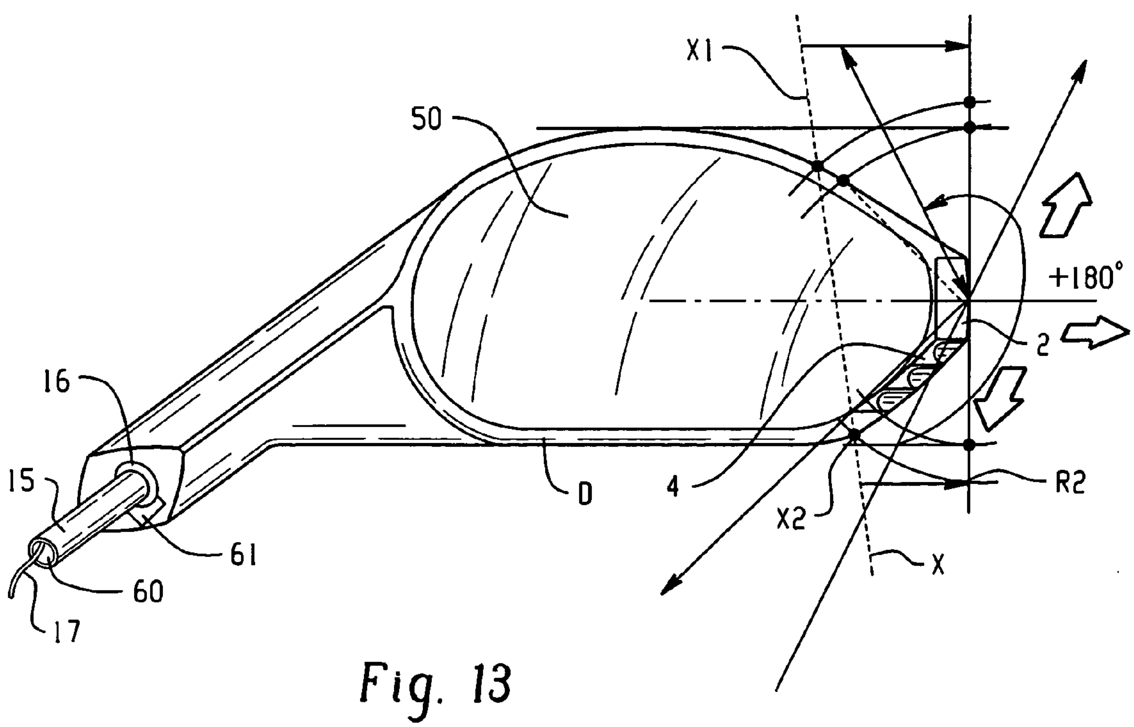
Figure 14:
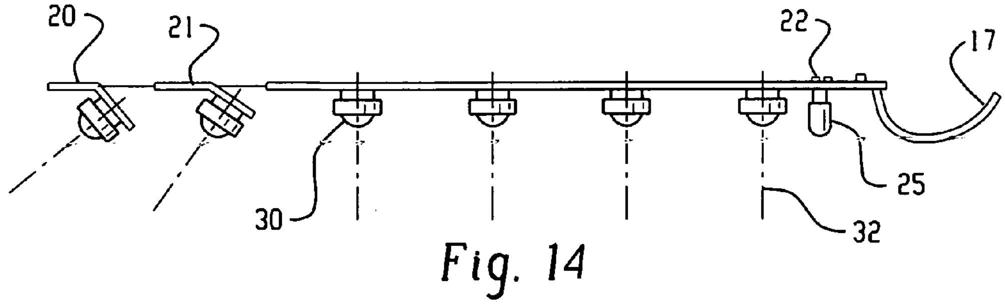
FIGS. 14 to 19 show the basic details of the flexible circuit.
Figure 15:
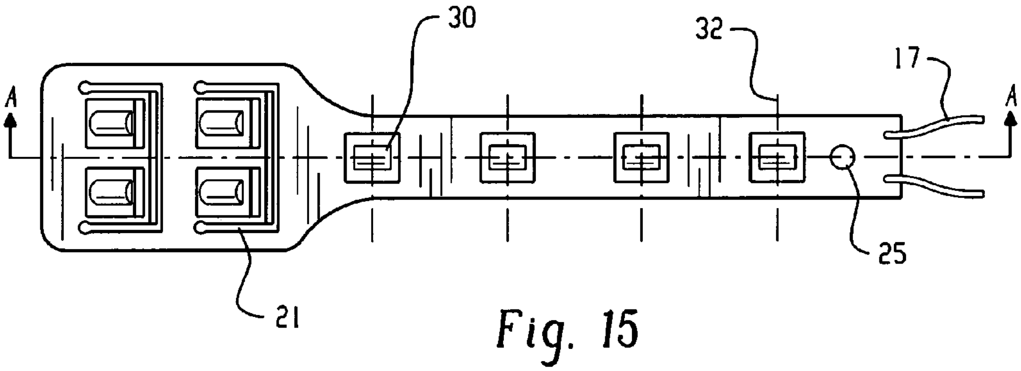
Figure 16:
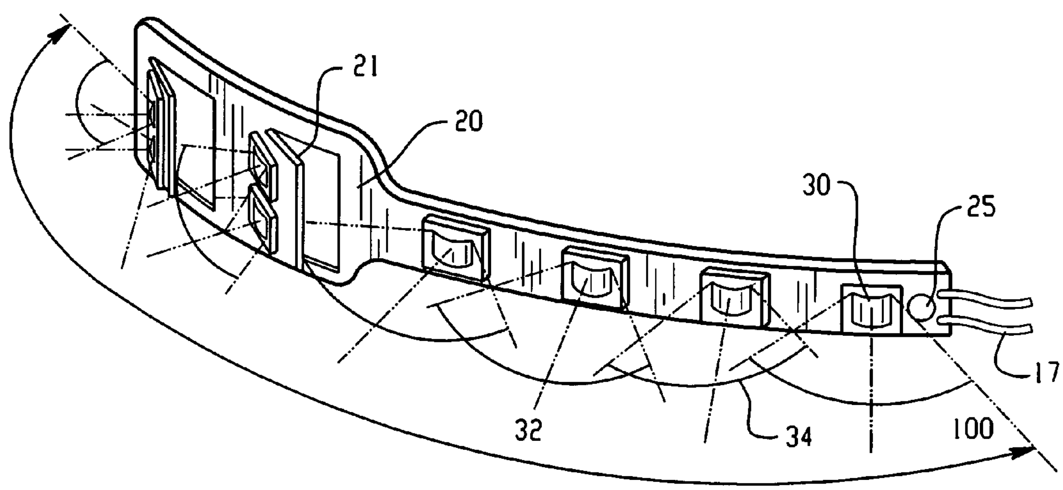
Figure 17:
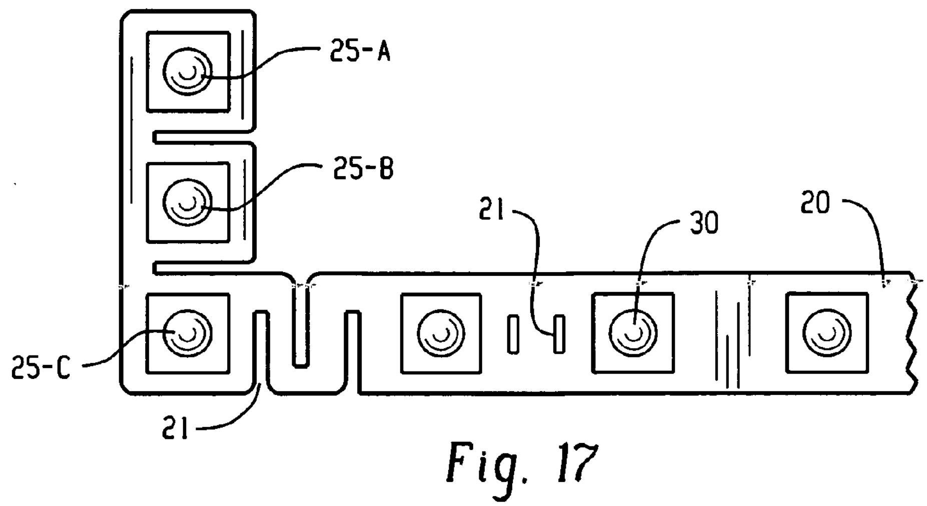
Figure 18:
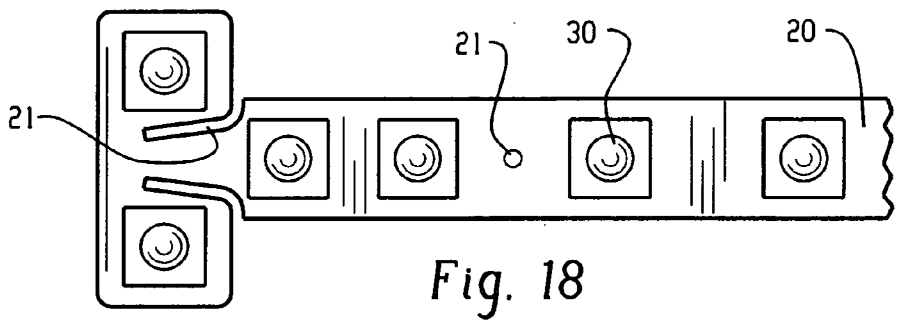
Figure 19:
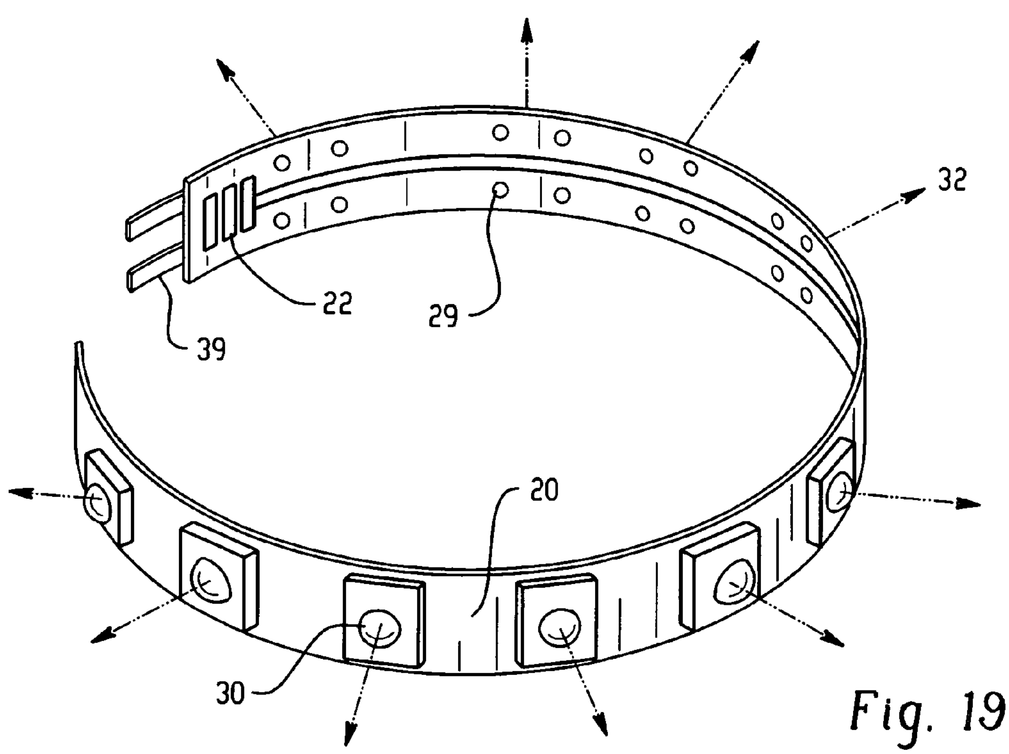
Figure 20:
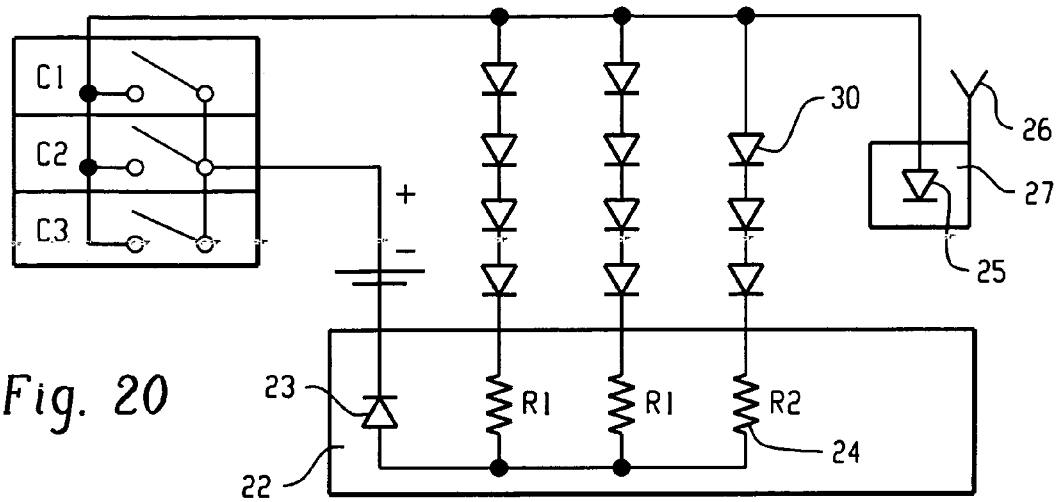
FIG. 20 is a basic diagram of the flexible circuit, components (30) and protection circuit (22) and commands (C1, C2 and C3).
Figure 21:
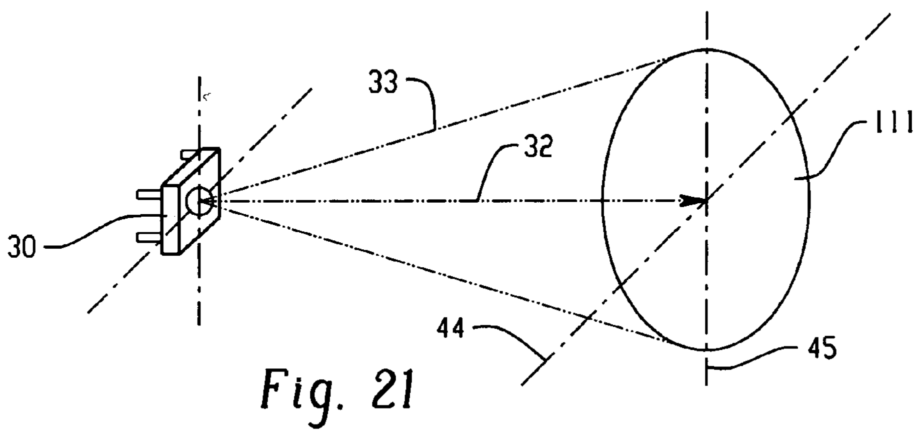
FIGS. 21 and 22 are a comparison of light projections from LED (111).
Figure 22:
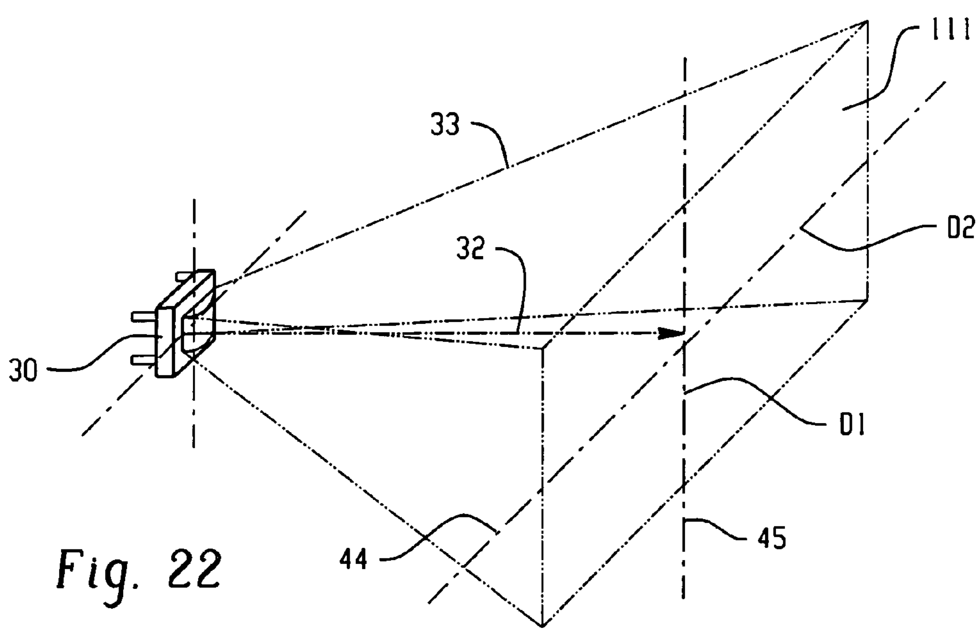
Figure 28:
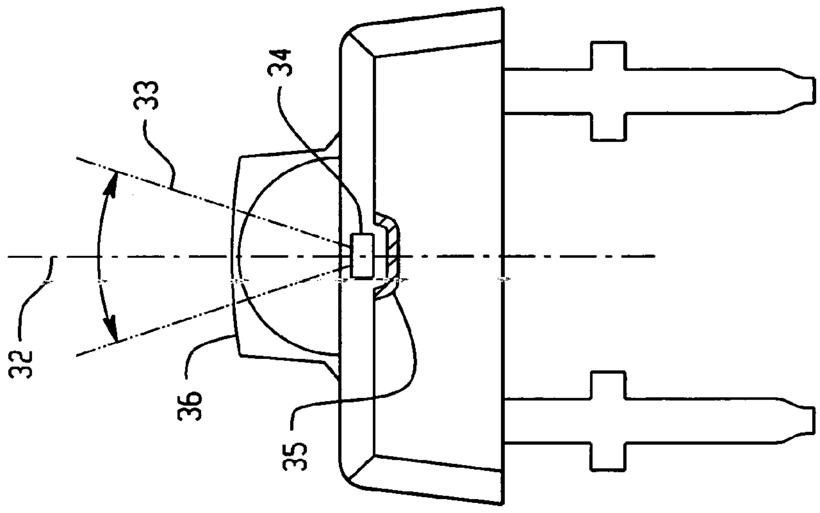
Figure 27:
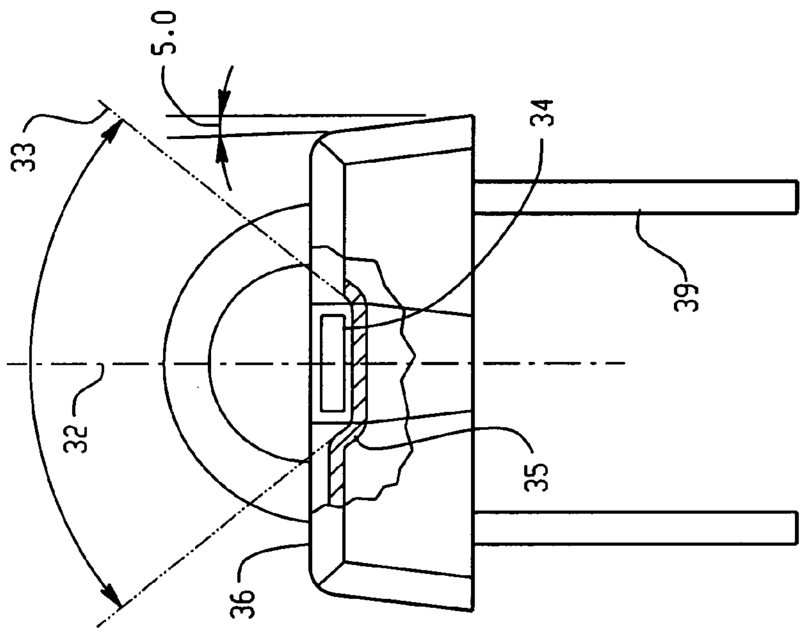
Figure 26:
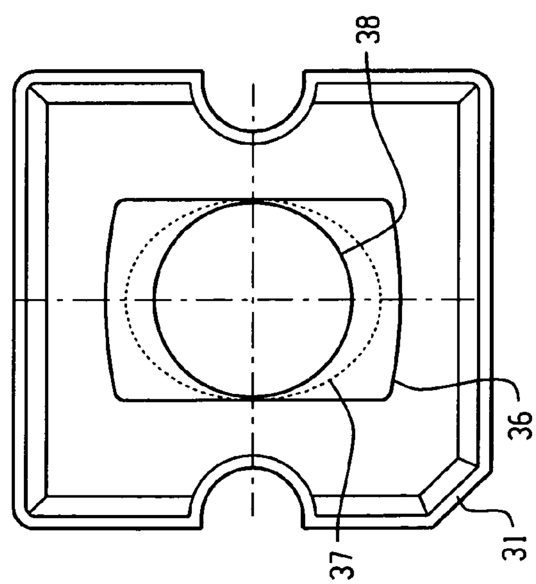
Figure 29:
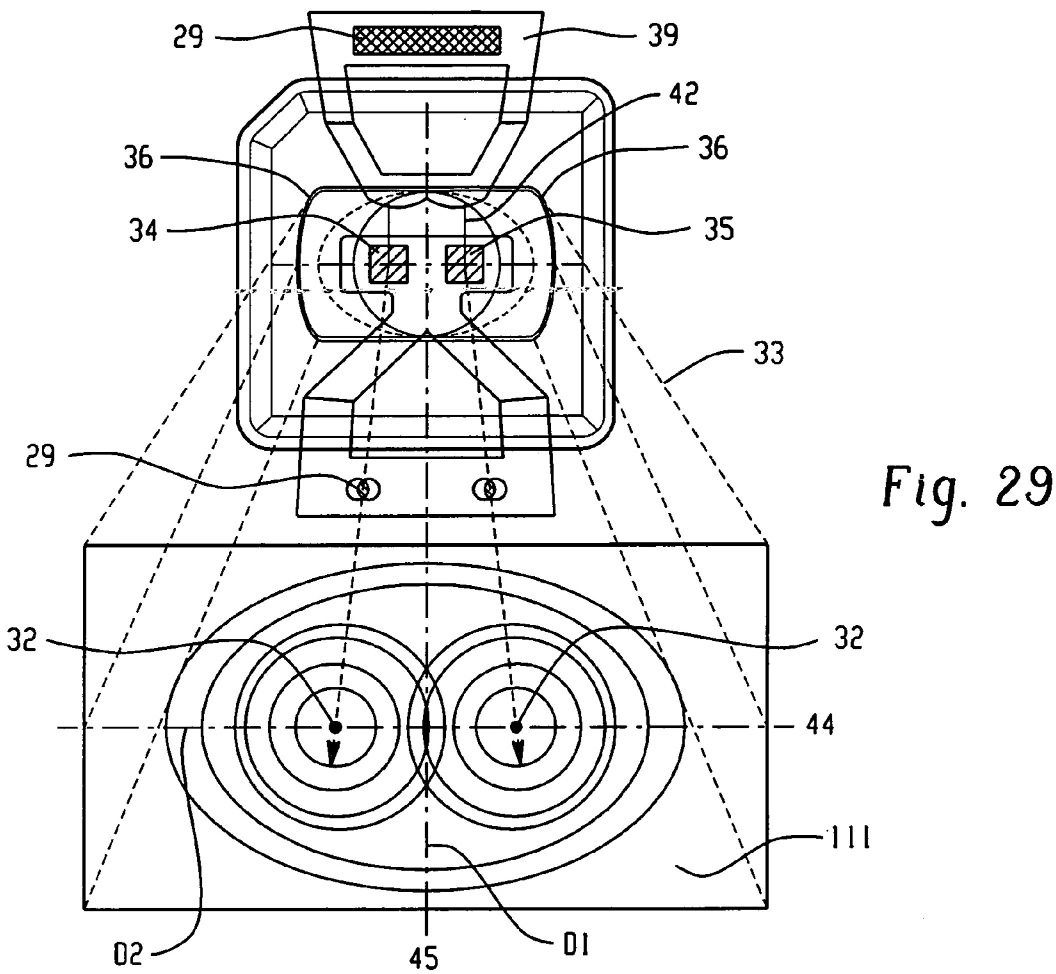
FIG. 29 shows details of double chip (34) LEDs, welding (29) and projection (111).
Figure 30:
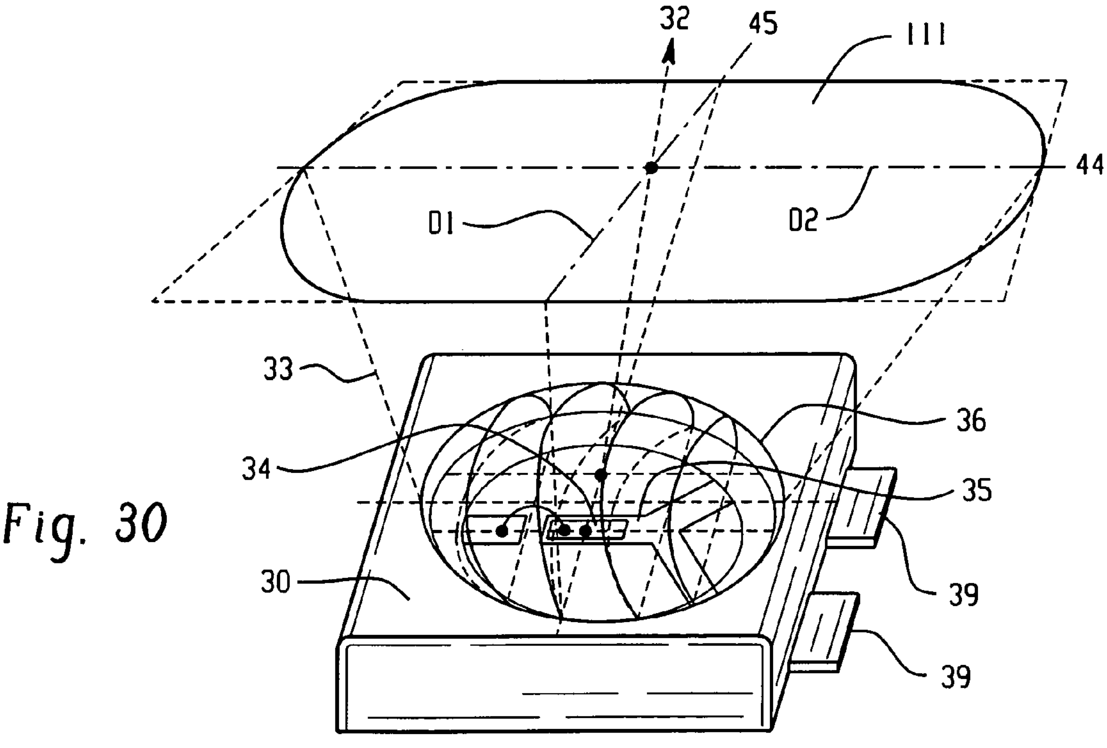
FIG. 30 shows light emission to the side (30-A) and consecutive projection (111).
Figure 31:
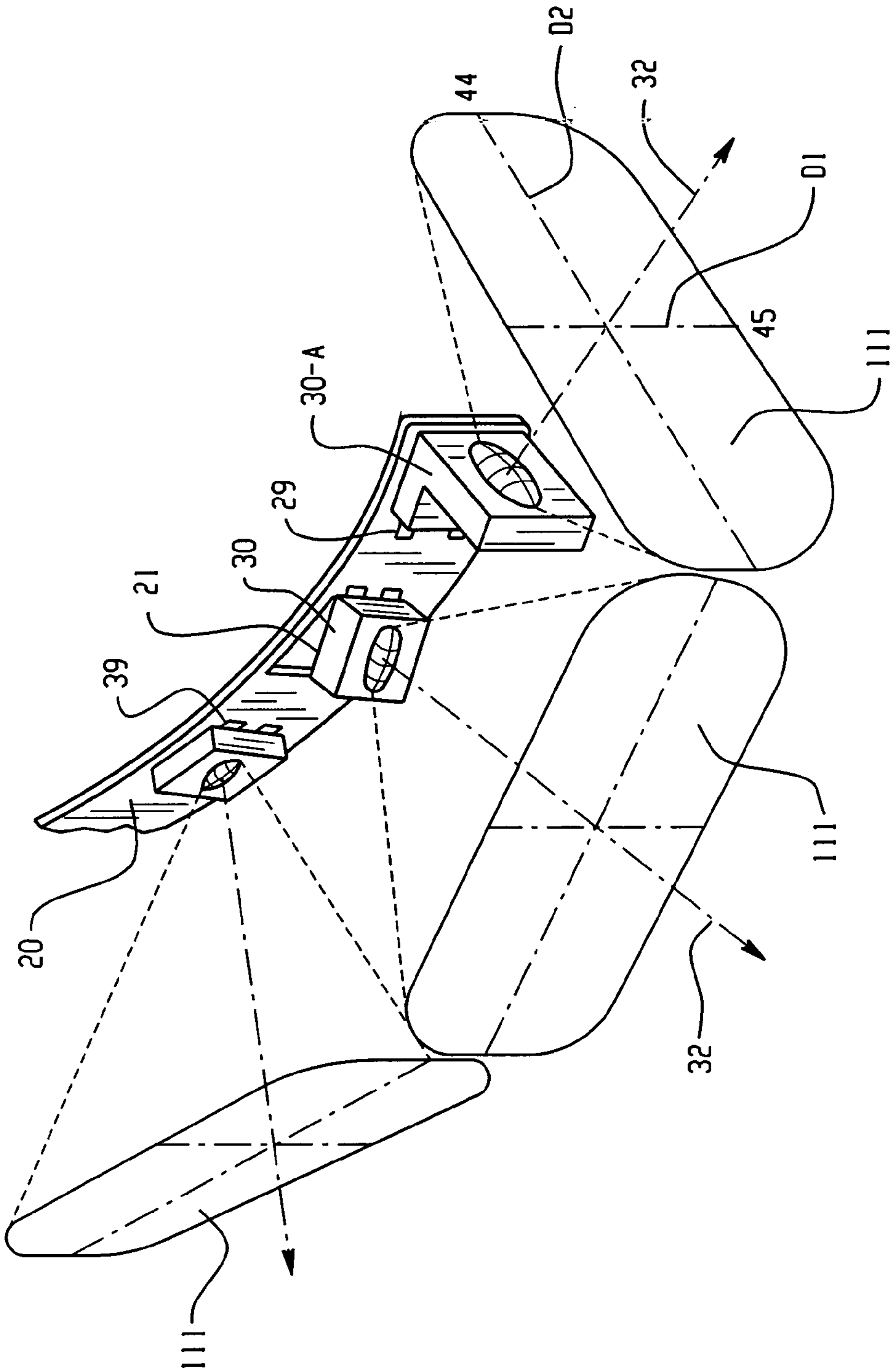
FIG. 31 shows the flexible circuit and details of the surface-mounted LEDs.
Figure 32A:
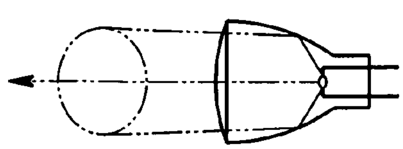
FIGS. 32-A-B-C-D-E-F-G-H-I-J-K and L shows details of various optics, and include side and top views of various LEDs, as well as the effect produced by the concentrating or diffusing projection of light (111).
Figure 32B:
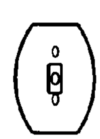
Figure 32C:
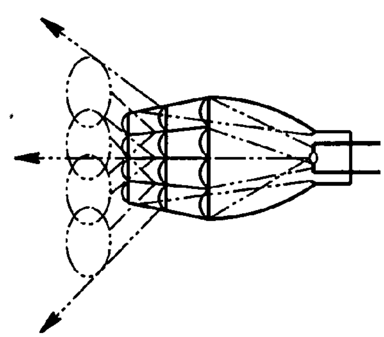
Figure 32D:
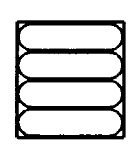
Figure 32E:
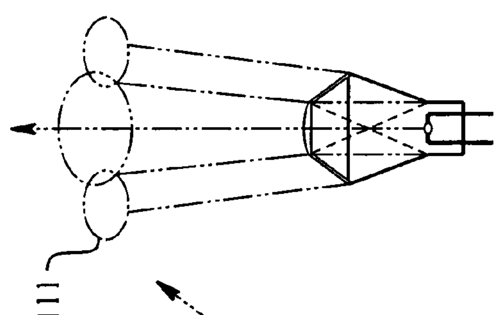
Figure 32F:
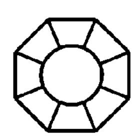
Figure 32G:
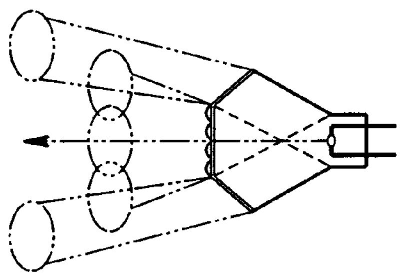
Figure 32H:
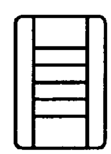
Figure 32I:
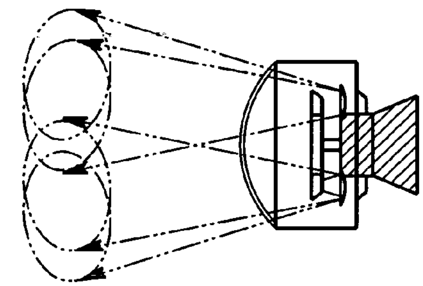
Figure 32J:
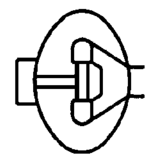
Figure 32K:
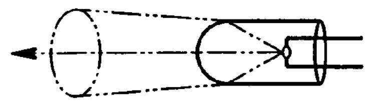
Figure 32L:
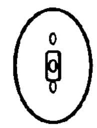
Figure 33:
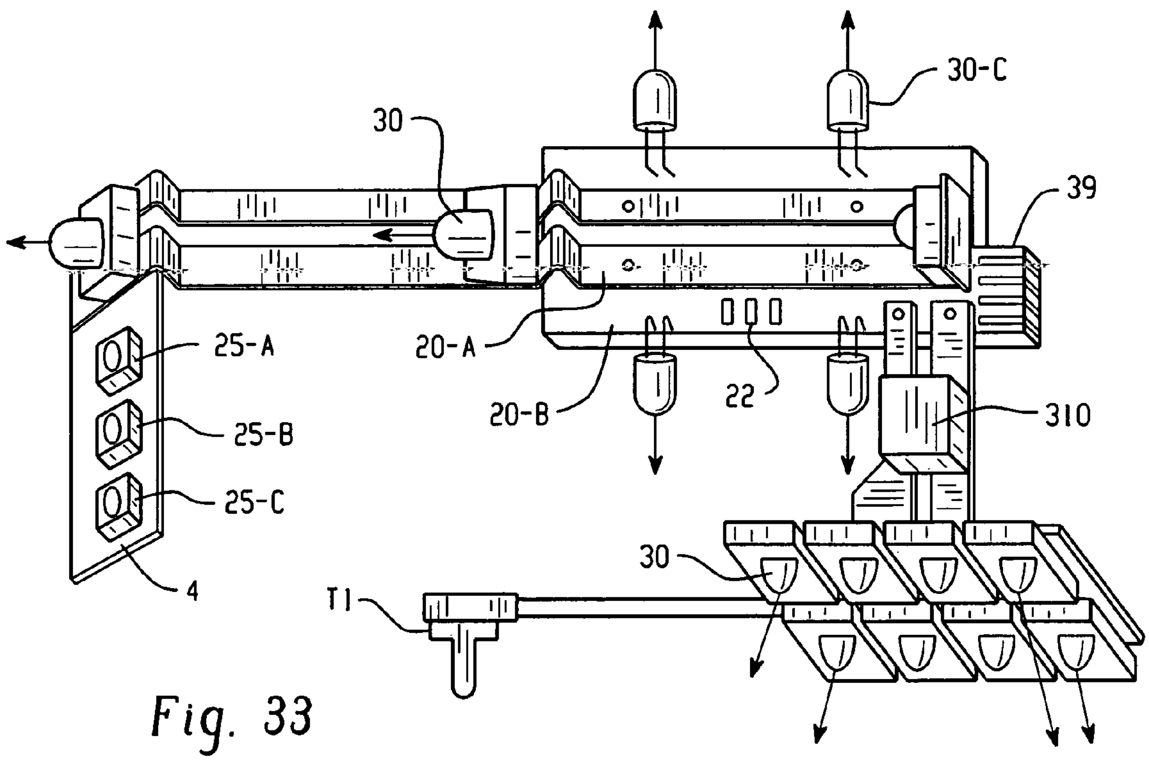
FIGS. 33, 34 and 35 show details of different integrated mixed circuits for various functions and containing various components, LEDs (30)+bulb (95) and (212)+timer (310)+ photodiodes (25-B), infra-red diodes (25-A)+temperature probe (T1).
Figure 34:
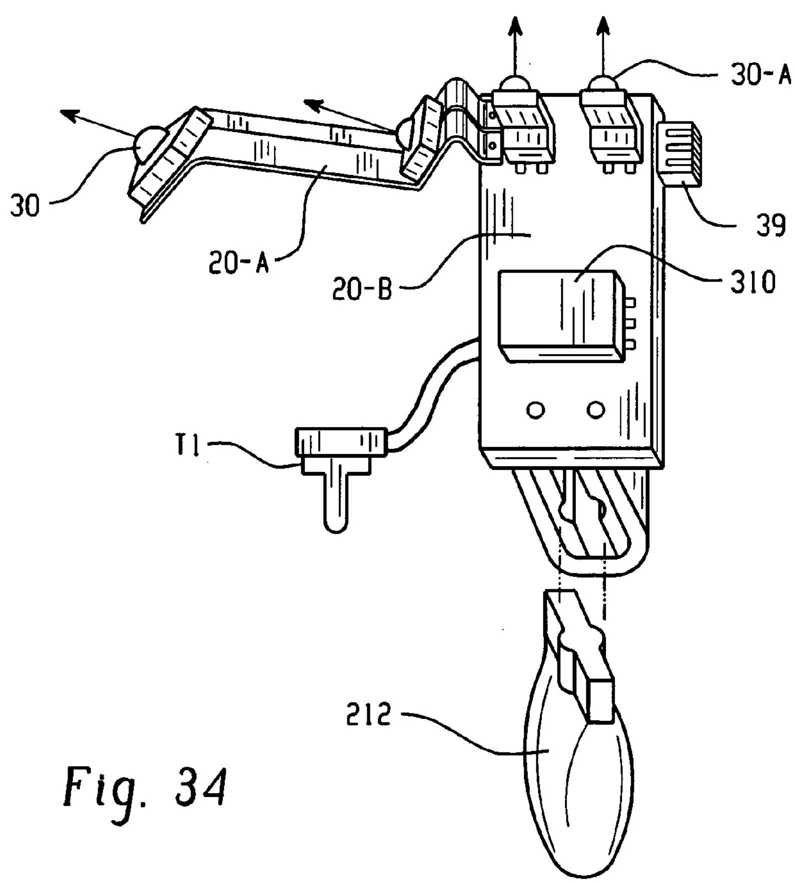
Figure 35:
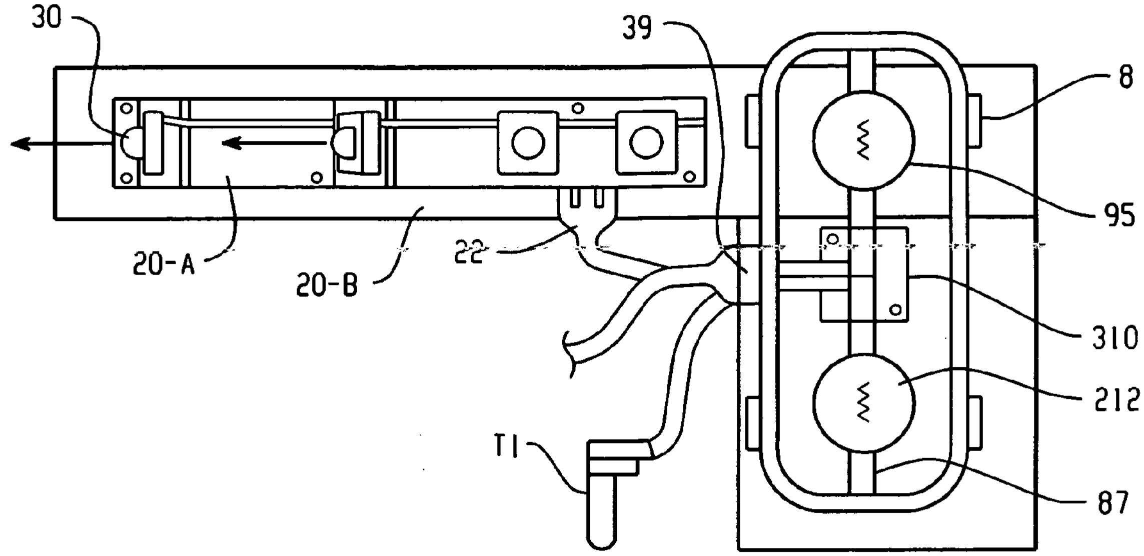
Figure 36A:
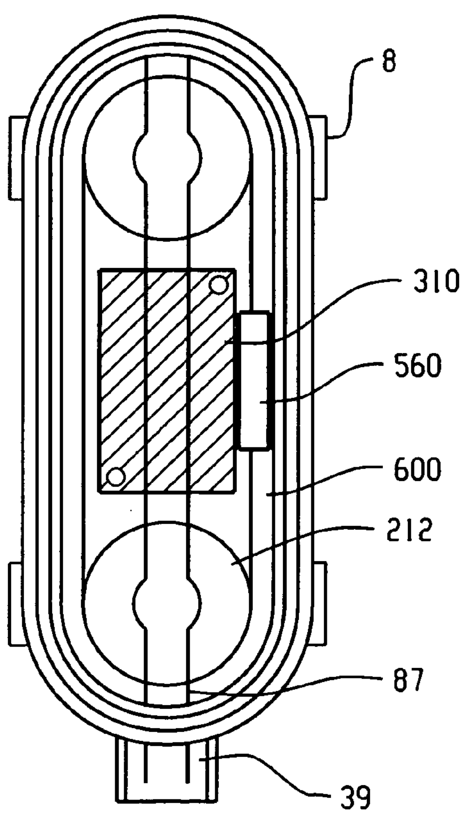
FIGS. 36 A–B illustrate the combined lamp support for two lamps with air outlet (560) and watertight, flexible cover type edge and timer (310).
Figure 36B:
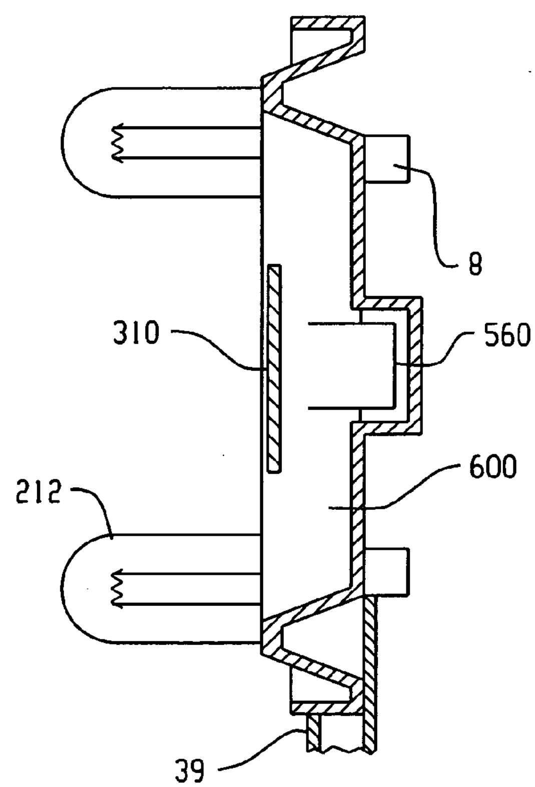
Figure 37:
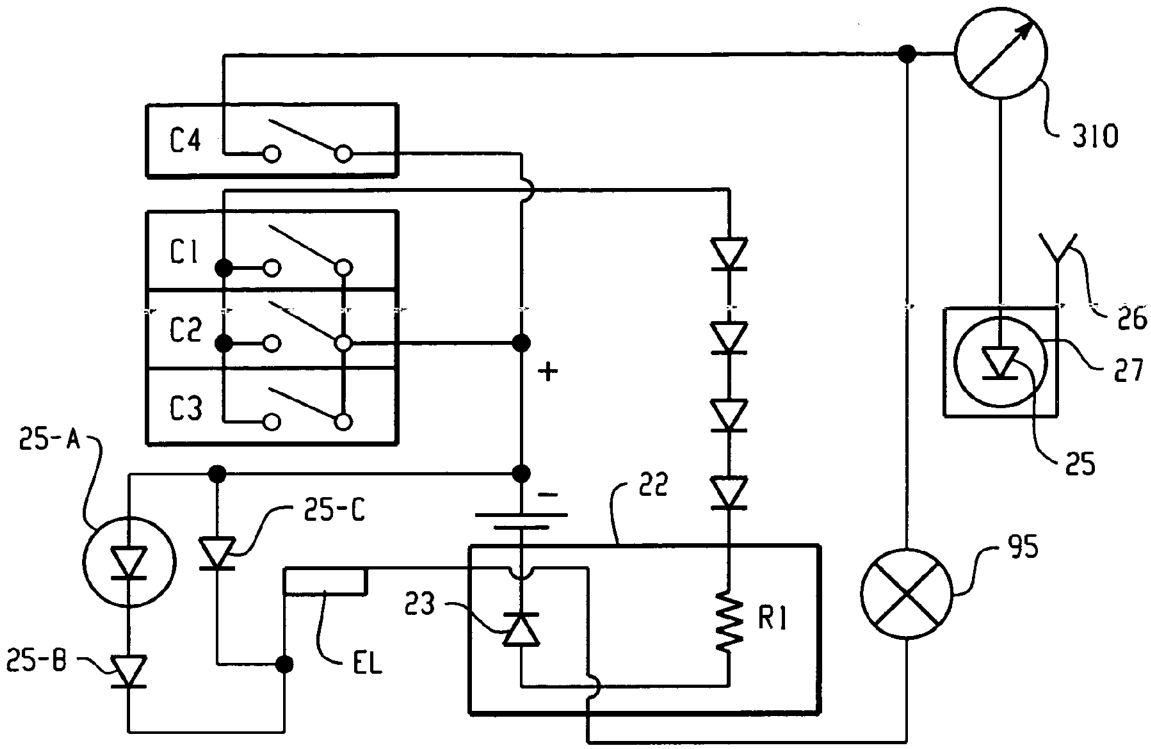
FIGS. 37 and 38 are diagrams of basic circuits including commands (C1-2-3 and 4) sensors, photodiodes and LEDs (25-A-B and C), its electronic decoding circuit (EL) and side light bulb (95).
Figure 38:
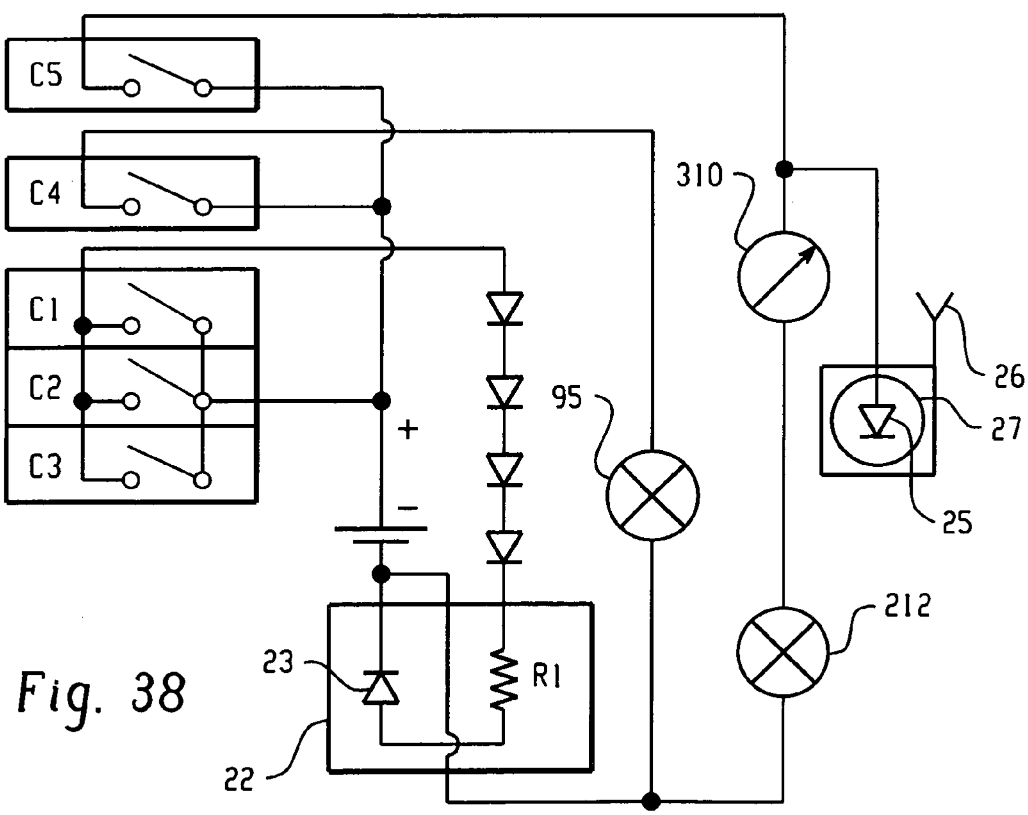
Figure 39C:
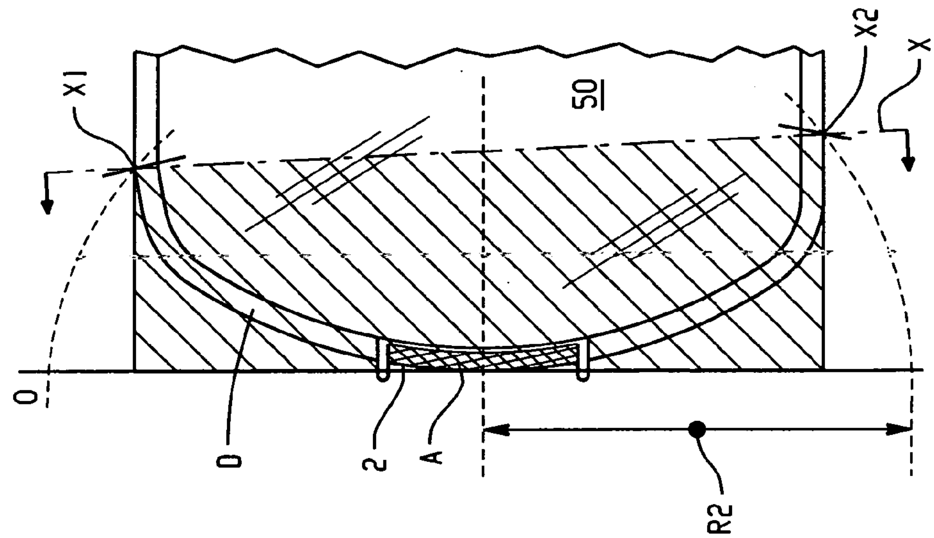
FIGS. 39-A-B-C define the side end area from which (A) exits in the form of projection (K1), and show how line (X) is determined between points (X1) and (X2), with respect to radius (R2).
Figure 39B:
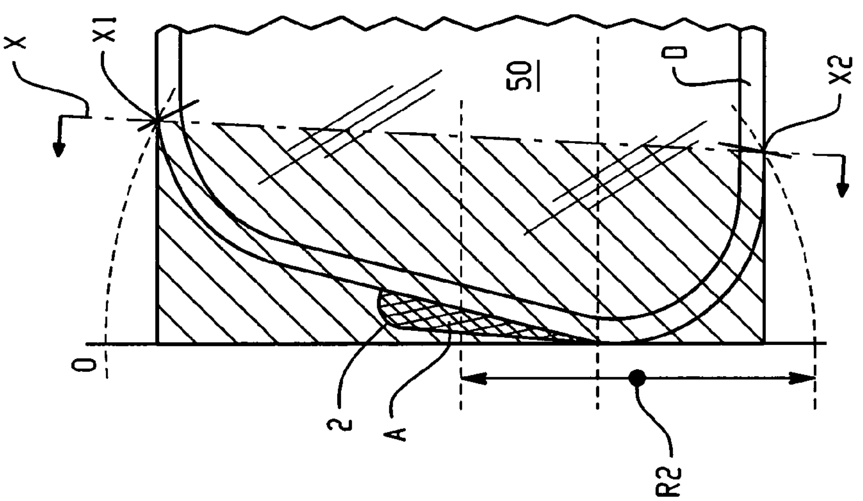
Figure 39A:
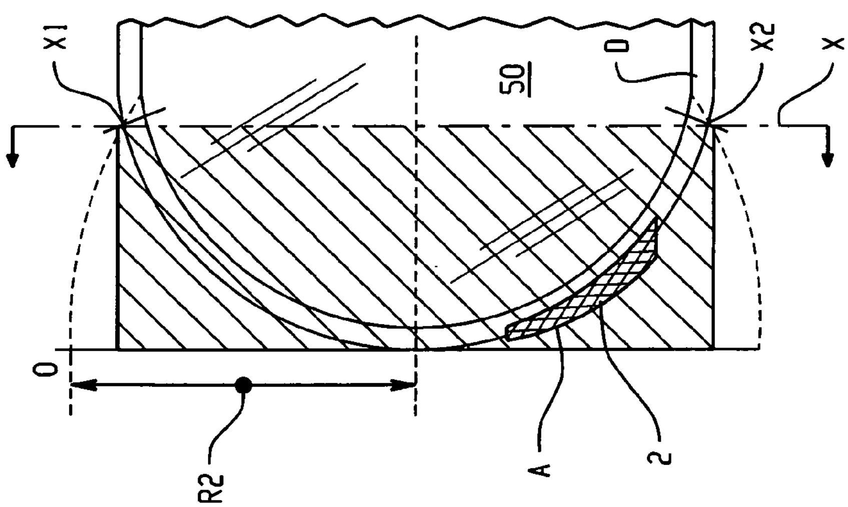
Figure 40A:
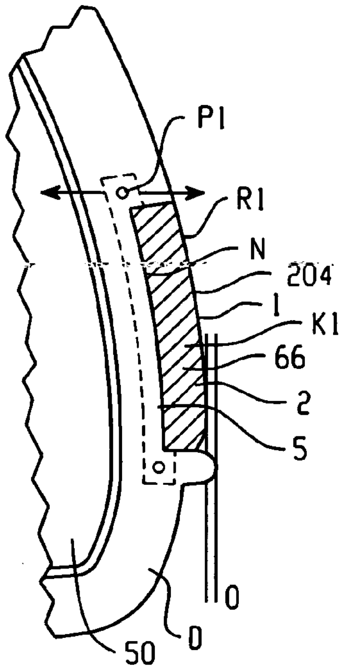
FIGS. 40-A-B-C-D-E-F-G and 41 are sectional views of different types of light output towards projection (K1) of (A), which is part (2) of surface (1), and they illustrate the various features that are common and specific to each variant.
Figure 40C:
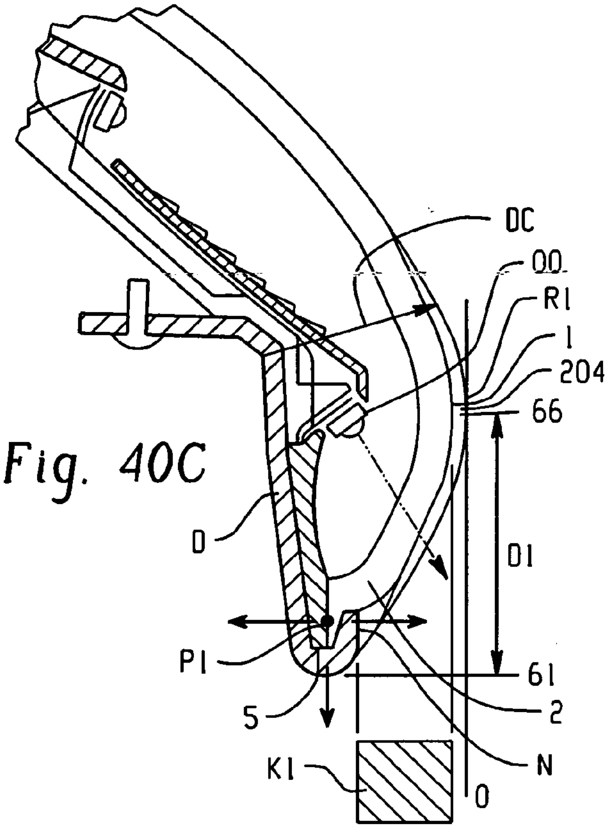
Figure 40D:
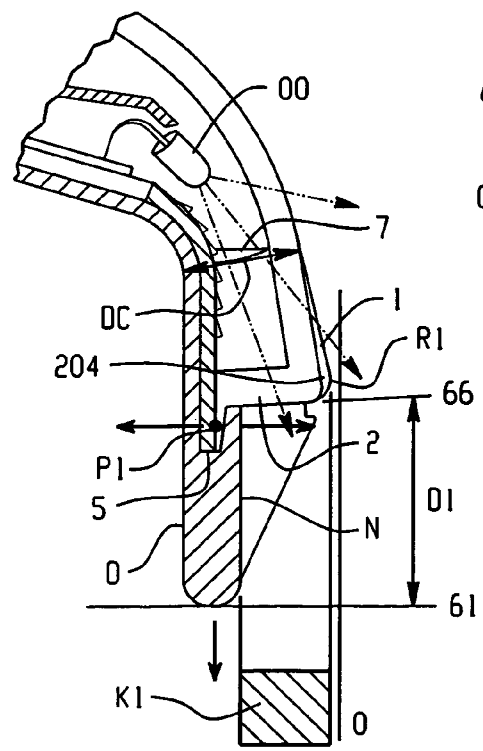
Figure 40E:
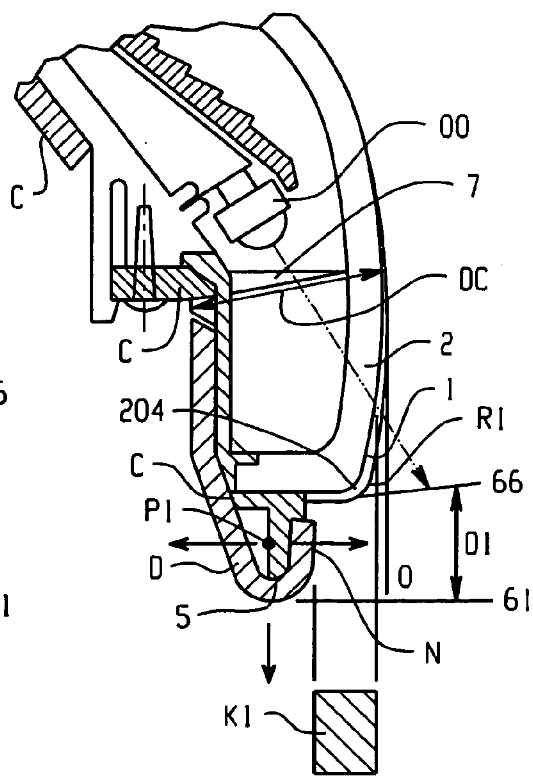
Figure 40B:
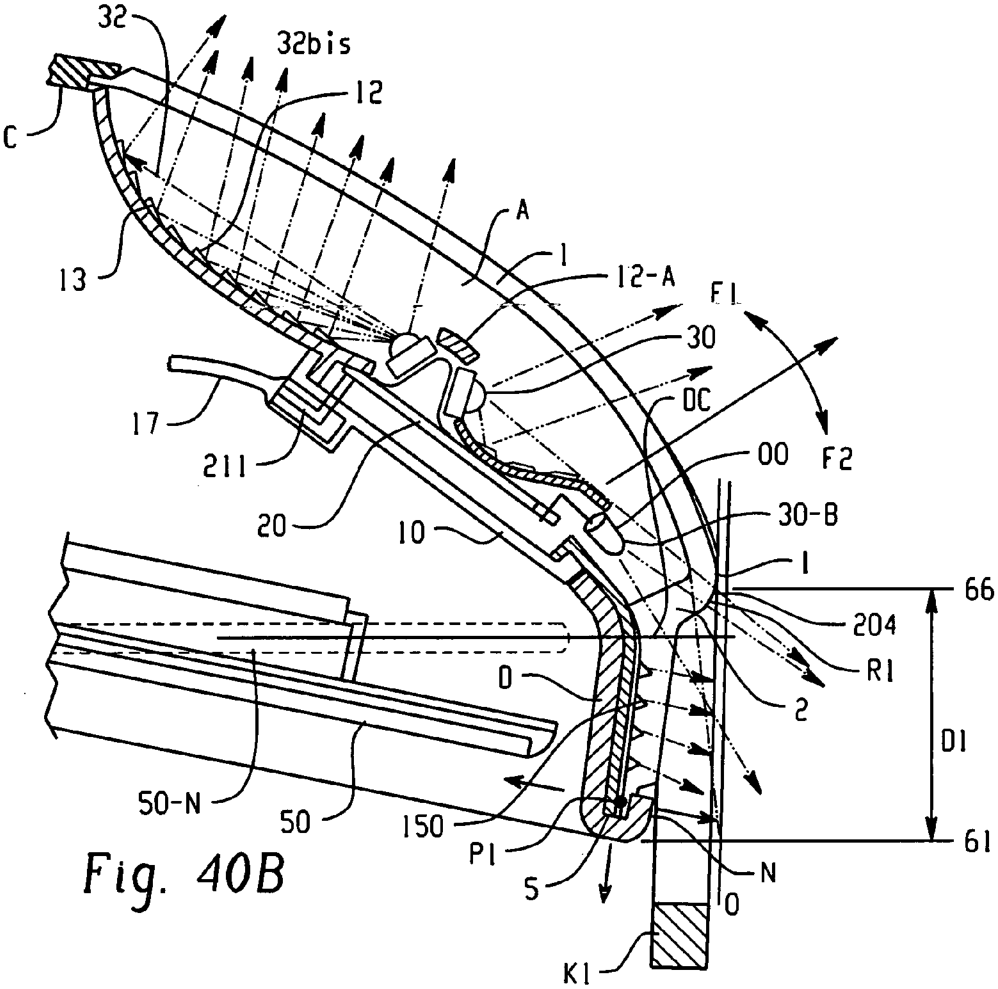
Figure 40F:
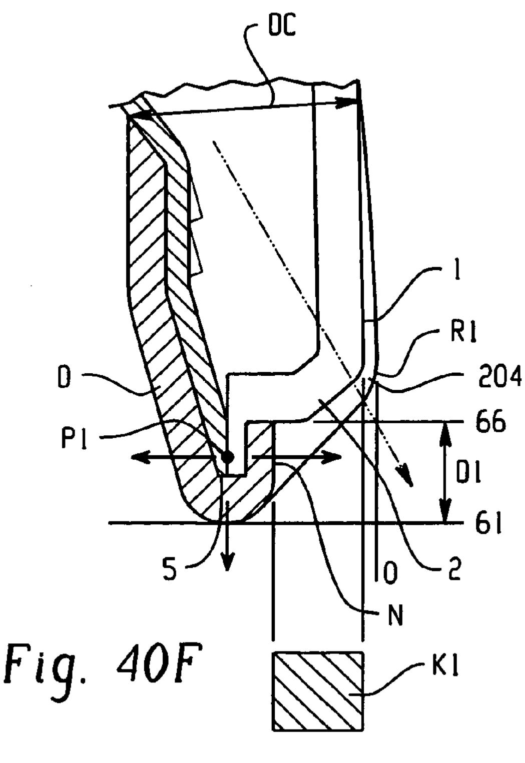
Figure 40G:
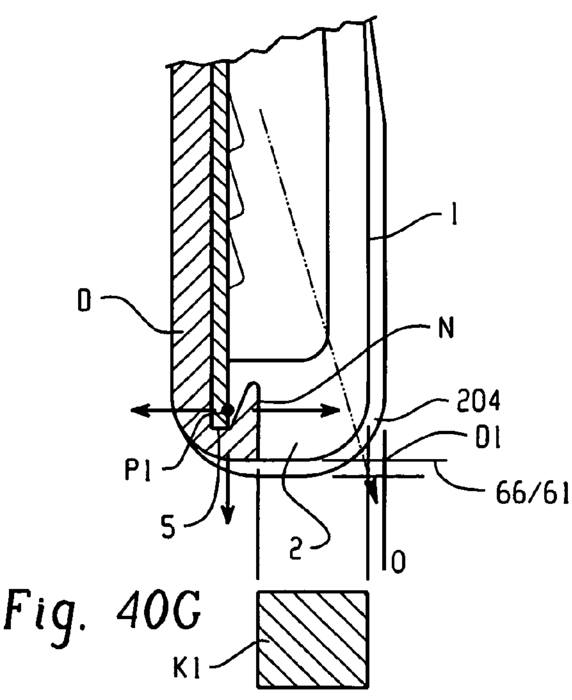
Figure 132:
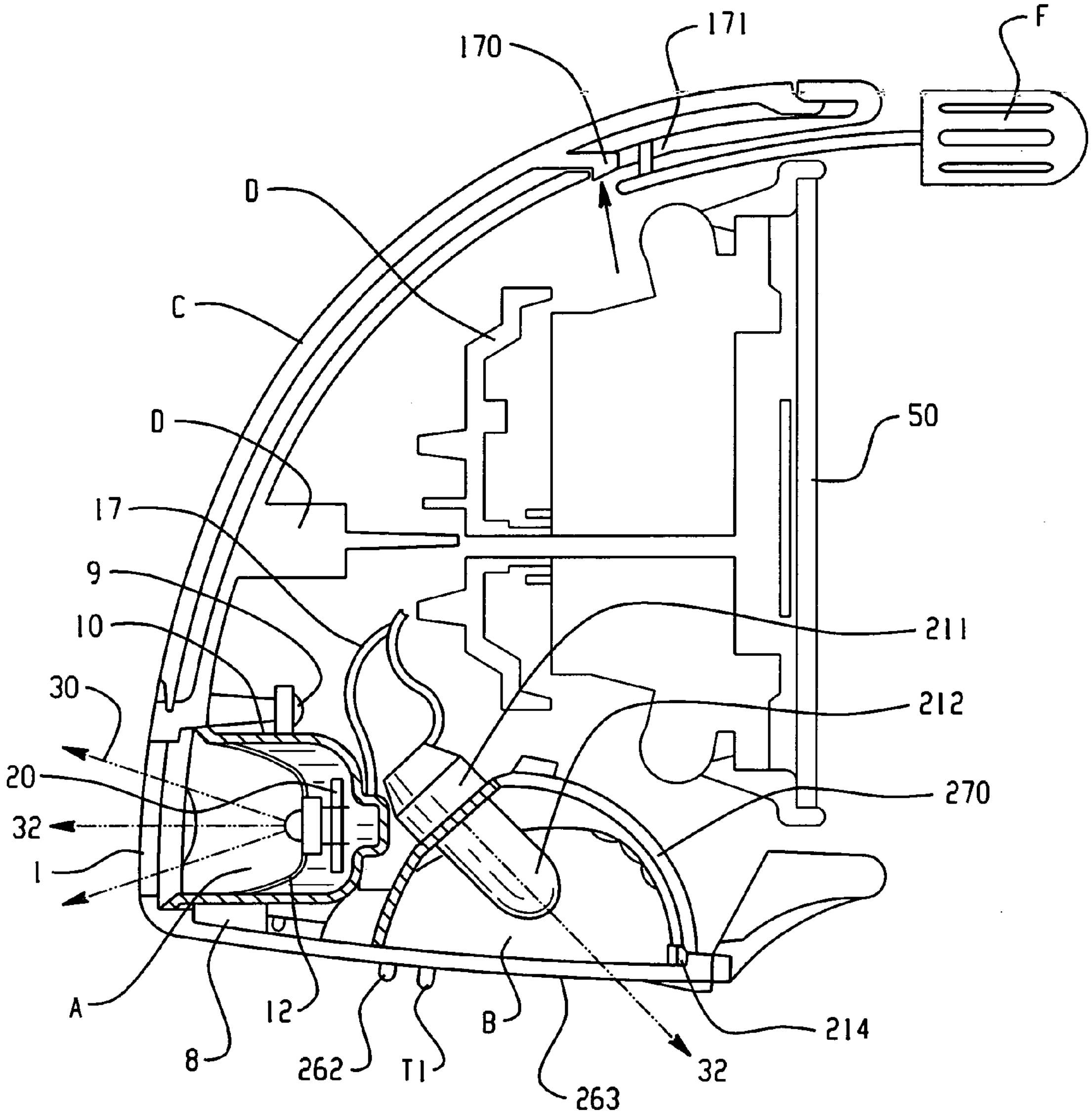

FIG. 132 is a sectional view AA of the mirror type illustrated in FIG. 7, detailing the position of modules (A, B, C and E), and the anti-theft system of module (C) (171).

Figure 133:
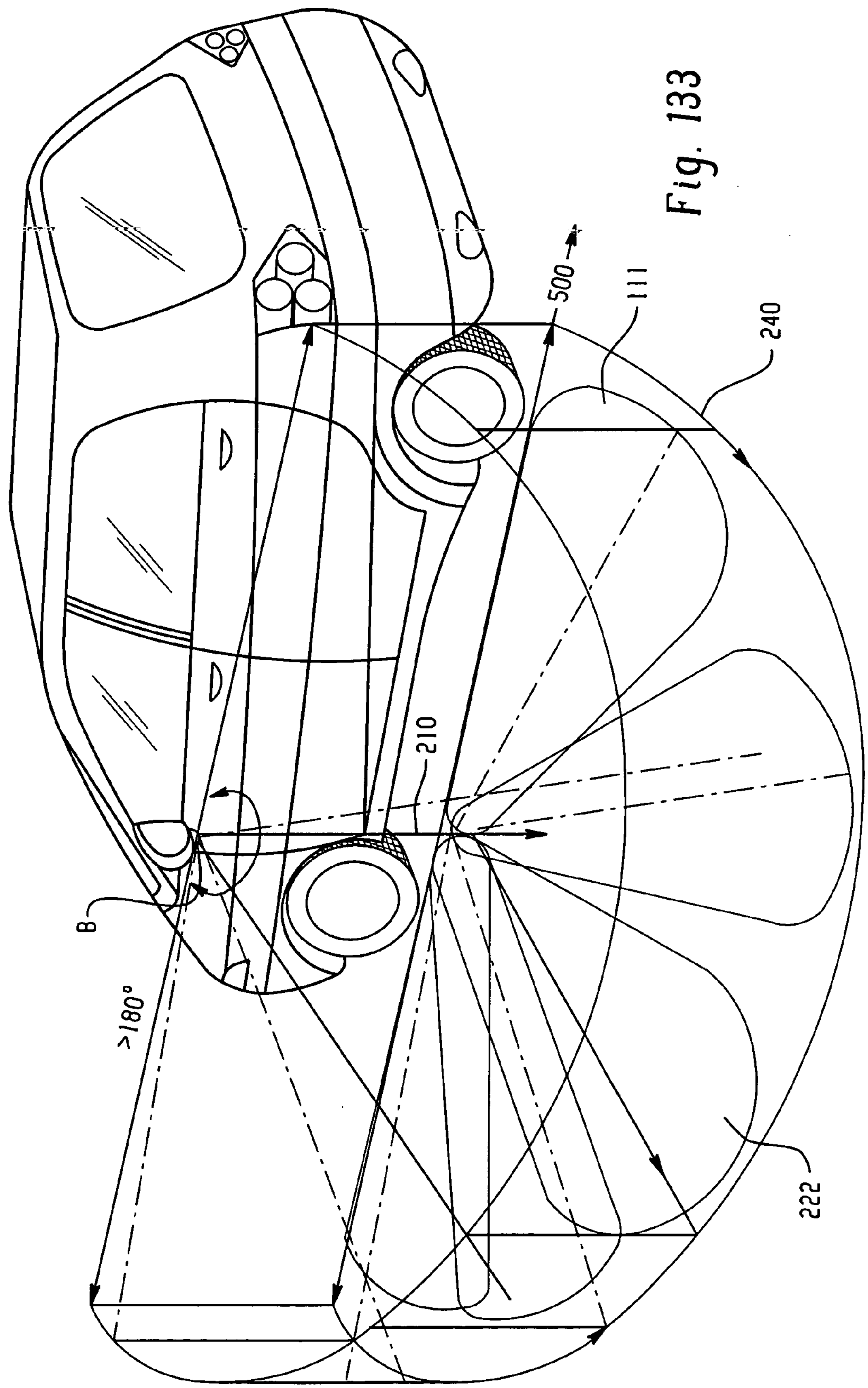

FIG. 133 is a perspective view of the light projection to the side of a vehicle, that can be adjusted and has its central point in (210) rotating along (240).

Figure 134:
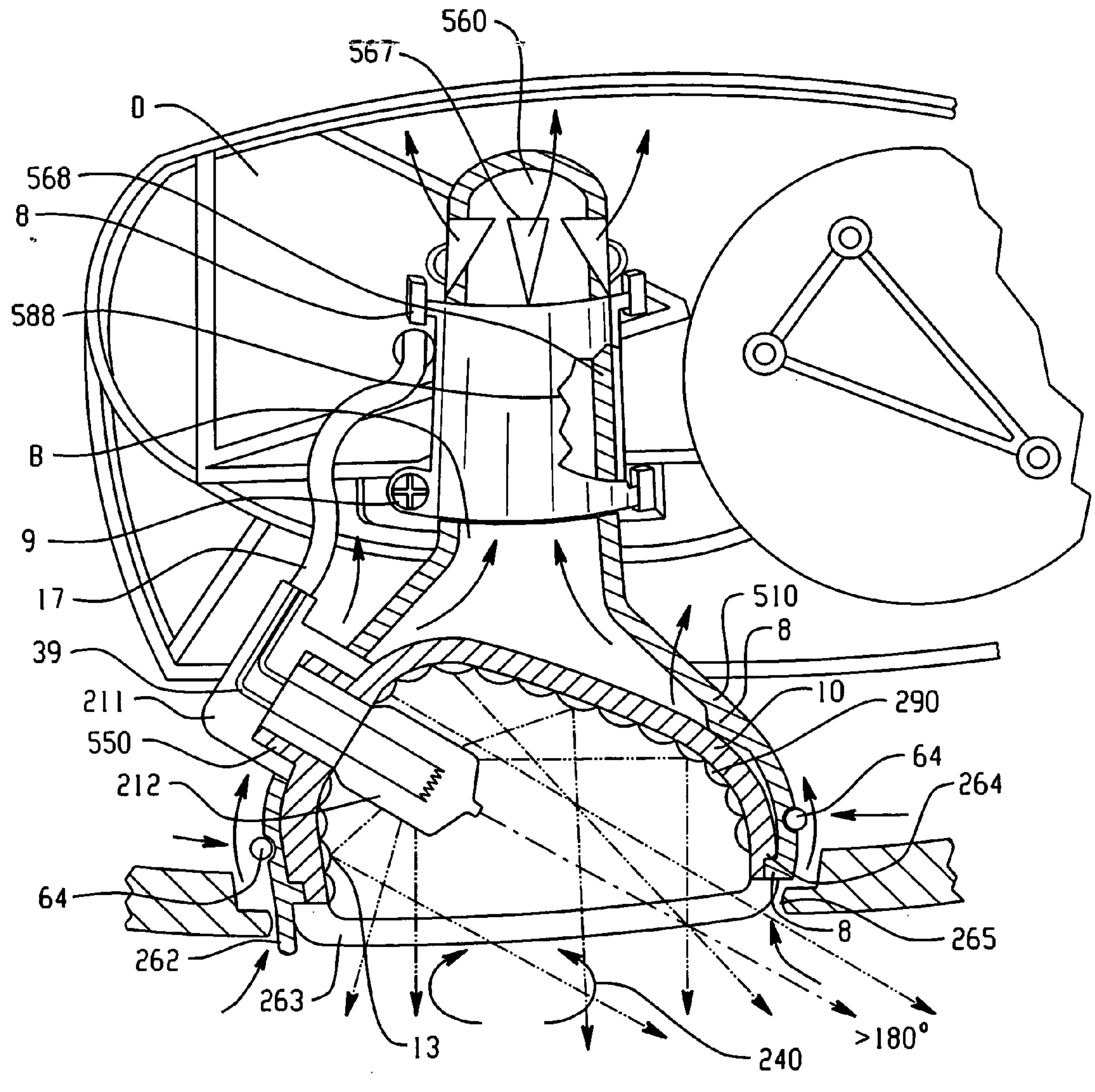

FIG. 134 is a sectional view AA of the rotational version of module (B), which has a dichroic halogen lamp (212). Details are also shown of metallic support (510) which attaches lamp (263) to subassembly (264) by means of teeth (8) and ring (64). The lamp is connected by connector (211) and attaches to chassis (D) by means of plate (588) which transmits heat by diffusion from the metal and by means of chimney (560) having inlet in (265) and ventilation outlet in (567).

Figure 135:
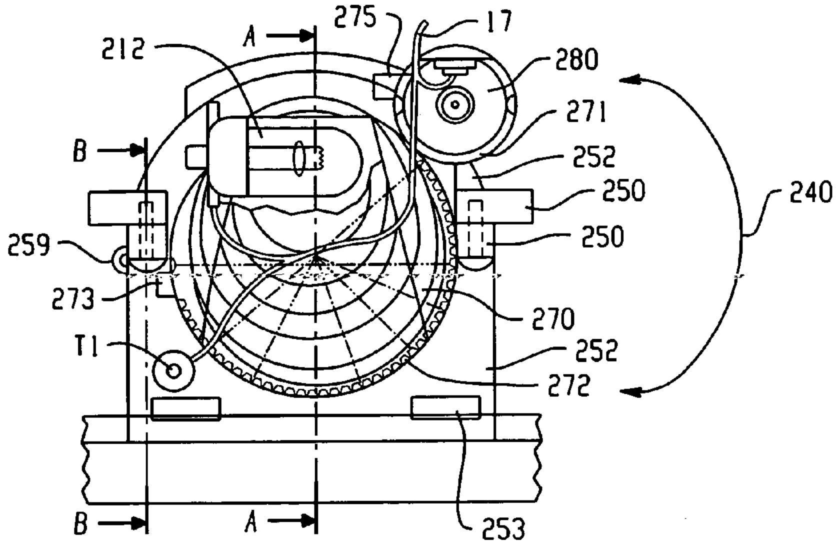

FIG. 135 is a view of the motorised version (280) of module (B) which rotates on crown gear (272) which is provided with stop at (273).

Figure 136:
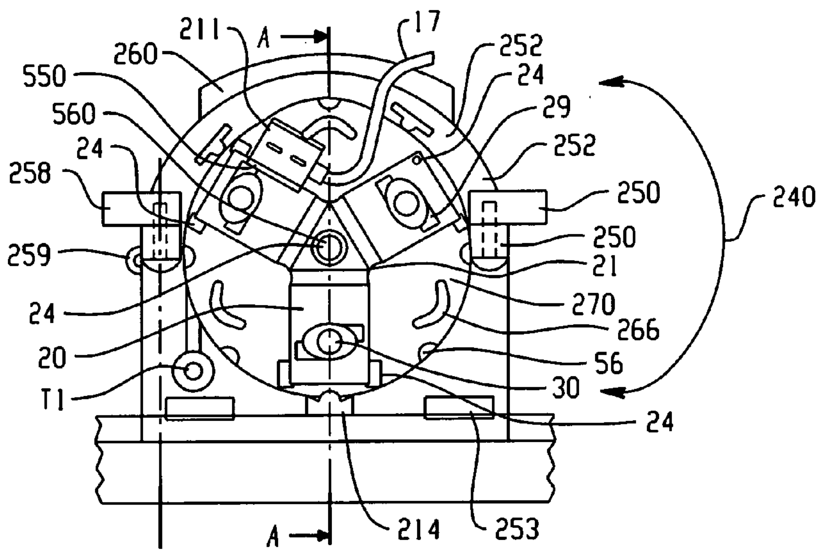

FIG. 136, is equivalent to FIG. 135, and shows a light dispersion system comprising various high brightness LEDs (30) inserted on the metallic base of circuit (20) acting as cooler, ventilation duct with outlet at (560) and connector (211) with security clips (550).

Figure 137:
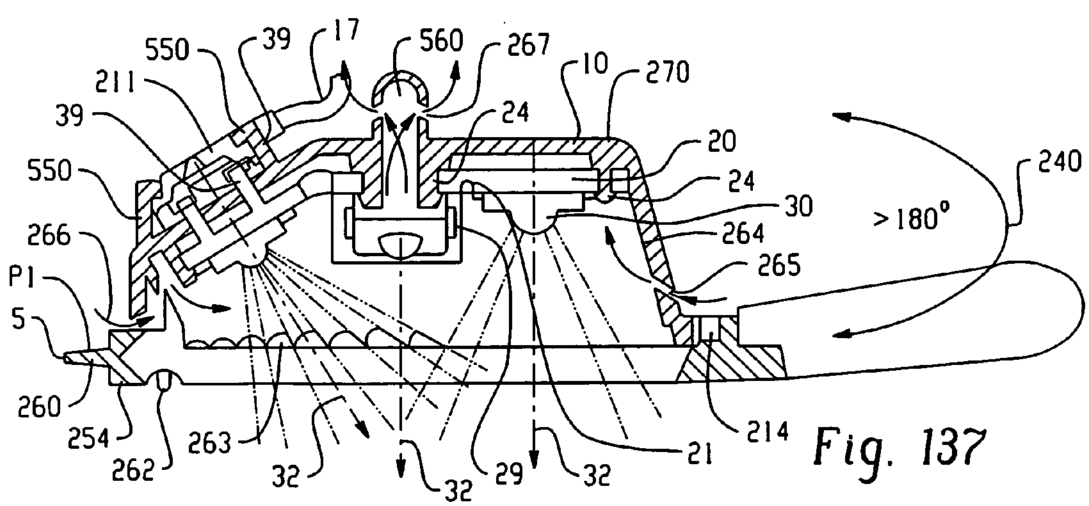

FIG. 137 is a sectional view AA of FIG. 136 showing the variable inclination angle of foci (32) and variable prisms (263) for distributing and dispersing the light.

FIG. 138 is a transparent view of module (B) which can be rotated manually, and which details attachment and parts (251) fixed and (270) mobile.

FIG. 139 is a sectional view AA of FIG. 138, detailing ventilation duct (266) and (267), together with rotation lever (262).

FIG. 140 is a sectional view BB of FIG. 138, detailing attachment to housing (261) and adjustment of part (270) by means of (250) and (250).

Figure 141:
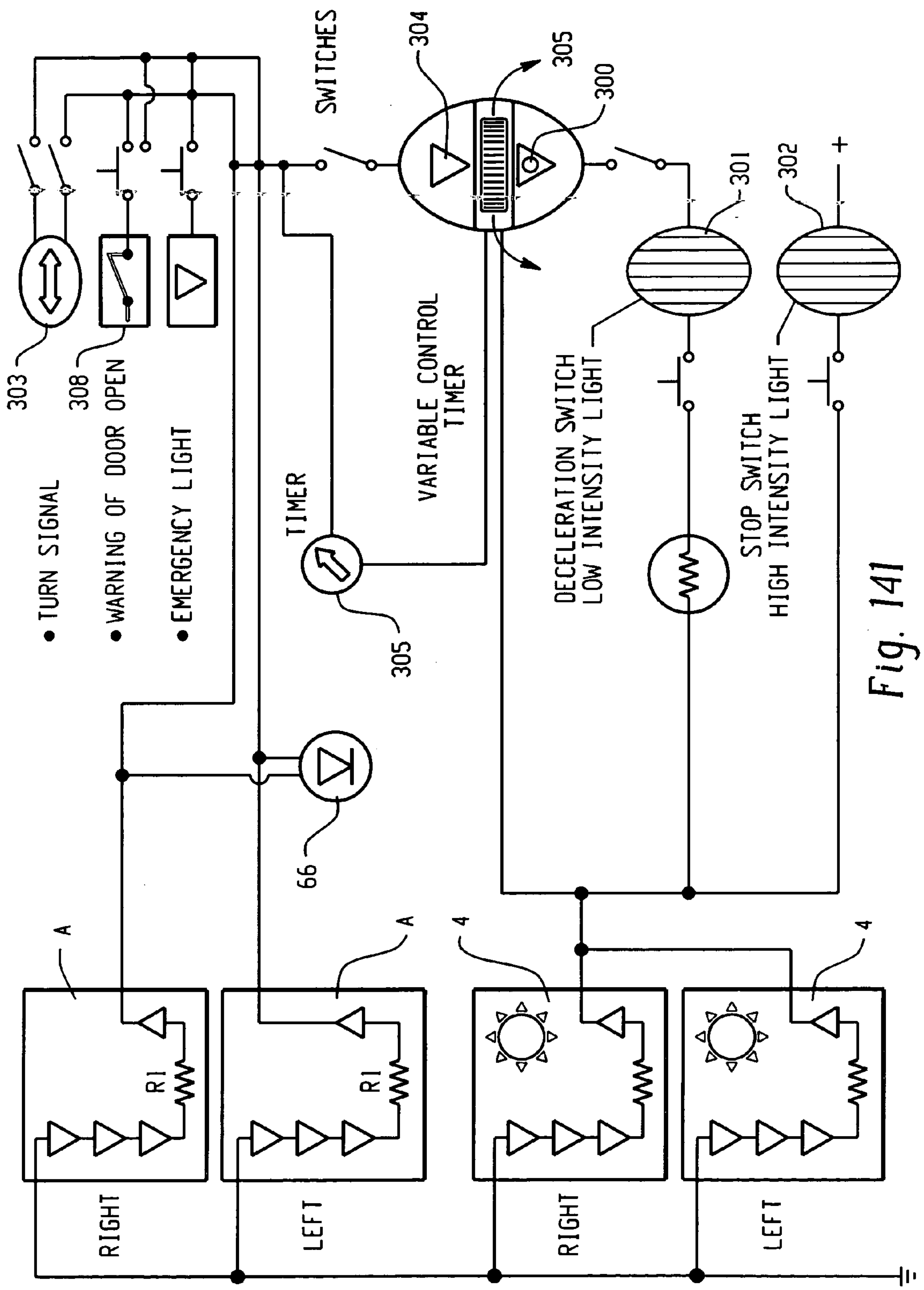

FIG. 141 is a circuit diagram detailing the commands and functions applicable to module (A).

Figure 142A:
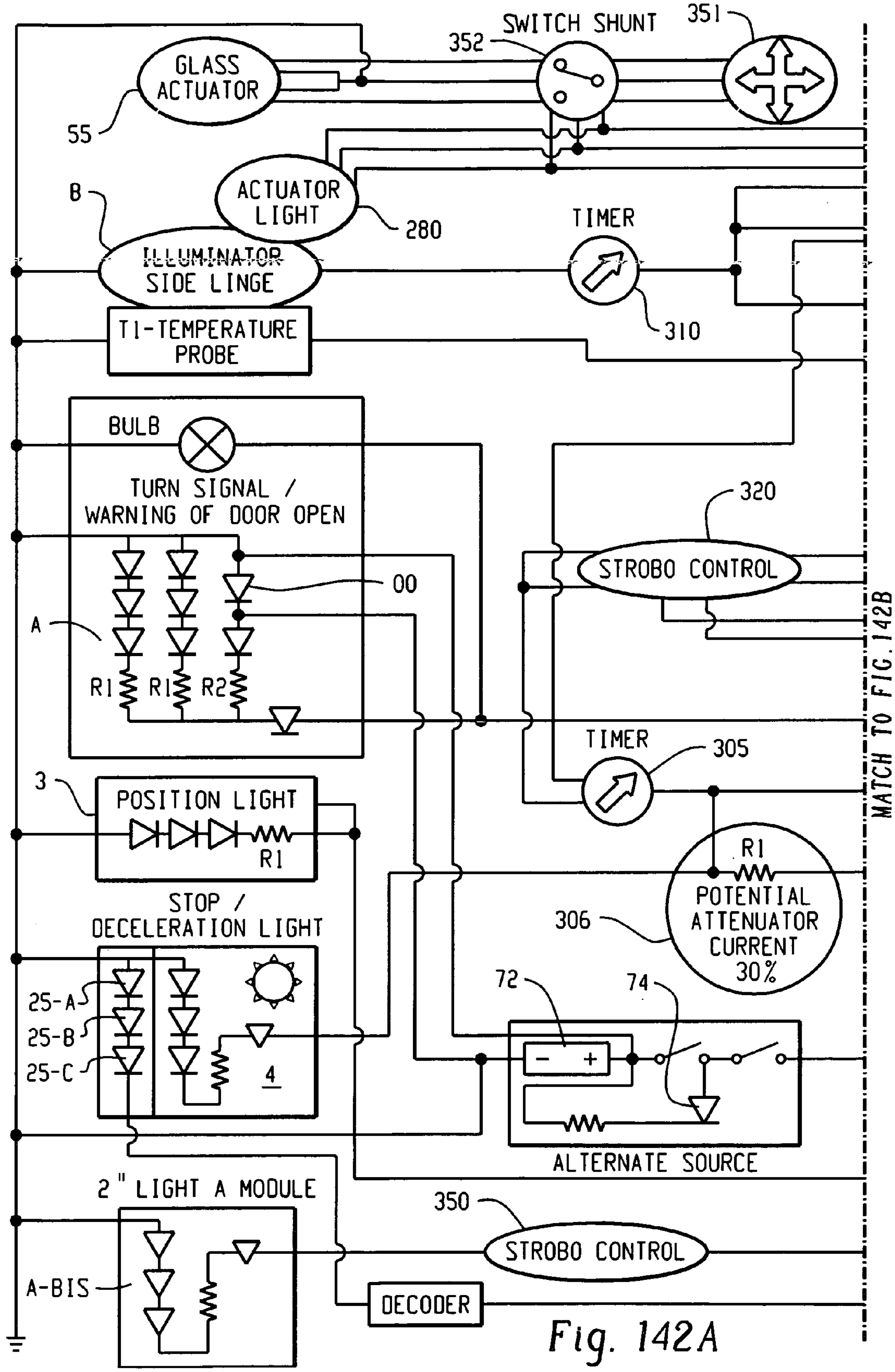
Figure 142B:
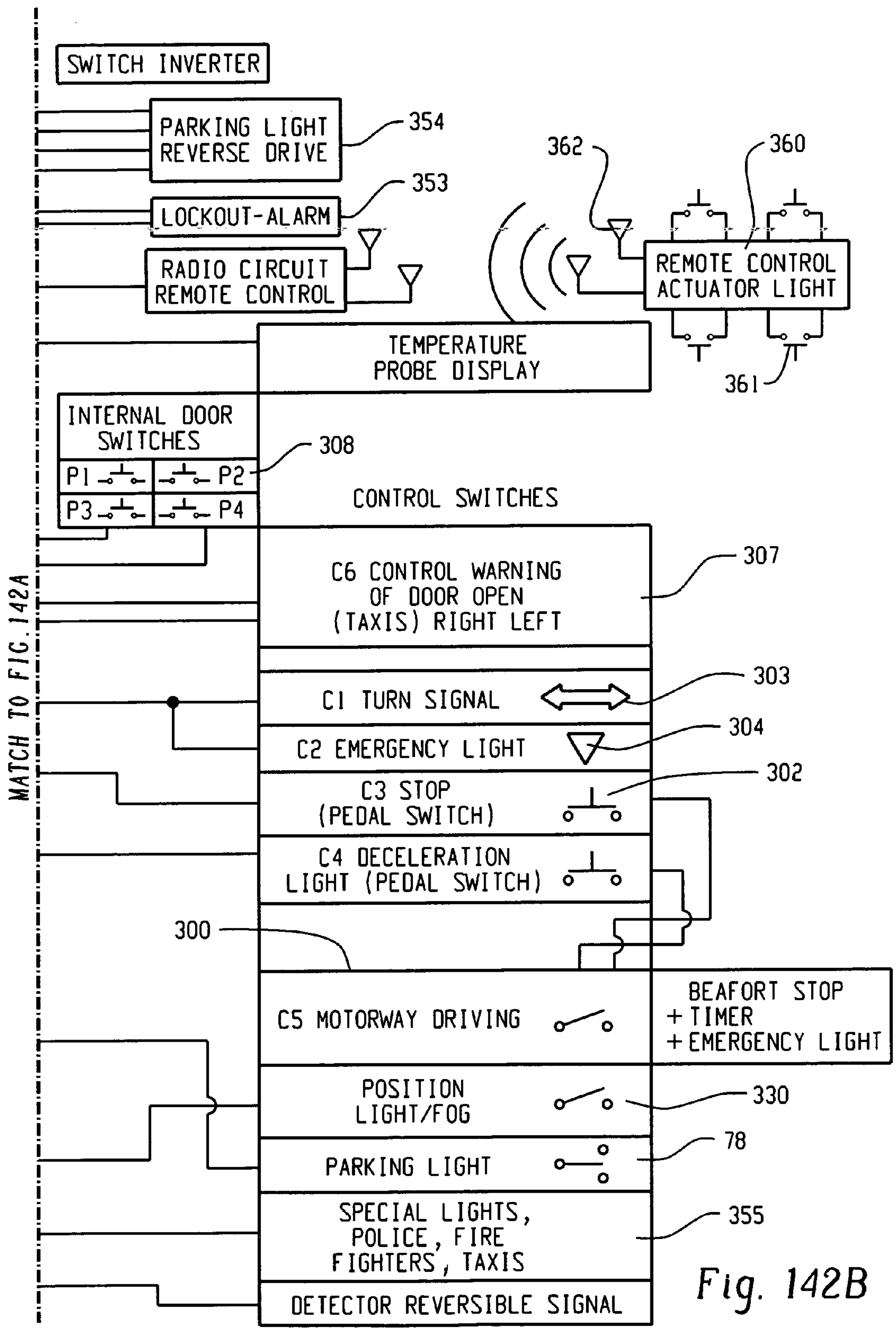

FIGS. 142A and 142B are circuit diagrams detailing the commands applicable to modules (A) and the versions thereof, versions (3*bis*), sensors (25-A-B-C-D) and (4), and functions for special vehicles, and module (B).

The invention claimed is:

1. Vehicle rear-view side mirror with multifunctional signal comprising:

- a housing (D) adapted to be attached by a support (10) to an outer surface of said vehicle, with a first opening having at least one prisms rear-viewing element, camera or mirror;
- a second opening including at least an aperture facing to a front part of said vehicle with respect to a driving direction, said second opening accommodating an emitter assembly including one light source and/or one reflector (12) for emitting at least luminous signals provided with a cover including at least a translucent or transparent or in part colorless tinted surface (1) configured to permit a passage of light towards said front part and/or towards a ground area in a lateral zone of the rear-view side mirror and towards a rear part through a side end area led away from said outer surface of the vehicle and open towards the rear of said vehicle,
- said emitter assembly is associated with an electronic control circuit to produce at least one turn-signal indicator function and an additional security signal and to use and/or combine various signals of different types or multiple functions by application of different commands, different light sources, on/off times, and/or is adapted to combine different internal arrangements with intercalated emitter assemblies, of the same or different type, form and color,
- wherein said at least translucent or transparent surface (1) is located in an area between upper and lower horizontal tangents delimiting superior and inferior parts of said housing (D), and placed at a back part of said mirror (50), allowing a light signal to be projected therethrough at least on a plane perpendicular to driving axis (500) to the front and rear, respectively.

2. The vehicle rear-viewside mirror according to claim 1, characterized in that said emitter assembly is also adapted to emit signals of a non-luminous type, and is selected from the group consisting of: sound signals, ultrasound signals and radio frequency signals.

3. The vehicle rear-viewside mirror according to claim 2, characterized in that said emitter assembly is adapted to receive signals of different types by means of corresponding sensors, which sensors are selected from the group consisting of: light, temperature, infrared, ultrasound, and radio frequency sensors.

4. The vehicle rear-viewside mirror according to claim 3, characterized in that said sensors and/or emitter assemblies are associated with an electronic control circuit, with a purpose to carry out said multiple functions, said application of different commands and/or of said different on/off times, after said sensors are activated manually or automatically, locally or remotely.

5. The vehicle rear-viewside mirror according to claim 1, characterized in that said intercalated emitter assemblies are selected from the group consisting of: LEDs, multichips LEDs, bulbs, neons, OLES, infrared LEDs or a combination of these for the same or different function.

6. The vehicle rear-viewside mirror according to claim 5, characterized in that said emitter assemblies are associated with one or more catadioptric reflecting elements.

7. The vehicle rear-viewside mirror according to claim 1, 5 or 6, characterized in that said emitter assemblies are arranged on a single circuit.

8. The vehicle rear-viewside mirror according to claim 1, characterized in that said emitter assembly comprises a transparent light conductor body (150) with at least one light input aimed at one or more light emitters of a different color, said emitter assembly being able to alternate and/or combine the turning on of said light emitters.

9. The vehicle rear-viewside mirror according to claim 1, characterized in that said emitter assembly comprises one emitter, externally visible, arranged to emit a colored light in a direct manner, and another emitter, not externally visible, arranged to emit a light with a different color in a diffused reflected manner, being said emitter assembly adapted to produce signals of more than one color by combining said different colored lights.

10. The vehicle rear-viewside mirror according to claim 1, characterized in that said emitter assembly is adapted to produce signals of more than one color based upon combining a reflected colored light and an indirect light of another color, through some optical bodies (150) included in the emitter assembly.

11. The vehicle rear-viewside mirror according to claim 1, characterized in that said emitter assembly is adapted to produce signals of more than one color by combining one light emitter with at least one mask that lets a part of the light pass through and reflects another part of the light, or with a color filter for a determined function and direction.

12. The vehicle rear-viewside mirror according to claim 1, characterized in that said emitter assembly is adapted to produce light signals of more than one color by combining alternated, sectorized emitter assemblies of different colors and/or different colored emitter assemblies projected on a diffuser or collimator reflector.

13. The vehicle rear-viewside mirror according to claim 1, characterized in that said emitter assembly is adapted to produce signals of more than one color and/or of the same color by combining an electroluminescent substrate OLES with LEDs.

14. The vehicle rear-viewside mirror according to claim 1, characterized in that said emitter assembly is adapted to produce at least one signal of the same color using as a light source at least one bulb interconnected in parallel with at least a series of LEDs.

15. The vehicle rear-viewside mirror according to claim 1, characterized in that said emitter assembly is adapted to carry out a door opening pre-warning function by means of one or more emitter assemblies governed by a controller circuit (320) that produces a different on/off frequency than that of an emitter which acts as a turn-signal indicator, or a stroboscopic effect.

16. The vehicle rear-viewside mirror according to claim 15, characterized in that in order to carry out said opening pre-warning function said emitter assembly uses a single emitter that also acts as a turn-signal indicator.

17. The vehicle rear-viewside mirror according to claim 15, characterized in that said controller circuit (320) is driven by a switch command in an inside opening lever of each door (308) and/or by a centralized switch in a vehicle's interior zone, and/or by an inverse switch that is activated when a taximeter (307) is stopped, and/or by a photodiode of any wavelength placed in an internal door lever that closes the controller circuit when a hand approaches the opening lever.

18. The vehicle rear-viewside mirror according to claim 1, characterized in that said emitter assembly has in a part of said surface (1) an interior mechanized prism that produces a catadioptric reflective surface which reflects the exterior white light towards the front and/or yellow light to a side in order to make the vehicle's presence known.

19. The vehicle rear-viewside mirror according to claim 1, characterized in that said emitter assembly is adapted to carry out, by using of one or more non intermittent light emitter assemblies, at least one of the functions selected from the group consisting of: end-outline marker light, position light, frontal and lateral illumination complementing the function carried out by the vehicle's front lights, and fog lights.

20. The vehicle rear-viewside mirror according to claim 1, characterized in that the emitter assembly is adapted to carry out a deceleration warning function that anticipates a brake, using a signal complementary to said vehicle's rearward signals.

21. The vehicle rear-viewside mirror according to claim 20, characterized in that said emitter assembly is adapted to carry out said deceleration warning function by using one or more emitter assemblies activated by a combined, automatic controller command (300), (305) integrated and synchronized with the a vehicle's emergency lights, which when activated initiates three road signal actions and combines two different coloured signal areas.

22. The vehicle rear-viewside mirror according to claim 20, characterized in that said emitter assembly is adapted to carry out said deceleration warning function by means of a connection of a controller (300) done voluntarily by a driver that synchronizes the following actions upon its connectioh to said controller (300):

- deceleration warning upon making contact with a switch (301) placed at any part of an acceleration system that is activated when releasing an accelerator pedal, provoking the turning on of one or more emitter assemblies (4) at a low intensity through a resistor attenuator circuit (306),
- turning on of emitter assemblies (4) at full intensity, upon activating a brake (302) together with a vehicle's brake lights, and activating, at the same time, a clock controller (305), which is voluntarily adjusted with respect to time and/or velocity,
- activating some emitter assemblies that act as turn-signal indicators when a programmed time in said clock (305) is passed, and
- ending and restarting the process when deactivating the brake (302).

23. The vehicle rear-viewside mirror according to claim 1, characterized in that said emitter assembly is adapted to carry out a detection function, manually or automatically selectable, by the use of one or more photodiodes (25-B) orientated towards an area to be covered.

24. The vehicle rear-viewside mirror according to claim 23, characterized in that said emitter assembly is adapted to carry out a warning function, in response to said detection function, for which said emitter assembly comprises an operation indicator (51) on the same rear-view mirror, and/or a sonorous indicator (70), and/or a luminous or sonorous indicator in the vehicle's interior, to be activated if something is detected when the emitter assembly is carrying out said detection function.

25. The vehicle rear-viewside mirror according to claim 23, characterized in that said emitter assembly, in order to carry out said detection function, is adapted to use a synchronized signal between right and left rear-view mirrors, which includes a codified emission of at least one signal by means of at least one infrared LED (25-A) from each rear-view mirror in the frontal direction (F1) and the detection of the presence or approach of a body in front of the vehicle by the detection with at least one photodiode (25-B) of the interruption of the signal emitted by said infrared LED (25-A).

26. The vehicle rear-viewside mirror according to claim 25, characterized in that said emitter assembly comprises a sonorous diode and/or a light indicator in the vehicle's interior visible by a driver in order to warn of the danger of an approximation from the front, if said photodiode (25-B) detects said interruption of the signal emitted by said infrared LED (25-A), codified or not, by a codifier circuit.

27. The vehicle rear-viewside mirror according to claim 1, characterized in that said emitter assembly is adapted to carry out an indicator function of the presence of the vehicle carrying the emitter assembly, for which said emitter assembly uses a signal as an indicator to indicate the vehicle's presence when parked by activating an intermittent LED (00 or 75) in said emitter assembly for each rear-view mirror and for each side of the vehicle, which is susceptible to be activated upon stopping the car, and/or connecting an alarm, and/or activating the a central locking system by a remote control (360) by means of an inverse switch (78) in combination with an ignition key.

28. The vehicle rear-viewside mirror according to claim 1, characterized in that said emitter assembly comprises, with the purpose of carrying out one or more of said multiple functions, elements which are complementary of the signals, as control indicators of their operation by means of a sonorous element (70) and/or visually outwards from the emitter assembly and/or in the vehicle's interior, by means of a mini LED (00, 25, 25-A or 30), or by means of an optical output (51) or a small window of light opposite to said surface (1) of said cover, located in the interior of said housing (D) inside a shadowed area (200) and visible to a driver's eyes (202).

29. The vehicle rear-viewside mirror according to claim 1, characterized in that the emitter assembly is adapted to use a signal to be emitted in a frontal direction that produces a stroboscopic effect or rapid flash based on a discharging tube (80) and/or LEDs and an ignition circuit.

30. The vehicle rear-viewside mirror according to claim 1, characterized in that the emitter assembly is adapted to use one single light emitter as a source for two different functions, one as frontal illumination and another as lateral illumination.

31. The vehicle rear-viewside mirror according to claim 1 characterized in that the emitter assembly comprises a mask or filter associated to at least a light-emitter, to give color to the light in at least one direction.

32. The vehicle rear-viewside mirror according to claim 1, characterized in that said emitter assembly is adapted to laterally emit light from the same transparent surface (1) by means of at least one emitter and/or a multi-focal system with more than one emitter positioned with equal or different orientation between them.

33. The vehicle rear-viewside mirror according to claim 1, characterized in that said emitter assembly is adapted to emit light downwards by means of a manual (262) or a motorized (280) rotative module, such that said module permits turning of the module around a vertical axis from 0° to more than 180° towards the front or rear wheel for complementary tasks and/or to facilitate maneuvers.

34. The vehicle rear-viewside mirror according to claim 33, characterized in that said rotative module has a device that permits it to be adjusted and retained in a determined position, by means of a piece (251), complementary pressure frame/mark, tooth (214) or screws (250 and 258), halfway between said emitter assembly and the part of the rear-view mirror which contains the rotative module, the housing (D) or chassis.

35. The vehicle rear-viewside mirror according to claim 1, characterized in that said emitter assembly is adapted to be initiated when activating a central locking system and/or alarm (355) and/or voluntarily or by any system that locks and disables the vehicle or automatically upon opening or closing the door, and/or synchronized with a gear lever, in first gear and reverse positions, at low velocity (354), and is turned off manually or automatically by a clock (310).

* * * * *

UNITED STATES PATENT AND TRADEMARK OFFICE

CERTIFICATE OF CORRECTION

PATENT NO. : 7,192,171 B2
APPLICATION NO. : 11/157075
DATED : March 20, 2007
INVENTOR(S) : Rodriguez Barros et al.

It is certified that error appears in the above-identified patent and that said Letters Patent is hereby corrected as shown below:

In Column 40, line 60, delete “rear-viewside” and insert -- rear-view side --.

In Column 40, line 65, delete “rear-viewside” and insert -- rear-view side --.

In Column 41, line 4, delete “rear-viewside” and insert -- rear-view side --.

In Column 41, line 11, delete “rear-viewside” and insert -- rear-view side --.

In Column 41, line 16, delete “rear-viewside” and insert -- rear-view side --.

In Column 41, line 19, delete “rear-viewside” and insert -- rear-view side --.

In Column 41, line 22, delete “rear-viewside” and insert -- rear-view side --.

In Column 41, line 27, delete “the”.

In Column 41, line 28, delete “rear-viewside” and insert -- rear-view side --.

In column 41, line 36, delete “rear-viewside” and insert -- rear-view side --.

In Column 41, line 42, delete “rear-viewside” and insert -- rear-view side --.

In Column 41, line 48, delete “rear-viewside” and insert -- rear-view side --.

In Column 41, line 54, delete “rear-viewside” and insert -- rear-view side --.

In Column 41, line 59, delete “rear-viewside” and insert -- rear-view side --.

In Column 41, line 64, delete “rear-viewside” and insert -- rear-view side --.

In Column 42, line 4, delete “rear-viewside” and insert -- rear-view side --.

In Column 42, line 8, delete “rear-viewside” and insert -- rear-view side --.

In Column 42, line 17, delete “rear-viewside” and insert -- rear-view side --.

UNITED STATES PATENT AND TRADEMARK OFFICE

CERTIFICATE OF CORRECTION

PATENT NO. : 7,192,171 B2 
APPLICATION NO. : 11/157075
DATED : March 20, 2007
INVENTOR(S) : Rodriguez Barros et al.

It is certified that error appears in the above-identified patent and that said Letters Patent is hereby corrected as shown below:

In Column 42, line 20, delete “the”.

In Column 42, line 23, delete “rear-viewside” and insert -- rear-view side --.

In Column 42, line 31, delete “rear-viewside” and insert -- rear-view side --.

In Column 42, line 36, delete “rear-viewside” and insert -- rear-view side --.

In Column 42, line 41, delete “the”.

In Column 42, line 44, delete “rear-viewside” and insert -- rear-view side --.

In Column 42, line 48, delete “connectioh” and insert -- connection --.

In Column 42, line 66, delete “rear-viewside” and insert -- rear-view side --.

In Column 43, line 4, delete “rear-viewside” and insert -- rear-view side --.

In Column 43, line 13, delete “rear-viewside” and insert -- rear-view side --.

In Column 43, line 24, delete “rear-viewside” and insert -- rear-view side --.

In Column 43, line 31, delete “rear-viewside” and insert -- rear-view side --.

In Column 43, line 40, delete “the”.

In Column 43, line 43, delete “rear-viewside” and insert -- rear-view side --.

In Column 44, line 5, delete “rear-viewside” and insert -- rear-view side --.

In Column 44, line 10, delete “rear-viewside” and insert -- rear-view side --.

In Column 44, line 15, delete “rear-viewside” and insert -- rear-view side --.

In Column 44, line 19, delete “rear-viewside” and insert -- rear-view side --.

UNITED STATES PATENT AND TRADEMARK OFFICE

CERTIFICATE OF CORRECTION

PATENT NO. : 7,192,171 B2
APPLICATION NO. : 11/157075
DATED : March 20, 2007
INVENTOR(S) : Rodriguez Barros et al.

It is certified that error appears in the above-identified patent and that said Letters Patent is hereby corrected as shown below:

In Column 44, line 25, delete “rear-viewside” and insert -- rear-view side --.

In Column 44, line 32, delete “rear-viewside” and insert -- rear-view side --.

In Column 44, line 40, delete “rear-viewside” and insert -- rear-view side --.

Signed and Sealed this

Eighteenth Day of March, 2008

Jon W. Dudas

JON W. DUDAS
*Director of the United States Patent and Trademark Office*